US012204919B2

(12) United States Patent
Zhang

(10) Patent No.: US 12,204,919 B2
(45) Date of Patent: Jan. 21, 2025

(54) INTERFACE DISPLAY METHOD AND ELECTRONIC DEVICE

(71) Applicant: HUAWEI TECHNOLOGIES CO., LTD., Guangdong (CN)

(72) Inventor: Ziyue Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 292 days.

(21) Appl. No.: 17/607,031

(22) PCT Filed: May 21, 2020

(86) PCT No.: PCT/CN2020/091612
§ 371 (c)(1),
(2) Date: Oct. 28, 2021

(87) PCT Pub. No.: WO2020/238759
PCT Pub. Date: Dec. 3, 2020

(65) Prior Publication Data

US 2022/0214891 A1 Jul. 7, 2022

(30) Foreign Application Priority Data

May 25, 2019 (CN) ........................ 201910442738.6

(51) Int. Cl.
*G06F 3/0481* (2022.01)
*G06F 3/0485* (2022.01)
(Continued)

(52) U.S. Cl.
CPC ............ *G06F 9/451* (2018.02); *G06F 3/0481* (2013.01); *G06F 3/0485* (2013.01); *G06F 3/04886* (2013.01); *G06F 2203/04803* (2013.01)

(58) Field of Classification Search
CPC ...... G06F 9/451; G06F 3/0481; G06F 3/0485; G06F 3/04886; G06F 2203/04803
See application file for complete search history.

(56) References Cited

U.S. PATENT DOCUMENTS 9,207,717 B2 * 12/2015 Sirpal ................. G06F 3/04883
11,714,520 B2 * 8/2023 Hwang .............. G06F 3/04886
715/780

(Continued)

FOREIGN PATENT DOCUMENTS

CN 103324435 A 9/2013
CN 106020592 A 10/2016

(Continued)

*Primary Examiner* — Haoshian Shih

(57) ABSTRACT

An interface display method is provided. The method includes: An electronic device displays an interface of a first application in a first display area of a display (501). The electronic device receives a first operation when the electronic device displays the interface of the first application (502). In response to the first operation, the electronic device displays a multi-task interface in the first display area (503), where the multi-task interface includes an application window of a currently running application. The electronic device receives a second operation performed on an application window of a second application in the application windows of the currently running applications (504). In response to the second operation, the electronic device displays the interface of the first application and an interface of the second application in different areas in the first display area (505).

20 Claims, 157 Drawing Sheets

(51) Int. Cl.
*G06F 3/04886* (2022.01)
*G06F 9/451* (2018.01)

(56) References Cited

U.S. PATENT DOCUMENTS

| | | | | |
|---|---|---|---|---|
| 2014/0068504 | A1 | 3/2014 | Sun et al. | |
| 2014/0164990 | A1* | 6/2014 | Kim | G06F 3/0488 715/788 |
| 2018/0121082 | A1* | 5/2018 | Zhu | G06F 3/04847 |
| 2019/0065240 | A1 | 2/2019 | Kong et al. | |

FOREIGN PATENT DOCUMENTS

| | | | |
|---|---|---|---|
| CN | 106537319 | A | 3/2017 |
| CN | 106970735 | A | 7/2017 |
| CN | 107783830 | A | 3/2018 |
| CN | 109358929 | A | 2/2019 |
| WO | 2019014859 | A1 | 1/2019 |

* cited by examiner

CONT. FROM FIG. 1A

TO FIG. 1C

CONT. FROM FIG. 1B

CONT. FROM FIG. 2A

TO FIG. 2C

CONT. FROM FIG. 2B

CONT. FROM FIG. 2C

CONT. FROM FIG. 20(a)-1

CONT. FROM FIG. 20(b)-1

CONT. FROM FIG. 20(c)-1

TO FIG. 34(a)-2

CONT. FROM FIG. 34(a)-1

TO FIG. 34(b)-2

CONT. FROM FIG. 34(b)-1

TO FIG. 34(c)-1

CONT. FROM FIG. 34(c)-1

INTERFACE DISPLAY METHOD AND ELECTRONIC DEVICE

This application is a National Stage of International Application No. PCT/CN2020/091612, filed on May 21, 2020, which claims priority to Chinese Patent Application No. 201910442738.6, filed on May 25, 2019, both of which are hereby incorporated by reference in their entireties.

TECHNICAL FIELD

Embodiments of the present invention relate to the field of electronic device technologies, and in particular, to an interface display method and an electronic device.

BACKGROUND

Currently, a display of an electronic device, for example, a mobile phone, becomes larger. To fully utilize a display feature of a large screen, more electronic devices support a split-screen function.

The mobile phone is used as an example. An implementation solution of a screen splitting operation in the conventional technology is as follows:

As shown in FIG. 1A to FIG. 1C, the mobile phone displays an interface 101 of a first application. In response to a screen splitting gesture of a user, for example, the user taps the display and slides from left to right, the mobile phone loads an interface 102. A display area of the interface 102 includes a display area 1021 and a display area 1022. The interface of the first application is displayed in the display area 1021, and icons of one or more other second applications that support the split-screen function are displayed in the display area 1022. The user may select the second application in the display area 1022. When the user selects an icon of a second application, an interface of the second application is displayed in the display area 1022.

Another implementation solution of the screen splitting operation is as follows:

As shown in FIG. 2A to FIG. 2D, a user opens a multi-task management interface 104 by performing operations such as sliding up from a lower edge of an interface 101. Windows of one or more applications started by the user are displayed on the multi-task management interface 104. The window of the application includes a split-screen button 1041. When the user taps a split-screen button of a first application, the mobile phone loads an interface 102. The interface 102 includes a display area 1021 and a display area 1022. An interface of the first application is displayed in the display area 1021, and icons of one or more other second applications that support the split-screen function are displayed in the display area 1022. The user may select the second application in the display area 1022. When the user selects an icon of a second application, an interface of the second application is displayed in the display area 1022.

The implementation solutions of the screen splitting operation in the conventional technology are inconvenient for the user to perform the screen splitting operation, and improvement is required.

SUMMARY

Embodiments of this application provide an interface display method and an electronic device, to implement a convenient screen splitting operation.

According to a first aspect, an embodiment of this application provides an interface display method. The method may be applied to an electronic device. The electronic device includes a display. The method includes:

The electronic device displays an interface of a first application in a first display area of the display. The first application may be one application or a plurality of applications. In other words, in the first display area, only an interface of one application may be displayed, or interfaces of a plurality of applications (each application has one interface) may be displayed.

When the electronic device displays the interface of the first application, the electronic device receives a first operation. To be specific, when the first application runs in a foreground, a user performs the first operation. For example, the first operation may be an operation performed on the first display area. The electronic device displays a multi-task interface in the first display area in response to the first operation. The multi-task interface includes an application window of a currently running application, and the application window of the currently running application includes at least an application window of the first application. For example, the currently running application may include all applications currently running on the electronic device. It should be noted that an application included in the electronic device may run in the foreground or a background.

The electronic device receives a second operation. The second operation is an operation performed on an application window of a second application in the application windows of the currently running applications. The electronic device displays the interface of the first application and an interface of the second application in different areas in the first display area in response to the second operation. The application window of the second application is included in the multi-task interface. The second application may be selected as an application, to be displayed on a split screen, by using the second operation performed on the application window of the second application, and the first application and the second application may be directly displayed on split screens. In this embodiment of this application, when using the first application, the user may conveniently perform one operation on the multi-task interface by using this method, to implement two functions: second application selection and split-screen display. In other words, the application to be displayed on a split screen is selected and the split-screen display is triggered by using one operation. This simplifies a screen splitting operation.

Optionally, application windows of two or more currently running applications may be simultaneously displayed in the first display area. However, if there is a plurality of currently running applications, when the multi-task interface is displayed on the display, application windows of all the currently running applications cannot be simultaneously displayed. When the user wants to view a hidden application window on the multi-task interface, the user may perform a third operation on the multi-task interface. In response to the third operation, the electronic device displays a plurality of application windows in scrolling mode on the multi-task interface. When the plurality of application windows are scrolled, the application window of the first application may be always displayed. In other words, the application window of the first application is not moved out of the first display area. When the plurality of application windows are displayed in scrolling mode, the user generally searches for an application that needs to be displayed on split screens with the first application. In this case, the application window of the first application is always kept displayed, to prompt the user that the first application is to be displayed on a split screen.

Optionally, some applications included in the electronic device support split-screen display, and some applications do not support the split-screen display. Therefore, some applications corresponding to the application windows included in the multi-task interface may support the split-screen display, and some applications may not support the split-screen display. When the second operation is performed on an application window of an application supporting the split-screen display, the electronic device outputs a first effect. For example, the first effect may be that as the user slides down the application window of the second application, the application window of the second application is moved down. When the second operation is performed on an application window of an application that does not support the split-screen display, the electronic device outputs a second effect, to prompt the user that the currently selected application does not support the split-screen display. For example, as the user slides down an application window, the application window moves down for a short distance and then returns to an initial position, to prompt the user that the application window does not support the split-screen display.

According to a second aspect, an embodiment of this application provides another interface display method, applied to an electronic device. The electronic device includes a display. The method includes:

The electronic device displays an interface of a first application in a first display area of the display. The first application may be one application or a plurality of applications. When the electronic device displays the interface of the first application, the electronic device receives a first operation. The electronic device displays a multi-task interface in the first display area in response to the first operation. The displayed multi-task interface includes a first area and a second area. The first area includes an application window of the first application. The second area includes an application window of a currently running application, for example, an application window of a currently running second application. The second area may include the application window of the first application, or may not include the application window of the first application.

The electronic device receives a second operation performed on the application window of the second application. The electronic device moves the application window of the second application to the first area in response to the second operation. After the electronic device moves the application window of the second application to the first area, the electronic device may display, in different areas in the first display area, applications corresponding to all application windows in the first area. In this embodiment of this application, when using the first application, the user may conveniently perform an operation on the multi-task interface by using this method, to move an application to be displayed on a split screen to the first area. Then, all applications included in the first area are displayed on split screens.

According to a third aspect, an embodiment of this application provides another interface display method, applied to an electronic device. The method includes: The electronic device displays an interface of a first application. The electronic device receives a first operation when displaying the interface of the first application. The electronic device displays a first multi-task interface in response to the first operation, where the first multi-task interface includes an application window of a currently running application. The electronic device receives a second operation when displaying the first multi-task interface. For example, the second operation may be an operation performed on an application window on the first multi-task interface or another operation that triggers a second multi-task interface. The electronic device displays the second multi-task interface in response to the second operation. The second multi-task interface includes a first area and a second area. The first area includes an application window of the first application, and the second area includes the application window of the currently running application. The electronic device receives a third operation performed on an application window, in the second area, of a second application that is currently running. The electronic device moves the application window of the second application to the first area in response to the third operation. The second operation and the third operation may be one consecutive operation. For example, the second operation may be dragging down the application window of the second application, and the third operation may be dragging the application window of the second application to the first area. The second operation and the third operation are consecutive, and a finger of a user may not leave the screen. After the application window of the second application is moved to the first area, the electronic device displays the interface of the first application and an interface of the second application in different areas based on application windows in the first area. In this solution, the first multi-task interface is first displayed in response to the first operation of the user. Then, the second multi-task interface including two areas is displayed, to prompt the user to move an application window to be displayed on a split screen to the first area.

Optionally, with reference to the third aspect, after the electronic device receives the second operation, in response to the second operation, the electronic device may display a process in which the first multi-task interface changes to the second multi-task interface. In other words, the electronic device may present an animation in which the application window of the first application is moved to the first area, to prompt the user to move the application window to be displayed on a split screen to the first area.

Optionally, the method provided in the third aspect may be performed on one display area of the display. The display may further include one or more other display areas for displaying another interface. The method provided in the third aspect may further include: after one or more application windows on the second multi-task interface are dragged to another display area, an application corresponding to the dragged application window may be displayed in the another display area. If a plurality of application windows are dragged, a plurality of applications corresponding to the plurality of application windows are displayed in different areas in the another display area. The user may conveniently display a plurality of applications in a plurality of display areas of the display in a split-screen manner.

Optionally, with reference to the first aspect, the second aspect, or the third aspect, the first application and the second application may be the same. If the first application and the second application are the same, the interface of the first application and the interface of the second application may be the same or different. To be specific, if the user selects the application window of the first application on the multi-task interface, the electronic device displays two interfaces of the first application in different areas. The two interfaces may be two same interfaces or two different interfaces of the first application. The user may display one application on split screens, that is, simultaneously display two interfaces of the application, and then independently perform an operation on each interface, so that the user can simultaneously use the two interfaces of the same application.

Optionally, with reference to the first aspect, the second aspect, or the third aspect, the second operation or the third operation includes any one of the following operations: touching and holding the application window of the second application, double-tapping the application window of the second application, or sliding down the application window of the second application.

Optionally, with reference to the first aspect, the second aspect, or the third aspect, if there is a plurality of currently running applications, the multi-task interface includes application windows of the plurality of applications. These application windows may be arranged according to a specific rule. For example, the arrangement may be based on a frequency that each application is jointly used with the first application. If a frequency that an application is jointly used with the first application is relatively high, the application is preferentially displayed on the multi-task interface. Therefore, it can be more convenient for the user to select an application having a high frequency of being jointly used with first application to perform screen splitting.

Optionally, with reference to the first aspect, the second aspect, or the third aspect, the second application may be a plurality of applications. The user may simultaneously perform a multi-point operation on the plurality of applications. In response to the multi-point operation, the electronic device may display the first application and the plurality of second applications in different areas. The user may perform one operation to simultaneously display a plurality of applications on split screens.

Optionally, with reference to the first aspect, the second aspect, or the third aspect, the first operation may be sliding from an edge of the display area to the center. Alternatively, the display area may include a multi-task button, and the first operation may be an operation performed on the multi-task button, for example, tapping, touching and holding, or pressing.

Optionally, with reference to the first aspect or the second aspect, the first display area may be all display areas on the display that are used to display an application interface, for example, may be all display areas except a status bar. Alternatively, the first display area may be a part of a display area, on the display, that is used to display an application interface. For example, the display may further include a second display area that displays another application interface. A home screen of the electronic device or an application interface may be displayed in the second display area. When the multi-task interface is displayed in the first display area, the user may perform an operation on one or more application windows on the multi-task interface. The operation is moving the one or more application windows to the second display area. In response to the operation, the electronic device may display interfaces of one or more applications in the second display area. If one application window is moved to the second display area by using the operation, the application window is displayed in the second display area. If a plurality of application windows are moved to the second display area by using the operation, interfaces of the plurality of applications are displayed in different areas in the second display area. The user may conveniently display a plurality of applications in a plurality of display areas of the display in the split-screen manner.

Optionally, with reference to the second aspect or the third aspect, after the application window of the second application is moved to the first area, in response to the movement, the electronic device may display, in different areas in the first display area, applications corresponding to all the application windows in the first area. In other words, the interface of the first application and the interface of the second application are displayed in different areas. When using the first application, the user may conveniently perform an operation on the multi-task interface, that is, move the second application to the first area, to implement the two functions: the second application selection and the split-screen display. The application to be displayed on a split screen is selected and the split-screen display is triggered by using one operation of the user. This simplifies the screen splitting operation. The first area is displayed on the multi-task interface, and the two functions of the selection and the split-screen display can be implemented by moving an application to the first area. In this way, the screen splitting operation is simple and intuitive, and is convenient for the user to operate.

Optionally, with reference to the second aspect or the third aspect, after the electronic device moves the application window of the second application to the first area, the user may further tap a confirmation operation. In response to the confirmation operation, the electronic device displays, in different areas in the first display area, the applications corresponding to all the application windows included in the first area. In this implementation, before the user taps the confirmation operation, the user may further perform another operation. For example, if the user wants to simultaneously display three or more applications on split screens, the user may further move another application window to the first area until the user selects all applications to be displayed on split screens, and then tap the confirmation operation. In this way, the plurality of applications may be displayed on split screens. For another example, the user may adjust positions of a plurality of application windows in the first area, that is, move positions of one or more application windows in the first area. After adjusting the position of the application window, the user taps the confirmation operation to perform screen splitting. A relative position relationship between the plurality of applications during the split-screen display may be the same as a relative position relationship between the plurality of application windows in the first area when the confirmation operation is tapped. For another example, the user may sequentially move a plurality of application windows to the first area, or may move one or more application windows out of the first area, that is, move from the first area to the second area. When the user taps the confirmation operation after the movement, the applications corresponding to all the application windows included in the first area are displayed on split screens. The user adjusts the positions of the plurality of application windows in the first area, so that the user conveniently adjusts display positions of the plurality of applications after the screen splitting.

Optionally, with reference to the second aspect or the third aspect, when the user moves the application window in the second area to the first area, the first area may include one or more application windows. During the movement, the user may move an application window to a desired position. For example, the first area includes the application window of the first application. When the application window of the second application is moved, the application window of the second application may be moved above the application window of the first application, or may be moved below the application window of the first application. A position relationship between a plurality of application interfaces to be subsequently displayed on split screens is the same as a position relationship between the plurality of application windows in the first area. When moving the application window of the second application, the user may control positions of the applications to be subsequently displayed on split screens.

According to a fourth aspect, an embodiment of this application provides an interface display method. The method may be applied to an electronic device. The electronic device includes a display. The method includes:

The electronic device displays a first interface of an instant messaging application in a first display area of the display.

When the electronic device displays the first interface, the electronic device receives a first operation. In response to the first operation, the electronic device displays a multi-task interface and stops displaying the first interface. The multi-task interface is used to display an application window of a currently running application, and the application window includes a window of the instant messaging application. When a user uses the first interface of the instant messaging application, if the user wants to use another interface of the application, the user may perform the first operation. For example, when the user browses friend feeds by using the instant messaging application (for example, Moments of the WeChat application), if an instant messaging message sent by another friend is received, the user may perform the first operation. Alternatively, when the user chats with a friend A by using the instant messaging application, if an instant messaging message sent by a friend B is received, the user may accordingly perform the first operation.

The electronic device receives a second operation on the multi-task interface. The second operation is an operation performed on the window of the instant messaging application. In response to the second operation, the electronic device displays the first interface of the first application and a second interface of the first application in different areas in the first display area. The first interface and the second interface may be the same or different. When the first interface displayed by the electronic device is a chat interface with the friend B, and the electronic device receives a new message sent by the friend B, if the electronic device receives the first operation of the user, the electronic device displays two first interfaces in different areas. When the first interface displayed by the electronic device is not a chat interface with the friend B (for example, the first interface is a chat interface with another friend or another interface of the instant messaging application), and the electronic device receives a new message sent by the friend B, if the electronic device receives the first operation of the user, the electronic device displays two different interfaces, namely, the first interface and the second interface of the instant messaging application in different areas. In this case, the second interface is the chat interface with the friend B.

In this embodiment of this application, when using the first application, the user may conveniently perform one operation on the multi-task interface by using this method, to display two different interfaces of the first application in different areas. In this way, the user can simultaneously use a plurality of functions of an application, to avoid repeatedly switching interfaces of the same application.

According to a fifth aspect, an embodiment of this application provides an electronic device. The electronic device includes a display, one or more processors, and one or more memories. The one or more memories store a computer program, and when the computer program is executed by the one or more processors, the electronic device is enabled to perform any method according to the first aspect, the second aspect, the third aspect, or the fourth aspect.

According to a sixth aspect, an embodiment of the present invention provides a graphical user interface (GUI). The GUI is stored in the electronic device according to the fifth aspect.

According to a seventh aspect, an embodiment of the present invention provides an interface display apparatus, included in an electronic device. The apparatus has a function of implementing behavior of the electronic device in the method according to the first aspect, the second aspect, the third aspect, or the fourth aspect. The function may be implemented by hardware, or may be implemented by hardware executing corresponding software. The hardware or the software includes one or more modules or units corresponding to the foregoing function.

According to an eighth aspect, an embodiment of the present invention provides a computer program product including instructions. When the computer program product runs on an electronic device, the electronic device is enabled to perform the method according to any one of the first aspect, the second aspect, the third aspect, or the fourth aspect.

According to a ninth aspect, an embodiment of the present invention provides a computer-readable storage medium, including instructions. When the instructions are run on an electronic device, the electronic device is enabled to perform the method according to any one of the first aspect, the second aspect, the third aspect, or the fourth aspect.

DESCRIPTION OF EMBODIMENTS

It should be noted that descriptions such as "first", "second", and the like in the embodiments of this application are used to distinguish different messages, devices, modules, applications, or the like, and do not indicate a sequence and "first" and "second" are not limited to different types either. Descriptions such as "first" and "second" are not limited in quantity. For example, a "first application" may be one "first application", or may be a plurality of "first applications".

The term "A and/or B" in the embodiments of this application describes only an association for describing associated objects and represents that three relationships may exist. For example, only A exists, both A and B exist, and only B exists. In addition, the character "I" in the embodiments of this application generally indicates an "or" relationship between the associated objects.

A multi-task technology means that an electronic device may simultaneously run a plurality of applications (which may be referred to as applications for short). Each application is referred to as a task. The multi-task technology may be specifically reflected as a screen splitting technology and a picture-in-picture (Picture-in-Picture, PIP) technology. Screen splitting means that interfaces of different applications may be displayed in different display areas of a display of the electronic device, and the interfaces of the different applications do not overlap each other. For example, the interfaces of the different applications are displayed separately, so that a user can simultaneously operate the applications. The picture-in-picture technology means that after a first interface is displayed, a second interface is displayed on the first interface in an overlapping manner. For ease of description, split-screen display and picture-in-picture display are referred to as "area-based display" in the embodiments of this application.

The embodiments of this application provide an interface display method, and the method may be applied to an electronic device. For example, the electronic device may be a mobile phone, a tablet personal computer (Tablet Personal Computer), a laptop computer (Laptop Computer), a digital camera, a personal digital assistant (personal digital assistant, PDA for short), a navigation apparatus, a mobile internet device (Mobile Internet Device, MID), a vehicle-mounted apparatus, or a wearable device (Wearable Device).

Figure 1A:
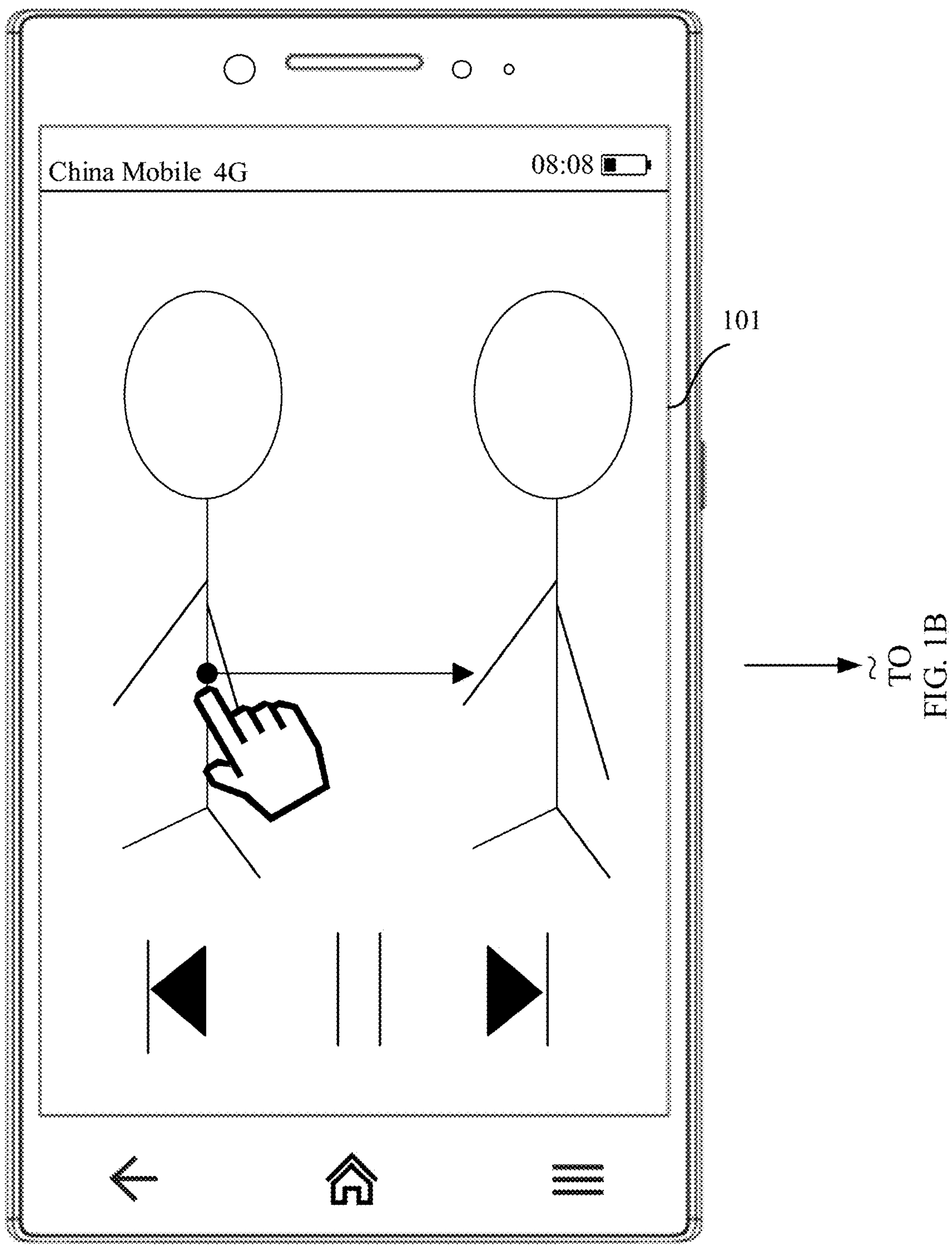
FIG. 1A to FIG. 1C are schematic diagrams of a scenario of an interface display method according to the conventional technology.
Figure 1B:
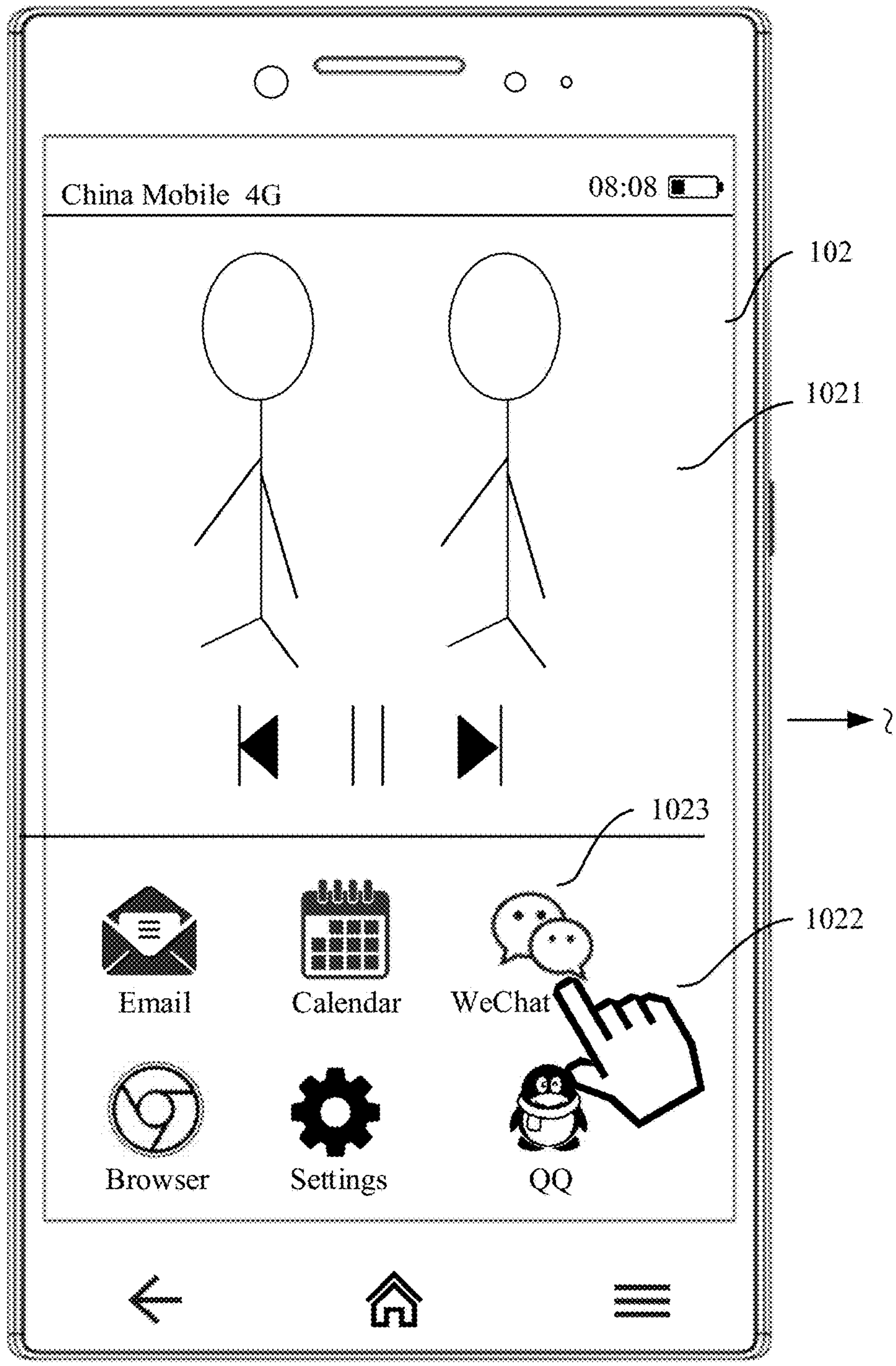
Figure 1C:
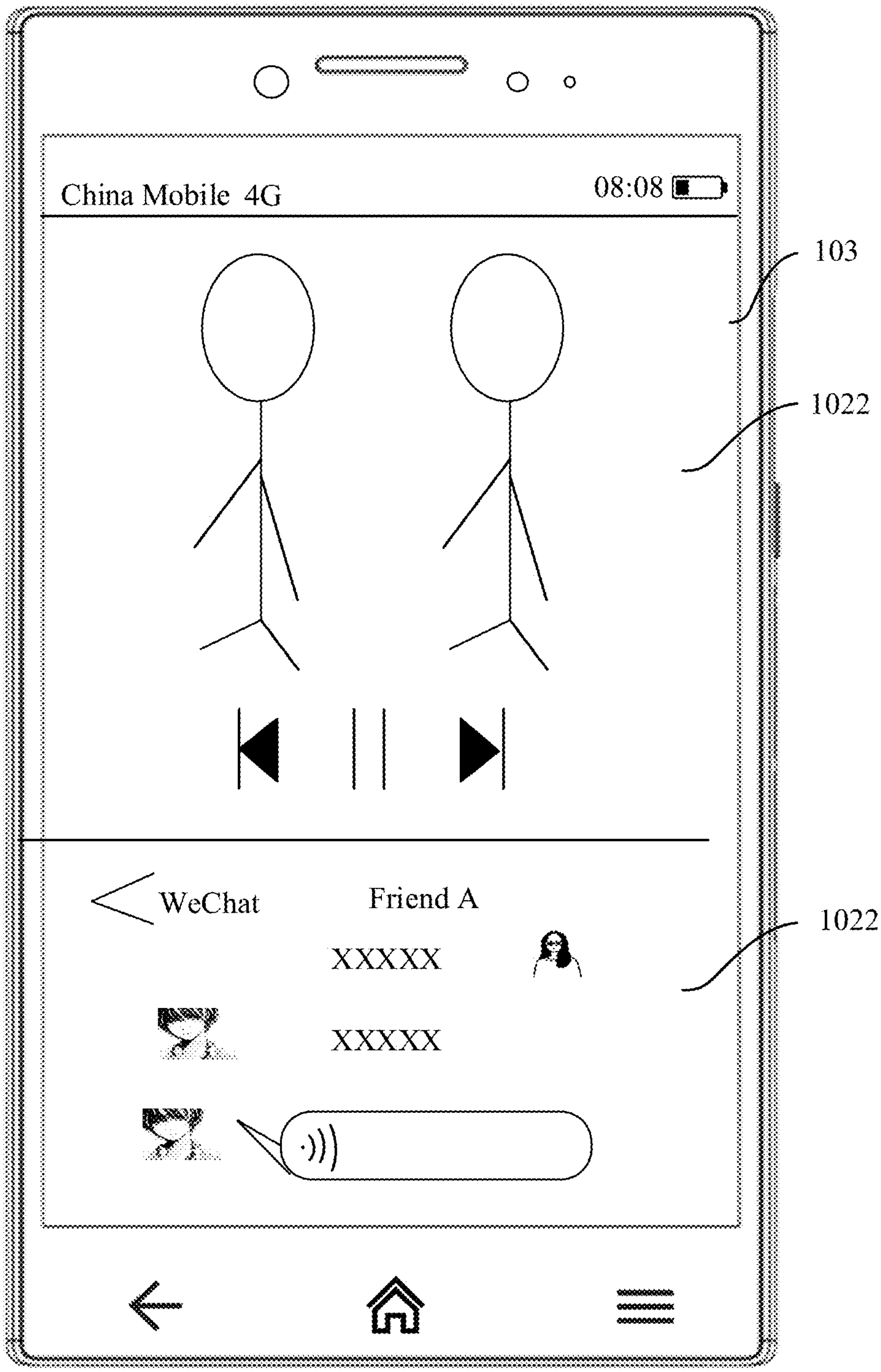
Figure 2A:
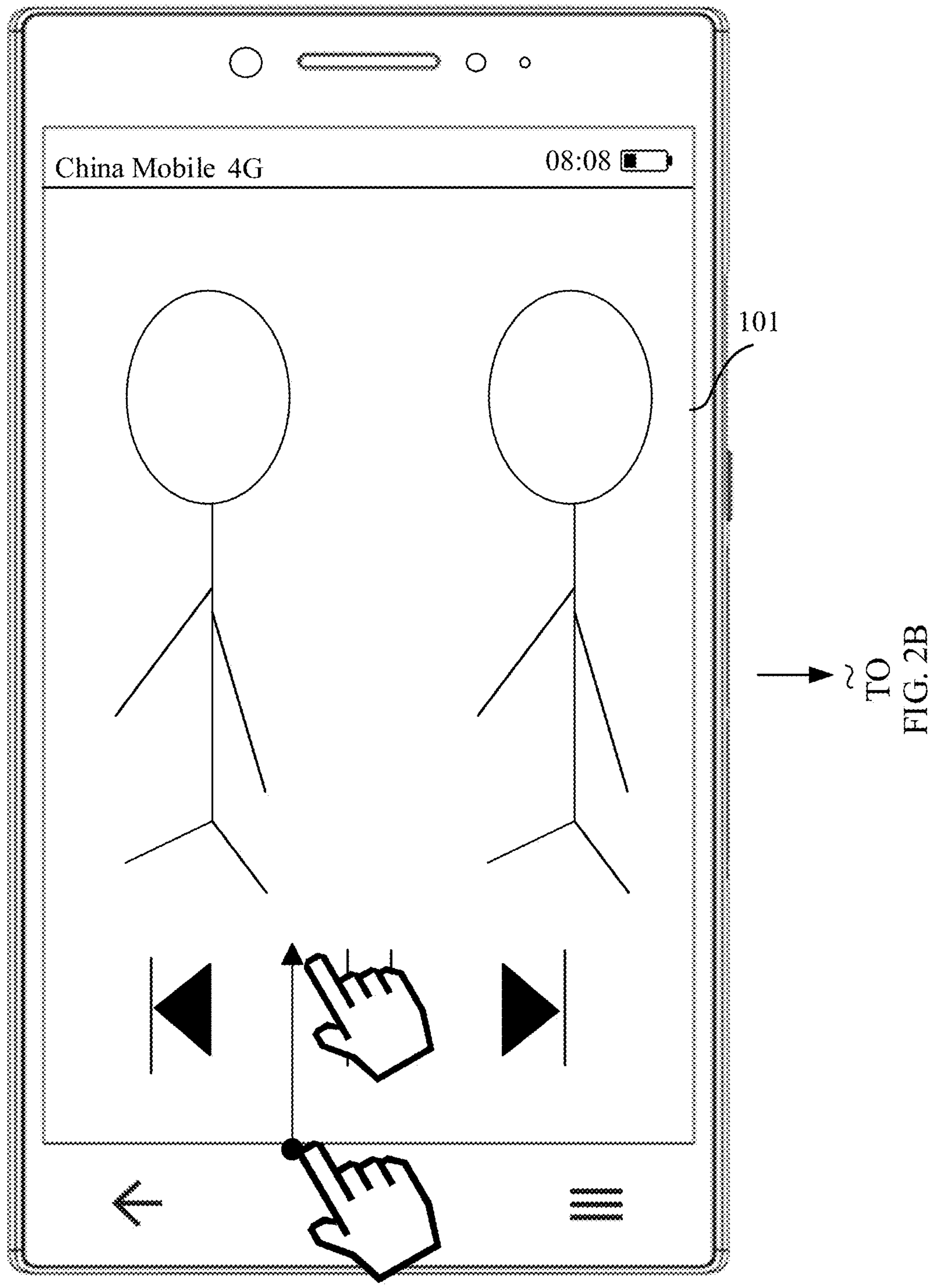
FIG. 2A to FIG. 2D are schematic diagrams of a scenario of another interface display method according to the conventional technology.
Figure 2B:
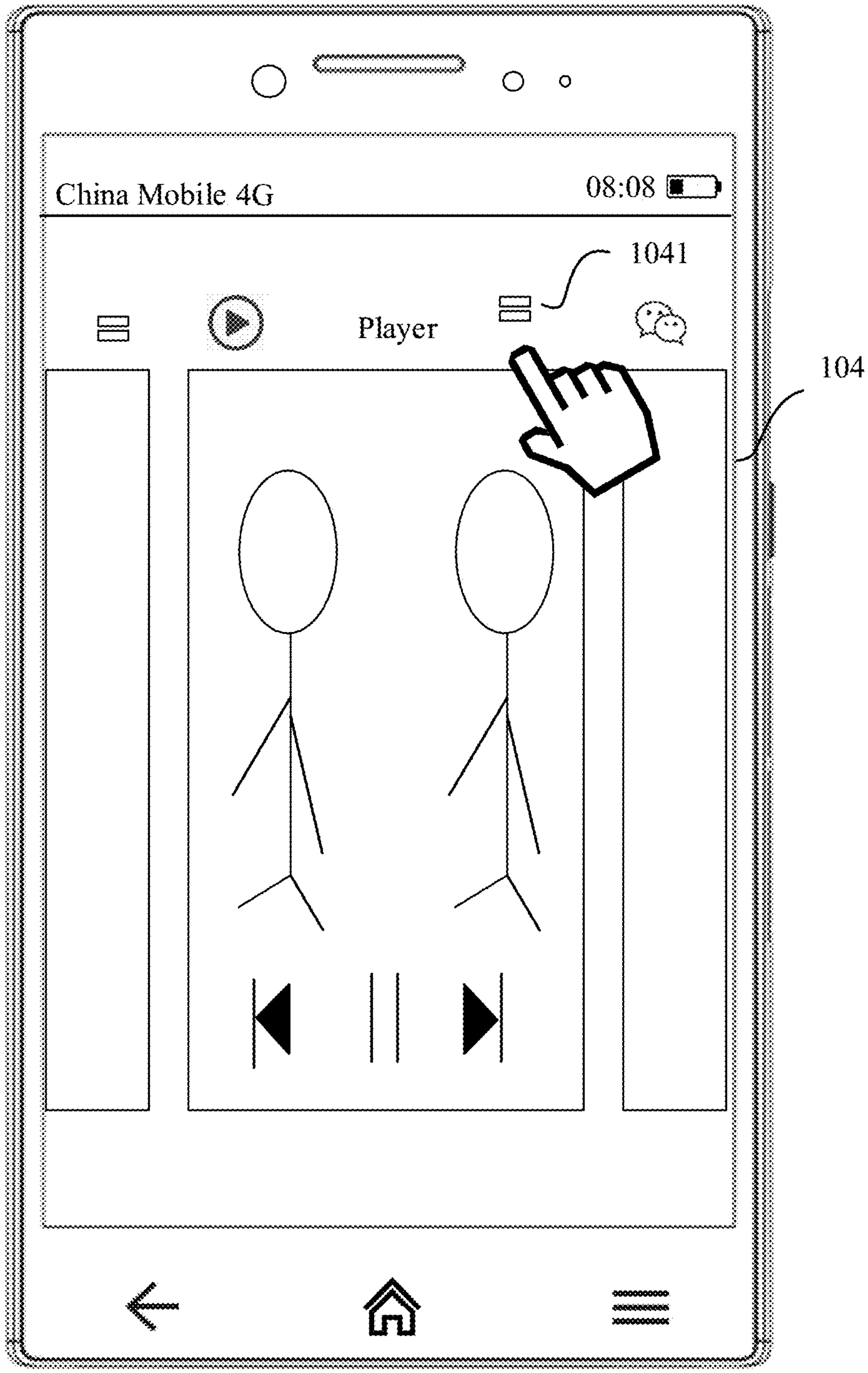
Figure 2C:
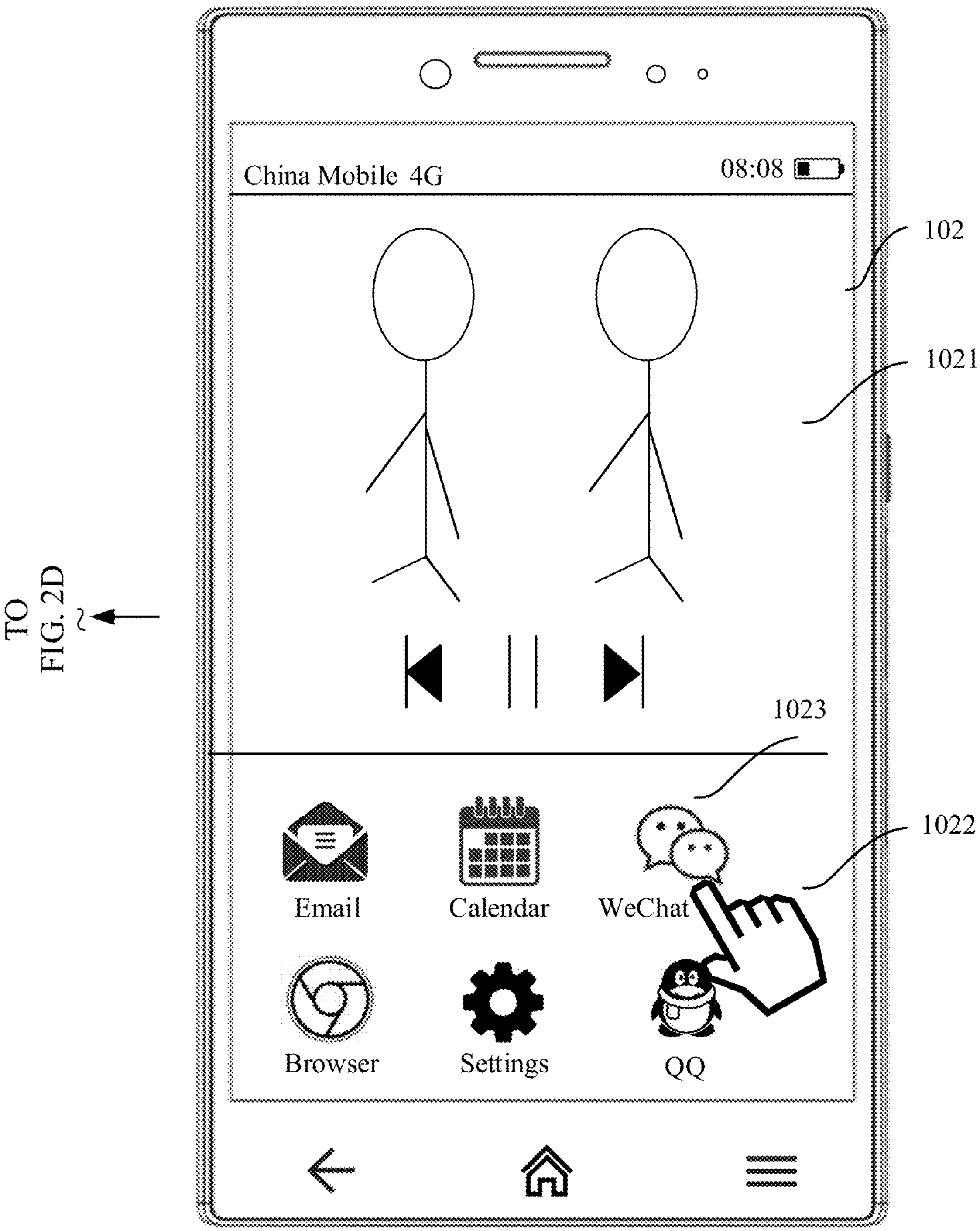
Figure 2D:
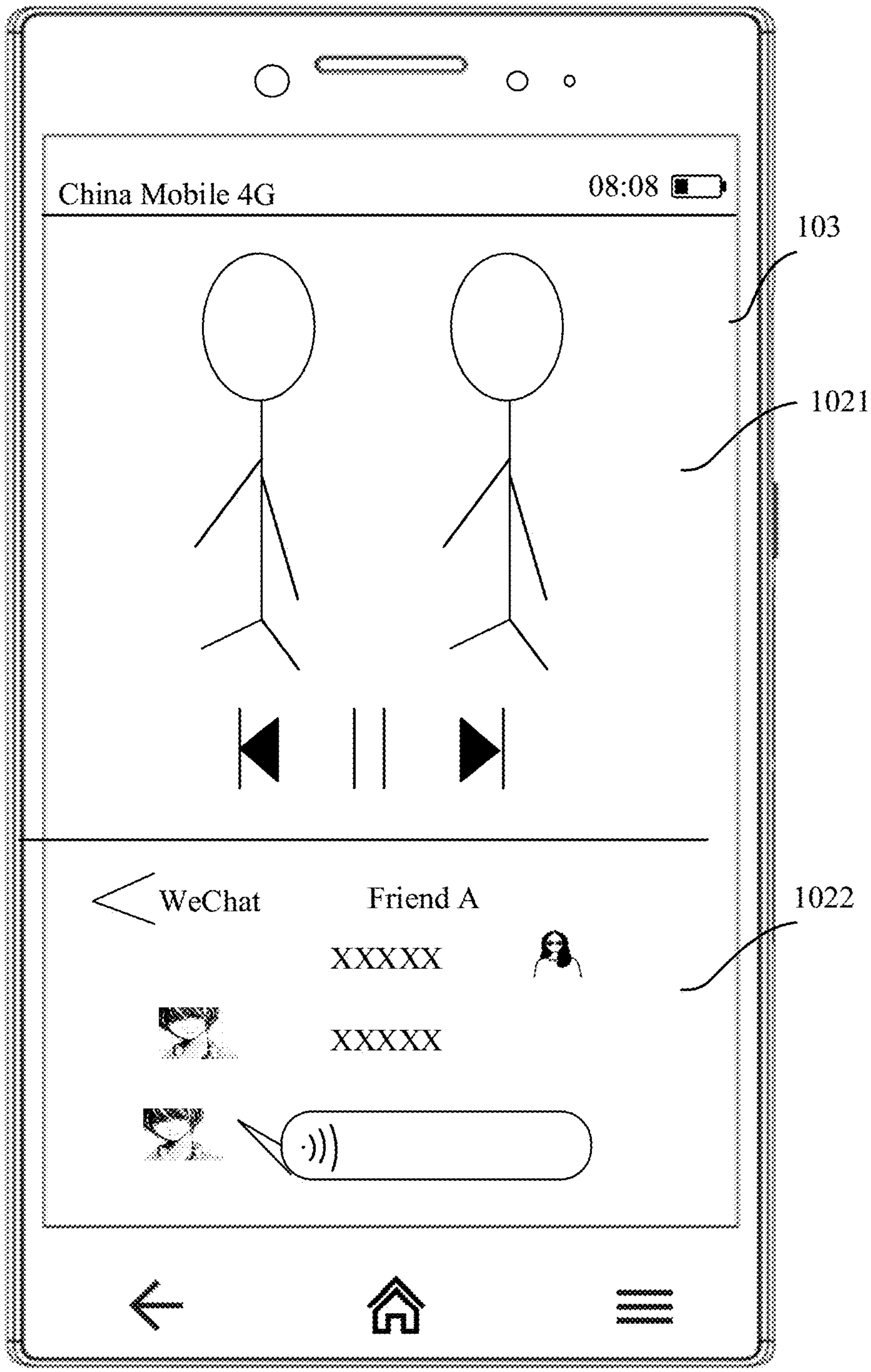
Figure 3:
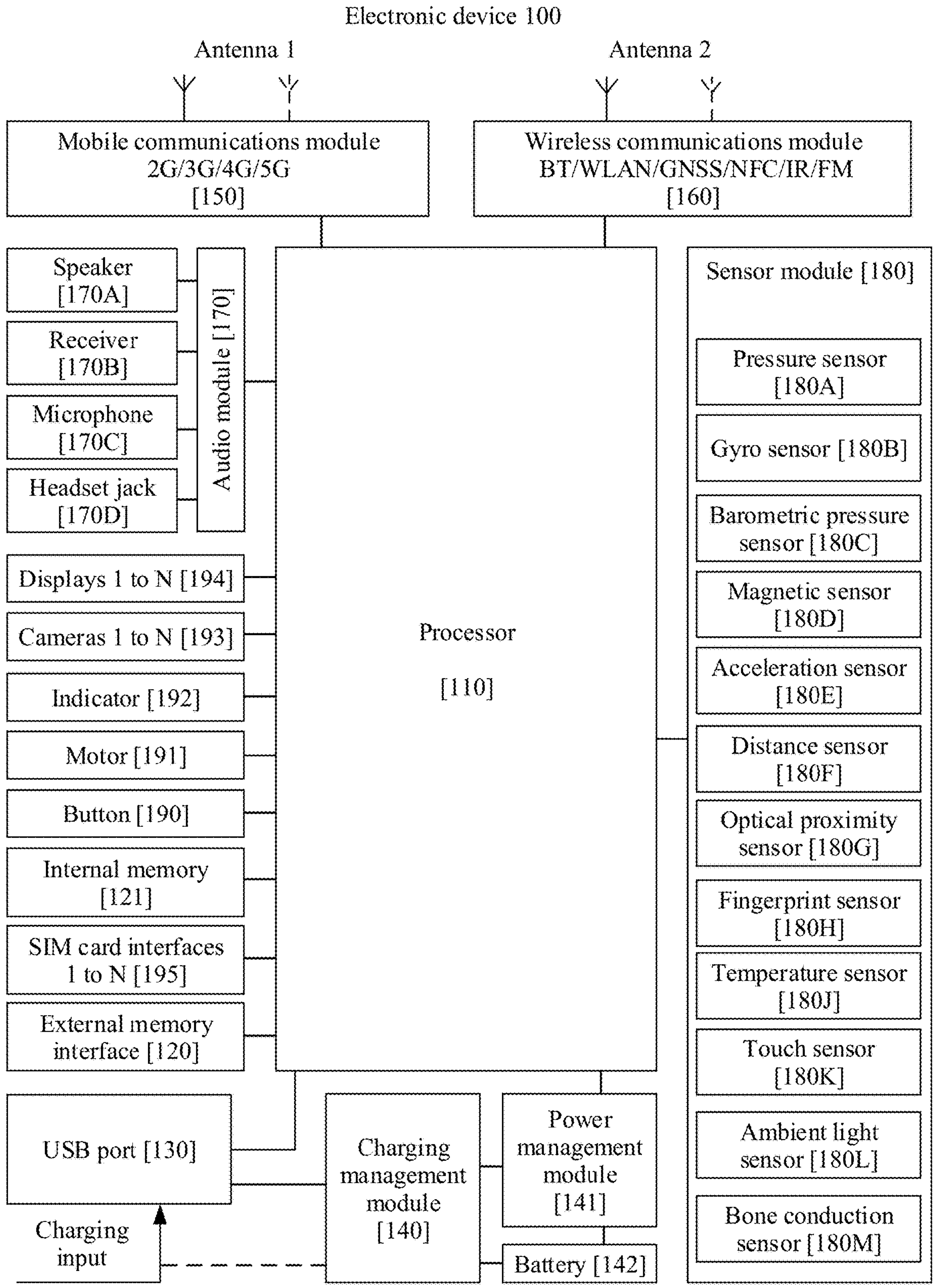
FIG. 3 is a schematic diagram of a structure of an electronic device according to an embodiment of this application.

FIG. 3 is a schematic diagram of a structure of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the structure shown in this embodiment of the present invention does not constitute a specific limitation on the electronic device 100. In some other embodiments of this application, the electronic device 100 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on instruction operation code and a time sequence signal, to complete control of instruction reading and instruction execution.

A memory may further be disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory. This avoids repeated access and reduces waiting time of the processor 110. Therefore, system efficiency is improved.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (serial clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call by using a Bluetooth headset.

The PCM interface may also be configured to perform audio communication, and sample, quantize, and code an analog signal. In some embodiments, the audio module 170 may be coupled to the wireless communications module 160 through a PCM bus interface. In some embodiments, the audio module 170 may alternatively transmit an audio signal to the wireless communications module 160 through the PCM interface, to implement the function of answering a call through the Bluetooth headset. Both the I2S interface and the PCM interface may be configured for audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music by using the Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a photographing function of the electronic device 100. The processor 110 communicates with the display 194 through the DSI interface, to implement a display function of the electronic device 100.

The GPIO interface may be configured through software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is an interface that conforms to a USB standard specification, and may be specifically a mini USB port, a micro USB port, a USB Type-C port, or the like. The USB port 130 may be configured to connect to a charger to charge the electronic device 100, or may be configured to transmit data between the electronic device 100 and a peripheral device, or may be used to connect to a headset for playing audio through the headset. Alternatively, the interface may be configured to connect to another electronic device, for example, an AR device.

It may be understood that an interface connection relationship between the modules shown in this embodiment of the present invention is merely an example for description, and does not constitute a limitation on the structure of the electronic device 100. In some other embodiments of this application, the electronic device 100 may alternatively use an interface connection manner different from that in the foregoing embodiment, or a combination of a plurality of interface connection manners.

The charging management module 140 is configured to receive a charging input from the charger. The charger may be a wireless charger or a wired charger. In some embodiments of wired charging, the charging management module 140 may receive a charging input from a wired charger through the USB port 130. In some embodiments of wireless charging, the charging management module 140 may receive a wireless charging input by using a wireless charging coil of the electronic device 100. The charging management module 140 supplies power to the electronic device by using the power management module 141 when charging the battery 142.

The power management module 141 is configured to connect to the battery 142 and the charging management module 140 to the processor 110. The power management module 141 receives an input of the battery 142 and/or an input of the charging management module 140, and supplies power to the processor 110, the internal memory 121, the display 194, the camera 193, the wireless communications module 160, and the like. The power management module 141 may further be configured to monitor parameters such as a battery capacity, a quantity of battery cycles, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive electromagnetic wave signals. Each antenna in the electronic device 100 may be configured to cover one or more communications frequency bands. Different antennas may further be multiplexed to improve antenna utilization. For example, the antenna 1 may be multiplexed as a diversity antenna in a wireless local area network. In some other embodiments, the antenna may be used in combination with a tuning switch.

The mobile communications module 150 may provide a solution that is applied to the electronic device 100 and that includes wireless communications technologies such as 2G, 3G, 4G, and 5G. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transmit a processed electromagnetic wave to the modem processor for demodulation. The mobile communications module 150 may further amplify a signal modulated by the modem processor, and convert the signal into an electromagnetic wave for radiation through the antenna 1. In some embodiments, at least some function modules of the mobile communications module 150 may be disposed in the processor 110. In some embodiments, at least some function modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transfers the low-frequency baseband signal obtained through demodulation to the baseband processor for processing. The low-frequency baseband signal is processed by the baseband processor, and is then transferred to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same component as the mobile communications module 150 or another function module.

The wireless communications module 160 may provide a wireless communication solution that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, or the like and that is applied to the electronic device 100. The wireless communications module 160 may be one or more components integrating at least one communications processor module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some embodiments, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or satellite based augmentation systems (satellite based augmentation systems, SBAS).

The electronic device 100 implements a display function through the GPU, the display 194, the application processor, and the like. The GPU is a microprocessor for image processing, and connects the display 194 to the application processor. The GPU is configured to perform mathematical and geometric calculation, and render an image. The processor 110 may include one or more GPUs that execute program instructions to generate or change display information.

The display 194 is configured to display an image, a video, and the like. The display 194 includes a display panel. A liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flexible light-emitting diode, FLED), a mini-LED, a micro-LED, a micro-OLED, quantum dot light emitting diodes (quantum dot light emitting diodes, QLED), or the like may be used for the display panel. In some embodiments, the electronic device 100 may include one or N displays 194, where N is a positive integer greater than 1.

The electronic device 100 may implement the photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto a photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transform on frequency energy, or the like.

The video codec is configured to compress or decompress a digital video. The electronic device 100 may support one or more video codecs. Therefore, the electronic device 100 may play or record videos in a plurality of coding formats, for example, moving picture experts group (moving picture experts group, MPEG)-1, MPEG-2, MPEG-3, and MPEG-4.

The NPU is a neural-network (neural-network, NN) computing processor. The NPU quickly processes input information by referring to a structure of a biological neural network, for example, by referring to a mode of transmission between human brain neurons, and may further continuously perform self-learning. Applications such as intelligent cognition of the electronic device 100 may be implemented through the NPU, for example, image recognition, facial recognition, speech recognition, and text understanding.

The external memory interface 120 may be configured to connect to an external memory card, for example, a micro SD card, to extend a storage capability of the electronic device 100. The external memory card communicates with the processor 110 through the external memory interface 120, to implement a data storage function. For example, music and videos are stored in the external storage card.

The internal memory 121 may be configured to store computer-executable program code. The executable program code includes instructions. The internal memory 121 may include a program storage area and a data storage area. The program storage area may store an operating system, an application required by at least one function (for example, a sound playing function or an image playing function), and the like. The data storage area may store data (for example, audio data, a phone book, and the like) created in a process of using the electronic device 100, and the like. In addition, the internal memory 121 may include a high-speed random access memory, and may further include a non-volatile memory such as at least one magnetic disk storage device, a flash storage device, or a universal flash storage (universal flash storage, UFS). The processor 110 runs the instructions stored in the internal memory 121 and/or the instructions stored in the memory disposed in the processor, to perform various function applications of the electronic device 100 and data processing.

The electronic device 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may further be configured to code and decode an audio signal. In some embodiments, the audio module 170 may be disposed in the processor 110, or some function modules in the audio module 170 are disposed in the processor 110.

The speaker 170A, also referred to as a "horn", is configured to convert an audio electrical signal into a sound signal. The electronic device 100 may be configured to listen to music or answer a hands-free call by using the speaker 170A.

The receiver 170B, also referred to as an "earpiece", is configured to convert an audio electrical signal into a sound signal. When a call is answered or voice information is received by using the electronic device 100, the receiver 170B may be put close to a human ear to receive a voice.

The microphone 170C, also referred to as a "mike", is configured to convert a sound signal into an electrical signal. When making a call or sending voice information, the user may make a sound near the microphone 170C through the mouth of the user, to input a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal and reduce noise. The microphones may further identify a sound source, to implement a directional recording function, and the like.

The headset jack 170D is configured to connect to a wired headset. The headset jack 170D may be the USB port 130 or a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and can convert the pressure signal into an electrical signal. In some embodiments, the pressure sensor 180A may be disposed on the display 194. There is a plurality of types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change of the capacitance. When a touch operation is performed on the display 194, the electronic device 100 detects intensity of the touch operation by using the pressure sensor 180A. The electronic device 100 may also calculate a touch position based on a detection signal of the pressure sensor 180A. In some embodiments, touch operations that are performed at a same touch position but have different touch operation intensity may correspond to different operation instructions. For example, when a touch operation whose touch operation intensity is less than a first pressure threshold is performed on a Messages application icon, an instruction for viewing an SMS message is executed. When a touch operation whose touch operation intensity is greater than or equal to the first pressure threshold is performed on the Messages application icon, an instruction for creating a new SMS message is executed.

The gyro sensor 180B may be configured to determine a motion posture of the electronic device 100. In some embodiments, an angular velocity of the electronic device 100 around three axes (namely, axes x, y, and z) may be determined through the gyro sensor 180B. The gyro sensor 180B may be configured to perform image stabilization during photographing. For example, when the shutter is pressed, the gyro sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyro sensor 180B may further be used in navigation and motion sensing game scenarios.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover through the magnetic sensor 180D. In some embodiments, when the electronic device 100 is a clamshell phone, the electronic device 100 may detect opening and closing of a flip cover by using the magnetic sensor 180D. Further, a feature such as automatic unlocking of the flip cover is set based on a detected opening or closing state of the leather case or a detected opening or closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may further be configured to identify a posture of the electronic device, and is applied to an application such as switching between landscape mode and portrait mode or a pedometer.

The distance sensor 180F is configured to measure a distance. The electronic device 100 may measure the distance in an infrared manner or a laser manner. In some embodiments, in a photographing scenario, the electronic device 100 may measure a distance by using the distance sensor 180F, to implement quick focusing.

For example, the optical proximity sensor 180G may include a light emitting diode (LED) and an optical detector, for example, a photodiode. The light emitting diode may be an infrared light emitting diode. The electronic device 100 emits infrared light through the light-emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust a white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is less than another threshold, the electronic device 100 heats the battery 142 to prevent the electronic device 100 from being shut down abnormally because of a low temperature. In some other embodiments, when the temperature is less than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor, to determine a type of a touch event. A visual output related to the touch operation may be provided through the display 194. In some other embodiments, the touch sensor 180K may alternatively be disposed on a surface of the electronic device 100 at a position different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse to receive a blood pressure beating signal. In some embodiments, the bone conduction sensor 180M may alternatively be disposed in the headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be used for an incoming call vibration prompt, or may be used for a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may further be customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted in a same SIM card interface 195. The plurality of cards may be of a same type or of different types. The SIM card interface 195 may also be compatible with different types of SIM cards. The SIM card interface 195 may further be compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded into the electronic device 100, and cannot be separated from the electronic device 100.

A software system of the electronic device 100 may use a layered architecture, an event-driven architecture, a microkernel architecture, a micro service architecture, or a cloud architecture. In this embodiment of the present invention, an Android system with a layered architecture is used as an example to illustrate a software structure of the electronic device 100.

Figure 4:
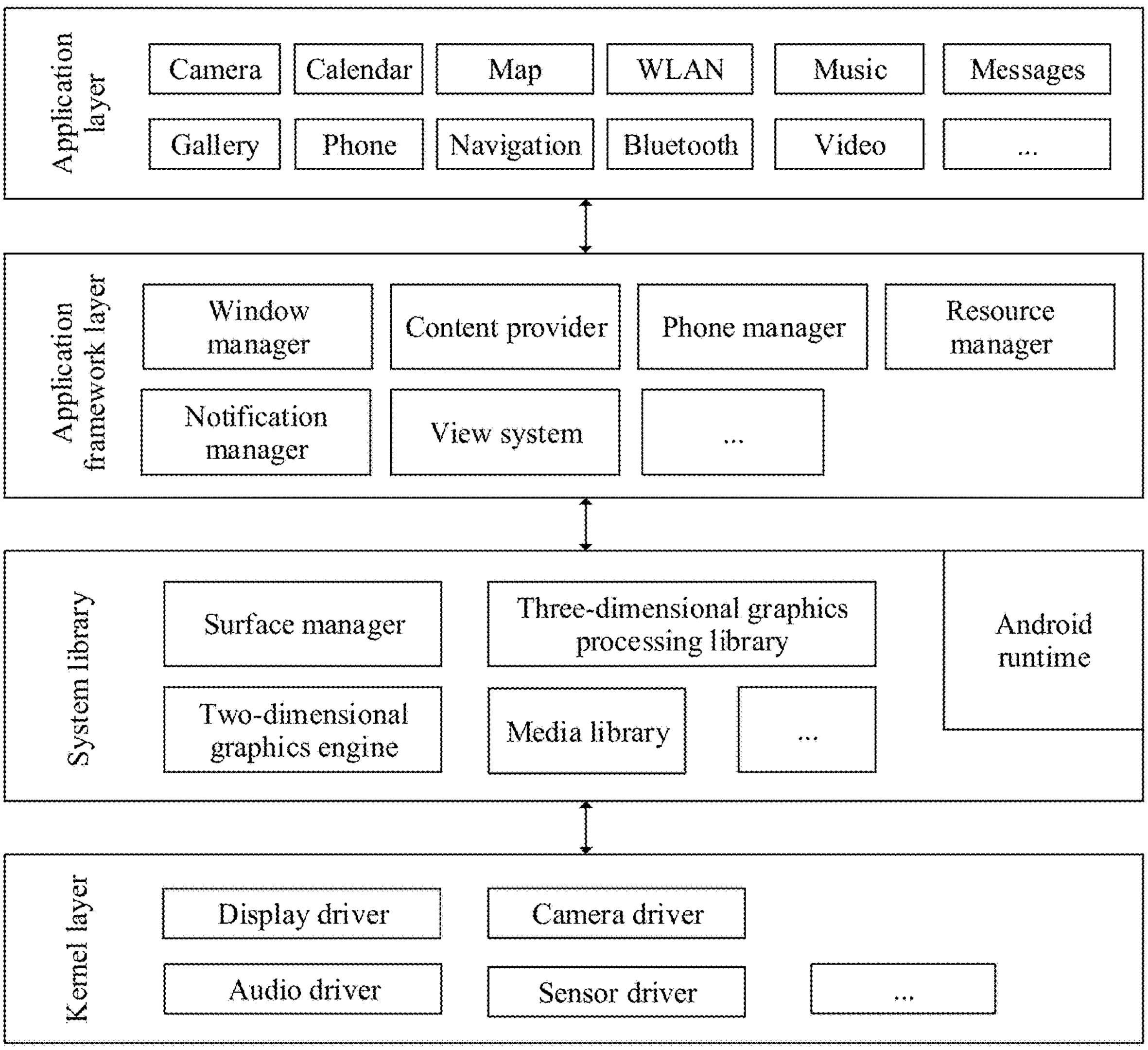
FIG. 4 is a block diagram of a software structure of an electronic device according to an embodiment of this application.

FIG. 4 is a block diagram of the software structure of the electronic device 100 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 4, the application package may include applications such as "Camera", "Gallery", "Calendar", "Phone", "Map", "Navigation", "WLAN", "Bluetooth", "Music", "Videos", and "Messages".

The application framework layer provides an application programming interface (application programming interface, API) and a programming framework for an application at the application layer. The application framework layer includes some predefined functions.

As shown in FIG. 4, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying an image. The view system may be configured to construct an application. A display interface may include one or more views. For example, a display interface including an SMS message notification icon may include a text display view and an image display view.

The phone manager is configured to provide a communication function of the electronic device 100, for example, management of a call status (including answering or declining a call).

The resource manager provides various resources for an application, such as a localized character string, an icon, an image, a layout file, and a video file.

The notification manager enables the application to display notification information in the status bar, and may be configured to convey a notification message. The notification manager may automatically disappear after a short pause without user interaction. For example, the notification manager is configured to notify download completion, give a message notification, and the like. The notification manager may alternatively be a notification that appears in a top status bar of the system in a form of a graph or a scroll bar text, for example, a notification of an application running in the background, or a notification that appears on the screen in a form of a dialog window. For example, text information is prompted in the status bar, a prompt tone is produced, the electronic device vibrates, or an indicator light blinks.

The Android runtime includes a kernel library and a virtual machine. The Android runtime is responsible for scheduling and management of the Android system.

The kernel library includes two parts: a functional function that needs to be invoked in a Java language and a kernel library of Android.

The application layer and the application framework layer run in the virtual machine. The virtual machine executes java files at the application layer and the application framework layer as binary files. The virtual machine is configured to implement functions such as object lifecycle management, stack management, thread management, security and exception management, and garbage collection.

The system library may include a plurality of function modules, for example, a surface manager (surface manager), a media library (Media Library), a three-dimensional graphics processing library (for example, an OpenGL ES), and a 2D graphics engine (for example, an SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes an example of a working process of software and hardware of the electronic device 100 with reference to a photographing scenario.

When the touch sensor 180K receives a touch operation, a corresponding hardware interruption is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. An example in which the touch operation is a touch tap operation, and a control corresponding to the tap operation is a control of a camera application icon is used. The camera application invokes an interface at the application framework layer to start the camera application, then starts a camera driver by invoking the kernel layer, and captures a static image or a video through the camera 193.

Methods provided in the following embodiments shown in FIG. 5 to FIG. 35(*b*) are applied to the electronic device provided in the foregoing embodiments.

Figure 5:
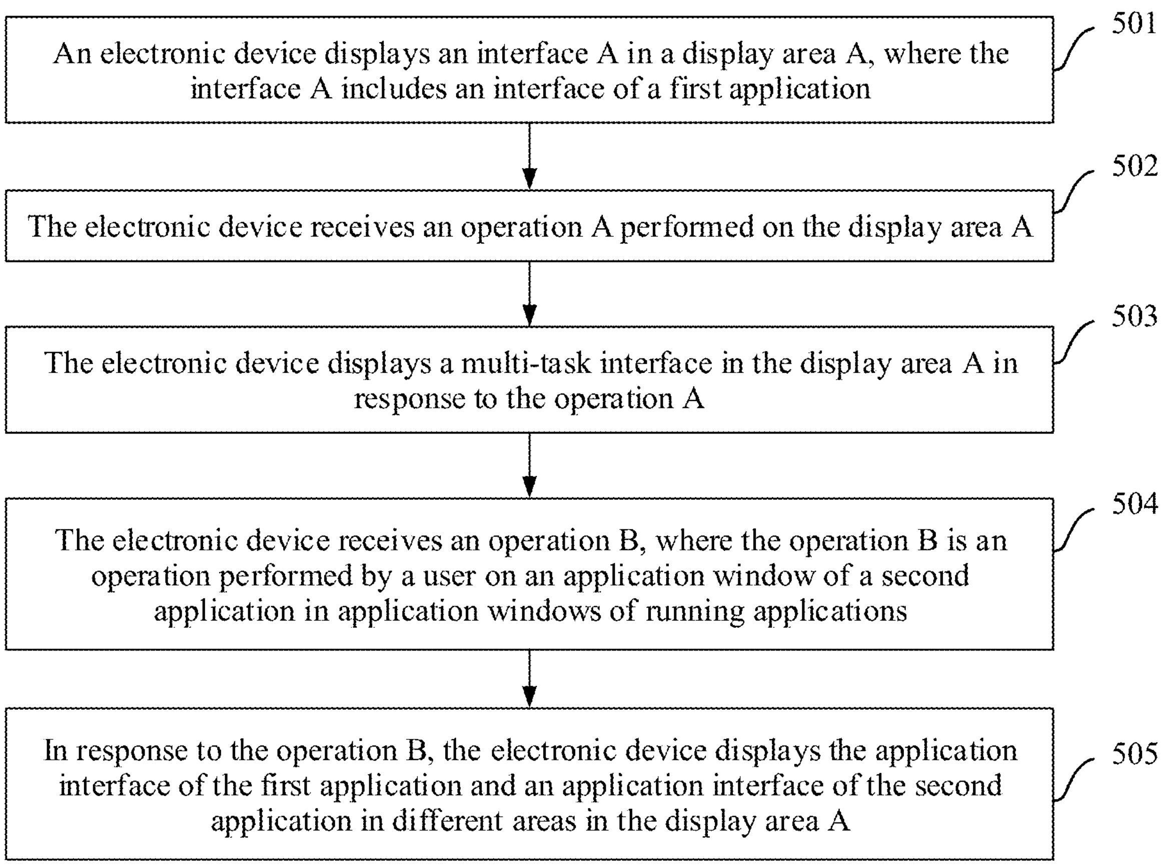
FIG. 5 is a schematic flowchart of an interface display method according to an embodiment of this application.
Figure 6A:
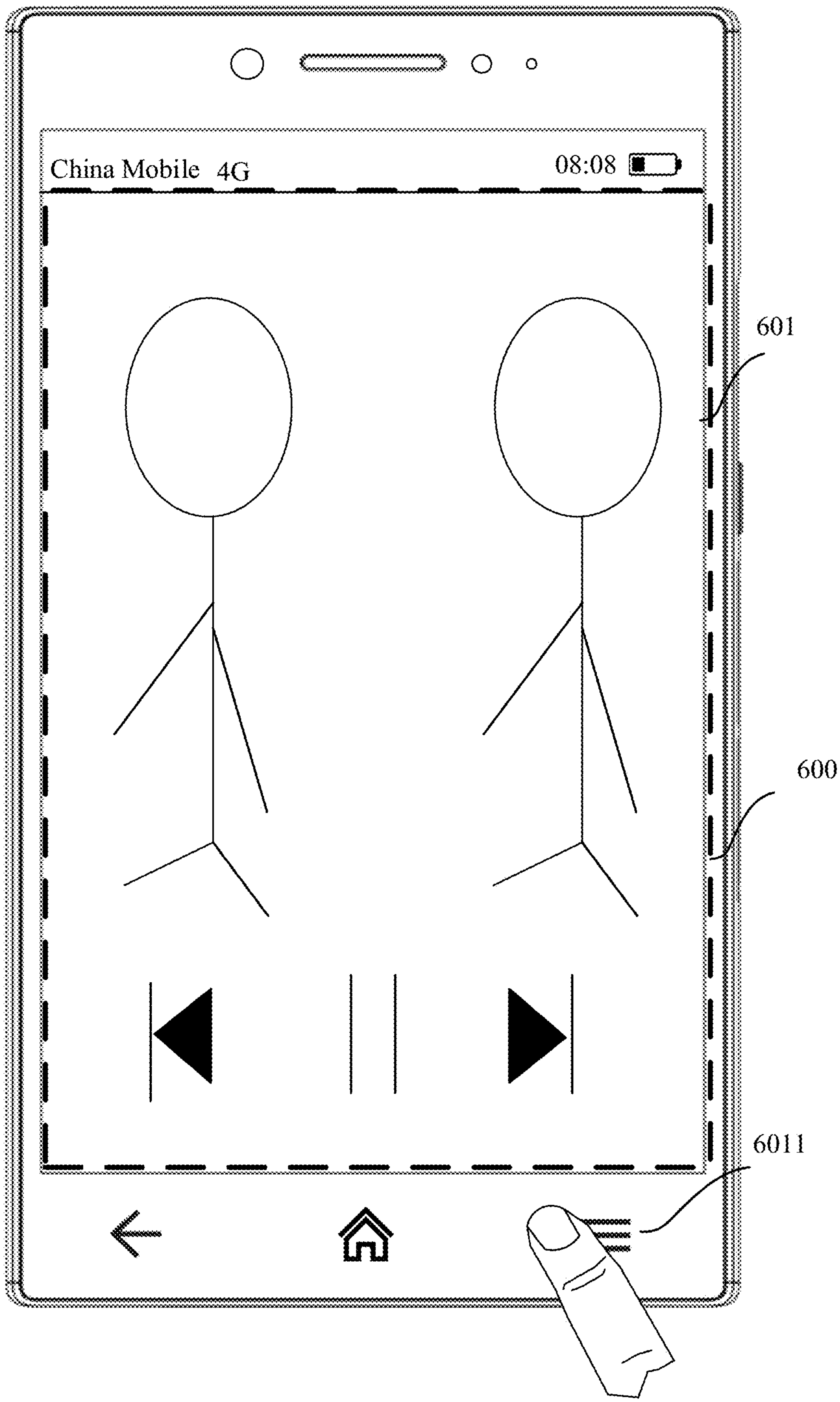
FIG. 6(*a*) to FIG. 6(*h*) are schematic diagrams of scenarios of an interface display method according to an embodiment of this application.
Figure 6B:
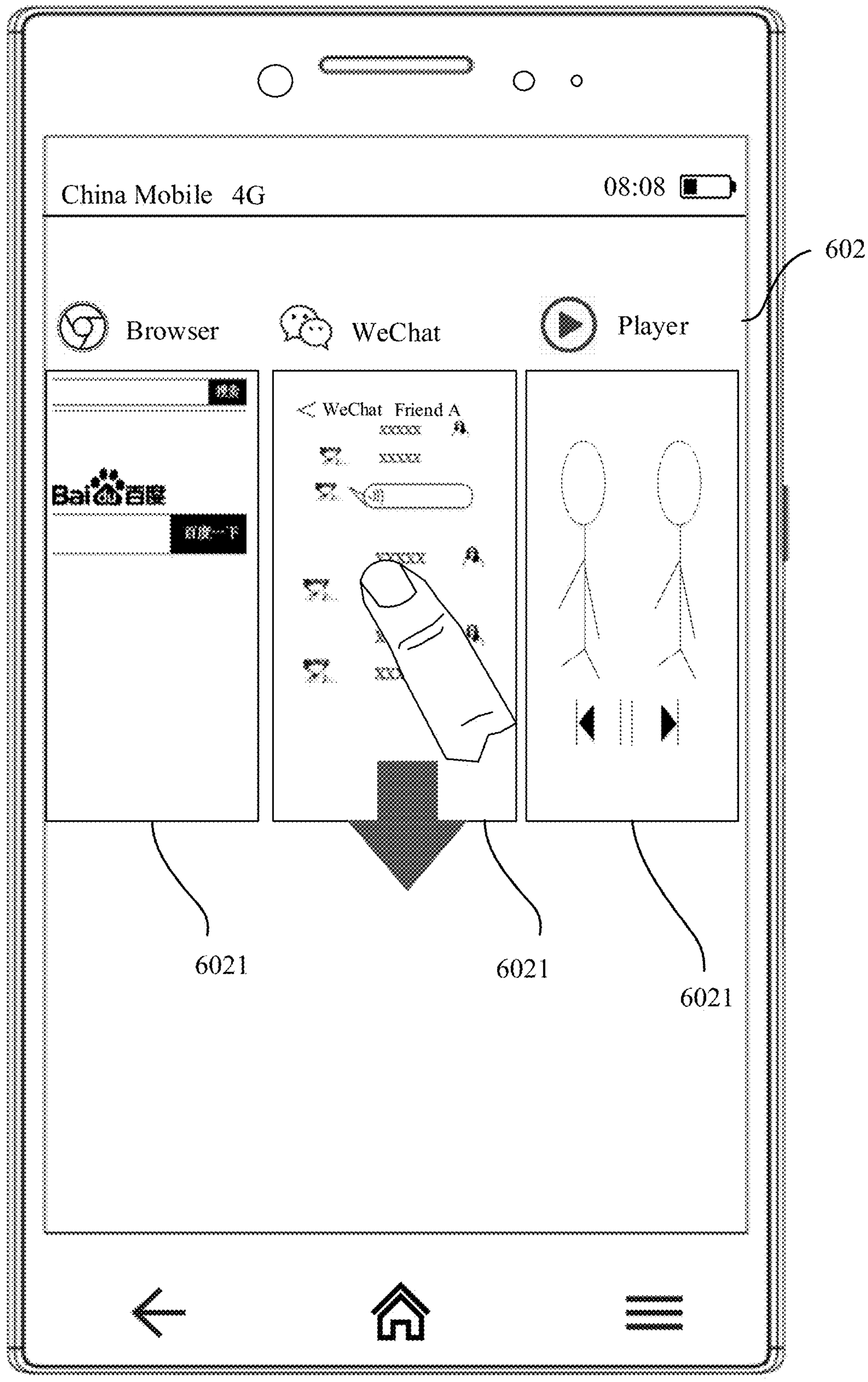
Figure 6C:
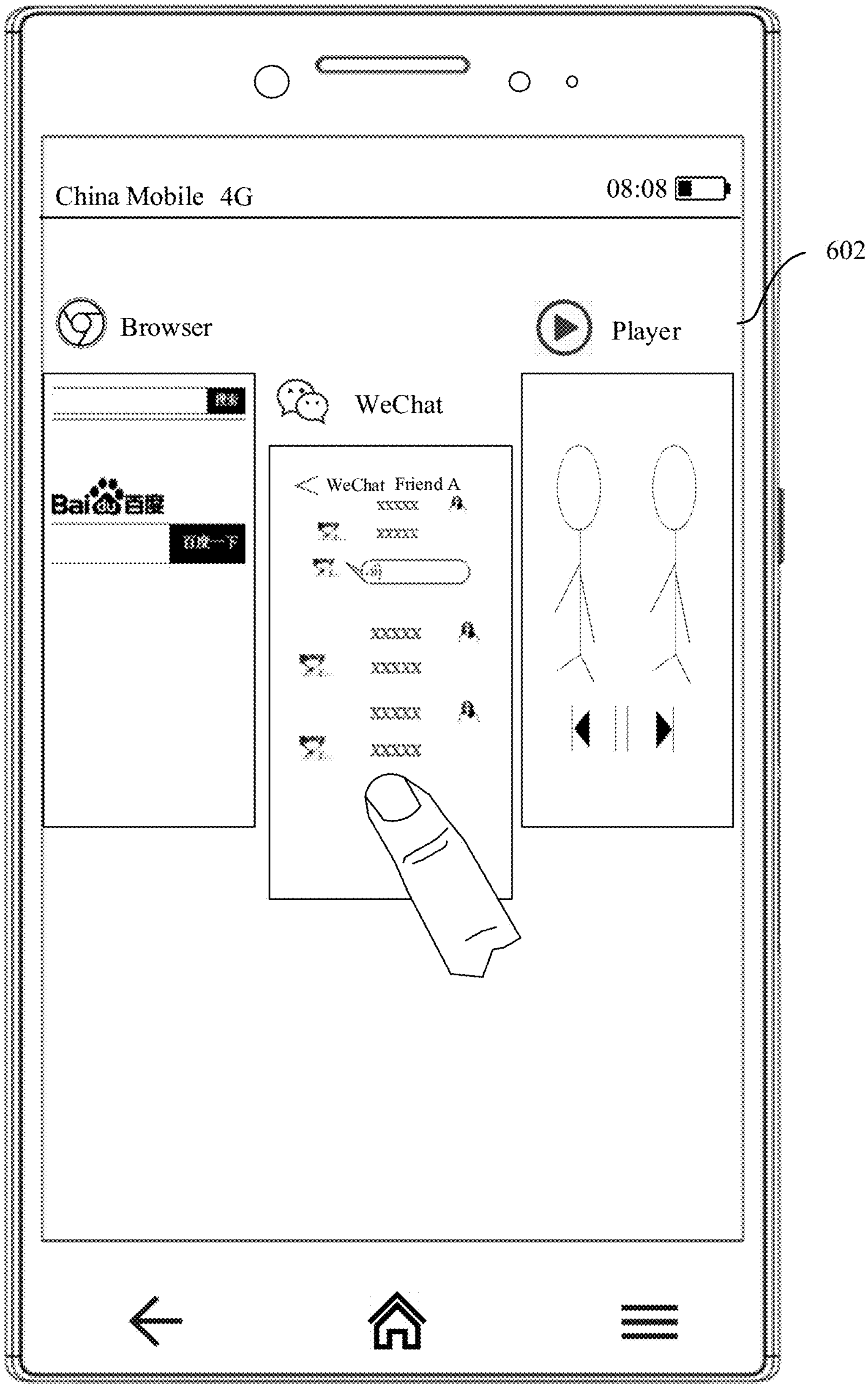
Figure 6D:
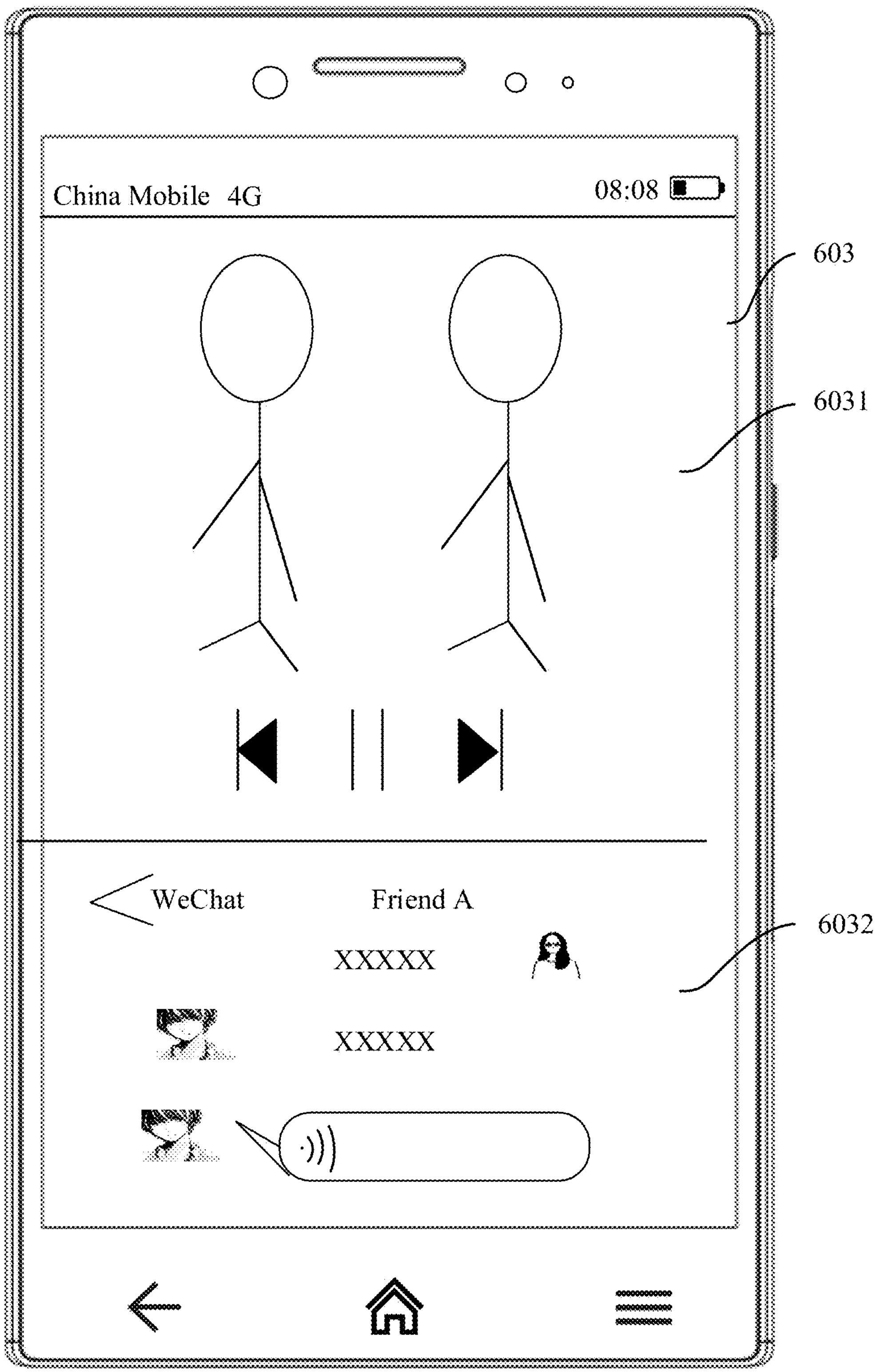
Figure 6E:
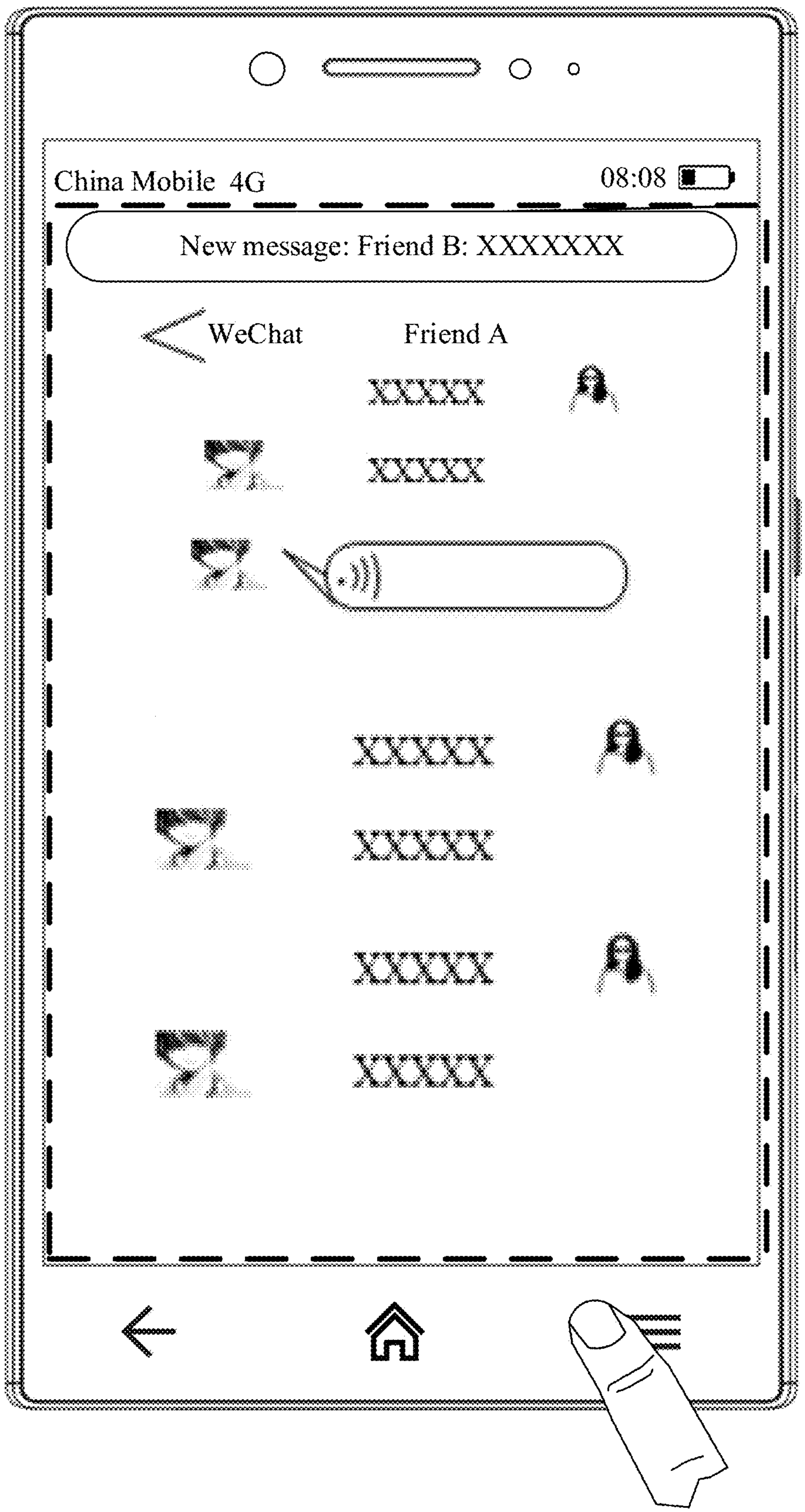
Figure 6F:
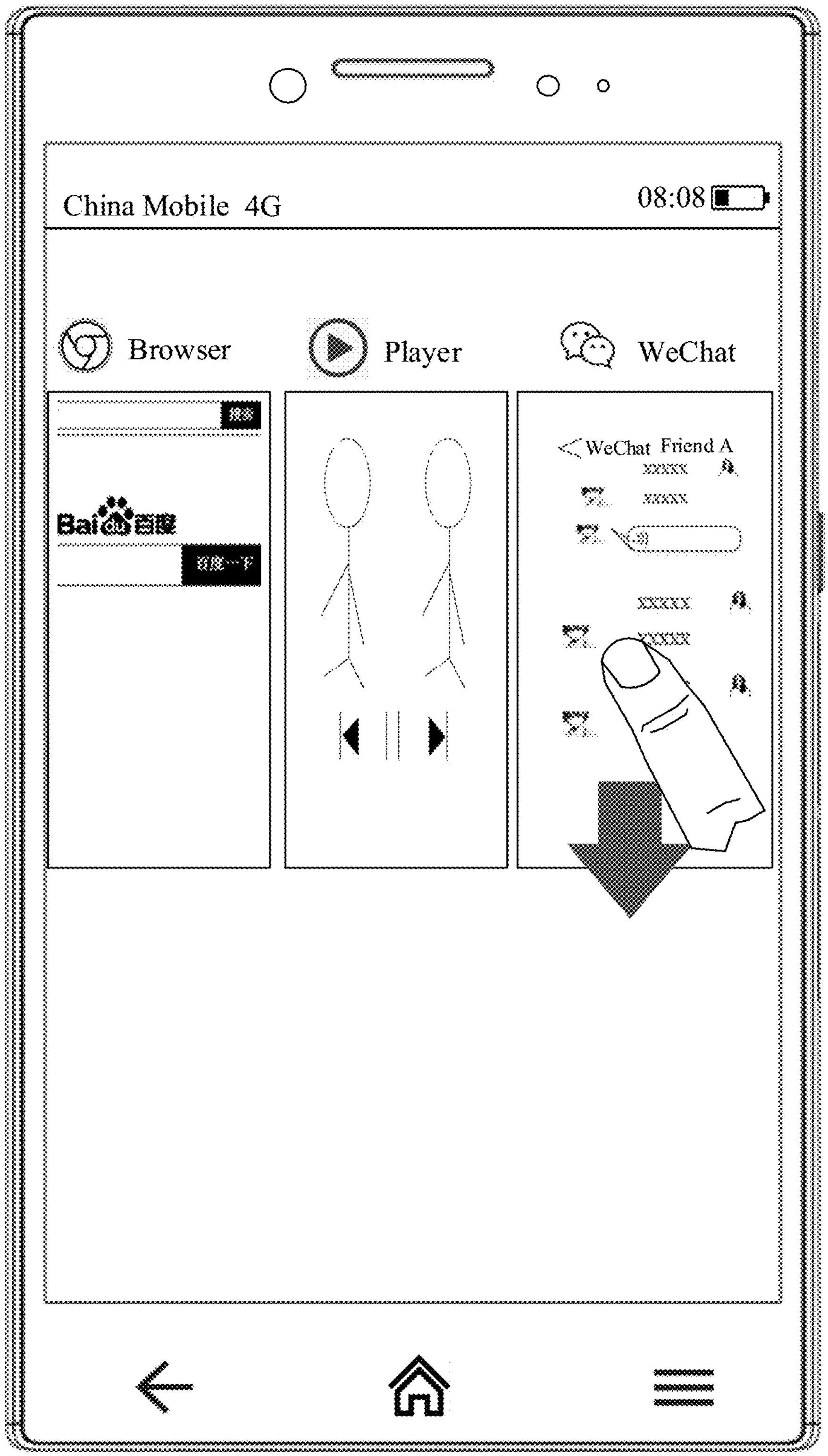
Figure 6G:
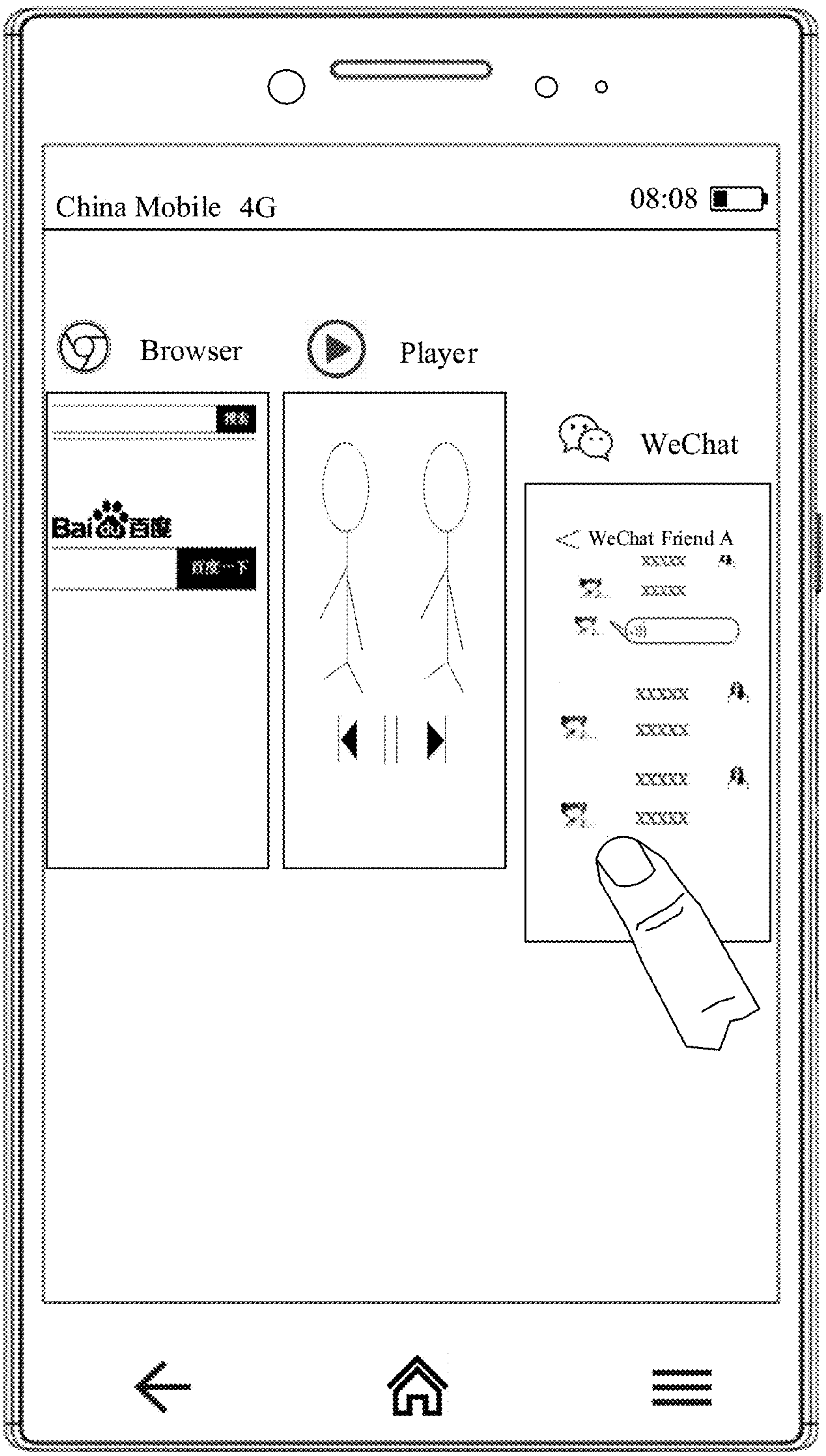
Figure 6H:
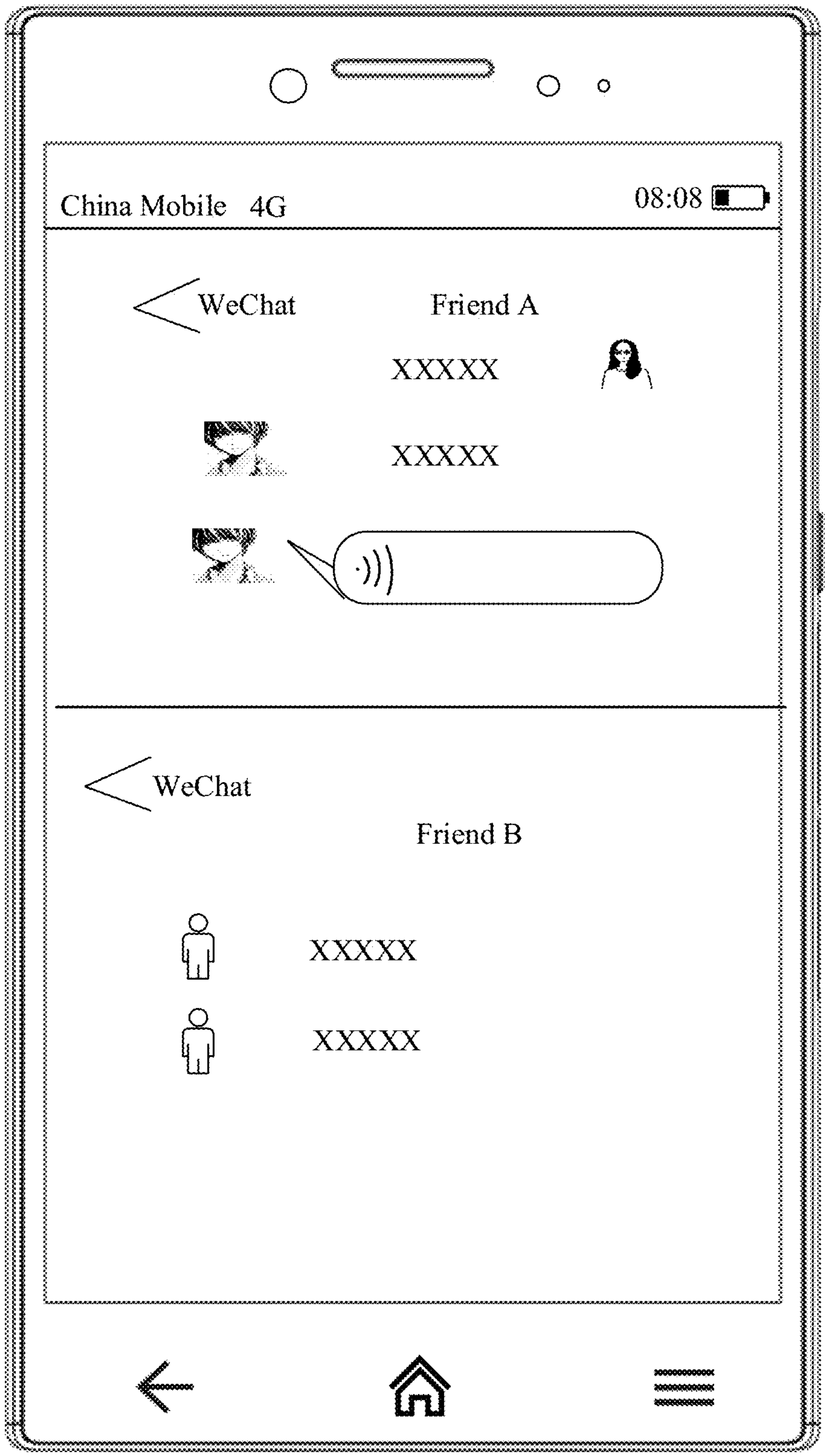
Figure 7A:
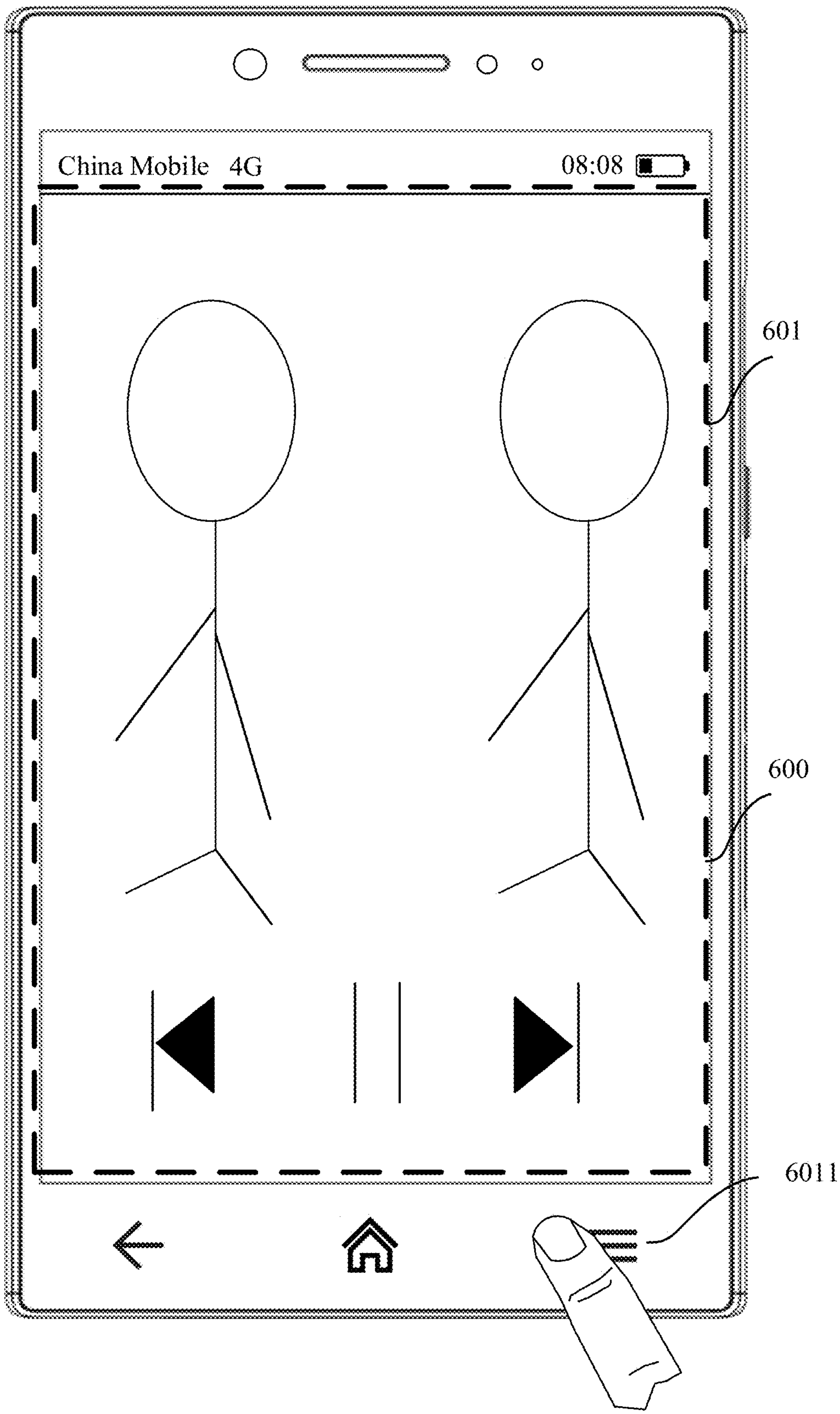
FIG. 7(*a*) to FIG. 7(*d*) are schematic diagrams of a scenario of another interface display method according to an embodiment of this application.
Figure 7B:
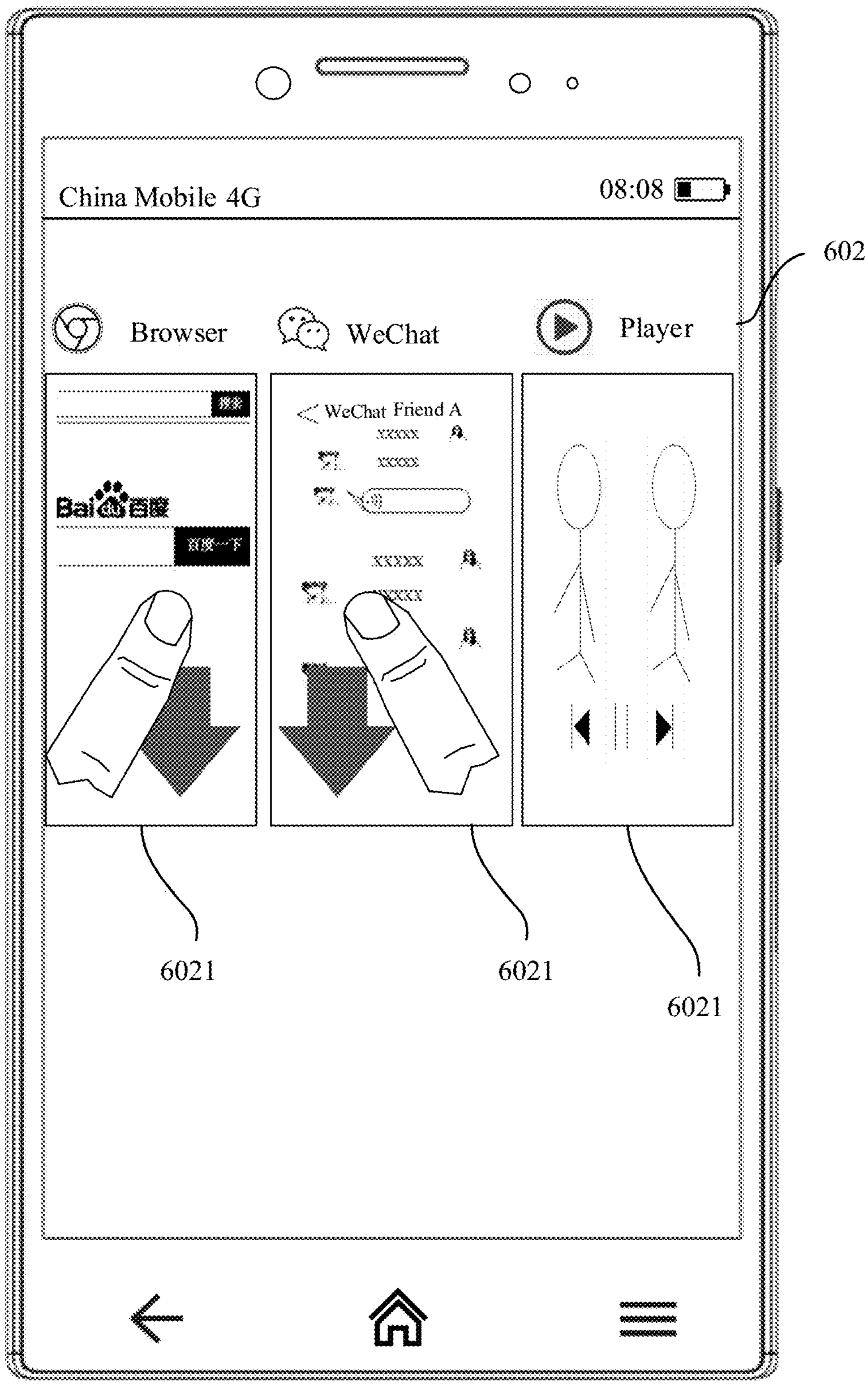
Figure 7C:
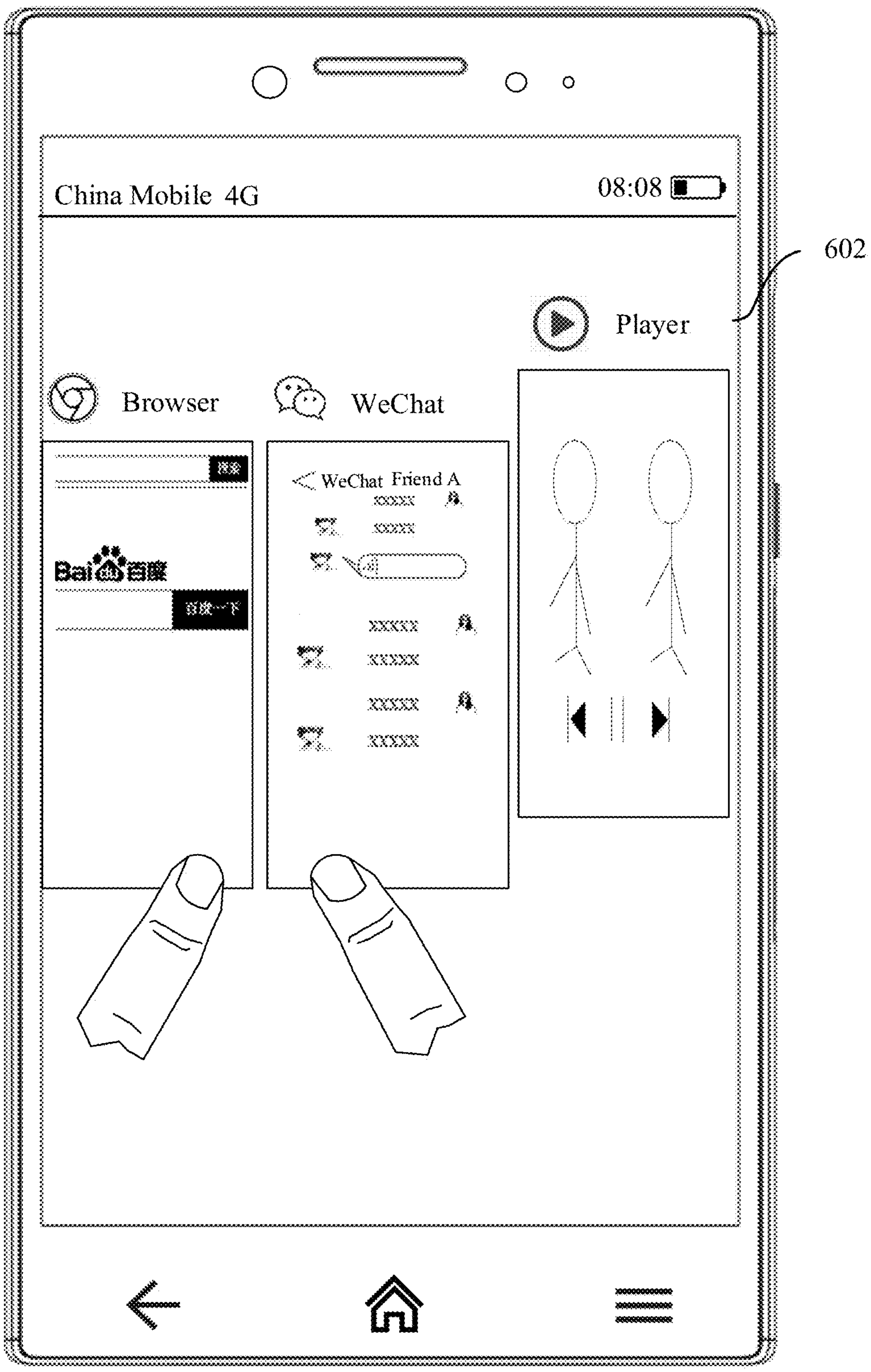
Figure 7D:
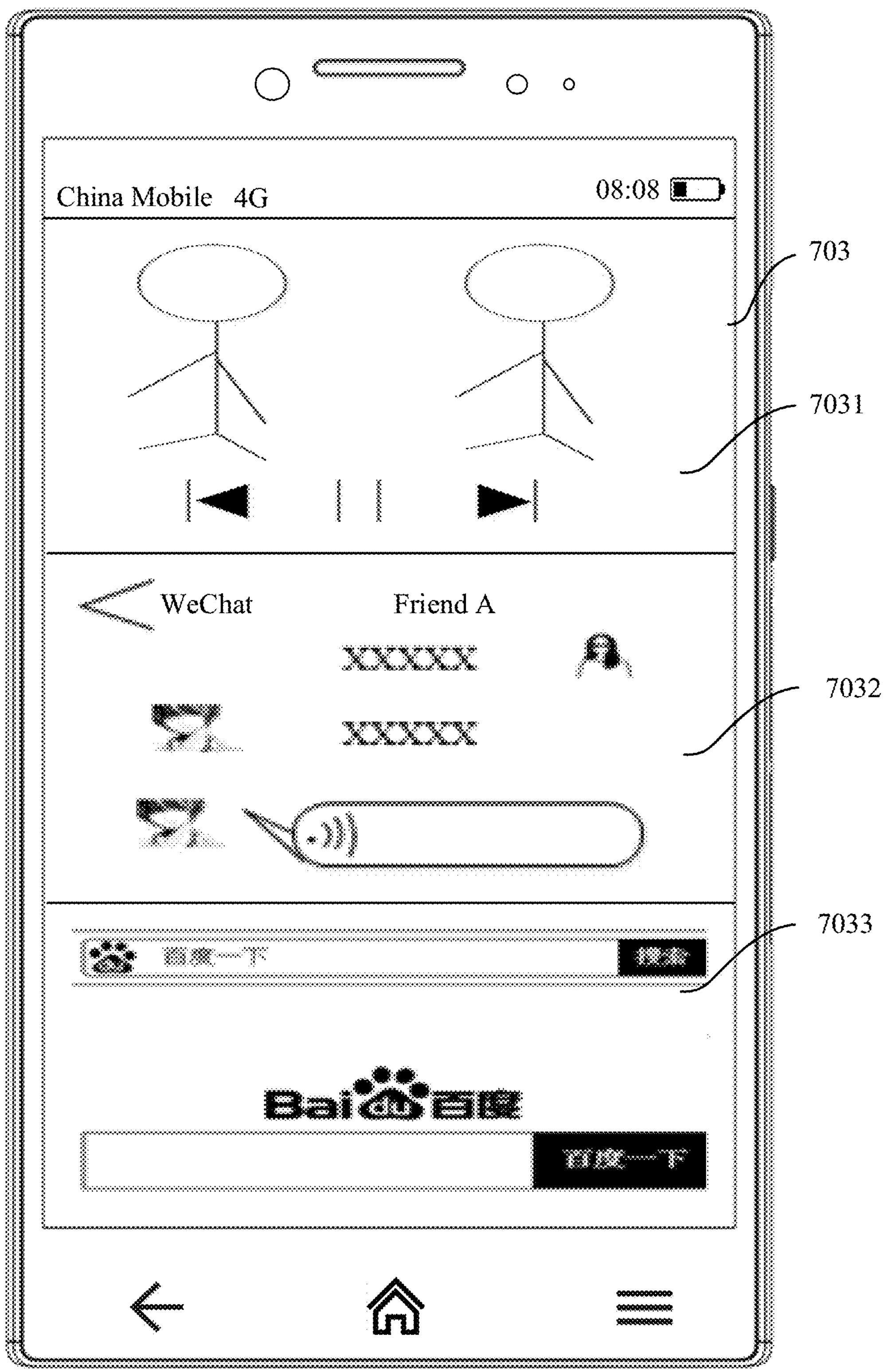
Figure 8A:
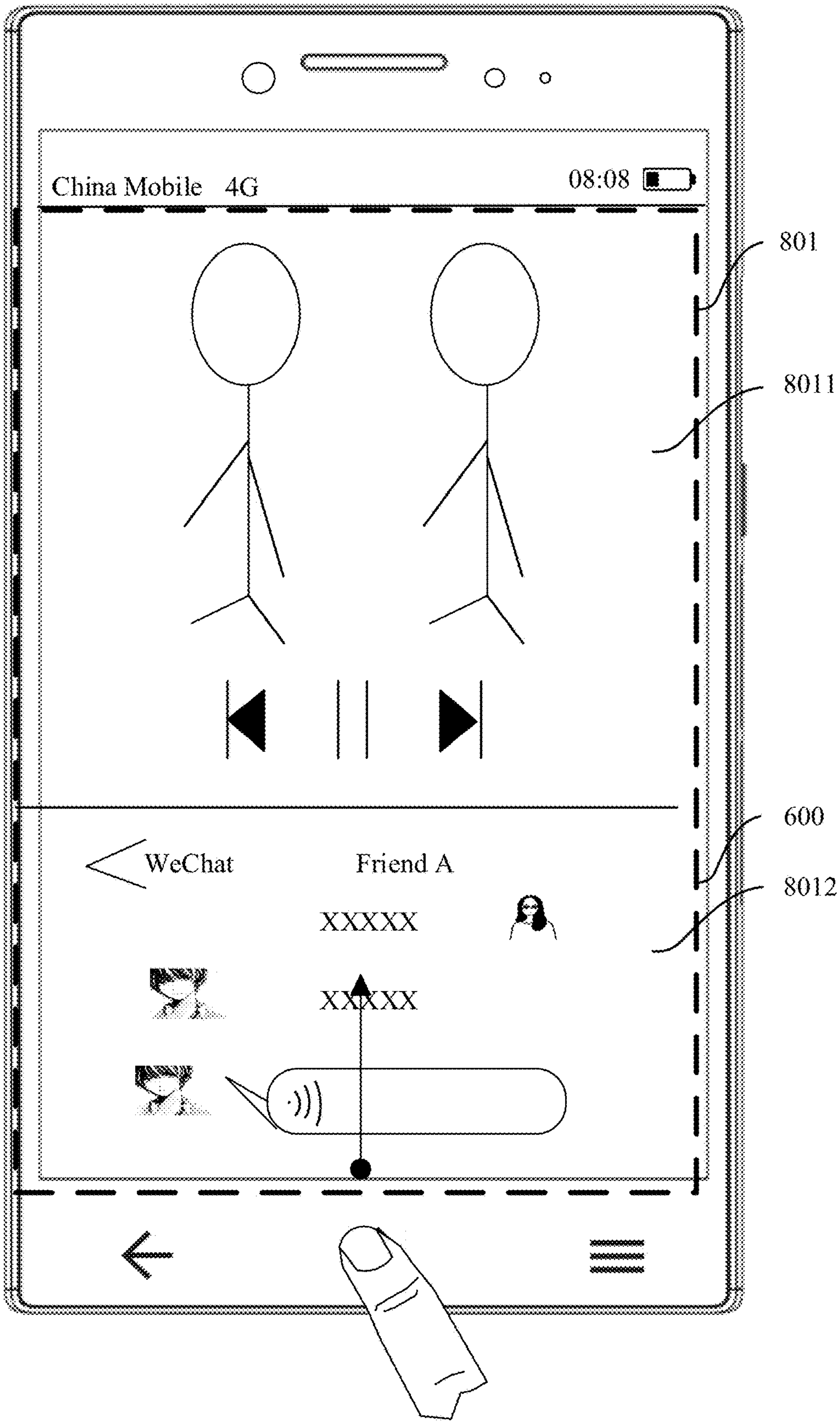
FIG. 8(*a*) to FIG. 8(*d*) are schematic diagrams of a scenario of another interface display method according to an embodiment of this application.
Figure 8B:
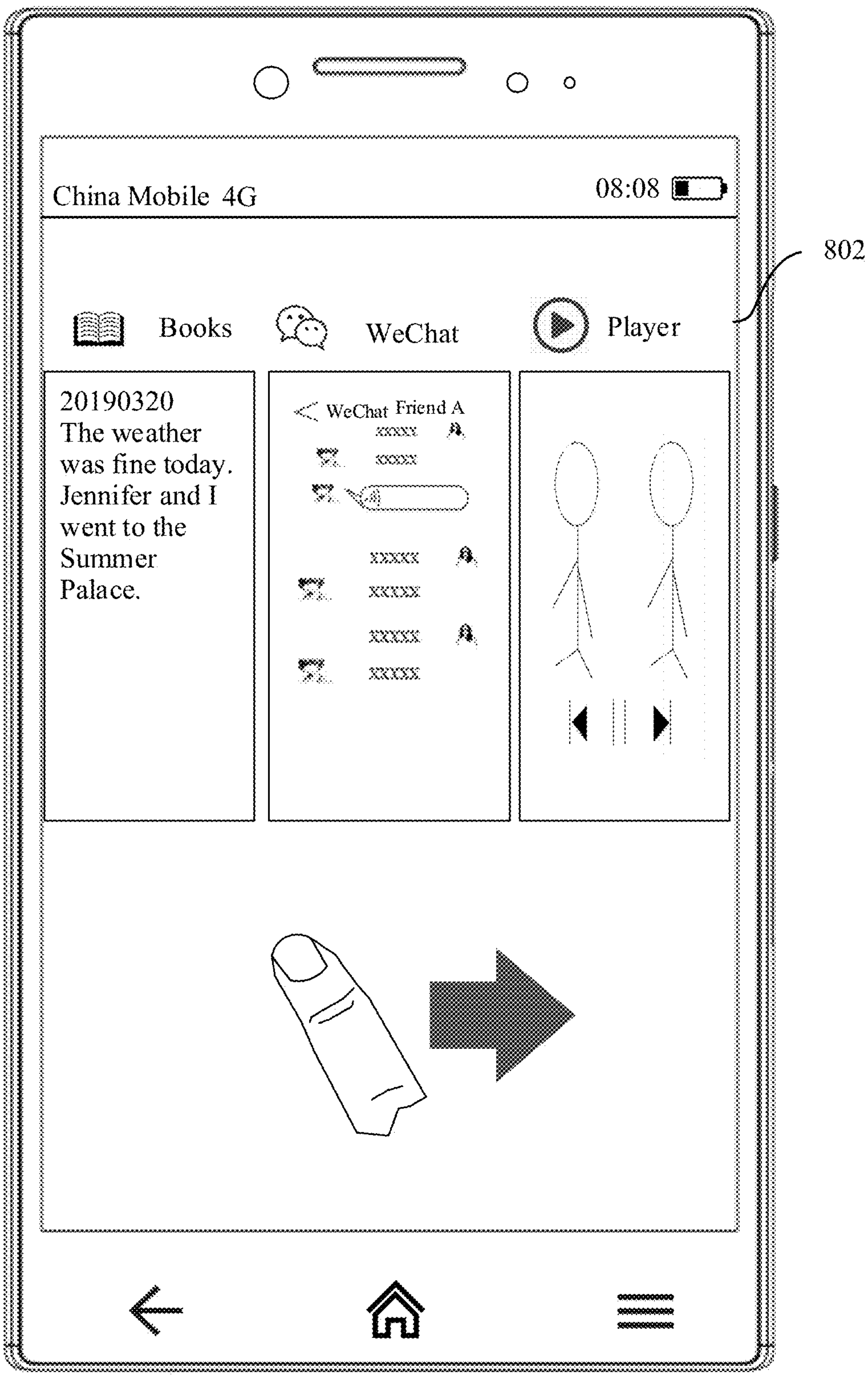
Figure 8C:
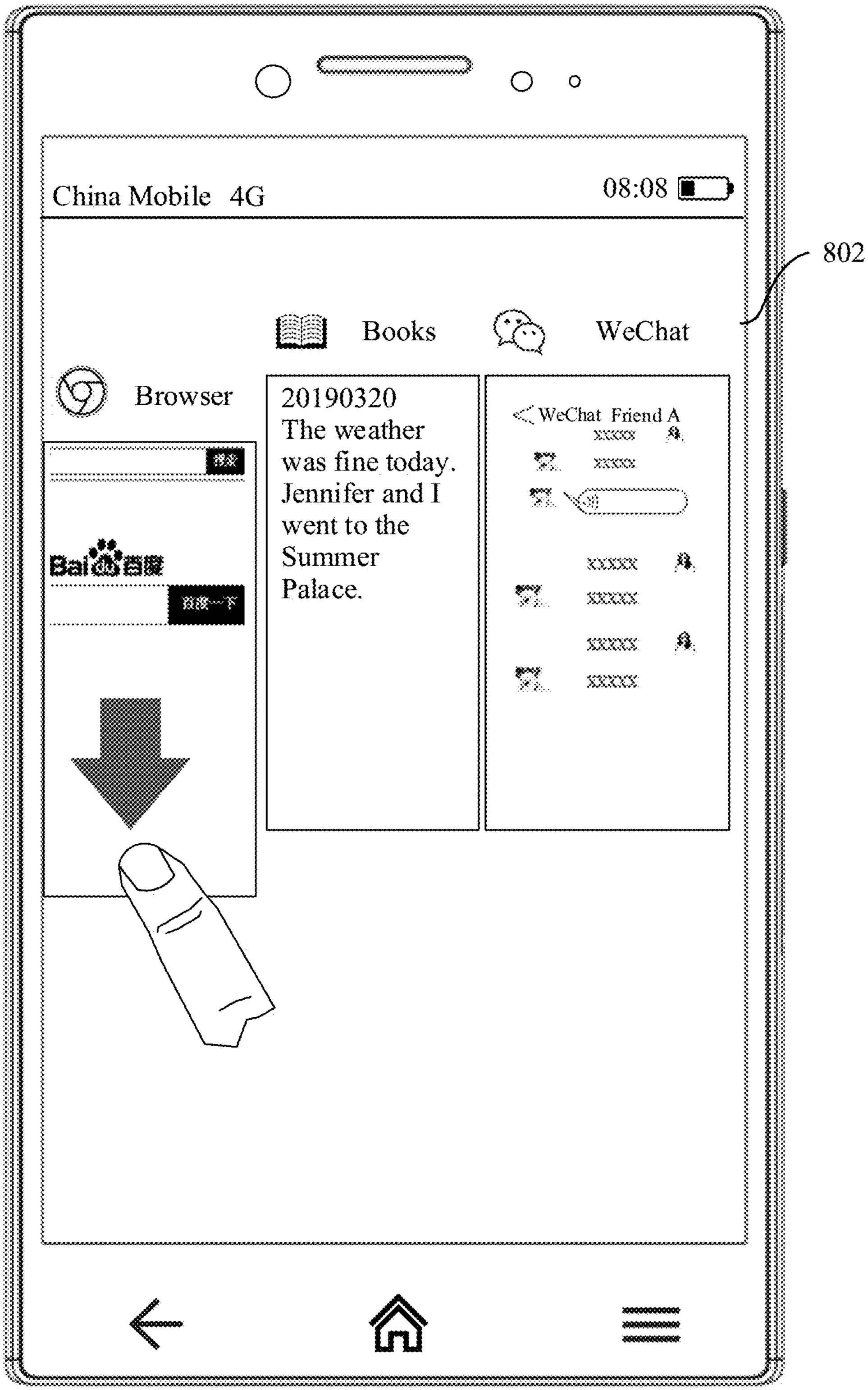
Figure 8D:
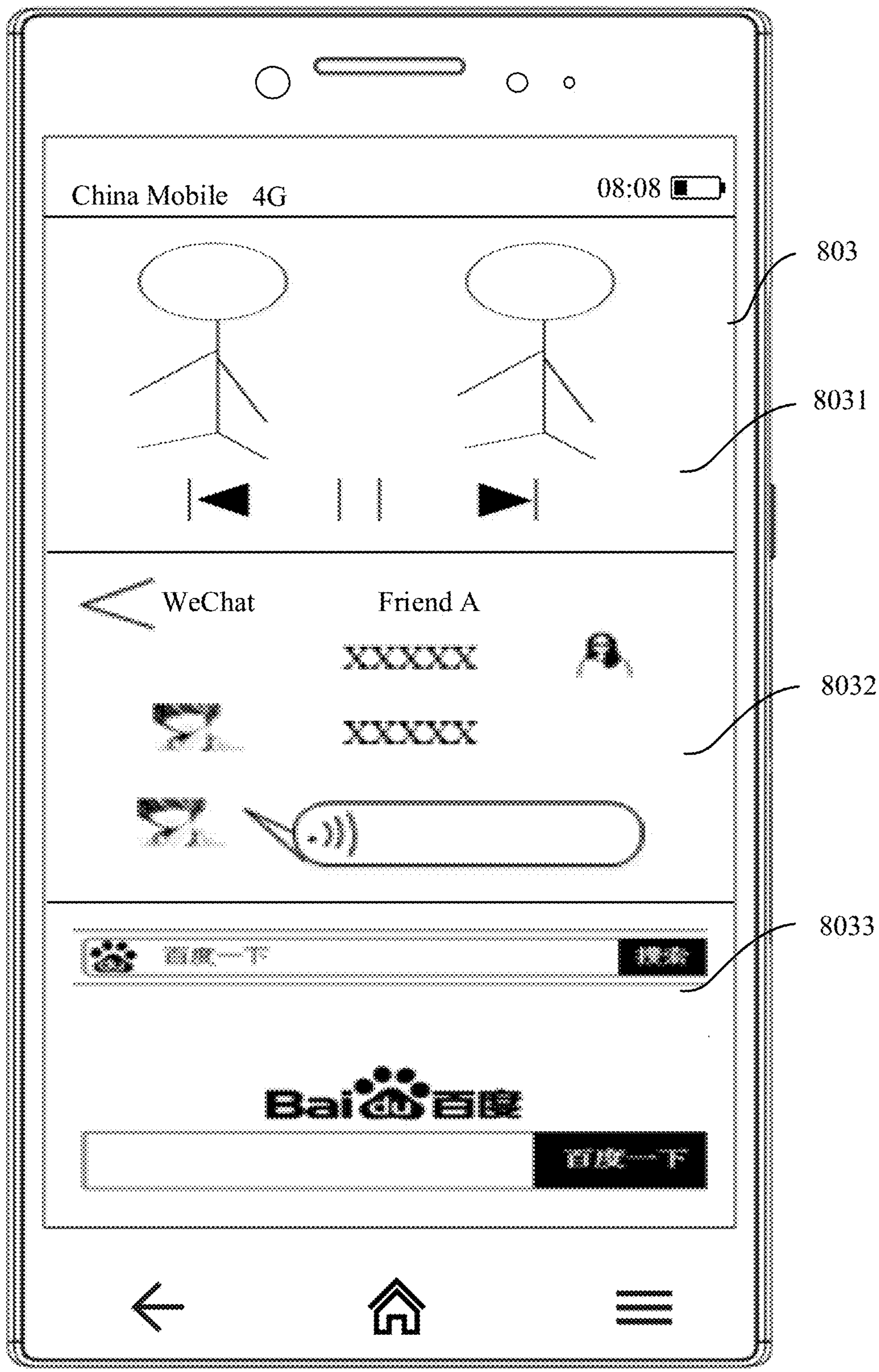
Figure 9A:
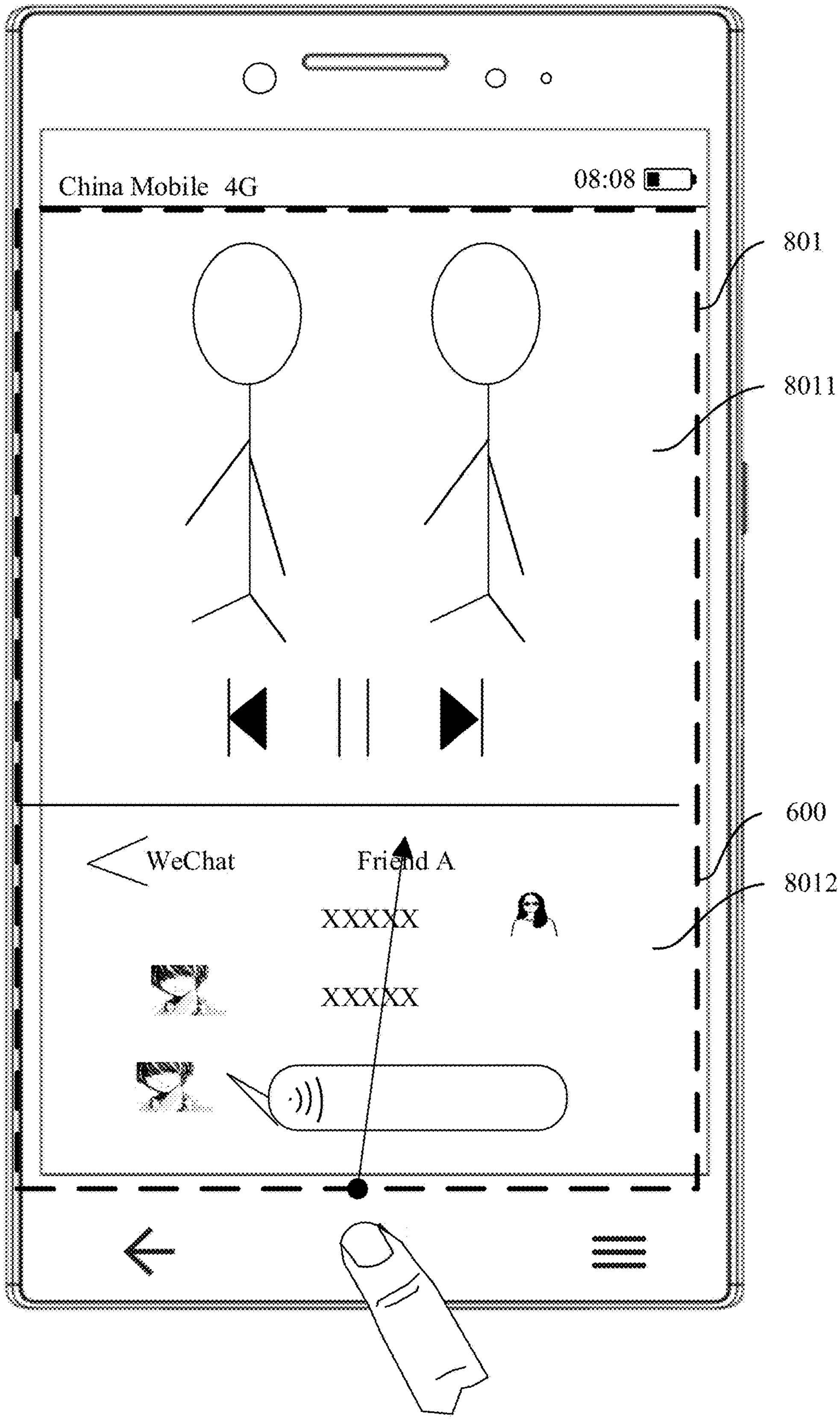
FIG. 9(*a*) to FIG. 9(*d*) are schematic diagrams of a scenario of another interface display method according to an embodiment of this application.
Figure 9B:
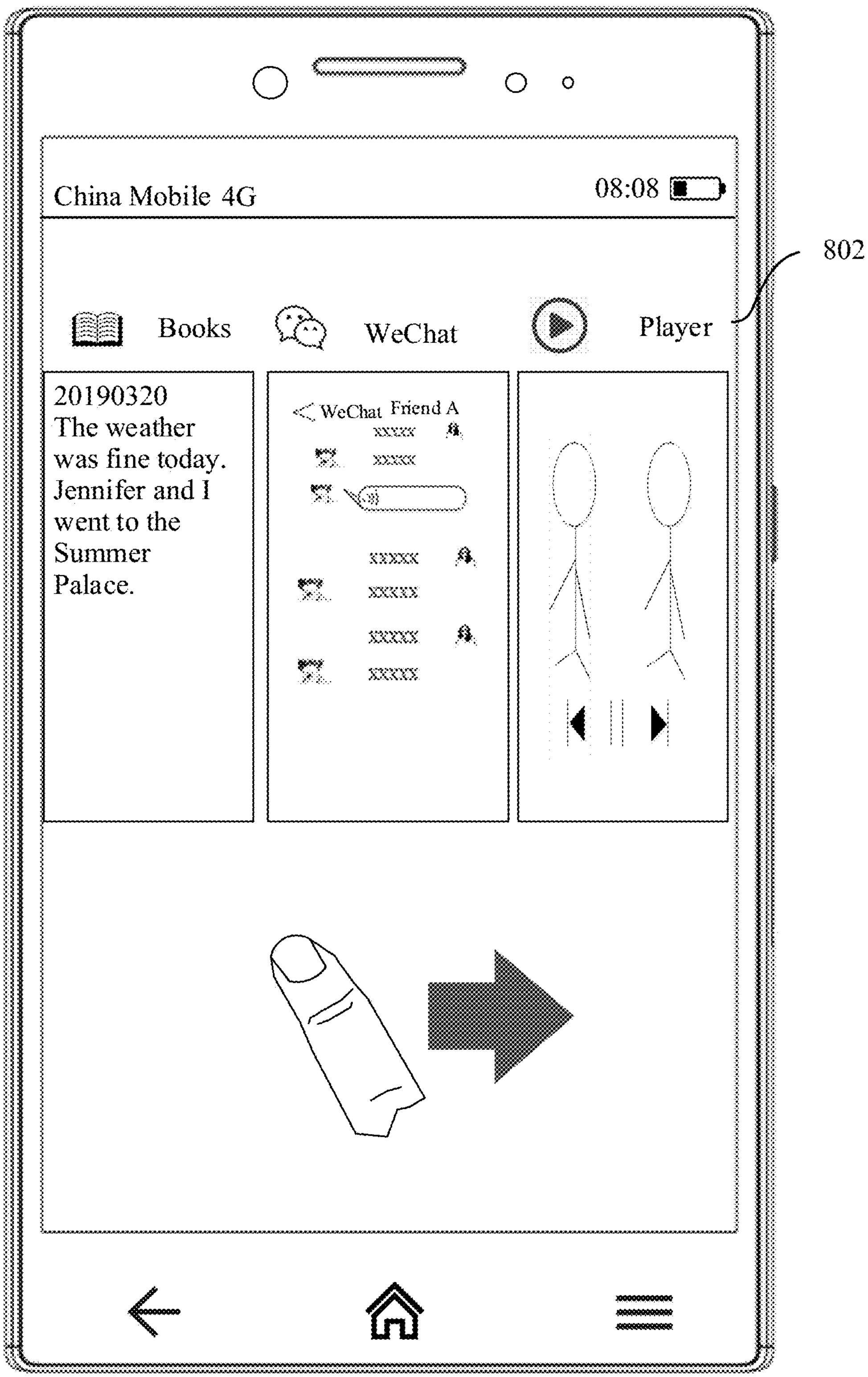
Figure 9C:
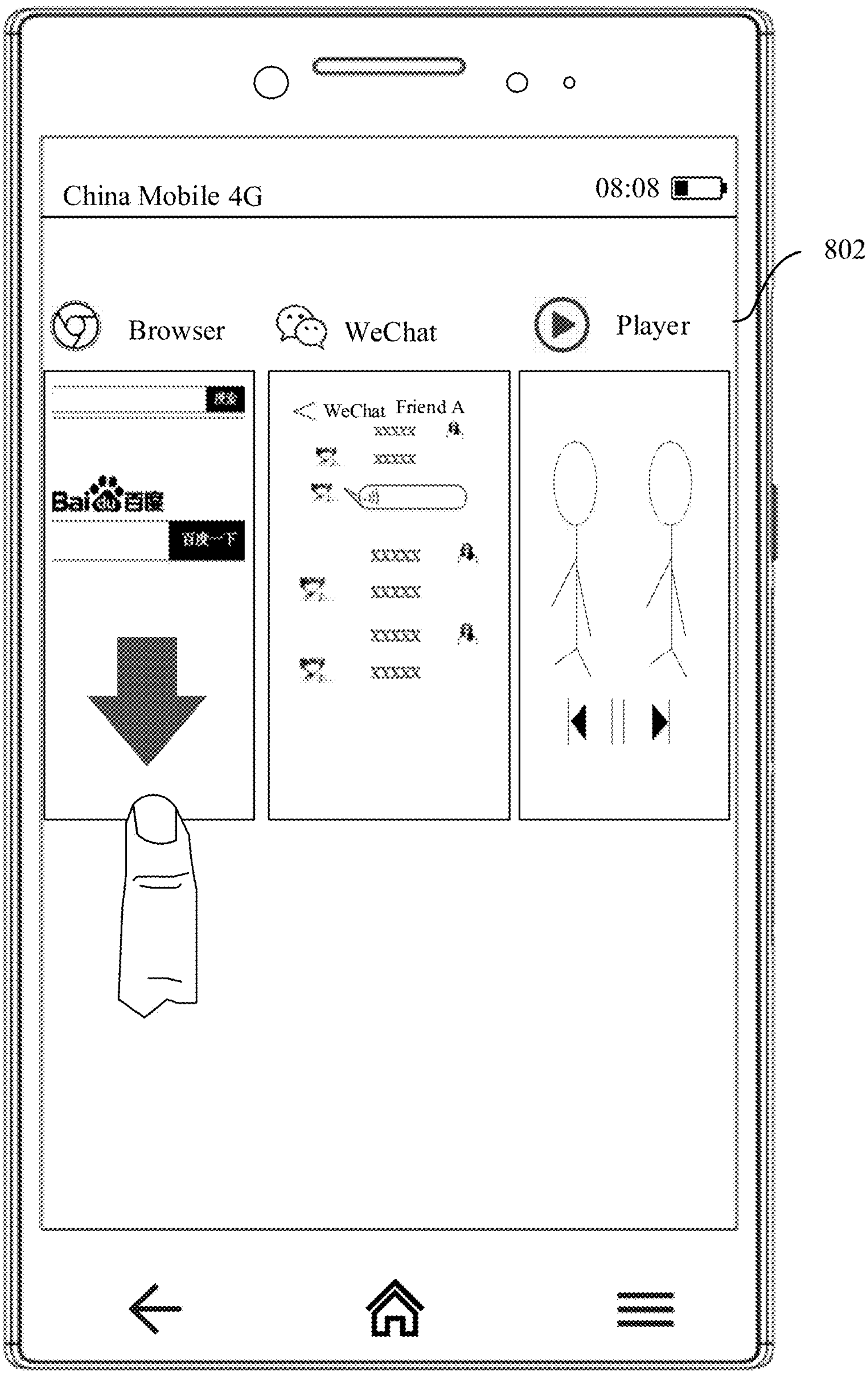
Figure 9D:
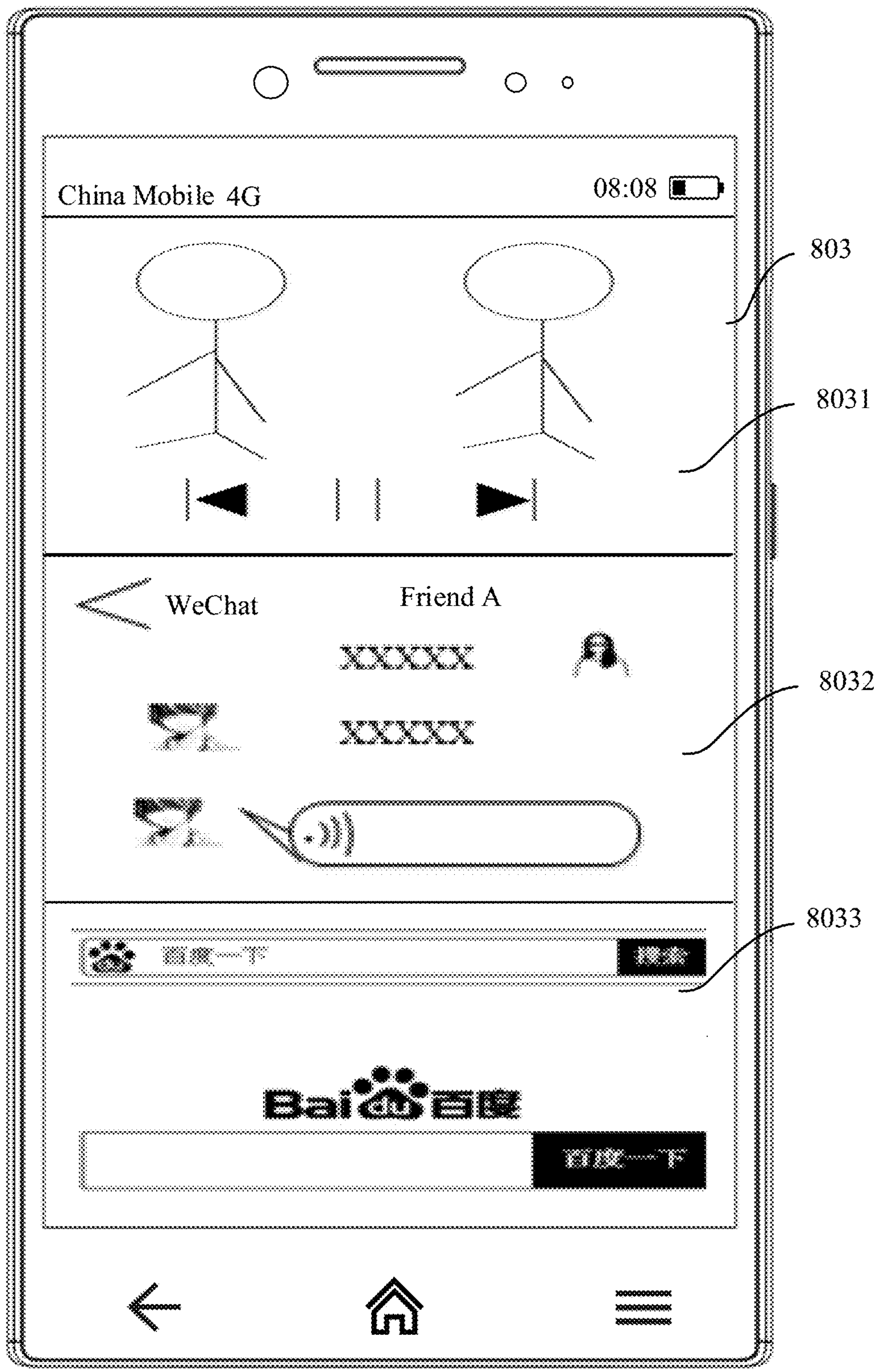
Figure 10A:
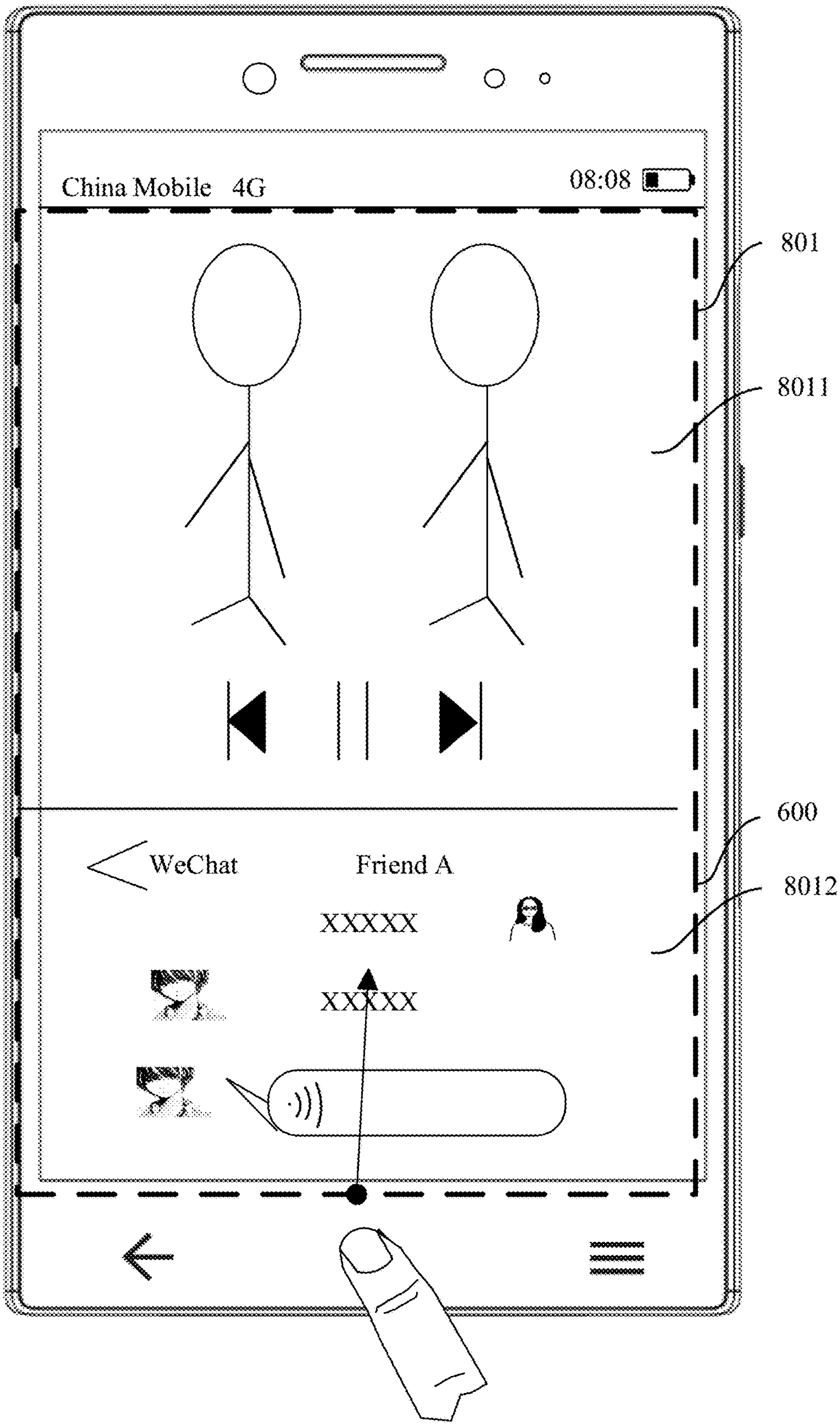
FIG. 10(*a*) to FIG. 10(*d*) are schematic diagrams of a scenario of another interface display method according to an embodiment of this application.
Figure 10B:
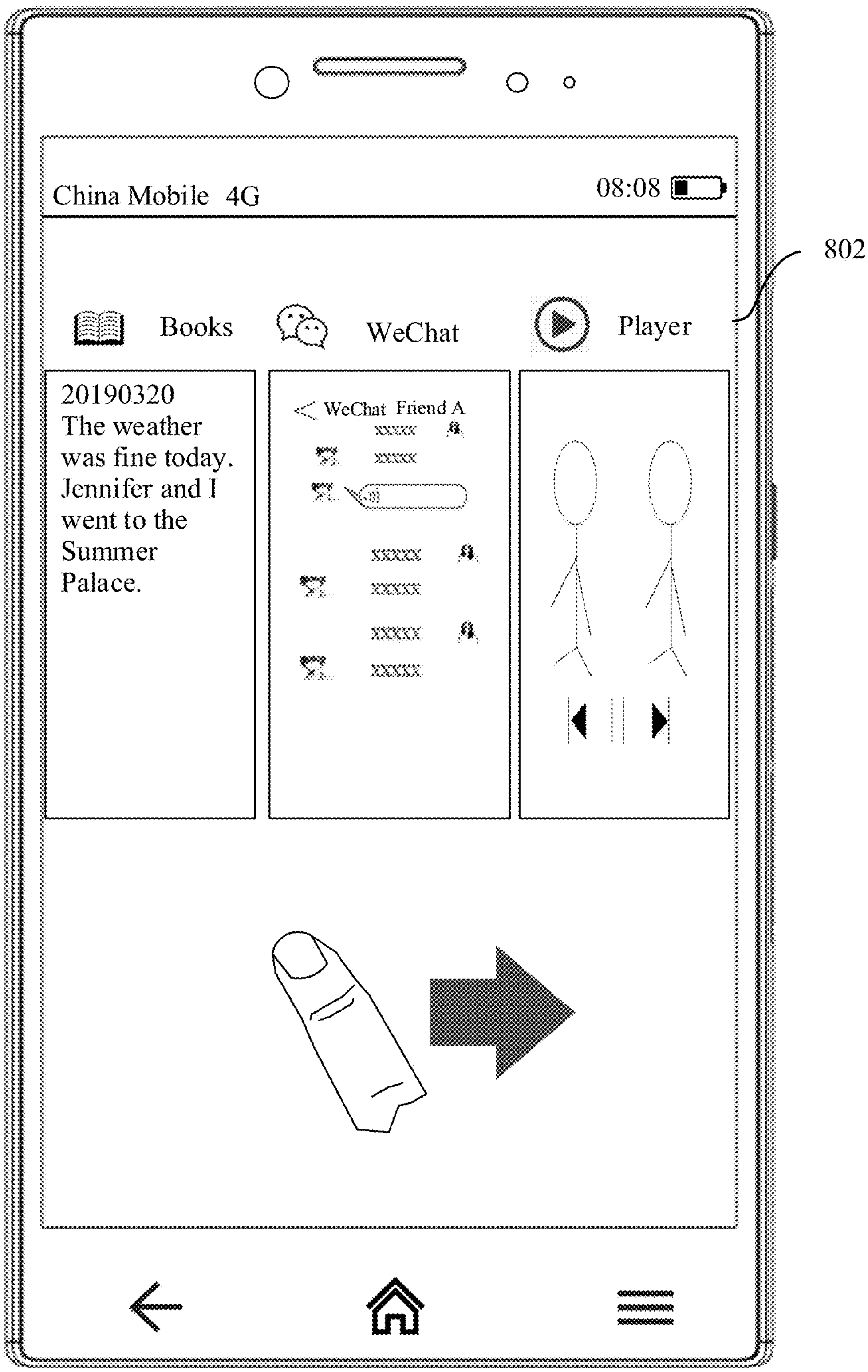
Figure 10C:
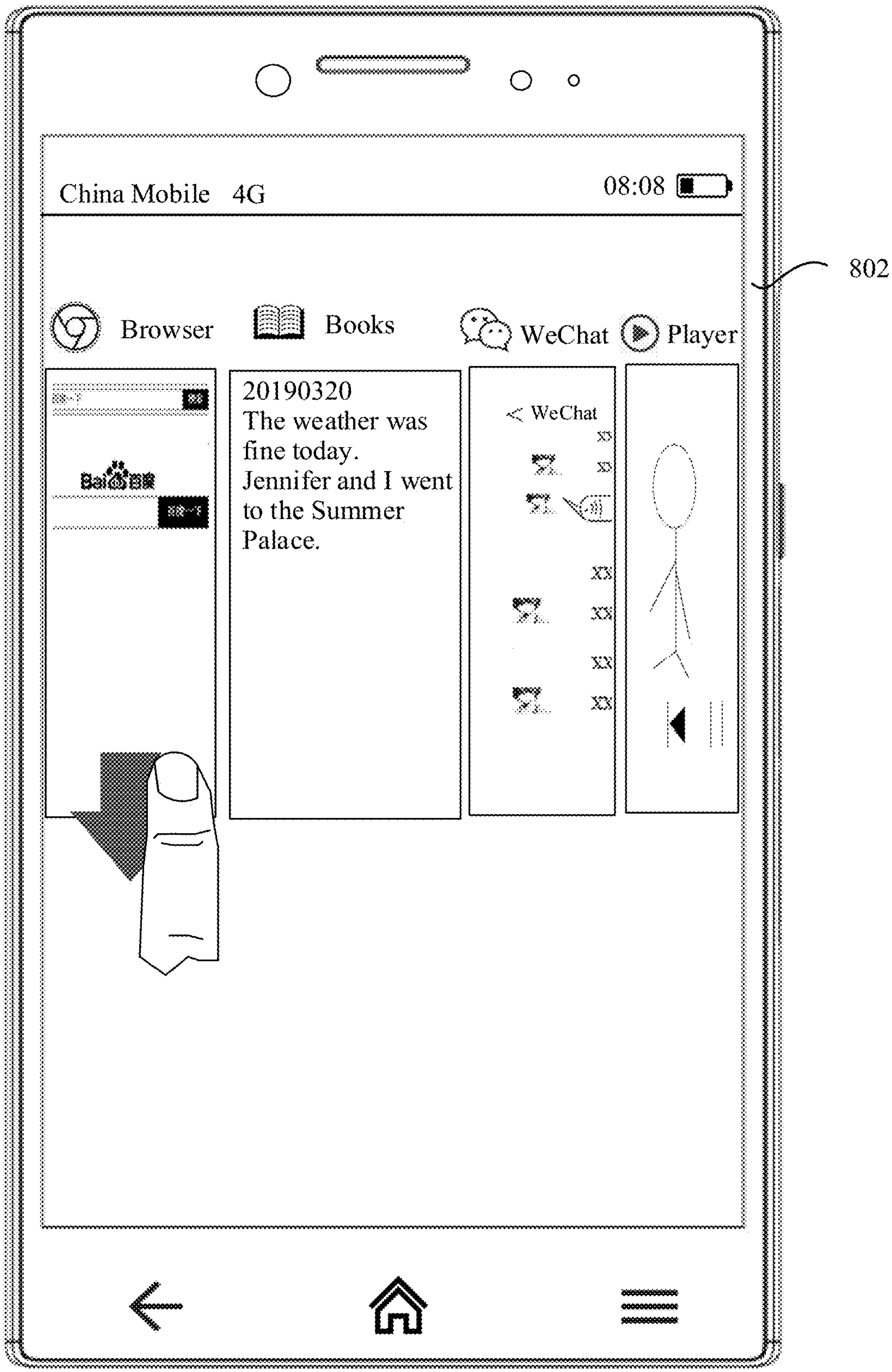
Figure 10D:
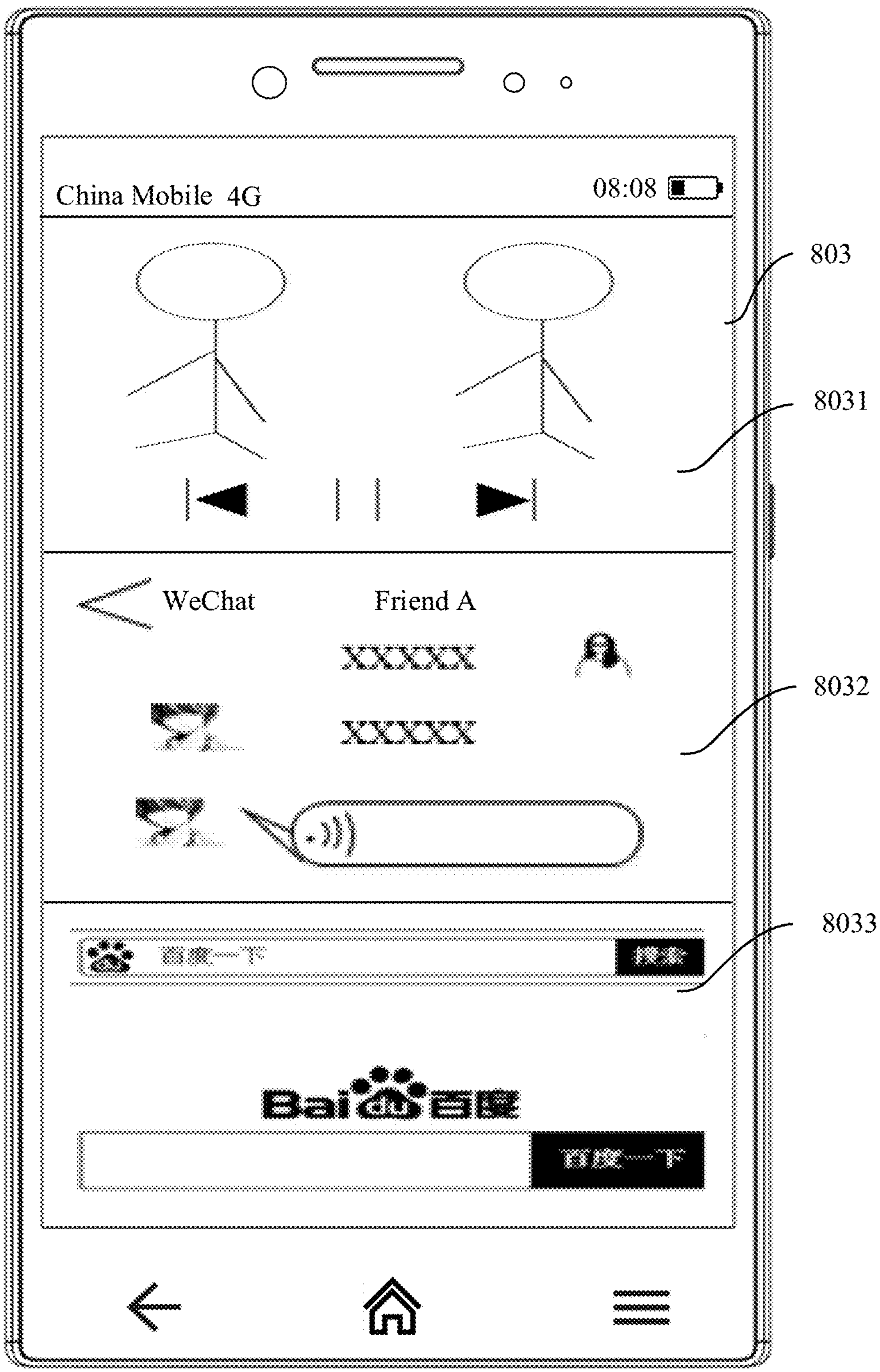
Figure 11A:
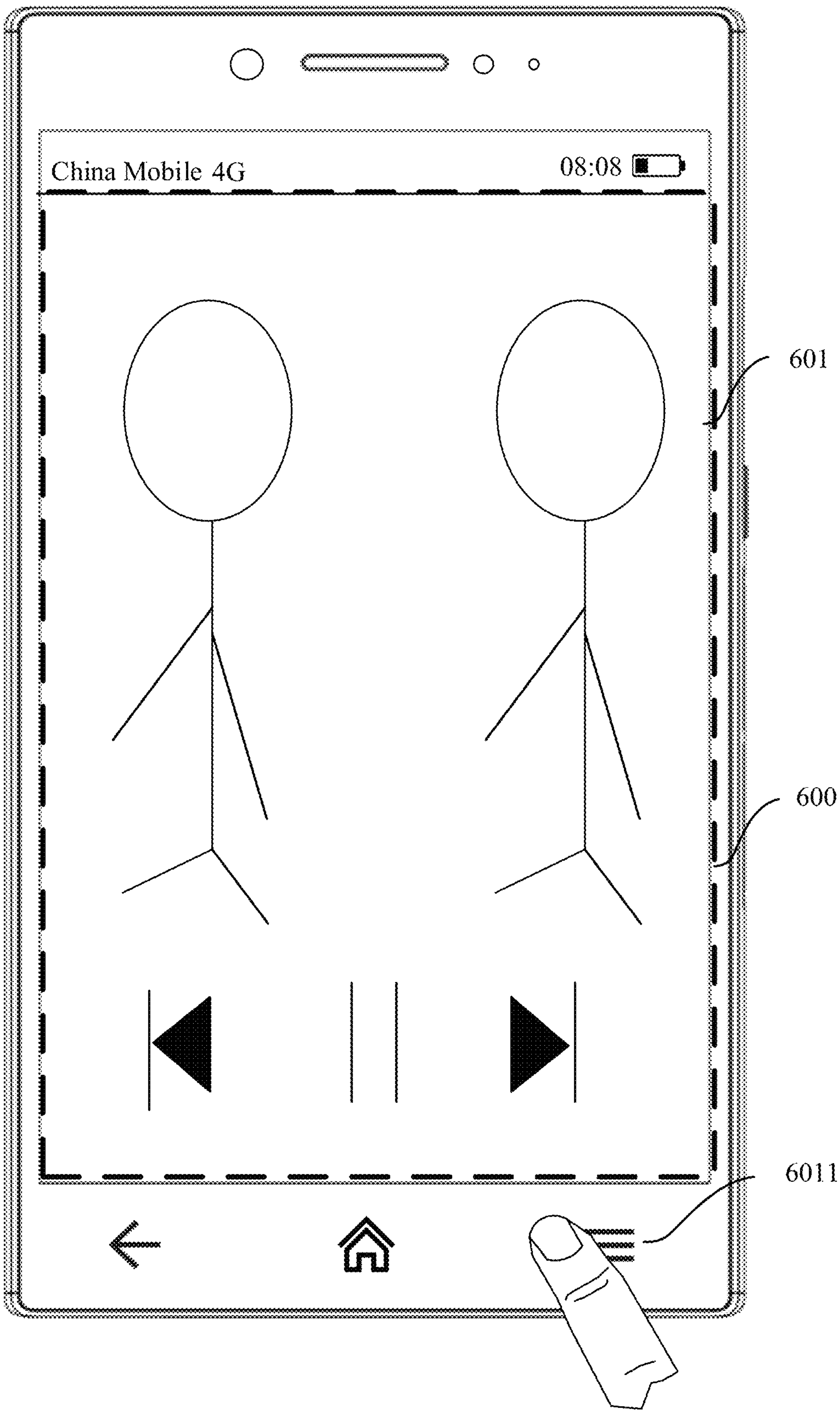
FIG. 11(*a*) to FIG. 11(*d*) are schematic diagrams of a scenario of another interface display method according to an embodiment of this application.
Figure 11B:
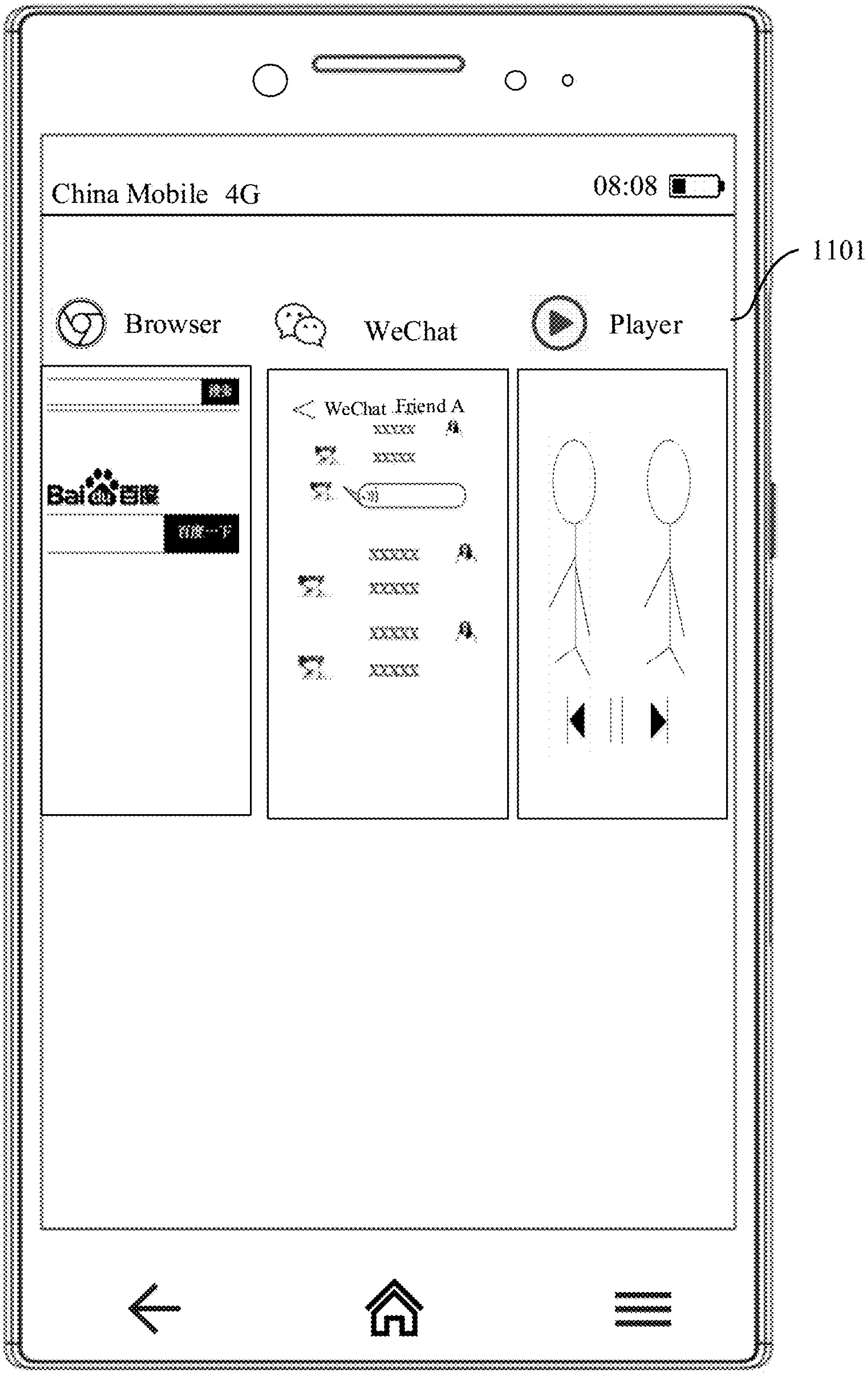
Figure 11C:
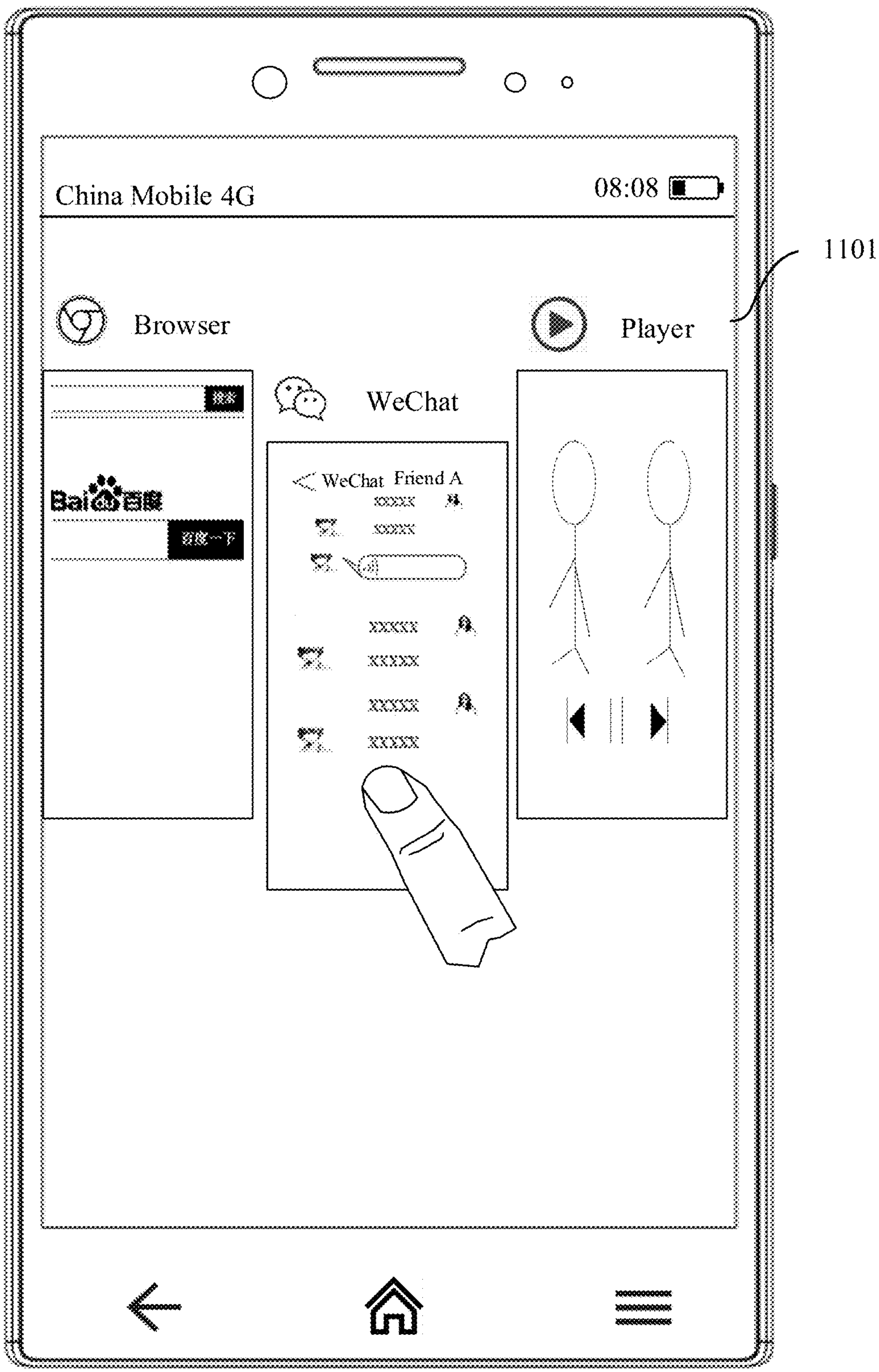
Figure 11D:
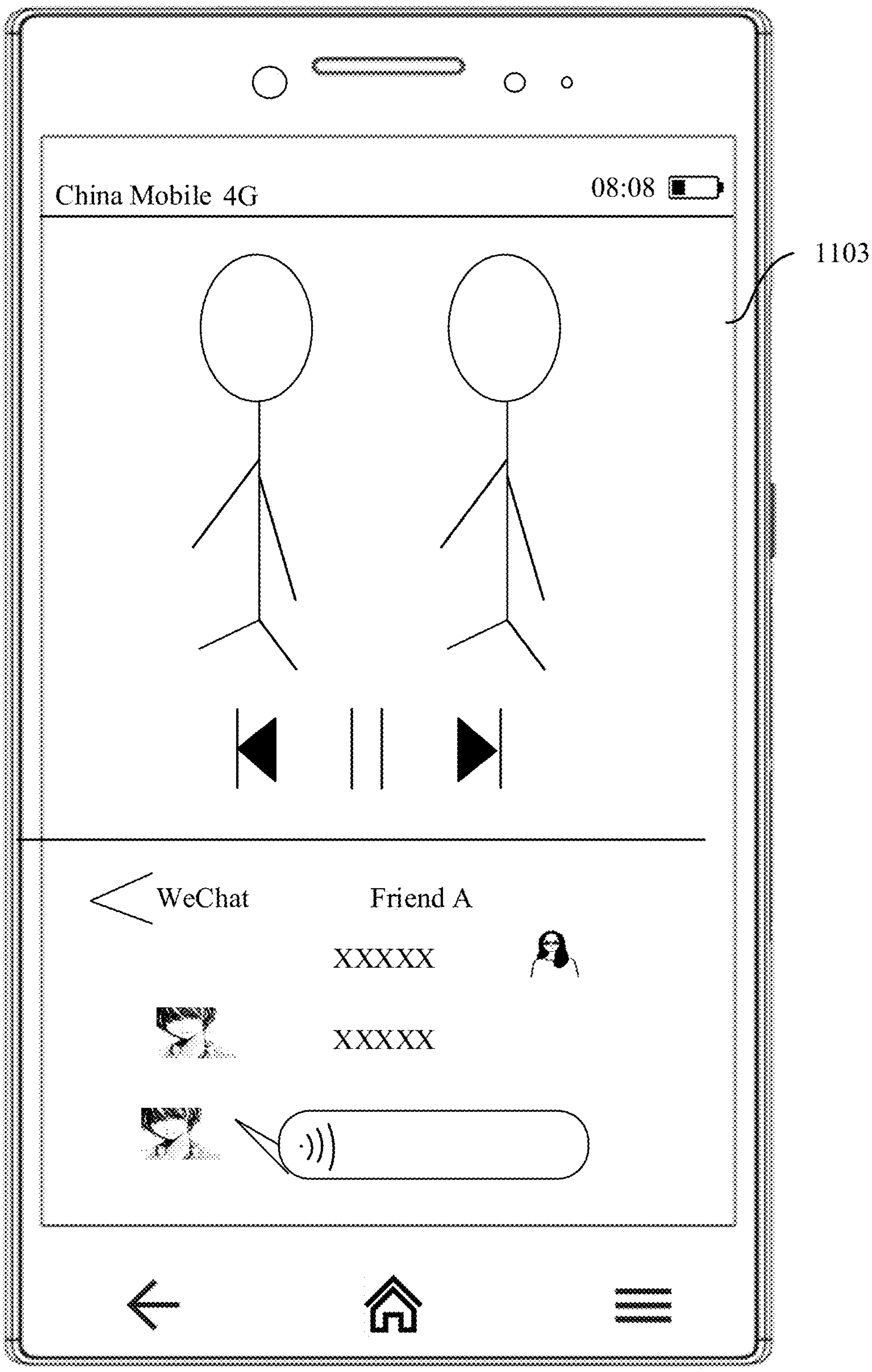
Figure 12A:
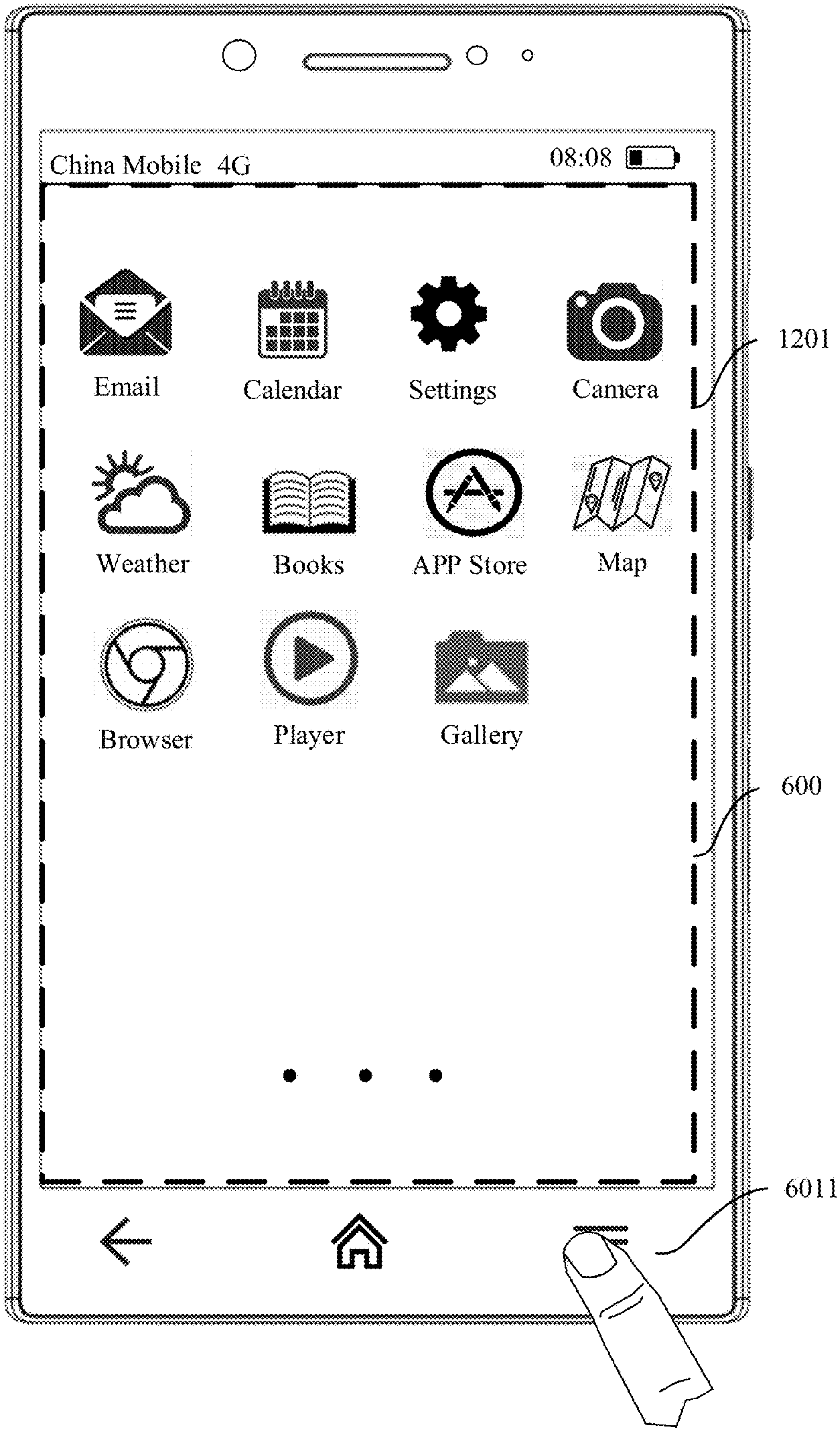
FIG. 12(*a*) to FIG. 12(*d*) are schematic diagrams of a scenario of another interface display method according to an embodiment of this application.
Figure 12B:
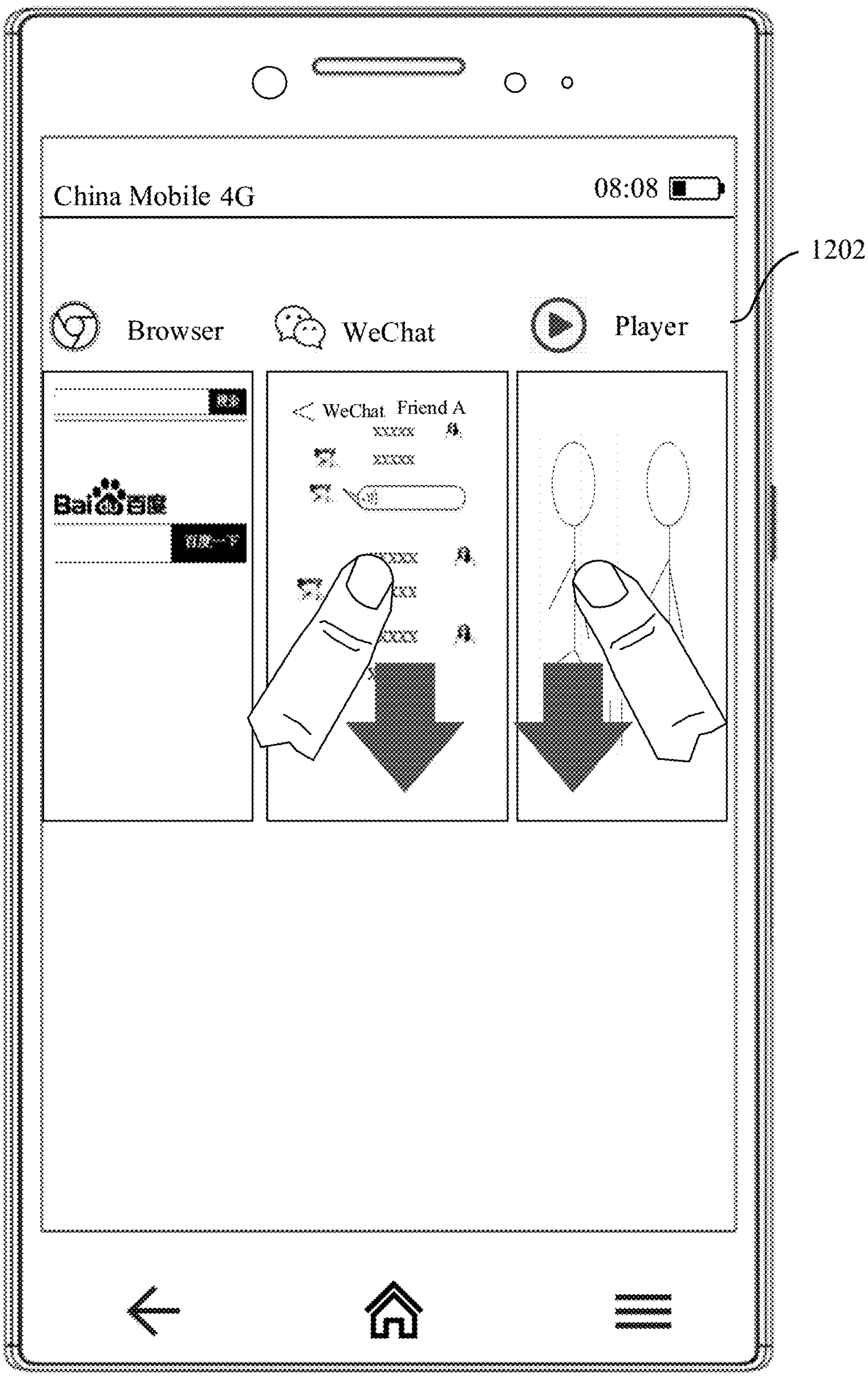
Figure 12C:
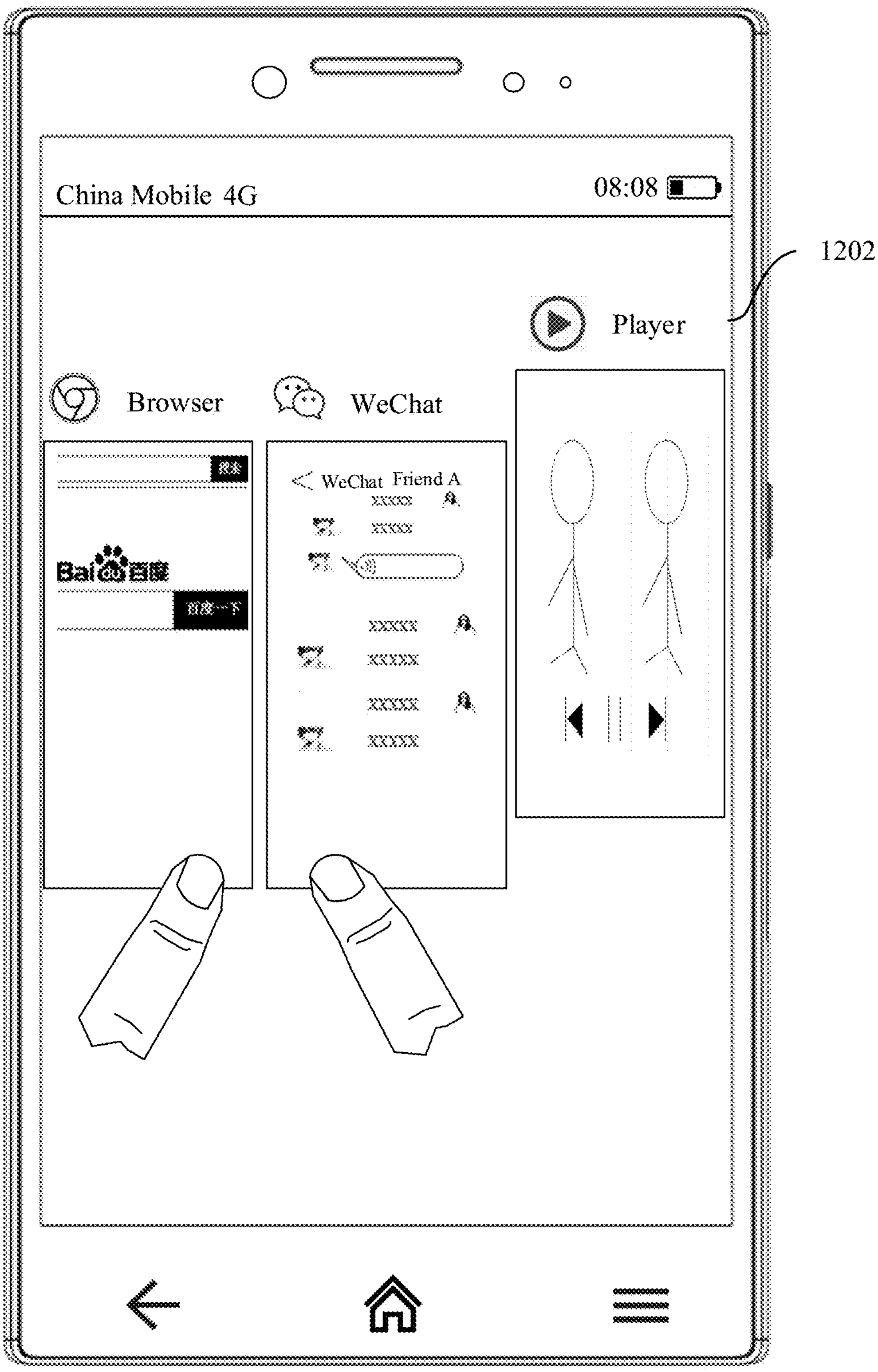
Figure 12D:
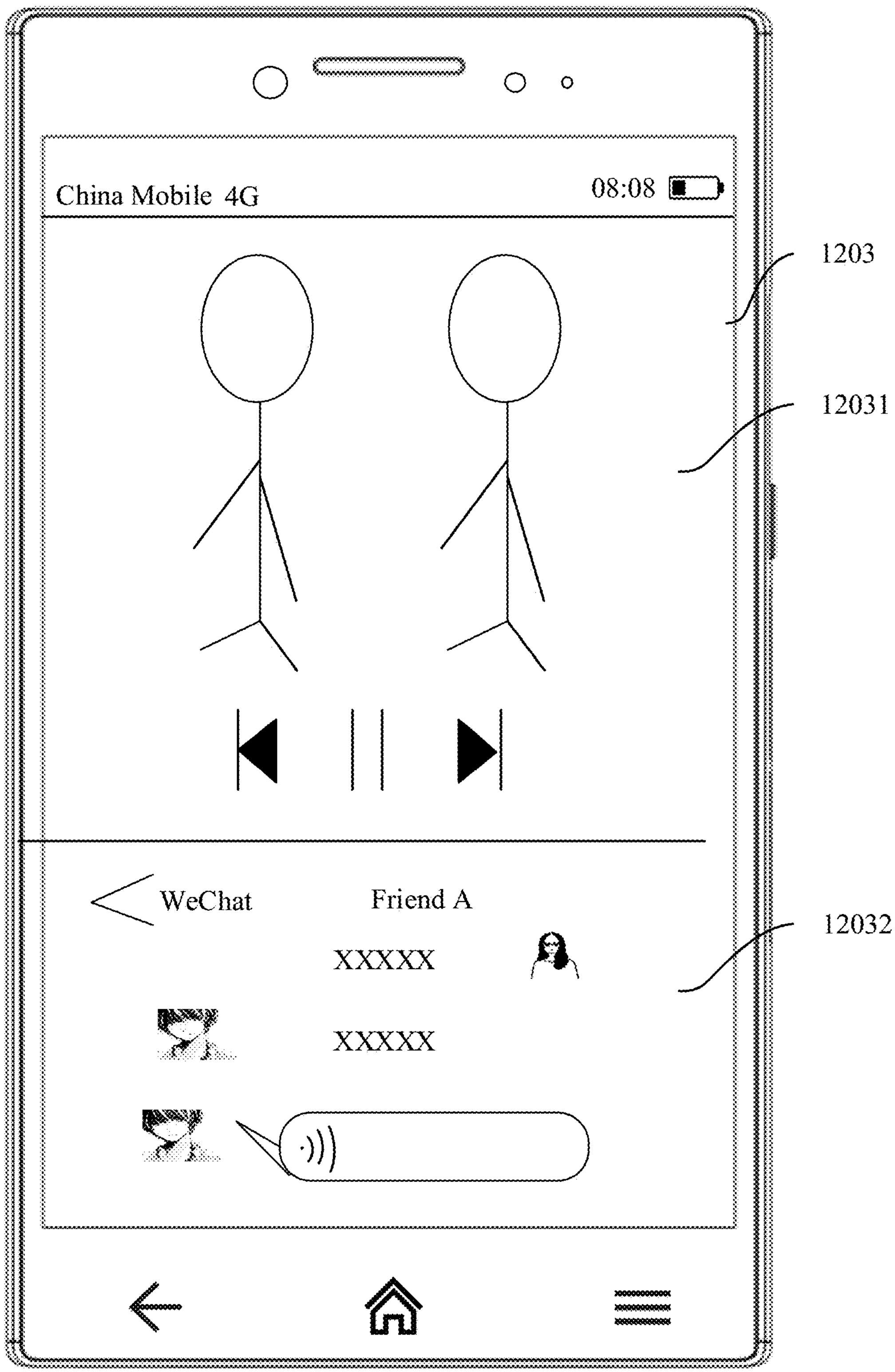

FIG. 5 is a schematic flowchart of an interface display method according to an embodiment of this application. As shown in FIG. 5, the method includes the following steps.

Step 501: The electronic device displays an interface Ain a display area A.

The display area A is any display area on the display 194. The display area A may be all display areas on the display 194 or some display areas on the display 194.

For example, the interface A may be an interface of an application. Alternatively, the interface A may include interfaces of a plurality of applications. For ease of description, the one or more applications are referred to as "first applications" below. It may be understood that the first application is one or more applications running in a foreground. The electronic device may run one or more other applications in a background.

Step 502: The electronic device receives an operation A performed on the display area A.

The operation A is used to indicate the electronic device to display, in the display area A, an application window of a running application. The application window of the running application includes an application window of an application run by the electronic device in the foreground and an application window of an application run by the electronic device in the background.

It may be understood that a form of the operation A is not limited in this embodiment of this application.

For example, the operation A may be sliding inward from a point on an edge of the display area A. Alternatively, the operation A may be tapping, touching and holding, or double-tapping a multi-task button in the display area A. The multi-task button is used to indicate the electronic device to display a multi-task interface in a corresponding display area. The multi-task button may be a physical button. The physical button includes but is not limited to HOME, MENU, RETURN, a power button, a volume button, and the like. Alternatively, the multi-task button may be a virtual button. For example, the multi-task button may be located on a lower edge of the corresponding display area. Alternatively, the multi-task button may be located at an end of a division line of a plurality of display areas.

Step 503: The electronic device displays the multi-task interface in the display area A in response to the operation A.

The multi-task interface includes application windows of one or more running applications. When the multi-task interface includes application windows of a plurality of running applications, the electronic device may arrange the application windows of the plurality of applications based on a sequence of running time of the applications, usage frequencies of the applications, names of the applications, types of the applications, or the like. The multi-task interface includes the application windows of all the running applications. The application windows of the running applications include the application window of the application running in the background and the application window of the application running in the foreground. It may be understood that when the electronic device displays the multi-task interface in the display area A, an application originally displayed in the display area A changes from running in the foreground to running in the background.

Optionally, the electronic device may preferentially display an application window of an application having a relatively high frequency of being jointly used with the application running in the foreground. Optionally, the electronic device may preferentially display an application window of an application having a relatively high frequency of being jointly used with the first application.

The application window may include a thumbnail of a running interface of the application, and may further include an icon or a name of the application.

It should be noted that a user may perform an operation on the application window. For example, the user may slide up an application window of an application, so that the electronic device ends running of the application. For another example, the user may tap an application window of an application to enable the application to run in the foreground.

Optionally, the electronic device may determine a style of an application window of an application based on a type of the application. For example, if an application supports an area-based display function, the electronic device determines that a style of an application window of the application is a first style. If an application does not support the area-based display function, the electronic device determines that a style of an application window of the application is a second style different from the first style. In this way, the user can identify the application that supports the area-based display function. It may be understood that the style of the application window is not limited in this embodiment of this application. The style of the application window includes but is not limited to: color, shape, size, transparency, brightness, saturation, contrast, color temperature, resolution, and the like.

It may be understood that methods of displaying different types of applications in a distinguishing manner include but are not limited to the foregoing examples. For example, the electronic device may display different identifiers based on the types of the applications. For example, if an application supports the area-based display function, the electronic device may display an area-based identifier at the top or the upper-right corner or the upper-left corner of an application window of the application. Alternatively, the electronic device may output different animations, sounds, and/or tactile effects based on whether an application selected by the user supports the area-based display function. For example, if the application selected by the user is an application that supports the area-based display function, the electronic device outputs a first effect. If the application selected by the user is an application that does not support the area-based display function, the electronic device outputs a second effect.

It should be noted that the user may perform an operation on the multi-task interface. For example, the user may slide the multi-task interface to scroll content displayed on the multi-task interface. It is assumed that when a quantity of running applications is greater than a quantity of application windows that can be displayed in the display area A, the user may slide the multi-task interface left or right to scroll the content displayed on the multi-task interface.

Step 504: The electronic device receives an operation B, where the operation B is an operation performed by the user on an application window of a second application in the application windows of the running applications.

The operation B is used to select one or more applications (namely, second applications) to be displayed in different areas and indicate the electronic device to perform area-based display. In other words, the second application is any one or more applications, selected by the user, that are to be displayed in different areas. It should be noted that the first application may be the same as the second application, or may be different from the second application.

For example, the operation B may be sliding down application windows of the one or more applications.

Optionally, to help the user learn that the operation B may be used to select applications to be displayed in different areas and indicate the electronic device to perform area-based display, the electronic device may display a prompt when displaying the multi-task interface. For example, "slide down the application window to split the screen" is displayed in a blank area of the multi-task interface.

Optionally, to help the user identify an application that supports a multi-task function, the electronic device may output different animations, sounds, and/or tactile effects based on whether an application selected by the user supports the area-based display function. For example, if the application selected by the user is an application that supports the area-based display function, the electronic device outputs the first effect. The first effect may be an animation effect that an application window of the application moves down as a finger of the user slides down. If the application selected by the user is an application that does not support the area-based display function, the electronic device outputs the second effect. The second effect may be an animation effect that, as a finger of the user slides down, a window of the application moves down for a predetermined distance and returns up.

Step 505: In response to the operation B, the electronic device displays the application interface of the first application and the application interface of the second application in different areas in the display area A.

For ease of understanding, the following specifically describes the method shown in FIG. 5 with reference to application scenarios.

FIG. 6(*a*) to FIG. 6(*h*) are schematic diagrams of scenarios of the interface display method according to an embodiment of this application. An application scenario shown in FIG. 6(*a*) to FIG. 6(*d*) is that the user receives a WeChat message from a friend A when watching a movie on the electronic device. The following describes an example of the method shown in FIG. 5 with reference to FIG. 6(*a*) to FIG. 6(*h*).

As shown in FIG. 6(*a*), the electronic device displays an interface 601 in a display area 600. The interface 601 is an interface of "Player". In other words, "Player" is an application currently running in the foreground. The electronic device may further run one or more other applications in the background. For example, other applications such as "WeChat" and "Browser" may run in the background.

Still as shown in FIG. 6(*a*), the user taps a multi-task button 6011.

It may be understood that tapping the multi-task button 6011 may be replaced with another operation, for example, sliding from a point on a lower edge of the display area 600 to the inside of the display area 600, touching and holding the multi-task button 6011, or double-tapping the multi-task button 6011.

As shown in FIG. 6(*b*), in response to that the user taps the multi-task button 6011, the electronic device may display a multi-task interface (for example, an interface 602) in the display area 600. The interface 602 includes application windows 6021 of running applications such as "Player", "WeChat", and "Browser".

As shown in FIG. 6(*b*) and FIG. 6(*c*), the user slides down the application window of "WeChat".

It should be noted that, when the electronic device displays the multi-task interface, a sliding-up operation is used to end a running application, and a sliding-left/right operation is used to turn a page or scroll the display content. In other words, the sliding-left/right operation and the sliding-up operation may be already used to perform other operation commands. Therefore, the sliding-down operation is used, to avoid affecting an existing interaction habit of the user.

It should be noted that in FIG. 5, an example in which the application window of "WeChat" is slid down is used for description. It may be understood that the sliding-down operation may be replaced with another operation, for example, replaced with double-tapping or touching and holding.

Optionally, the user may double-tap the application window of "WeChat" or touch and hold the application window of "WeChat".

"WeChat" is an application that supports a split-screen function. Therefore, as shown in FIG. 6(*b*) and FIG. 6(*c*), the application window of "WeChat" moves down as the finger of the user slides down.

As shown in FIG. 6(*d*), in response to that the user slides down the application window of "WeChat", the electronic device displays an interface 603. The interface 603 includes an interface of "Player" and an interface of "WeChat". The display area 600 is divided into a display area 6031 and a display area 6032. The electronic device displays the interface of "Player" in the display area 6031, and displays the interface of "WeChat" in the display area 6032. In other words, the electronic device displays the interface of "WeChat" and the interface of "Player" in different areas in the display area 600. In this case, the user may simultaneously watch a video by using the interface of "Player" and reply to the WeChat message of the friend A by using the interface of "WeChat".

As shown in FIG. 1A to FIG. 1C or FIG. 2A to FIG. 2D, in the conventional technology, in response to a screen splitting gesture of a user, a display area 100 of an electronic device is divided into a display area 1021 and a display area 1022. An interface of "Player" is displayed in the display area 1021, and icons of one or more applications that support the split-screen function are displayed in the display area 1022. When the user selects an icon of an application, the electronic device displays an interface of the selected application in the display area 1022. It may be understood that when the user installs a plurality of applications that support the split-screen function on the electronic device, a plurality of icons are displayed in the display area 1022. It is relatively difficult for the user to find, in the display area 1022, an icon of an application to be displayed on a split screen. In addition, the user needs to first input the screen splitting gesture to trigger screen splitting of the electronic device, and then select, in the display area 1022 after the screen splitting, the application to be displayed on a split screen. The operations are relatively complex. In this embodiment of this application, it is relatively convenient for the user to select an application to be displayed in an area-based manner from the running applications. Only one operation is required to indicate the electronic device to perform area-based display and select the application to be displayed in the area-based manner. This simplifies an operating process of the user for the area-based display.

It should be noted that the first application may be the same as the second application. An application scenario shown in FIG. 6(*e*) to FIG. 6(*h*) is that a new message from a friend B is received when the user chats with the friend A by using "WeChat" on the electronic device.

As shown in FIG. 6(*e*), the electronic device displays an interface of "WeChat" (a dialog interface with the friend A). In other words, "WeChat" is an application currently running in the foreground. Still as shown in FIG. 6(*e*), the user taps the multi-task button 6011.

As shown in FIG. 6(*f*), in response to that the user taps the multi-task button 6011, the electronic device may display the multi-task interface, including the application windows of the running applications such as "WeChat", "Browser", and "Player".

As shown in FIG. 6(*f*) and FIG. 6(*g*), the user slides down the application window of "WeChat".

As shown in FIG. 6(*h*), in response to that the user slides down the application window of "WeChat", the electronic device displays two interfaces of "WeChat" in different areas. One is the dialog interface with the friend A, and the other is a dialog interface with the friend B. In this way, the user may simultaneously chat with the friend A and chat with the friend B, to avoid repeatedly switching different interfaces of the same application. It may be understood that the dialog interface with the friend A may alternatively be another interface of "WeChat", for example, Moments or an official account.

According to this solution, the user can conveniently display a plurality of interfaces of an application in different areas, so that different interfaces of the application can be simultaneously used, to avoid repeated switching.

It should be noted that, in this embodiment of this application, the operation B may be used to select one or more applications to be displayed in different areas.

FIG. 7(*a*) to FIG. 7(*d*) are schematic diagrams of a scenario of another interface display method according to an embodiment of this application. The application scenario shown in FIG. 7(*a*) to FIG. 7(*d*) is that the user watches a movie on the electronic device. The user wants to watch the movie, and at the same time, query what good movies are available on the weekend and ask a friend A to watch a movie on the weekend.

As shown in FIG. 7(*a*) and FIG. 7(*b*), the electronic device displays an interface 601 in a display area 600. In response to that the user taps a multi-task button 6011, the electronic device may display a multi-task interface (for example, an interface 602) in the display area 600. As shown in FIG. 7(*b*) and FIG. 7(*c*), the user simultaneously slides down an application window of "WeChat" and an application window of "Browser" by using different fingers. As shown in FIG. 7(*d*), in response to that the user slides down the application window of "WeChat" and the application window of "Browser" by using a multi-point operation, the electronic device displays an interface 703. The interface 703 includes an interface of "Player", an interface of "WeChat", and an interface of "Browser". The display area 600 is divided into a display area 7031, a display area 7032, and a display area 7033. The electronic device displays the interface of "Player" in the display area 7031, displays the interface of "WeChat" in the display area 7032, and displays the interface of "Browser" in the display area 7033. In other words, the electronic device displays the interface of "Player", the interface of "WeChat", and the interface of "Browser" in different areas in the display area 600.

It should be noted that in FIG. 7(*a*) to FIG. 7(*d*), an example in which the user simultaneously slides a plurality of application windows by using different fingers is used for description. It may be understood that simultaneously sliding the plurality of application windows may be replaced with another operation, for example, successively sliding the application windows at a preset time interval.

In conclusion, the user can quickly and conveniently select a plurality of applications to be displayed in different areas.

It should be noted that in this embodiment of this application, the interface A may include an interface of one application, or may include interfaces of a plurality of applications. In other words, the display area A may include a plurality of display areas, and the plurality of display areas are used to separately display interfaces of a plurality of applications.

FIG. 8(*a*) to FIG. 8(*d*) are schematic diagrams of a scenario of another interface display method according to an embodiment of this application. The application scenario shown in FIG. 8(*a*) to FIG. 8(*d*) is that, by using the electronic device, the user simultaneously watches a movie and chats with a friend A. In the chat, the friend A mentions an actor in the movie. The user wants to query related information about the actor by using the electronic device.

As shown in FIG. 8(*a*), the electronic device displays an interface 801 in a display area 600. The interface 801 includes an interface of "Player" and an interface of "WeChat". The display area 600 includes a display area 8011 and a display area 8012. The interface of "Player" is displayed in the display area 8011, and the interface of "WeChat" is displayed in the display area 8012. In this case, "WeChat" and "Player" are applications running in the foreground on the electronic device. "Books" and "Browser" run in the background. Still as shown in FIG. 8(*a*), the user slides from a point on a lower edge of the display area 600 to the inside of the display area 600. As shown in FIG. 8(*a*) and FIG. 8(*b*), in response to that the user slides from the point on the lower edge of the display area 600 to the inside of the display area 600, the electronic device displays a multi-task interface (for example, an interface 802). The interface 802 includes application windows of "Player", "WeChat", "Browser", and "Books". In this case, the application windows of "Player", "WeChat", and "Books" are displayed in the display area 600. It may be understood that the user may slide the interface 802 left or right to scroll content displayed on the interface 802. For example, as shown in FIG. 8(*b*) and FIG. 8(*c*), the user slides the interface 802 right, so that the application window of "Browser" is displayed in the display area 600. Then, as shown in FIG. 8(*c*), the user slides down the application window of "Browser". As shown in FIG. 8(*d*), in response to that the user slides down the application window of "Browser", the electronic device displays an interface 803. The interface 803 includes an interface of "Player", an interface of "WeChat", and an interface of "Browser". The display area 600 is divided into a display area 8031, a display area 8032, and a display area 8033. The electronic device displays the interface of "Player" in the display area 8031, displays the interface of "WeChat" in the display area 8032, and displays the interface of "Browser" in the display area 8033. In other words, the electronic device displays the interface of "Player", the interface of "WeChat", and the interface of "Browser" in different areas in the display area 600.

In conclusion, the electronic device displays the interface A in the display area A, and the interface A includes interfaces of X applications. The electronic device receives the operation A of the user. The electronic device displays the multi-task interface in the display area A in response to the operation A of the user. The multi-task interface may include application windows of one or more running applications. The electronic device receives the operation B performed by the user on application windows of Y applications. The electronic device displays interfaces of X+Y applications in the display area A in response to the operation B of the user. The display area A is divided into X+Y display areas, which are respectively configured to display the interfaces of the X+Y applications. X is a positive integer, and Y is a positive integer.

Optionally, a maximum quantity Z of display areas may be set. Z is any positive integer greater than or equal to 2. It is assumed that the interface A includes interfaces of X applications. The electronic device receives the operation B performed on application windows of Y applications. When X+Y is greater than Z, the electronic device may pop up a prompt.

In the embodiment shown in FIG. 8(*a*) to FIG. 8(*d*), as the user slides the interface 802 right, the application window of "Player" moves right until the application window moves out of the display area 600. Optionally, to help the user view the interface of the first application jointly displayed with the interface of the second application, the electronic device may keep displaying an application window of the first application.

FIG. 9(*a*) to FIG. 10(*d*) are schematic diagrams of a scenario of another interface display method according to an embodiment of this application.

As shown in FIG. 9(*a*) or FIG. 10(*a*), the electronic device displays an interface 801 in a display area 600. For a description of the interface 801, refer to FIG. 8(*a*) to FIG. 8(*d*). Details are not described herein again. In this case, "WeChat" and "Browser" are applications running in the foreground on the electronic device. "Books" and "Browser" run in the background. The user slides from a point on a lower edge of the display area 600 to the inside of the display area 600. As shown in FIG. 8(*a*) and FIG. 8(*b*), in response to the foregoing operation, the electronic device displays a multi-task interface (for example, an interface 802) in the display area 600. The interface 802 includes application windows of "Player", "WeChat", "Browser", and "Books". In this case, the application windows of "Player", "WeChat", and "Books" are displayed in the display area 600. It may be understood that the user may slide the interface 802 left or right to scroll content displayed on the interface 802. As shown in FIG. 9(*c*) or FIG. 10(*c*), the user may slide the interface 802 right, to display the application window of "Browser" in the display area 600. In this case, different from FIG. 8(*c*), the application windows of "Player" and "Browser" are not moved out of the display area 600 in the sliding-right process.

Specifically, as shown in FIG. 9(*b*) and FIG. 9(*c*), "Player" and "WeChat" may be fixedly displayed in the display area 600. Display positions of the application windows of "Player" and "WeChat" in FIG. 9(*b*) are the same as display positions of the application windows of "Player" and "WeChat" in FIG. 9(*c*).

Alternatively, as shown in FIG. 10(*b*) and FIG. 10(*c*), as the user slides the interface 802 right, the display positions of the application windows of "Player" and "WeChat" move right, and the application windows of "Player" and "WeChat" gradually become smaller, so that the application window of "Browser" can be displayed in the display area 600. In this case, different from FIG. 9(*c*), the application window of "Player" and the application window of "WeChat" occupy less space, and the electronic device may display application windows of more applications. For example, the application window of "Books" and the application window of "Browser" are displayed in the display area 600.

Then, as shown in FIG. 9(*c*) and FIG. 10(*c*), the user slides down the application window of "Browser". In this case, as shown in FIG. 9(*d*) and FIG. 10(*d*), in response to that the user slides down the application window of "Browser", the electronic device displays an interface 803. The electronic device displays an interface of "Player", an interface of "WeChat", and an interface of "Browser" in different areas in the display area 600. For a description of the interface 803, refer to FIG. 8(*a*) to FIG. 8(*d*). Details are not described herein again.

In conclusion, in this embodiment of this application, when the multi-task interface is displayed, the electronic device may continuously display the application window of the first application in the display area 600, so that the user can view which application or applications are jointly displayed on split screens with the second application selected by the user on the multi-task interface.

Generally, application windows of a plurality of applications are arranged based on a sequence of running time of the applications. For example, the most recently used application is placed on the rightmost side, and the first used application is placed on the leftmost side. In the embodiment shown in FIG. 8(*a*) to FIG. 8(*d*), when running time of "Browser" is earlier than running time of "Books", the application window of "Browser" is placed on the left of the application window of "Books". In this case, the user needs to slide the interface 802 right, so that the application window of "Browser" is displayed in the display area 600. To help the user select an application to be displayed in the area-based manner, optionally, the electronic device may preferentially display an application window of an application having a relatively high frequency of being jointly used with the first application. For ease of understanding, the following describes the method with reference to an application scenario in FIG. 11(*a*) to FIG. 11(*d*). FIG. 11(*a*) to FIG. 11(*d*) are schematic diagrams of a scenario of another interface display method according to an embodiment of this application.

As shown in FIG. 11(*a*), the electronic device displays an interface 601 in a display area 600. The interface 601 is an interface of "Player". In this case, "Player" is an application running in the foreground on the electronic device. "Books", "WeChat", and "Browser" run in the background. The user taps a button 6011. As shown in FIG. 11(*b*), in response to that the user taps the button 6011, the electronic device displays a multi-task interface (for example, an interface 1101) in the display area 600. The interface 1101 includes application windows of "Player", "WeChat", "Browser", and "Books". The electronic device arranges interfaces of a plurality of applications based on frequencies that the applications are jointly used with "Player". It is assumed that a frequency that "Player" is jointly used with "WeChat" is greater than a frequency that "Player" is jointly used with "Browser", and the frequency that "Player" is jointly used with "Browser" is greater than a frequency that "Player" is jointly used with "Books". In this case, compared with the application window of "Browser" or the application window of "Books", the application window of "WeChat" is preferentially displayed (in other words, when the user browses the multi-task interface, the application window of "WeChat" is preferentially viewed by the user). Similarly, compared with the application window of "Books", the application window of "Browser" is preferentially displayed. As shown in the figure, the application window of WeChat is placed on the right of the application windows of "Browser" and "Books", and can be preferentially displayed. It may be understood that, for an application window with a low priority, the user may need to perform some operations on the multi-task interface to view the application window. For example, if the frequency that "Books" is jointly used with "Player" is relatively low, the user needs to slide the interface 1101 right to view the application window of "Books". That an application window with a high priority is located on the right side in the foregoing is merely an example. It may be understood that preferential display is based on a scrolling display rule of the multi-task interface, and an application window that is preferentially viewed by the user is preferentially displayed.

As shown in FIG. 11(*c*), the user slides down the application window of "WeChat". As shown in FIG. 11(*d*), in response to that the user slides down the application window of "WeChat", the electronic device displays an interface 1103. The interface 1103 includes an interface of "Player" and an interface of "WeChat". The electronic device displays the interface of "Player" and the interface of "WeChat" in different areas.

It should be noted that, in the foregoing embodiment, an example in which the interface A is an interface of a single application or interfaces of a plurality of applications is used for description. It may be understood that the interface A includes but is not limited thereto. For example, the interface A may be a home screen, a leftmost screen, or a lock screen.

FIG. 12(*a*) to FIG. 12(*d*) are schematic diagrams of a scenario of another interface display method according to an embodiment of this application. The application scenario shown in FIG. 12(*a*) to FIG. 12(*d*) is that the electronic device displays a home screen and the user wants to simultaneously watch a video and chat with a friend A by using the electronic device.

As shown in FIG. 12(*a*), the electronic device displays an interface 1201, and the interface 1201 is a home (Home) screen. In this case, the electronic device runs one or more applications in the background. For example, applications such as "Player", "WeChat", and "Browser" run in the background. The user taps a button 6011. As shown in FIG. 12(*b*), in response to that the user taps the button 6011, the electronic device displays a multi-task interface (for example, an interface 1202). The interface 1202 includes application windows of "Player", "WeChat", and "Browser". As shown in FIG. 12(*b*) and FIG. 12(*c*), the user slides down the application window of "WeChat" and the application window of "Player". As shown in FIG. 12(*d*), in response to that the user slides down the application window of "WeChat" and the application window of "Player", the electronic device displays an interface 1203. The interface 1203 includes an interface of "Player" and an interface of "WeChat". The display area 600 is divided into a display area 12031 and a display area 12032. The interface of "Player" is displayed in the display area 12031, and the interface of "WeChat" is displayed in the display area 12032. In other words, the electronic device displays the interface of "Player" and the interface of "WeChat" in different areas in the display area 600.

Figure 13:
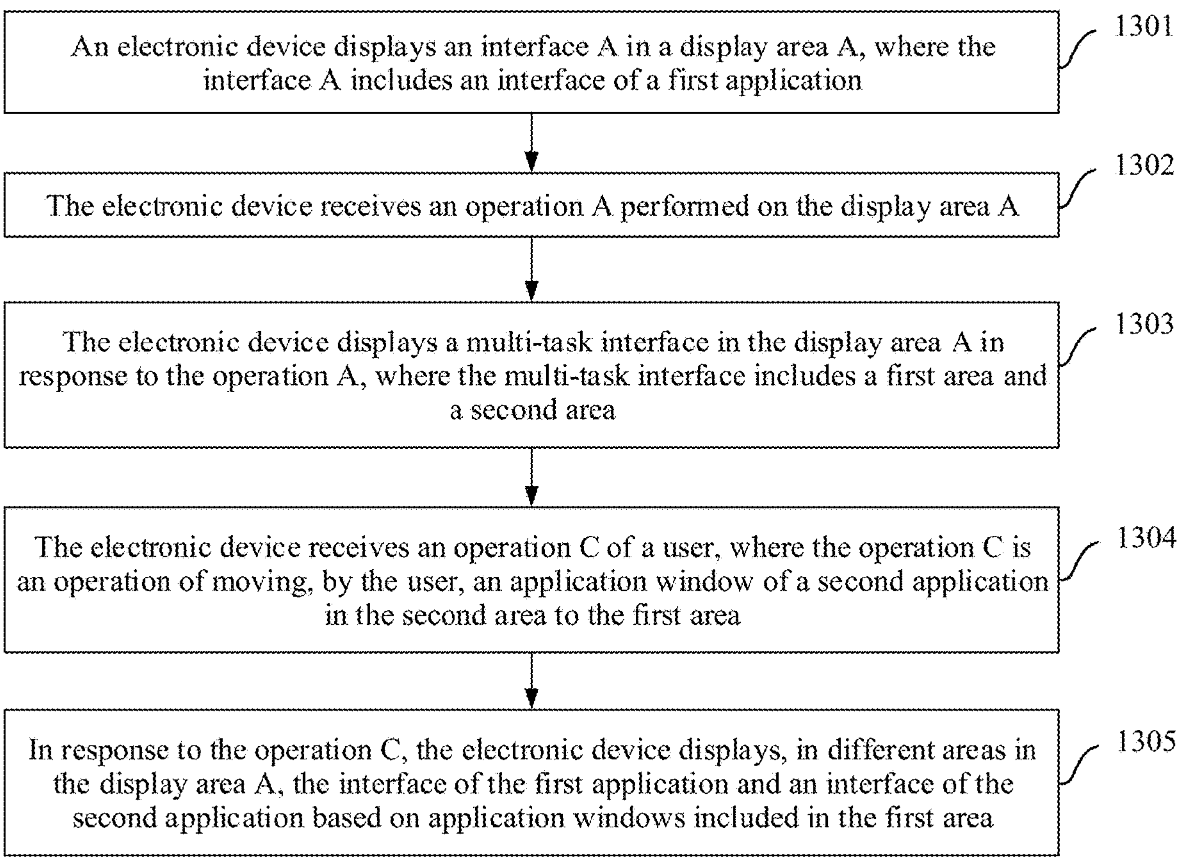
FIG. 13 is a schematic flowchart of another interface display method according to an embodiment of this application.
Figure 14A:
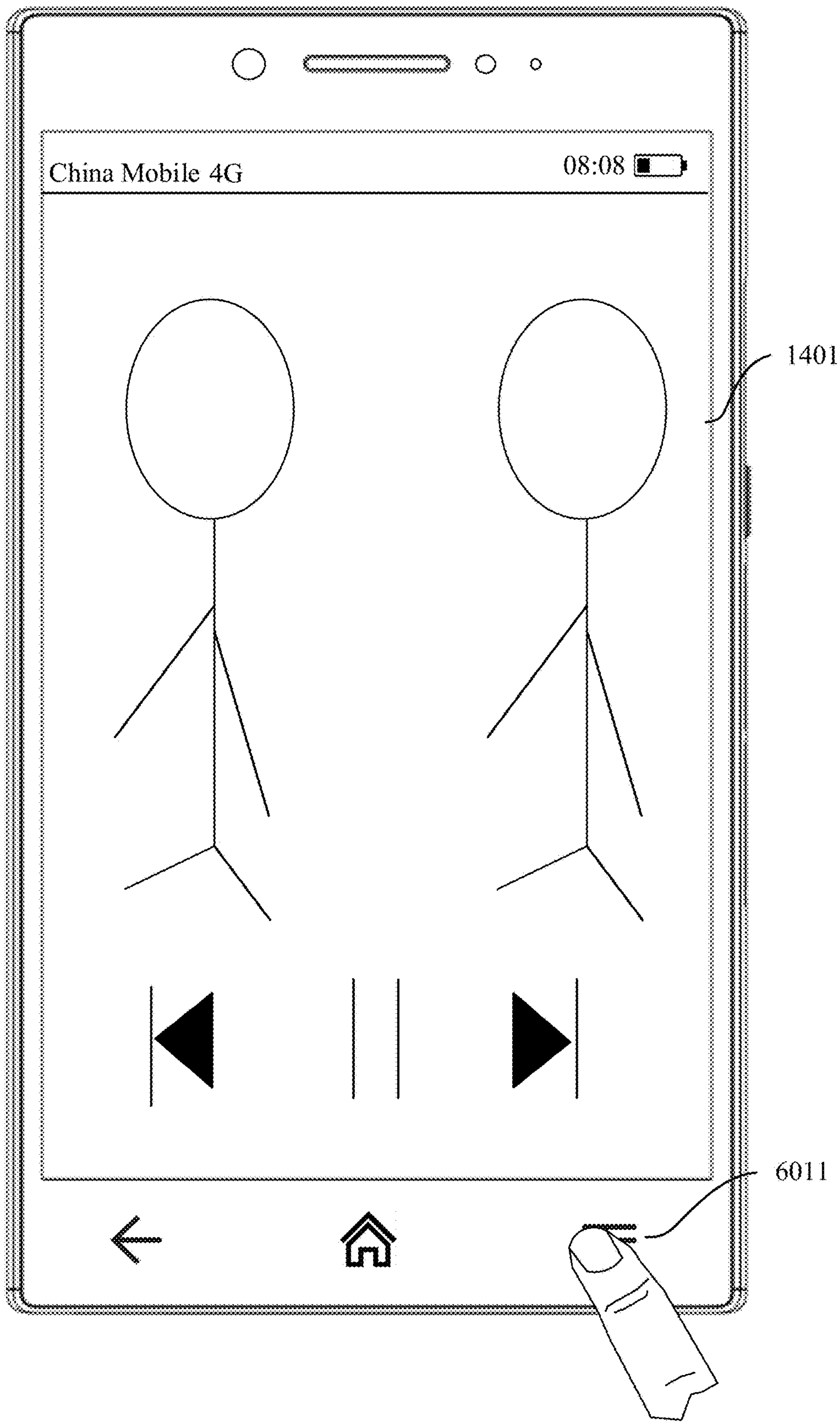
FIG. 14(*a*) to FIG. 14(*i*) are schematic diagrams of a scenario of another interface display method according to an embodiment of this application.
Figure 14B:
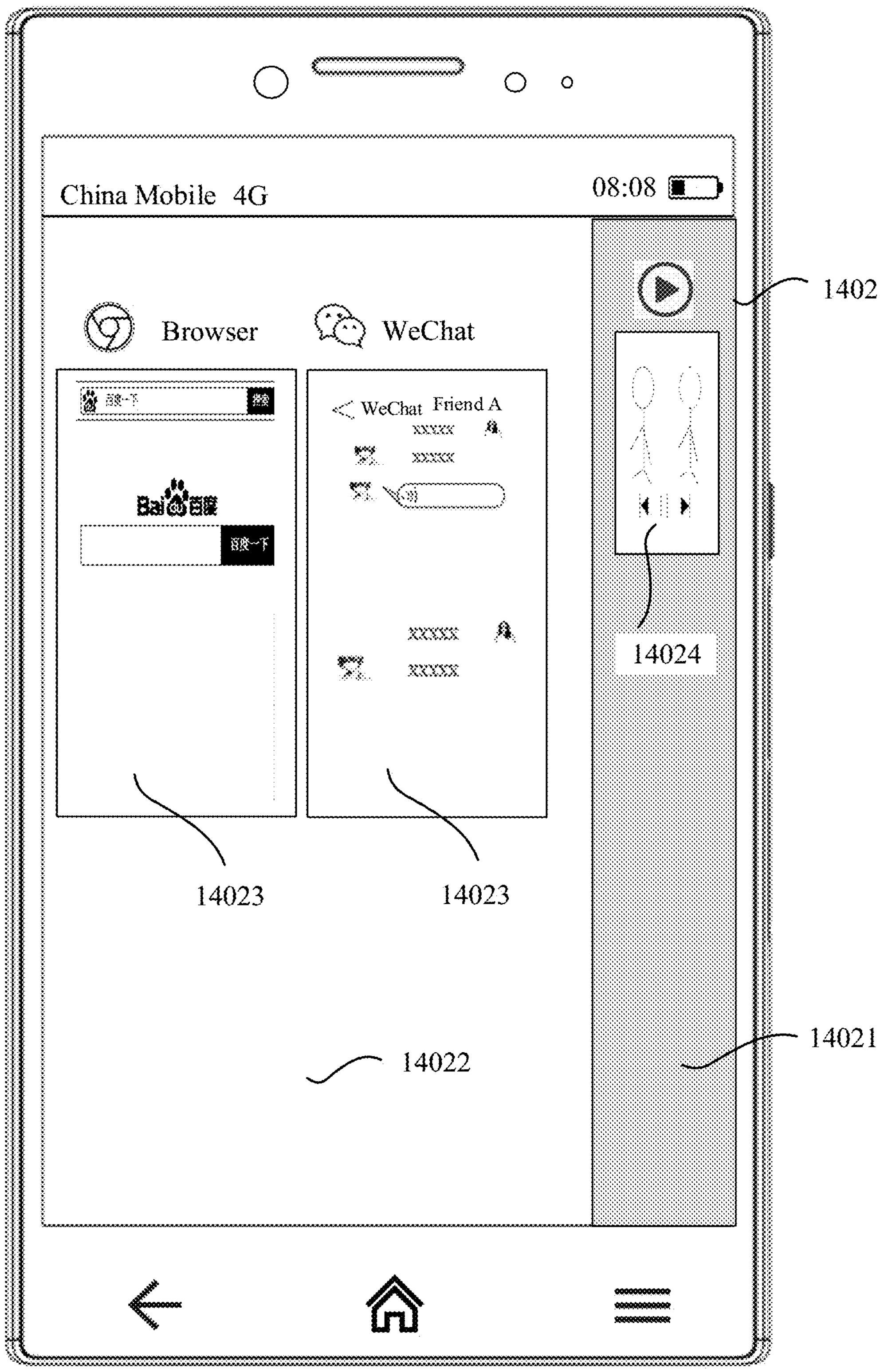
Figure 14C:
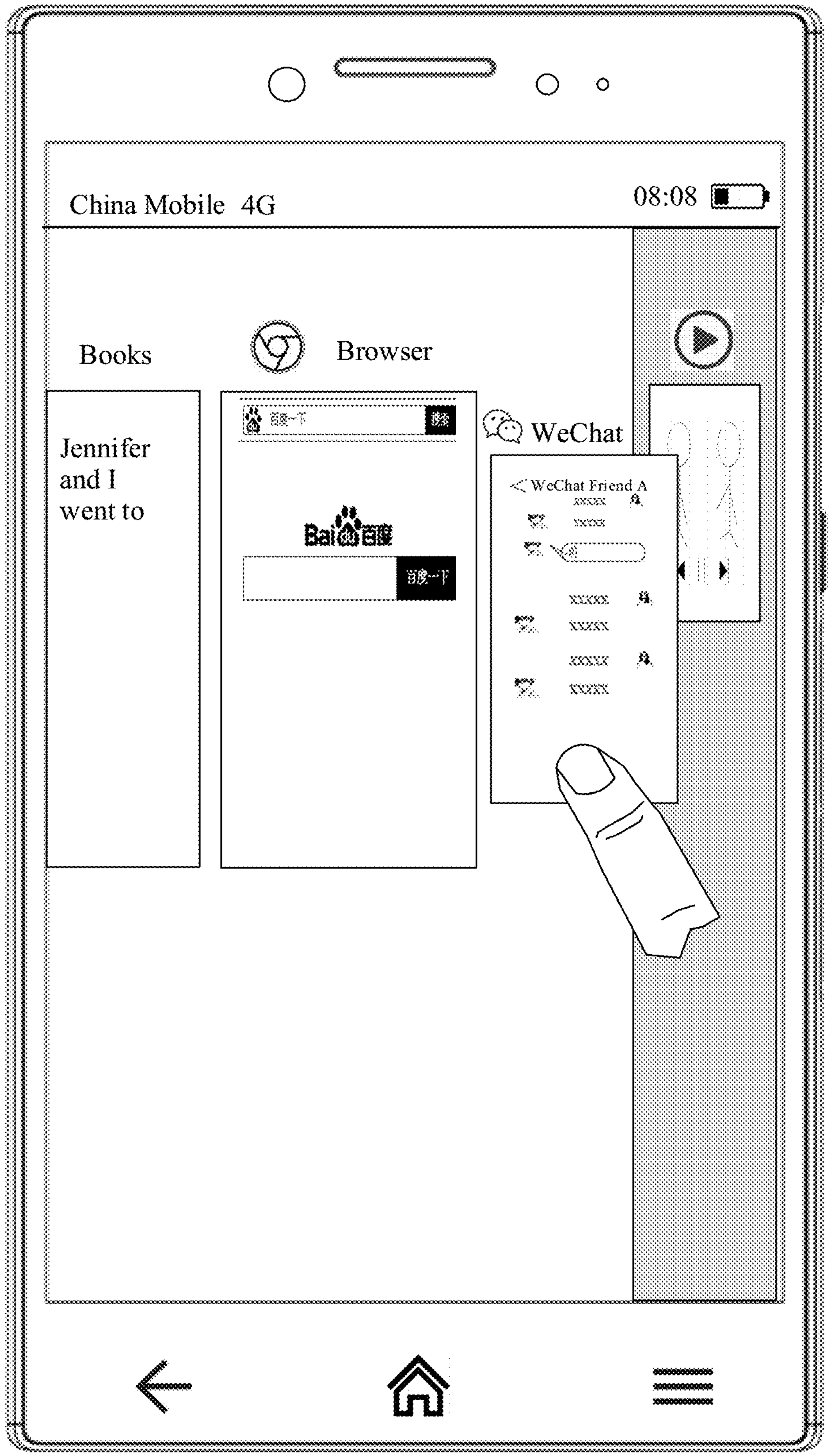
Figure 14D:
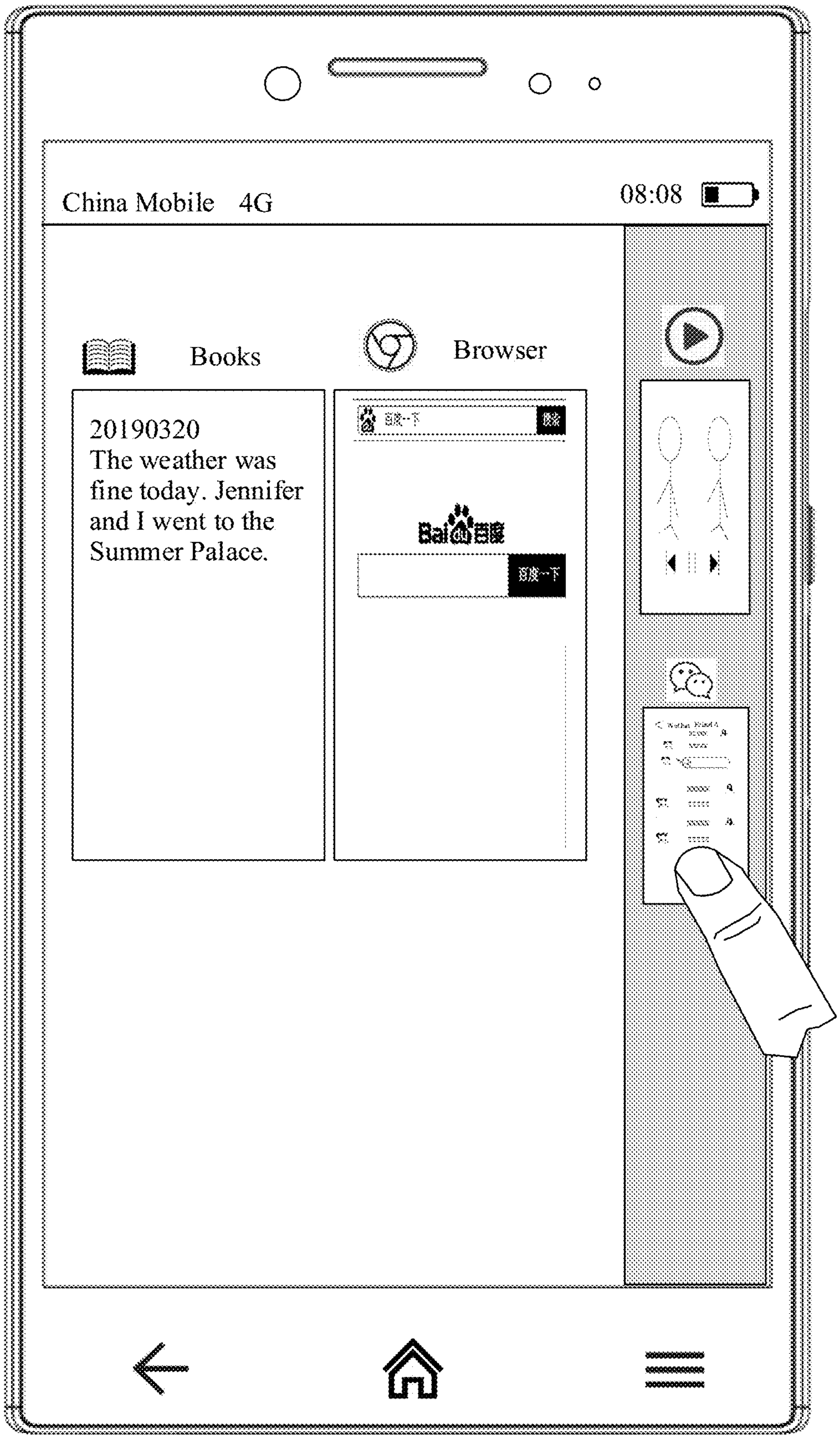
Figure 14E:
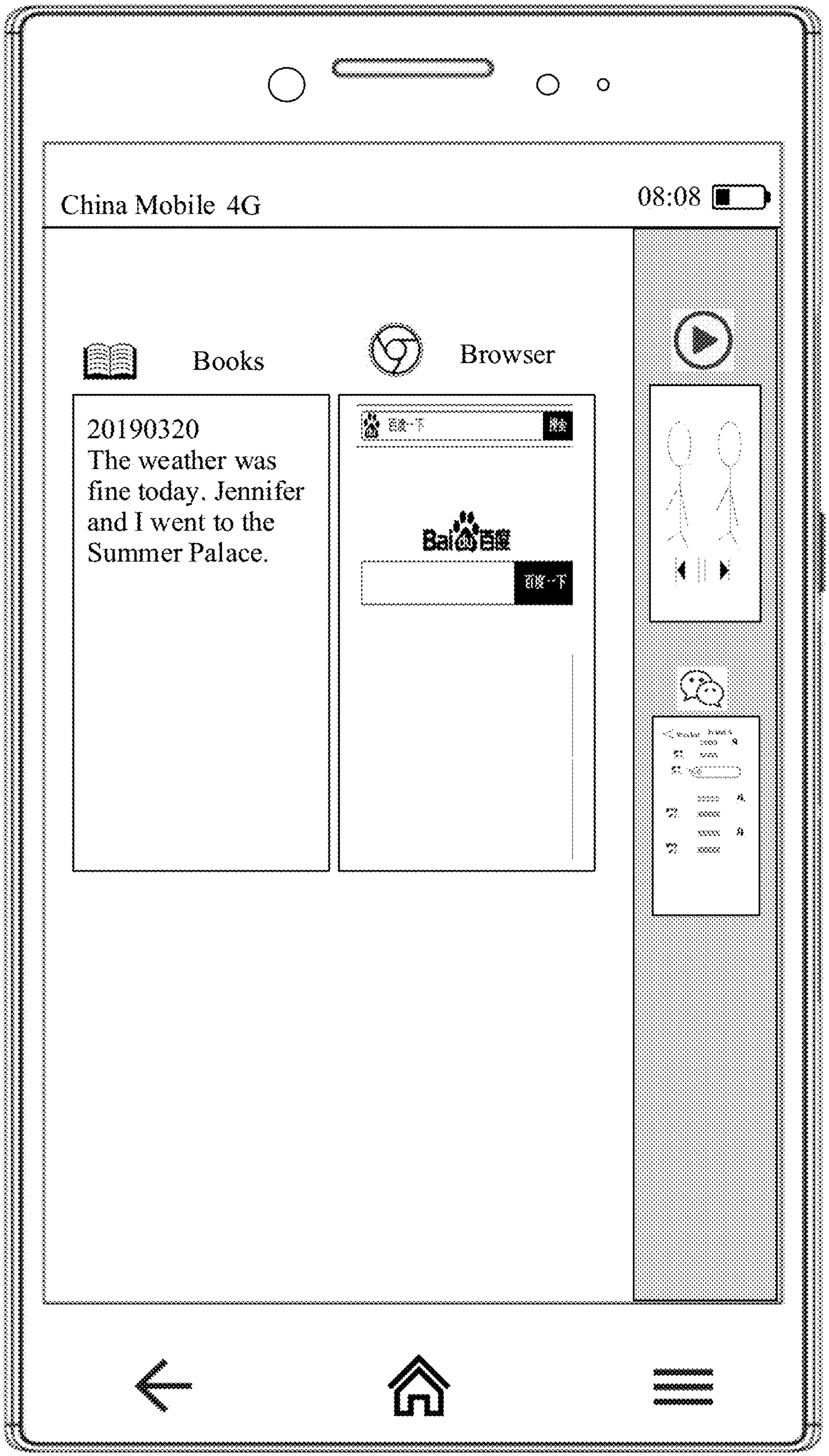
Figure 14F:
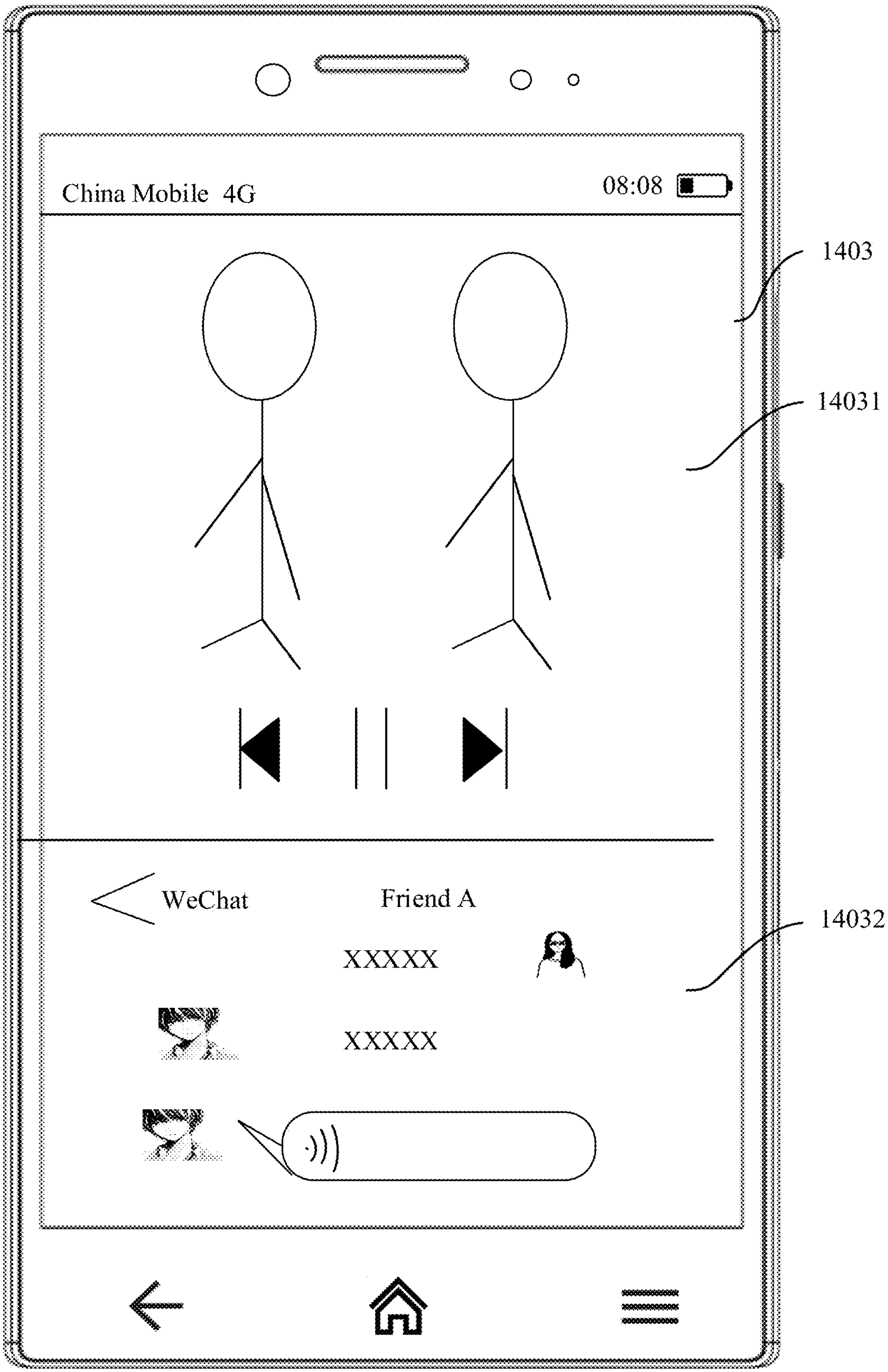
Figure 14G:
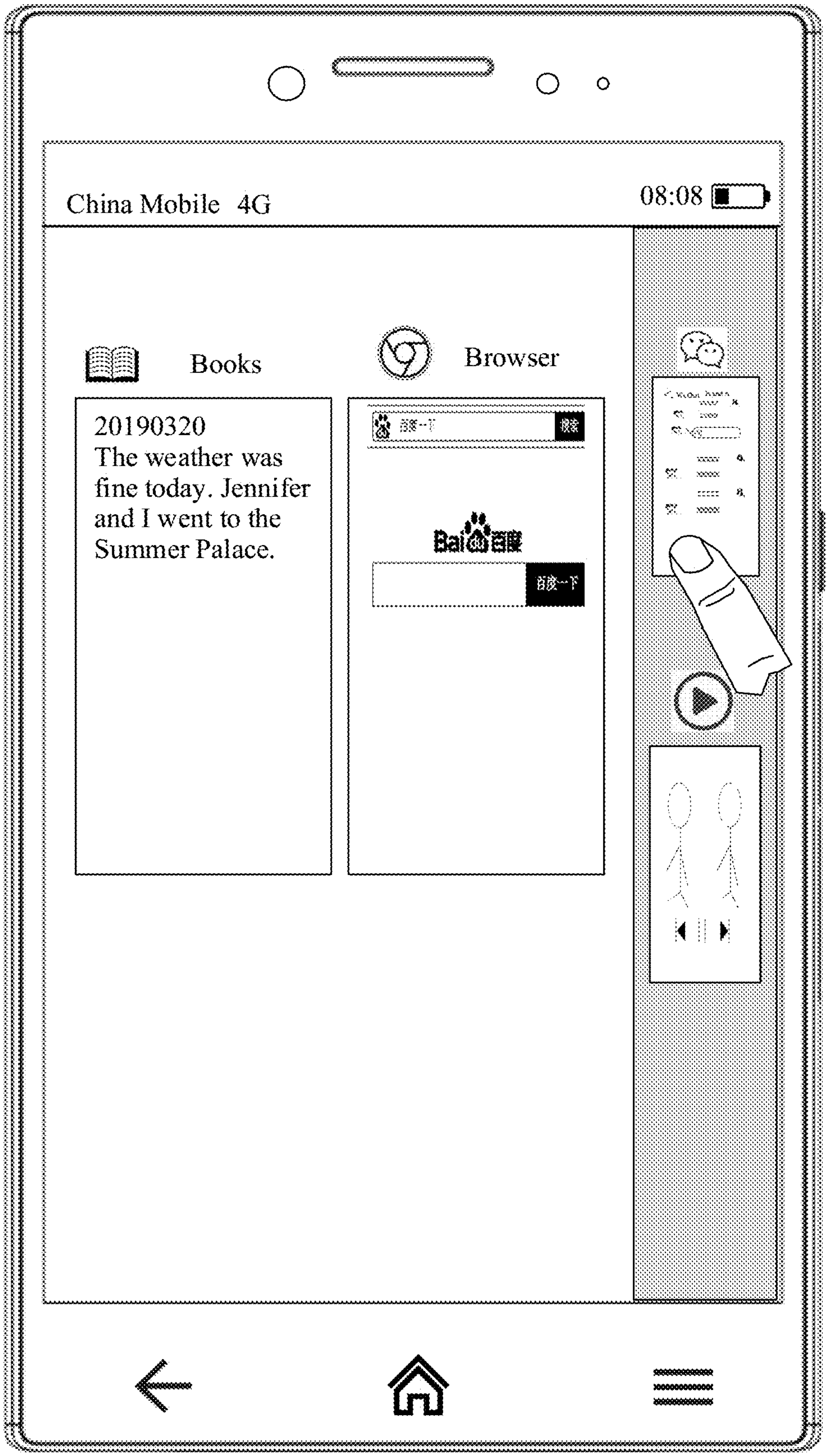
Figure 14H:
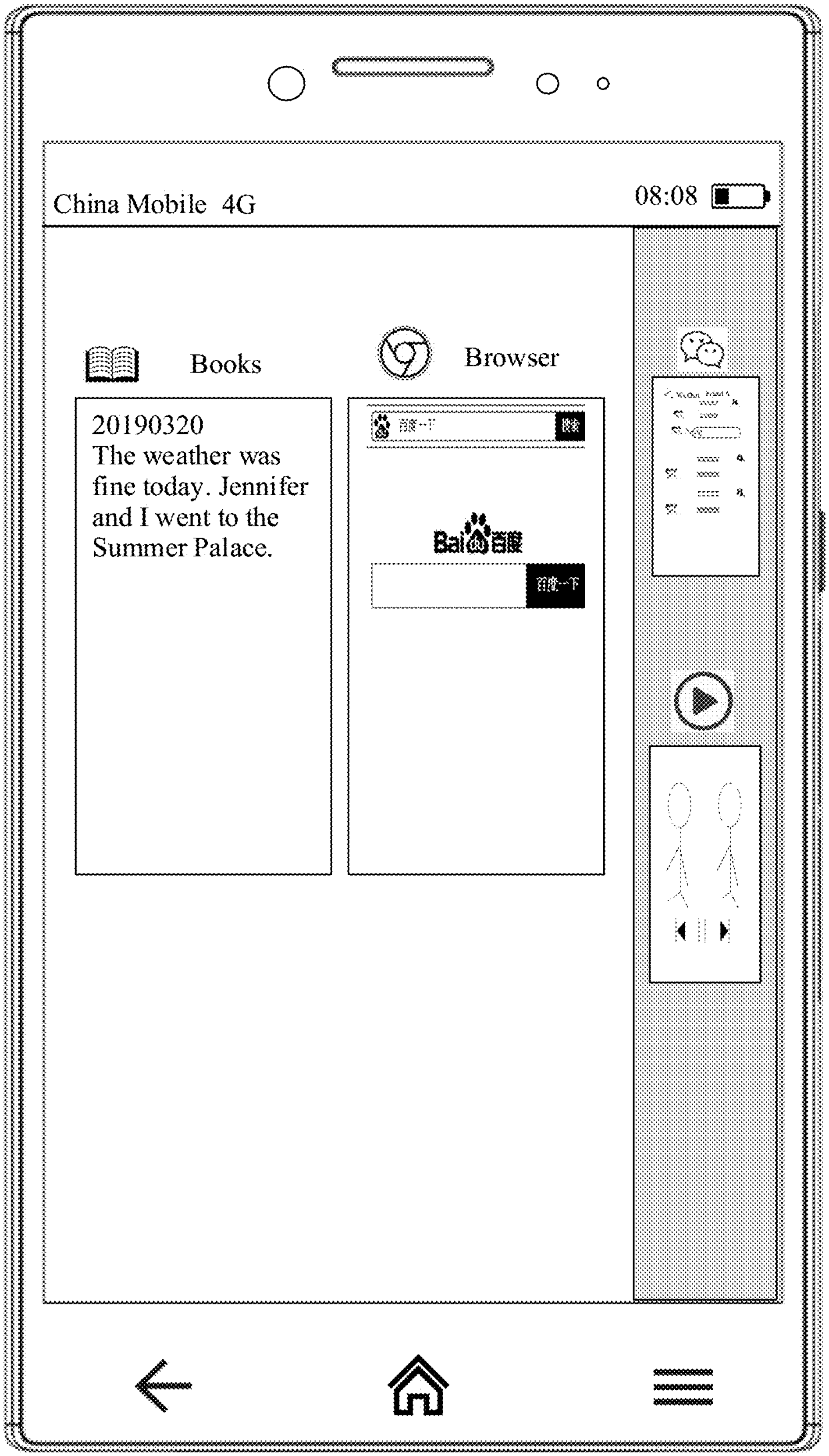
Figure 14I:
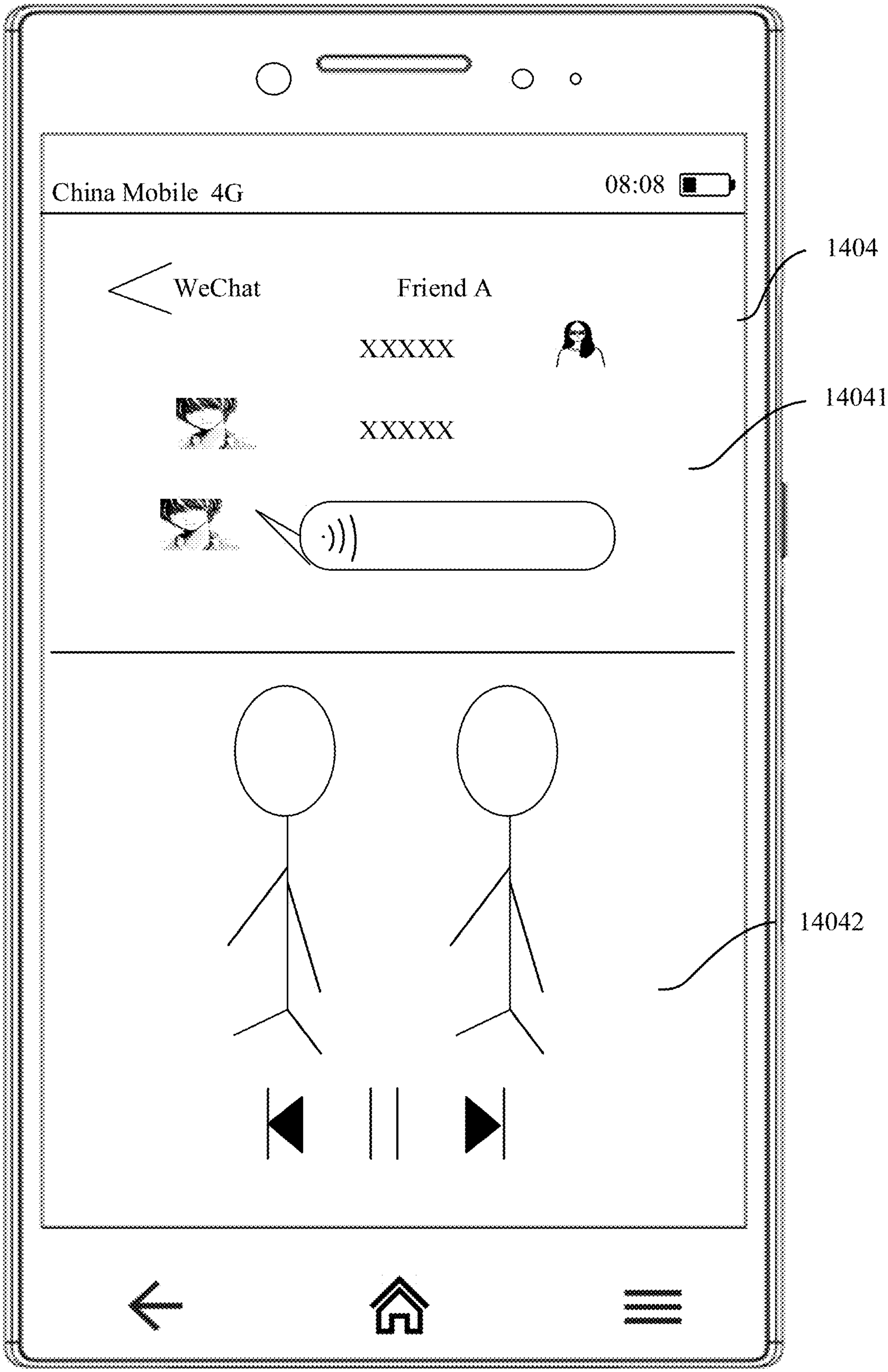
Figure 15A:
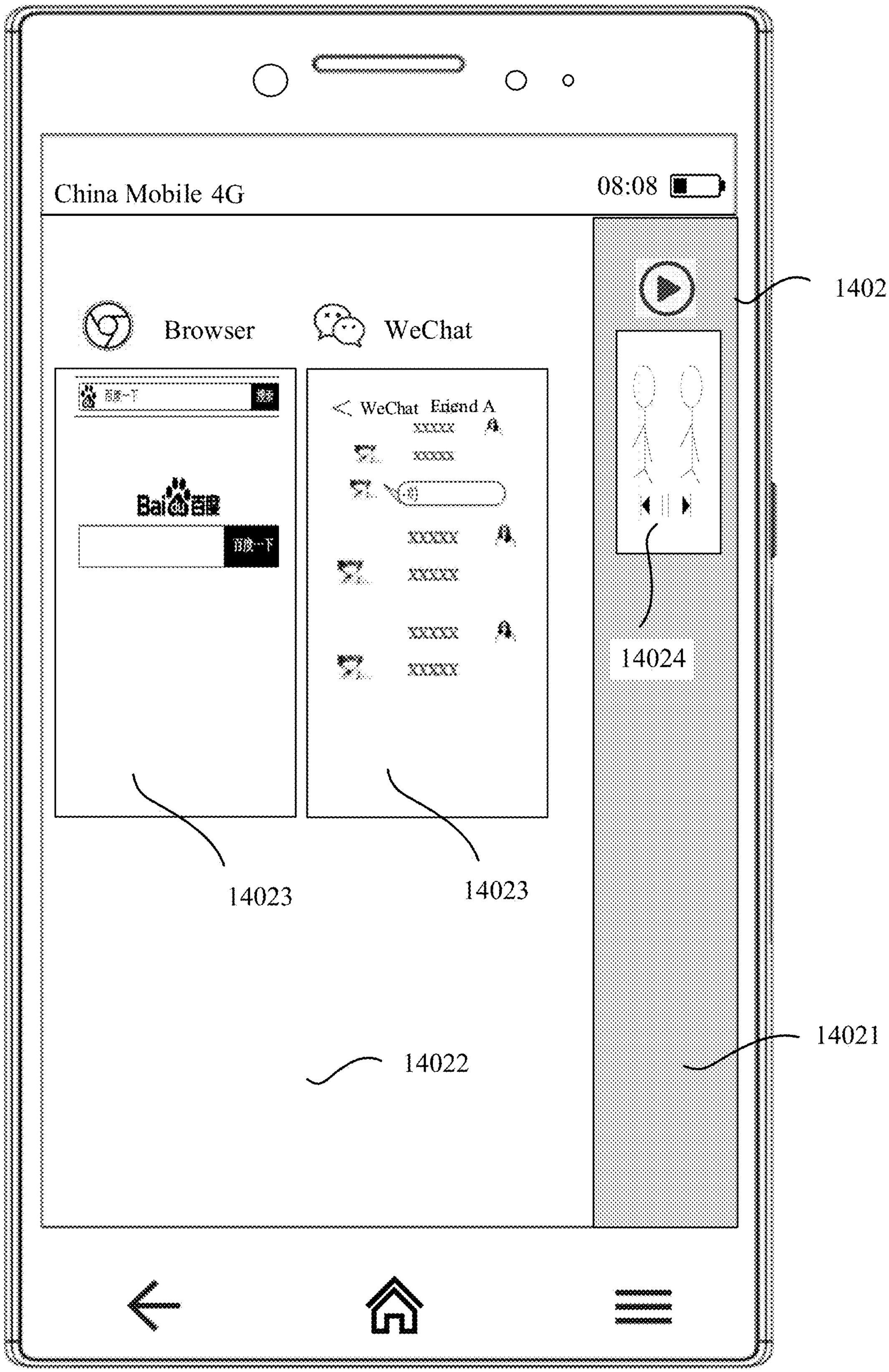
FIG. 15(*a*) to FIG. 15(*f*) are schematic diagrams of a scenario of another interface display method according to an embodiment of this application.
Figure 15B:
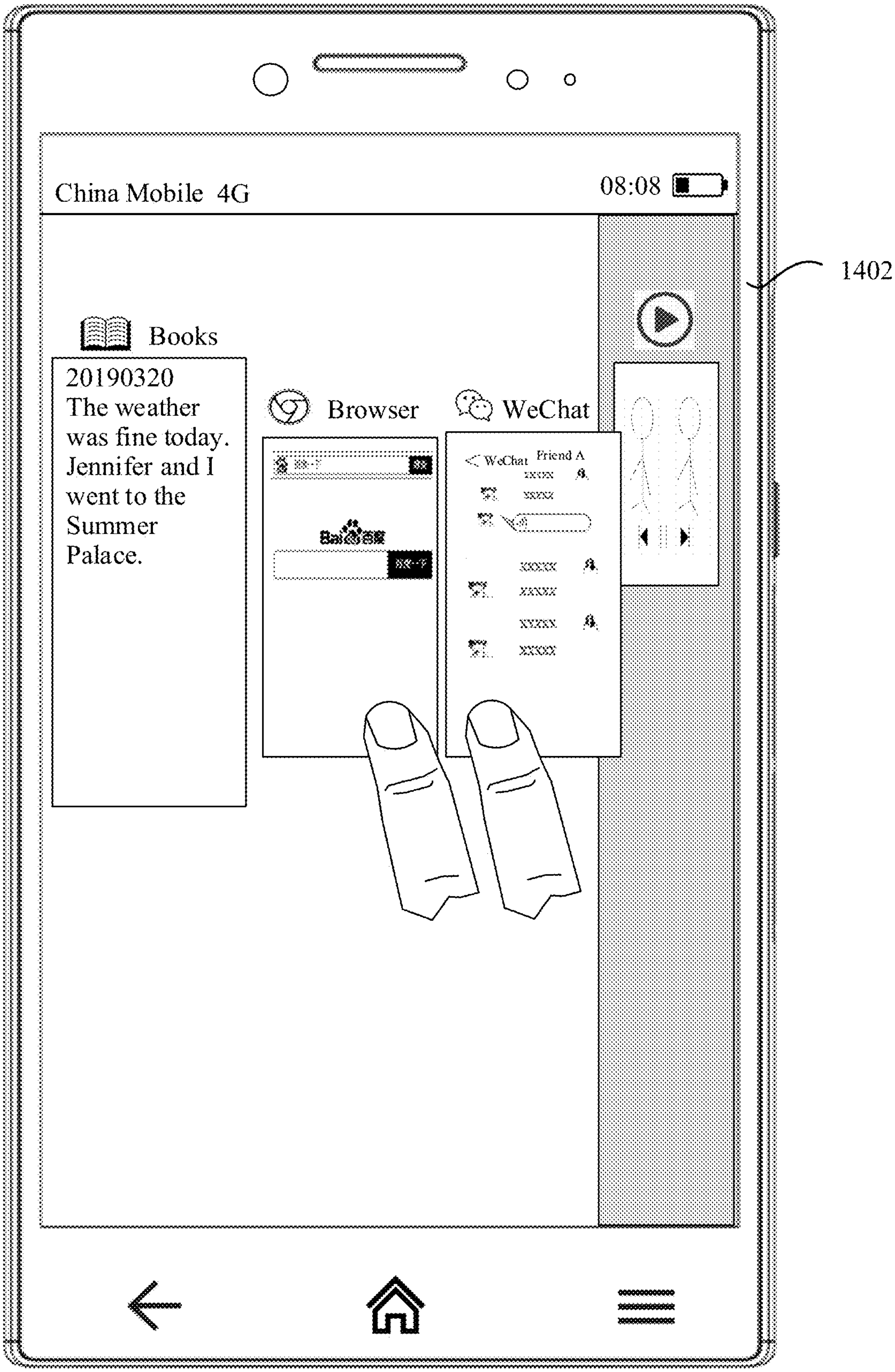
Figure 15C:
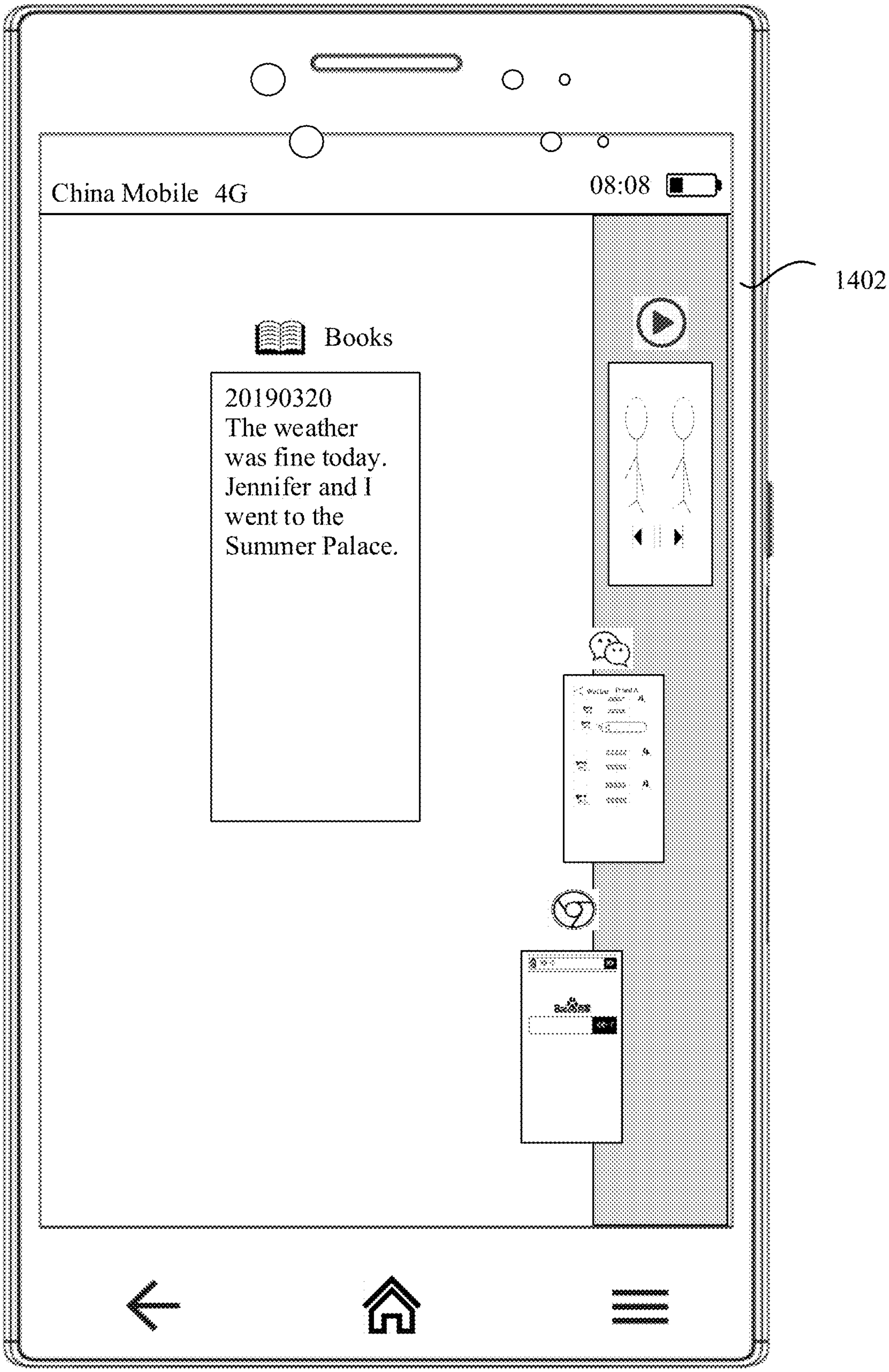
Figure 15D:
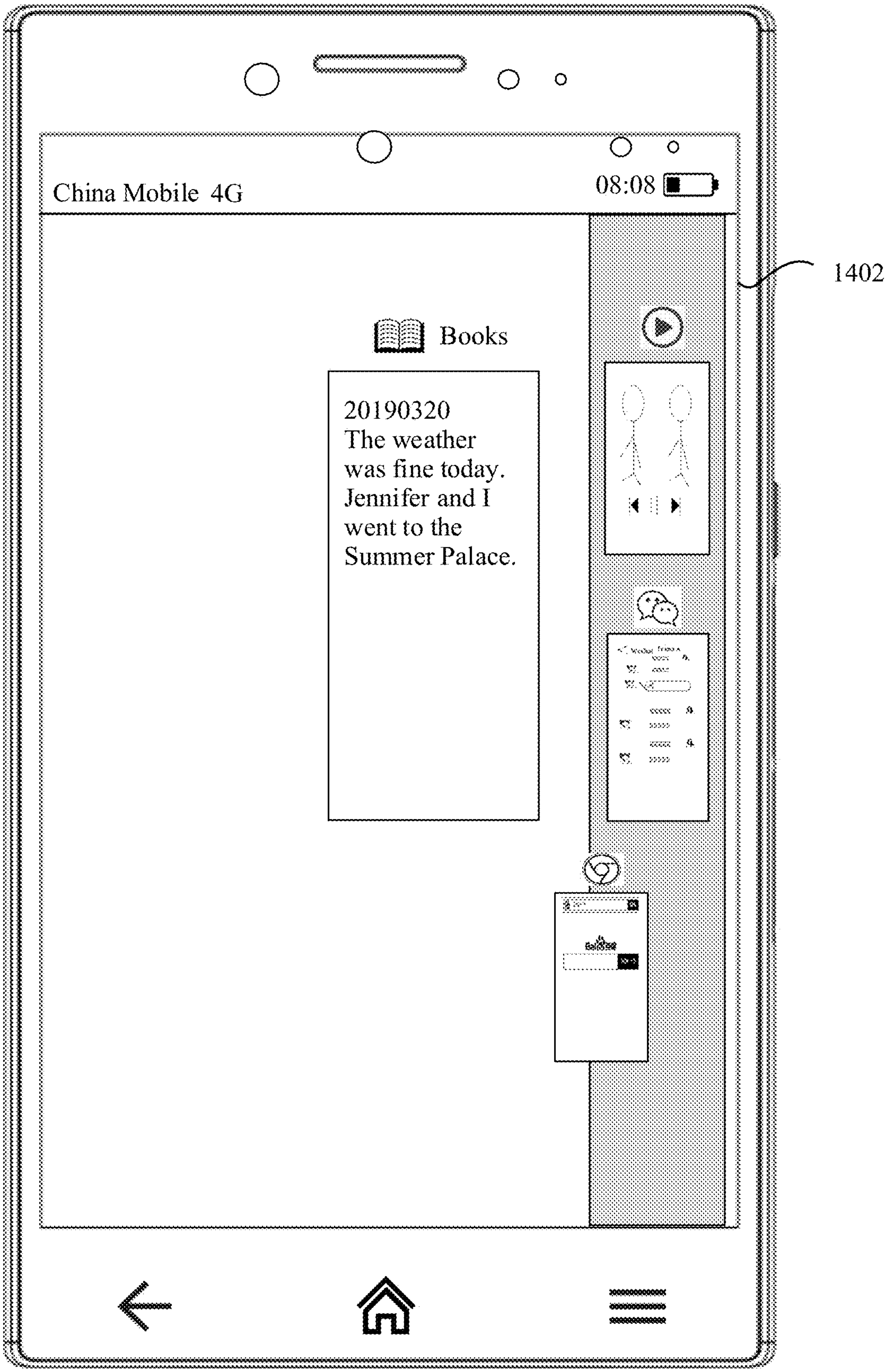
Figure 15E:
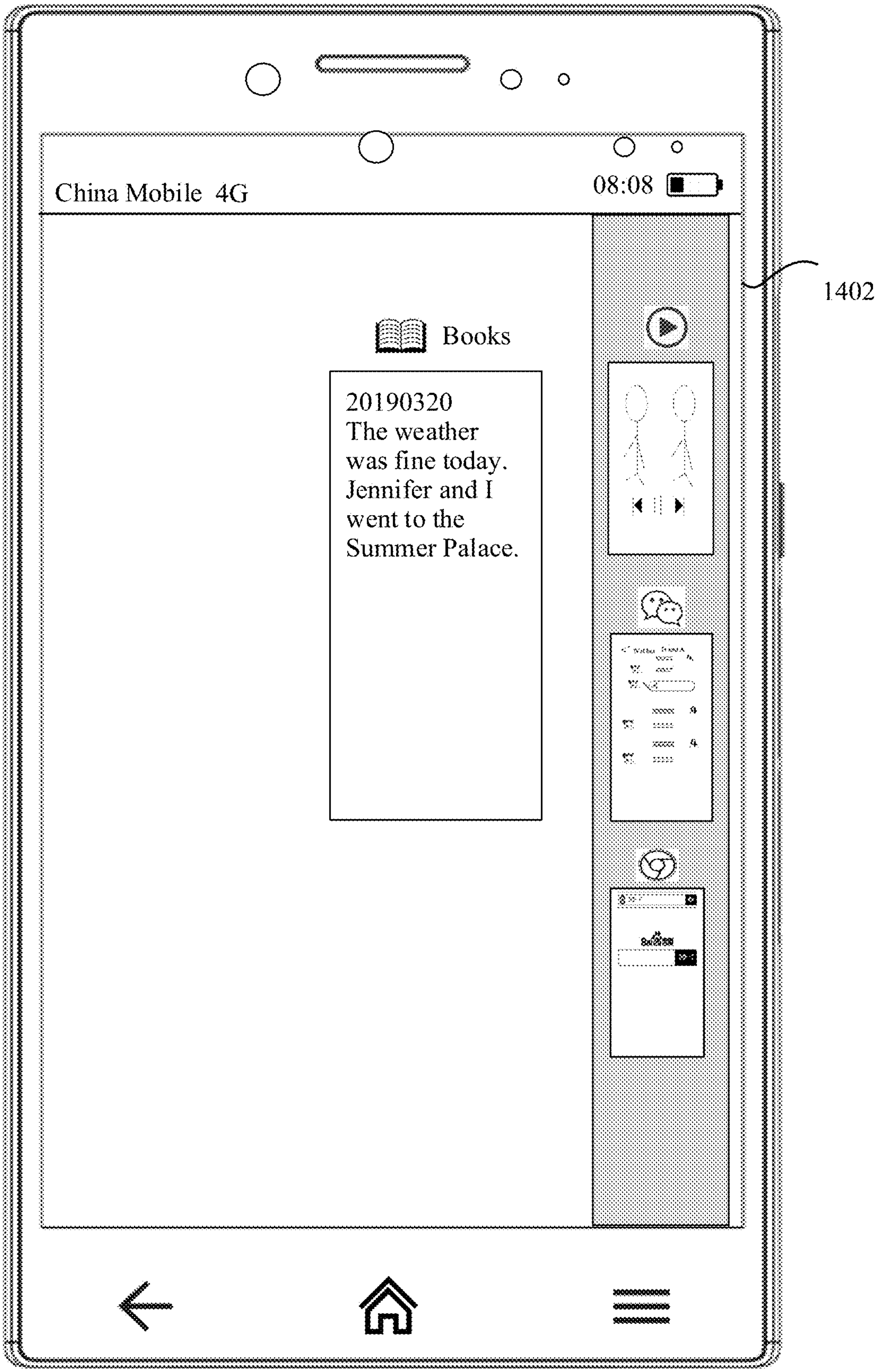
Figure 15F:
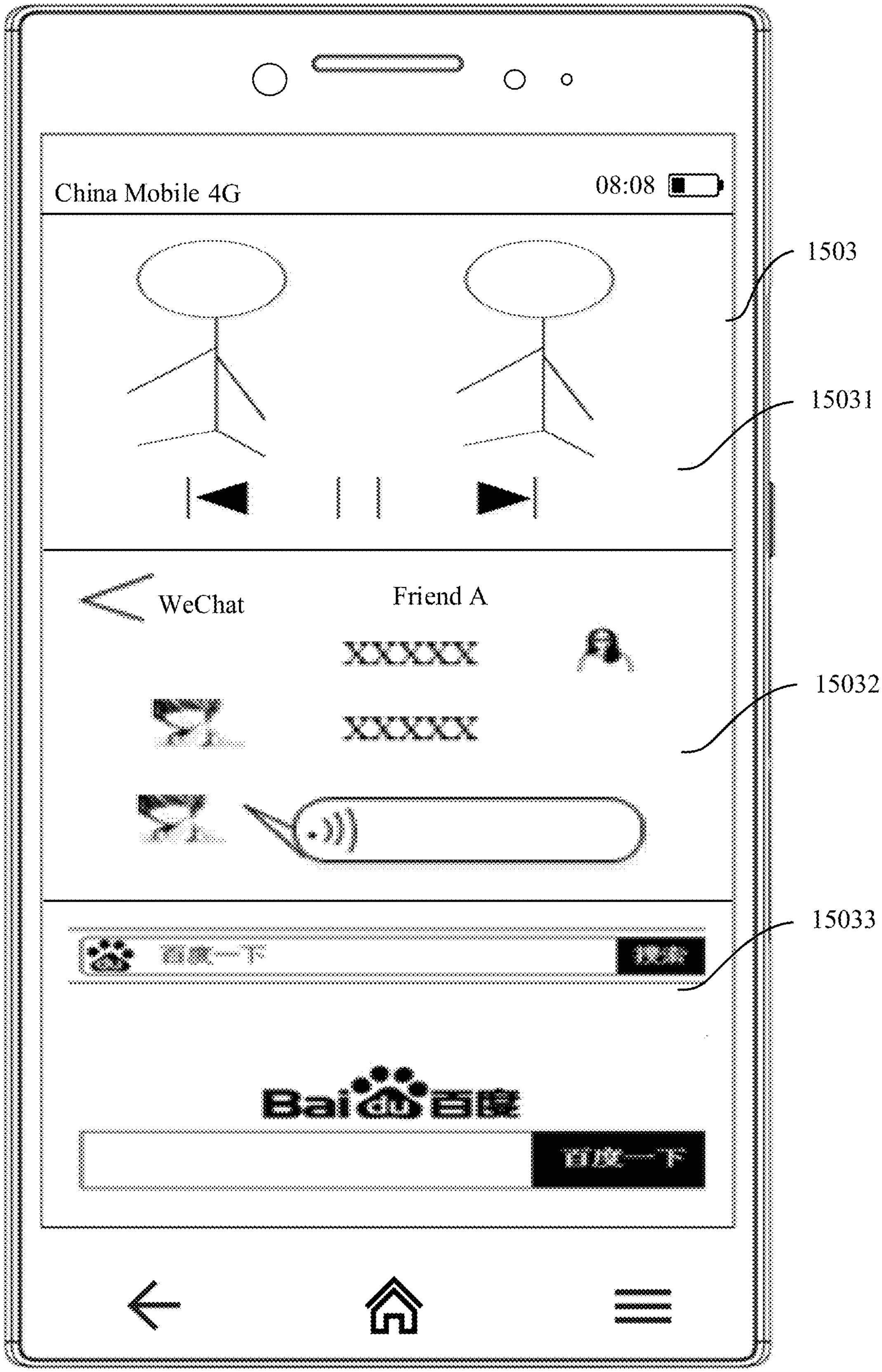

To help the user specify display positions of interfaces of applications that are displayed in different areas, an embodiment of this application provides another interface display method. FIG. 13 is a schematic flowchart of the another interface display method according to this embodiment of this application. As shown in FIG. 13, the method includes the following steps.

Step 1301: An electronic device displays an interface A in a display area A.

Step 1301 is the same as step 501, and details are not described herein again.

Step 1302: The electronic device receives an operation A performed on the display area A.

Step 1302 is the same as step 502, and details are not described herein again.

Step 1303: The electronic device displays a multi-task interface in the display area A in response to the operation A.

The multi-task interface includes application windows of one or more running applications. For a description of the multi-task interface, refer to FIG. 5. The multi-task interface further includes a first area and a second area. An application window of a first application is displayed in the first area, and an application window of another running application other than the first application is displayed in the second area that is different from the first area.

Optionally, a size of the first area may be less than a size of the second area, so that the user can view application windows of more applications that are not displayed in the display area A. For example, a width of the first area may be less than a width of the second area.

It should be noted that the user may perform an operation on each area. For example, the user may slide the first area up or down to scroll content displayed in the first area. The user may slide the second area left or right to scroll content displayed in the second area.

When the second area includes application windows of a plurality of applications, the electronic device may arrange the application windows of the plurality of applications based on running time of the applications, usage frequencies of the applications, names of the applications, types of the applications, or the like. Optionally, the electronic device may preferentially display an application window of an application having a relatively high frequency of being jointly used with the application running in the foreground. Optionally, the electronic device may preferentially display an application window of an application having a relatively high frequency of being jointly used with the first application.

When the first area includes application windows of a plurality of applications, the electronic device may arrange the application windows of the applications in the first area based on positions, on the interface A, of interfaces of the applications.

Step 1304: The electronic device receives an operation C of the user.

The operation C may be moving application windows of one or more second applications in the second area to the first area. It may be understood that the second application is any one or more applications, selected by the user, that are to be displayed in different areas.

It should be noted that the moving application windows of the one or more second applications to the first area includes: moving the application window of the second application, so that the application window of the second application partially overlaps the first area. In other words, the user does not need to completely move the application window of the second application to the first area.

Optionally, when the user moves the application windows of the one or more second applications to partially overlap the first area, the electronic device may display an animation effect that the application window of the second application is completely moved to the first area.

Optionally, when the first area is less than the second area, as the application window of the second application is moved to the first area, the electronic device may reduce display of the application window of the second application.

Step 1305: In response to the operation C, the electronic device displays, in different areas in the display area A, an interface of the first application and an interface of the second application based on application windows included in the first area.

For example, step 1305 may include step 13051 to step 13055.

Step 13051: In response to the operation C, the electronic device obtains position information of an application window, of each application, that is included in the first area.

Step 13052: The electronic device determines, based on the position information of the application window of each application in the first area, a display position of an interface of the application.

For example, a relative position relationship between the application windows, of the applications, that are included in the first area may be the same as a relative position relationship between interfaces of the applications displayed in different areas.

For example, if an application window of an application in the first area is located on the left side of an application window of another application in the first area, an interface of the application is accordingly located on the left side of an interface of the another application. It may be understood that the position relationship includes but is not limited to: left, right, upper, middle, lower, upper right, lower left, lower right, upper left, and the like.

Alternatively, for example, a relative position relationship between the application window of each application and the first area is the same as a relative position relationship between the interface of the application and the display area A.

For example, if an application window of an application is located in an upper half area of the first area, an interface of the application is displayed in an upper half display area of the display area A.

Step 13053: The electronic device obtains a quantity of the application windows included in the first area.

Step 13054: The electronic device determines, based on the quantity of the application windows, a quantity of display areas included in the display area A.

For example, when the quantity of the application windows included in the first area is N, the electronic device divides the display area A into N display areas, and respectively displays interfaces of the N applications. N is an integer greater than or equal to 2.

Step 13055: The electronic device displays an interface B based on the display positions and the quantity determined in the foregoing steps.

It may be understood that a sequence of step 13051 and step 13053 is not limited in this embodiment of this application. Step 13051 may be performed first, or step 13053 may be performed first, or step 13051 and step 13053 may be simultaneously performed.

For ease of understanding, the following specifically describes the method shown in FIG. 13 with reference to application scenarios. FIG. 14(*a*) to FIG. 14(*i*) are schematic diagrams of a scenario of the another interface display method according to an embodiment of this application.

As shown in FIG. 14(*a*), the electronic device displays an interface 1401 in a display area 600. The interface 1401 is an interface of "Player". The electronic device may run one or more applications in a background. For example, applications such as "WeChat", "Browser", and "Books" run in the background. The user taps a multi-task button 6011. As shown in FIG. 14(*b*), in response to that the user taps the multi-task button 6011, the electronic device displays an interface 1402 in the display area 600. The interface 1402 is a multi-task interface. The interface 1402 includes application windows 14023 and 14024 of running applications such as "Player", "WeChat", "Browser", and "Books". An application window 14024 of a first application (for example, "Player") is displayed in a first area 14021, and the application windows 14023 of other running applications (such as "WeChat", "Browser", and "Books") are displayed in a second area 14022. In this case, a width of the first area 14021 is less than a width of the second area 14022.

As shown in FIG. 14(*c*) to FIG. 14(*e*), the user touches an application window of "WeChat" in the second area, drags the application window of "WeChat" to the first area, and releases the touch on the application window of "WeChat". In response to the foregoing operations, the application window of "WeChat" is moved to the first area 14021.

As shown in FIG. 14(*b*) to FIG. 14(*d*), as the application window of "WeChat" is moved to the first area 14021, the application window of "WeChat" gradually becomes smaller until the application window of "WeChat" is less than or equal to the width of the first area.

It may be understood that the application window of "WeChat" may be moved below an application window of "Player", or may be moved above an application window of "Player".

As shown in FIG. 14(*d*) and FIG. 14(*e*), after the user moves the application window of "WeChat" below the application window of "Player", the user releases a finger that touches the application window of "WeChat". In this case, as shown in FIG. 14(*e*), in response to the foregoing operation, the application window of "WeChat" is moved to the first area. The first area 14021 includes two application windows: the application window of "WeChat" and the application window of "Player". The application window of "WeChat" is located below the application window of "Player". Then, as shown in FIG. 14(*f*), the electronic device displays an interface 1403. The interface 1403 includes an interface of "WeChat" and an interface of "Player". An upper half interface is the interface of "WeChat", and a lower half interface is the interface of "Player". The display area 600 is divided into two display areas: a display area 14031 and a display area 14032. The display area 14031 is located above the display area 14032. The interface of "Player" is displayed in the display area 14031, and the interface of "WeChat" is displayed in the display area 14032.

As shown in FIG. 14(*g*) and FIG. 14(*h*), after the application window of "WeChat" is moved above the application window of "Player", the user releases a finger that touches the application window of "WeChat". In this case, as shown in FIG. 14(*h*), the first area 14021 includes two application windows: the application window of "WeChat" and the application window of "Player". The application window of "WeChat" is located above the application window of "Player". Then, as shown in FIG. 14(*i*), the electronic device displays an interface 1404. The interface 1404 includes an interface of "WeChat" and an interface of "Player". In this case, different from FIG. 14(*f*), an upper half interface of the interface 1404 is the interface of "WeChat", and a lower half interface is the interface of "Player". The display area 600 is divided into two display areas: a display area 14041 and a display area 14042. The display area 14041 is located above the display area 14042. In this case, different from FIG. 14(*f*), the interface of "Player" is displayed in the display area 14052, and the interface of "WeChat" is displayed in the display area 14051.

In other words, the quantity of the application windows of the applications in the first area is the same as a quantity of interfaces, of applications, that are included in the interface B. The relative position relationship between the application windows of the applications in the first area is the same as a relative position relationship between the interfaces of the applications on the interface B. For example, if an application window of an application in the first area is located above an application window of another application in the first area, when the electronic device displays the interface B, an interface of the application is accordingly located above an interface of the another application. If an application window of an application in the first area is located below an application window of another application in the first area, when the electronic device displays the interface B, an interface of the application is accordingly located below an interface of the another application. It may be understood that the position relationship includes but is not limited to: left, right, upper, middle, lower, upper right, lower left, lower right, upper left, and the like.

In conclusion, according to the another interface display method provided in this embodiment of this application, the user may specify display positions of interfaces of applications displayed in different areas.

It should be noted that the user may perform a multi-touch on application windows of a plurality of applications, and release the touch after moving the application windows of the plurality of applications to the first area. FIG. 15(*a*) to FIG. 15(*f*) are schematic diagrams of a scenario of the another interface display method according to an embodiment of this application. The application scenario shown in the figure is that the user simultaneously operates a plurality of application windows by using different fingers, and moves the application windows of a plurality of applications (for example, application windows of "Browser" and "WeChat") to the first area.

As shown in FIG. 15(*a*), the electronic device displays an application interface of "Player" in a display area 600. The user taps a multi-task button 6011. In response to that the user taps the multi-task button 6011, the electronic device may display a multi-task interface (for example, an interface 1402). For a description of the interface 1402, refer to FIG. 14(*a*) to FIG. 14(*i*). Details are not described herein again. As shown in FIG. 15(*b*), after the user touches the application windows of "WeChat" and "Browser", and drags the application windows of "WeChat" and "Browser" to partially overlap the application window of "WeChat" and/or the application window of "Browser" with the first area, the user releases the touch. As shown in FIG. 15(*b*), the user touches the application windows of "WeChat" and "Browser" by using different fingers, and drags the application windows of "WeChat" and "Browser" to a first area 14021. As the application windows of "WeChat" and "Browser" are moved to the first area 14021, the application windows of "WeChat" and "Browser" gradually become smaller. It may be understood that the application windows of "WeChat" and "Browser" may be moved below an application window of "Player" or may be moved above an application window of "Player".

As shown in FIG. 15(*b*), the application windows of "WeChat" and "Browser" are moved below the application window of "Player". After a part of the application window of "WeChat" overlaps the first area, the user releases the finger that touches the application window of "WeChat". In this case, as shown in FIG. 15(*c*) to FIG. 15(*e*), the electronic device may display an animation effect that the application windows of "WeChat" and "Browser" are completely moved to the first area. As shown in FIG. 15(*e*), the first area 14021 includes application windows of three applications: the application window of "WeChat", the application window of "Browser", and the application window of "Player". The application window of "Browser" is located below the application window of "WeChat", and the application window of "WeChat" is located below the application window of "Player". As shown in FIG. 15(*f*), the electronic device displays an interface 1503. The interface 1503 includes an interface of "Browser", an interface of "WeChat", and an interface of "Player". An upper third of the interface is the interface of "Player", a middle third of the interface is the interface of "WeChat", and a lower third of the interface is the interface of "Browser". The display area 600 is divided into three display areas: a display area 15031, a display area 15032, and a display area 15033. The display area 15031 is located above the display area 15032, and the display area 15032 is located above the display area 15033. The interface of "Player" is displayed in the display area 15031, the interface of "WeChat" is displayed in the display area 15032, and the interface of "Browser" is displayed in the display area 15033. In other words, the electronic device displays the interface of "Browser", the interface of "WeChat", and the interface of "Player" in different areas in the display area 600.

Although not shown in the figure, it may be understood that when the application windows of "WeChat" and "Browser" are moved above the application window of "Player", different from FIG. 15(*d*), the electronic device displays the interface of "Browser", the interface of "WeChat", and the interface of "Player" in different areas. The interface of "WeChat" is displayed in the display area 15031, the interface of "Browser" is displayed in the display area 15032, and the interface of "Player" is displayed in the display area 15033.

Figure 16:
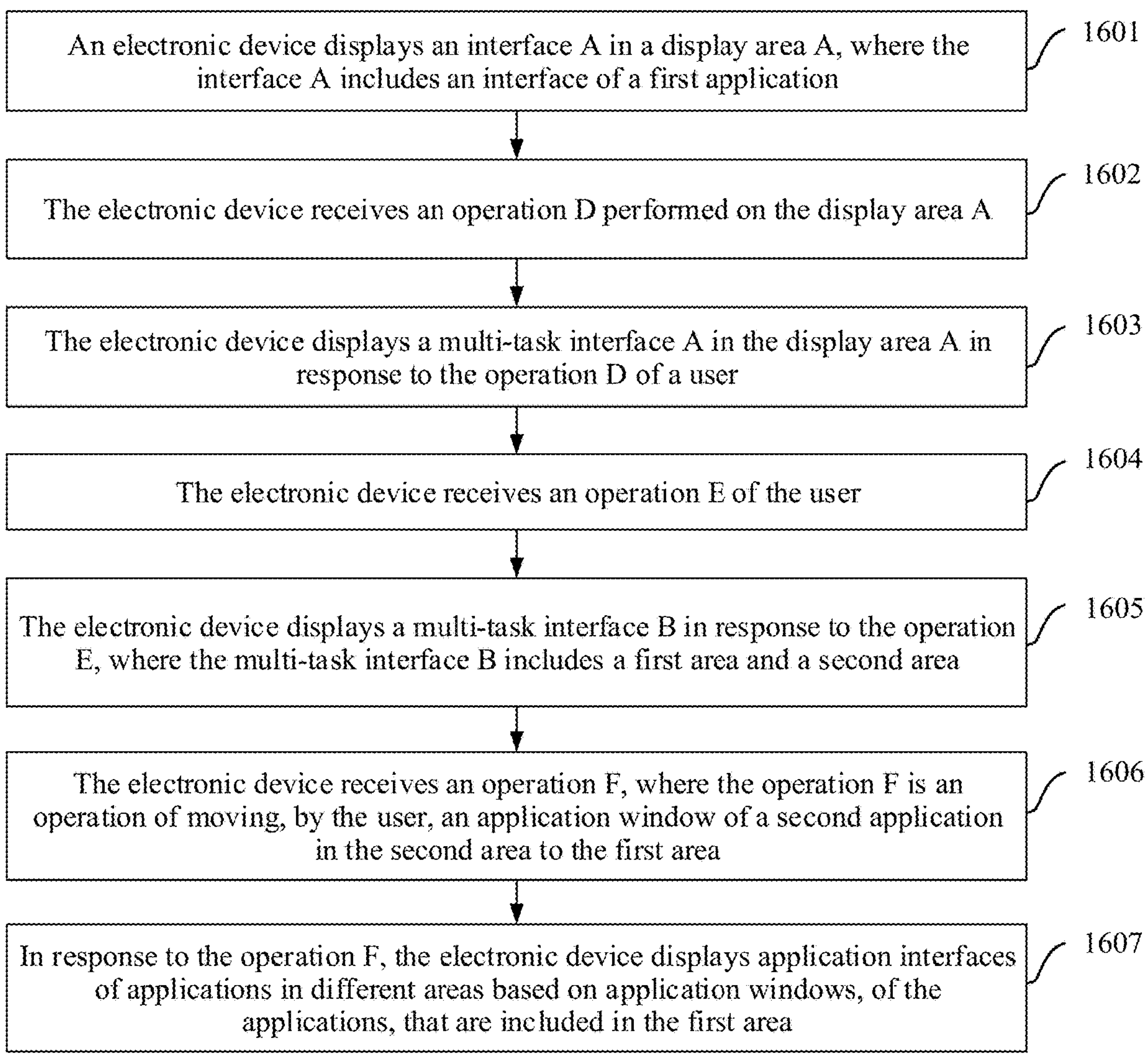
FIG. 16 is a schematic flowchart of another interface display method according to an embodiment of this application.
Figure 17A:
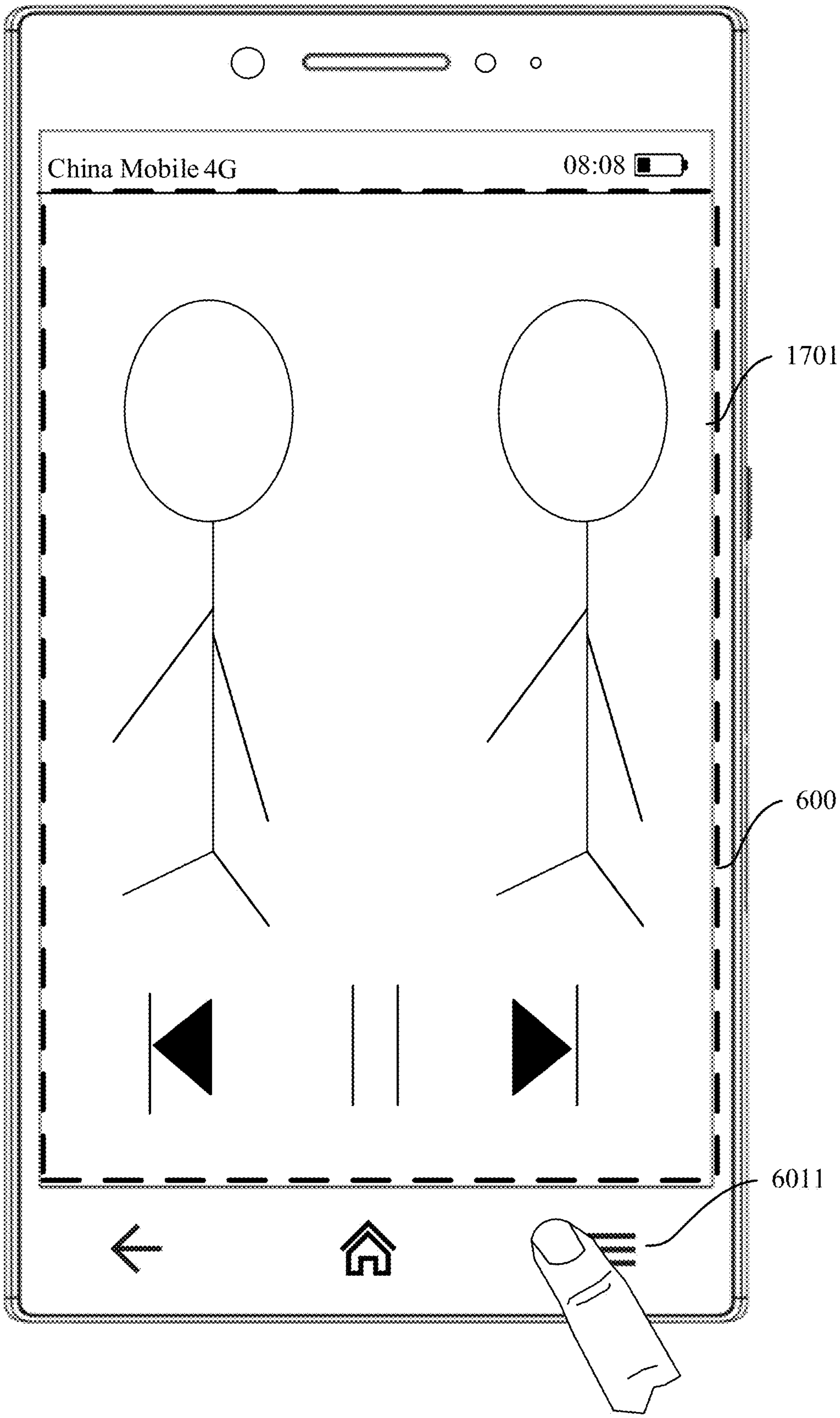
FIG. 17(*a*) to FIG. 17(*i*) are schematic diagrams of a scenario of another interface display method according to an embodiment of this application.
Figure 17B:
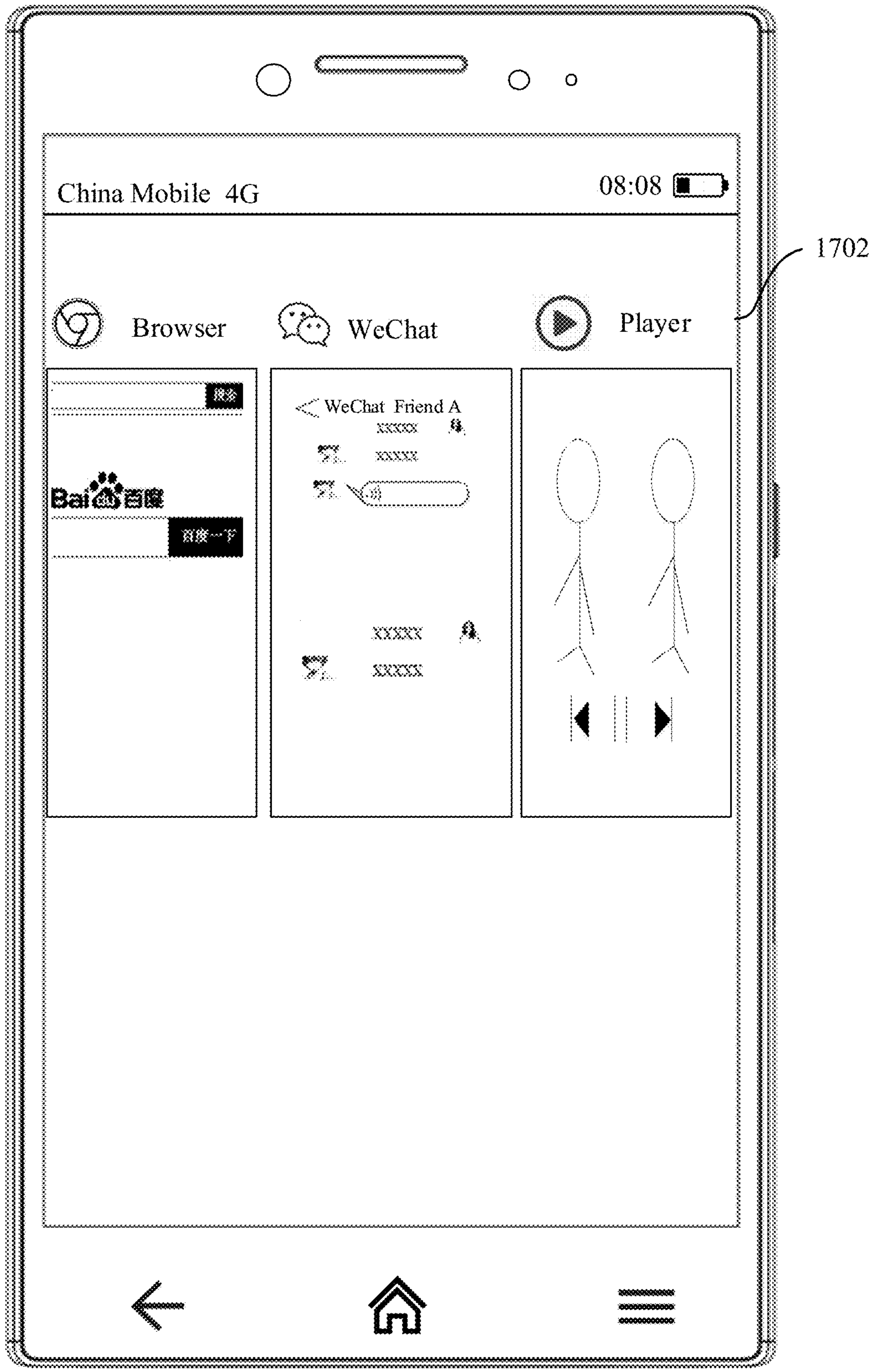
Figure 17C:
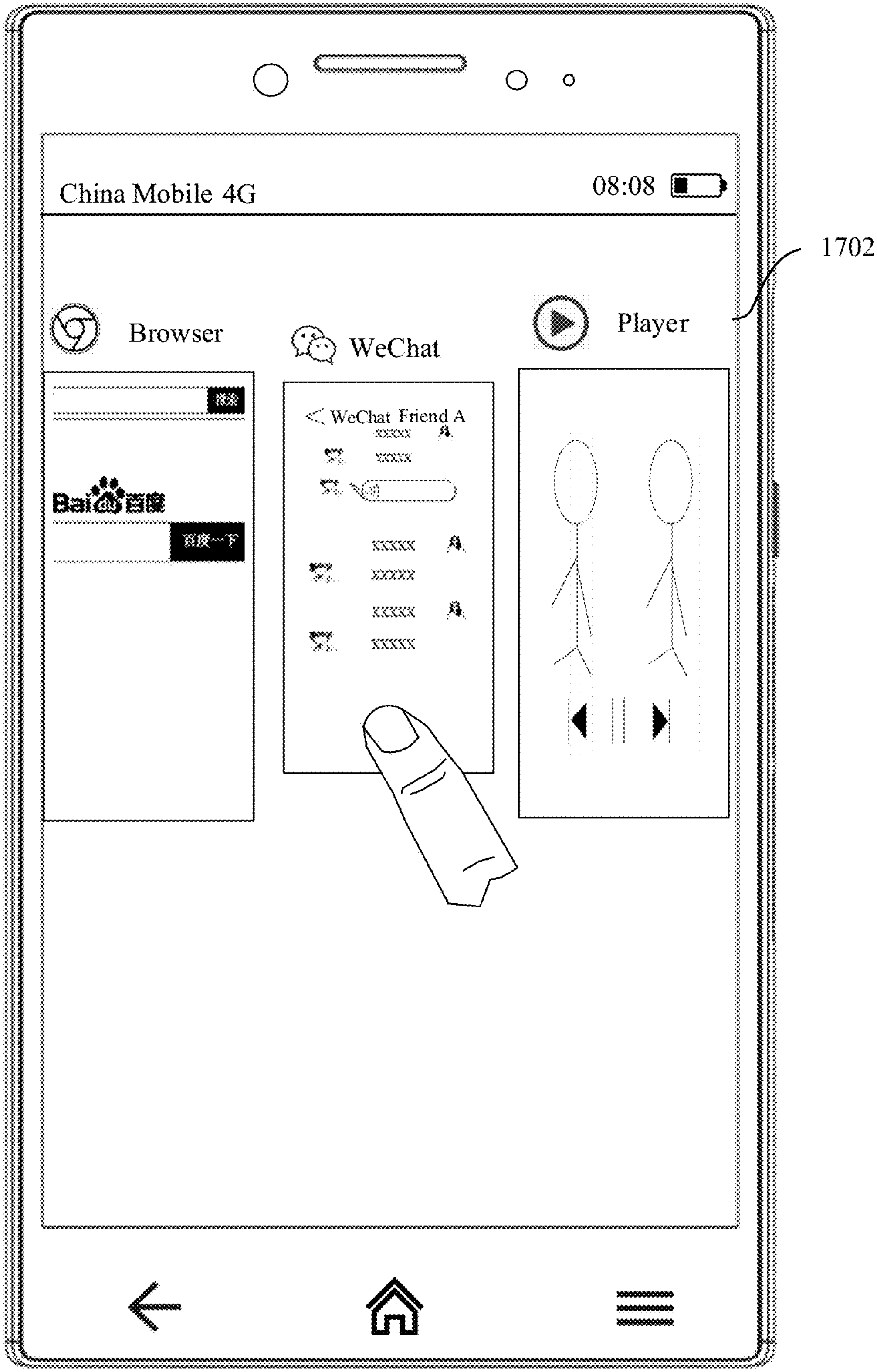
Figure 17D:
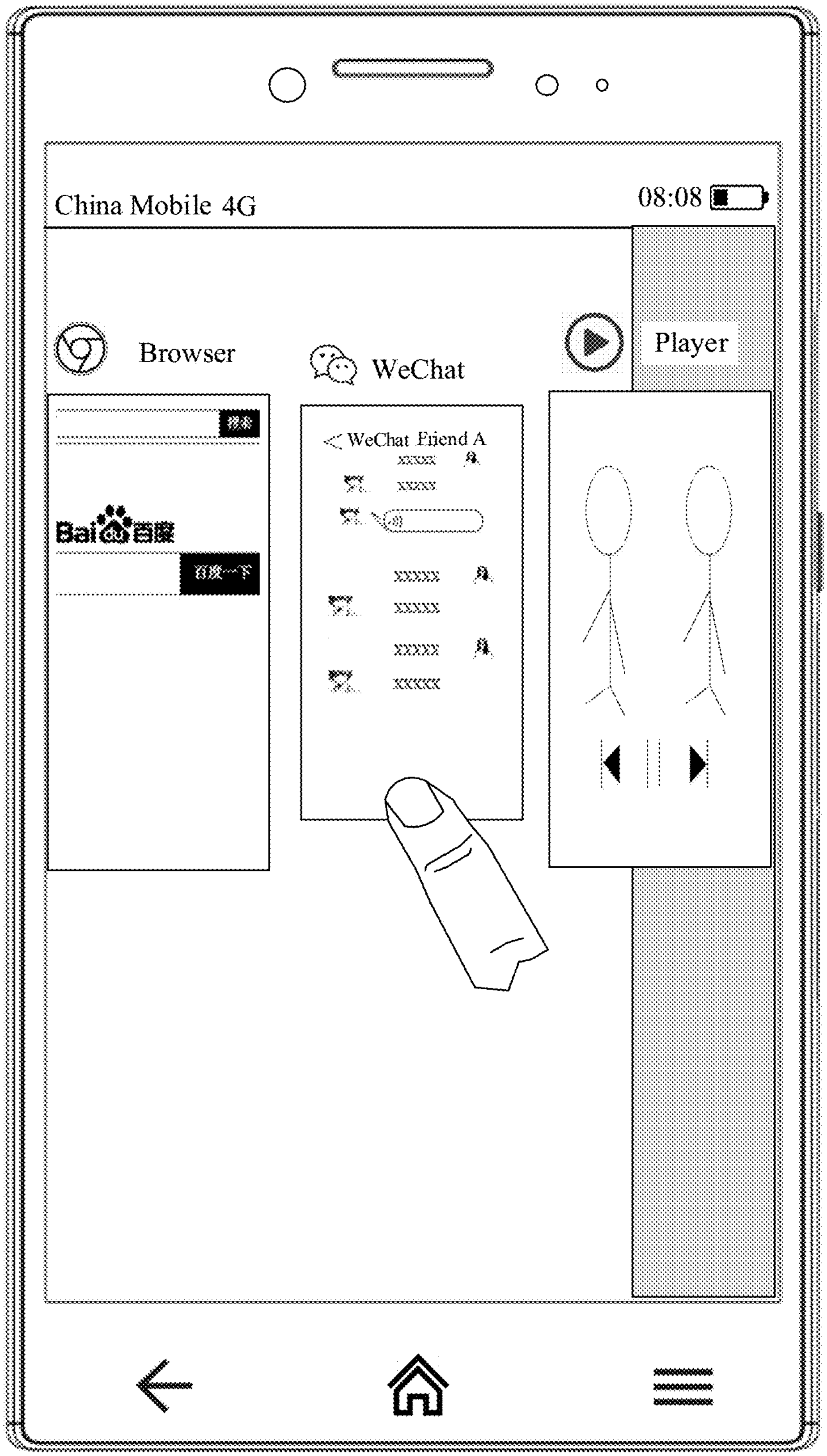
Figure 17E:
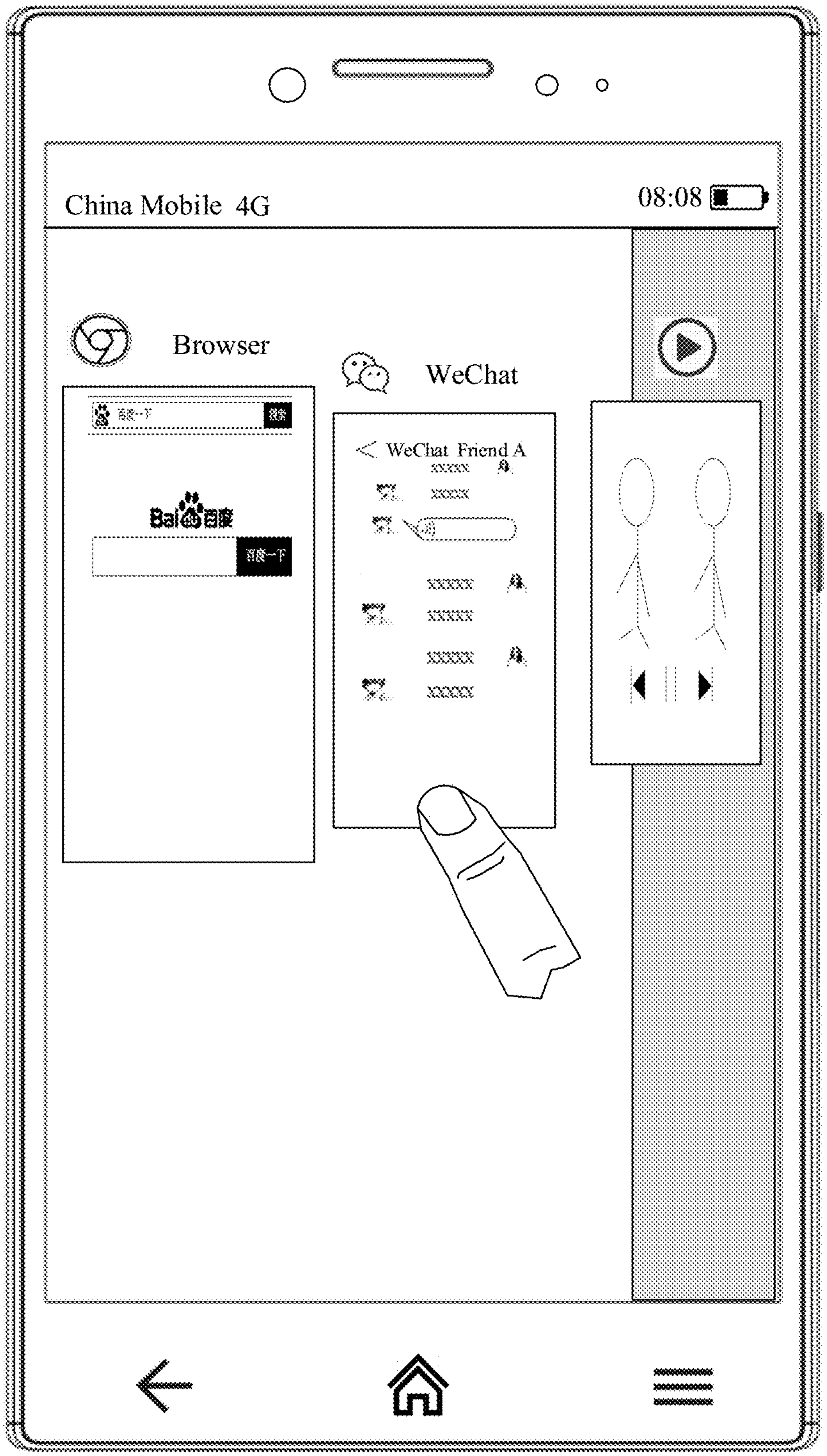
Figure 17F:
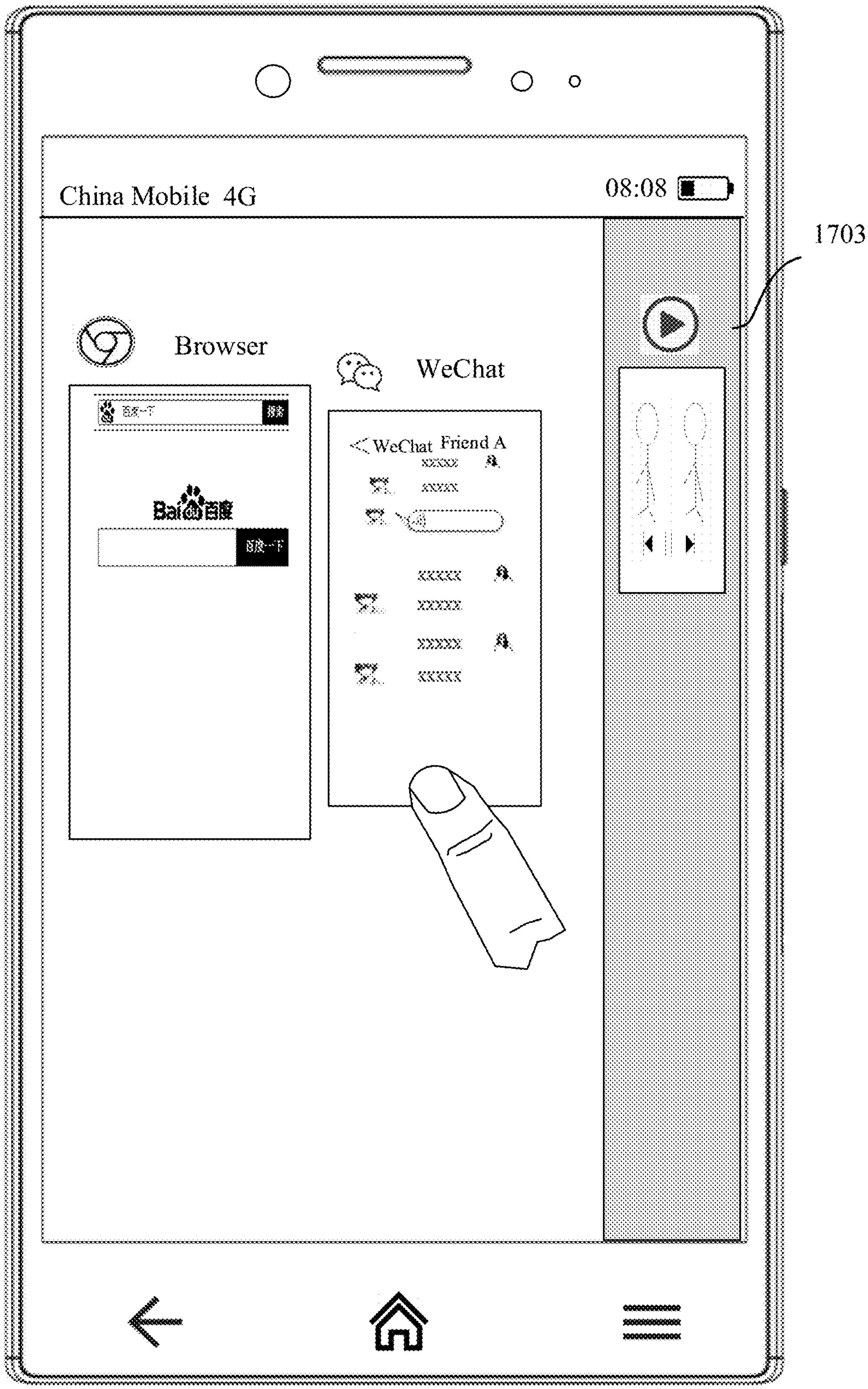
Figure 17G:
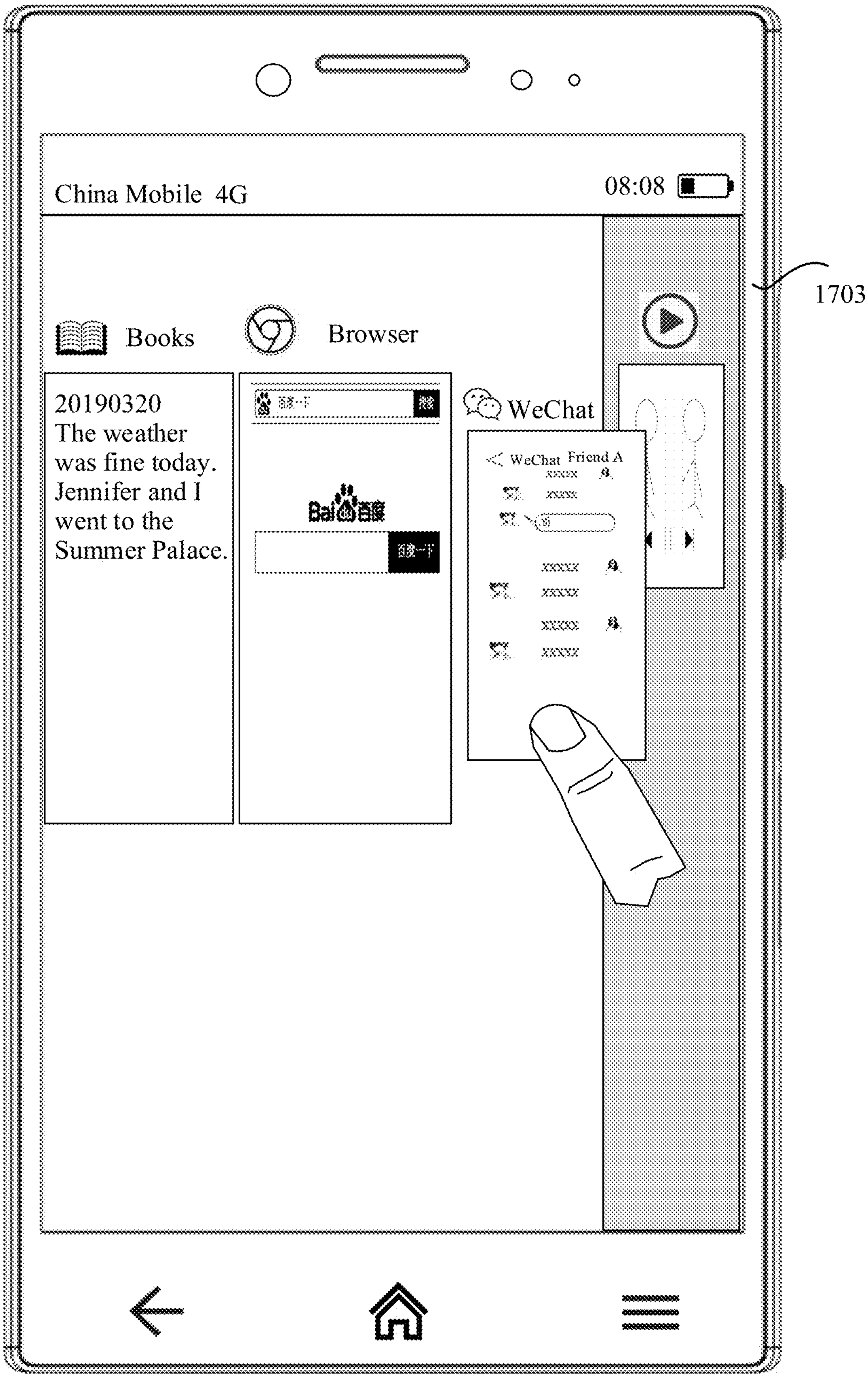
Figure 17H:
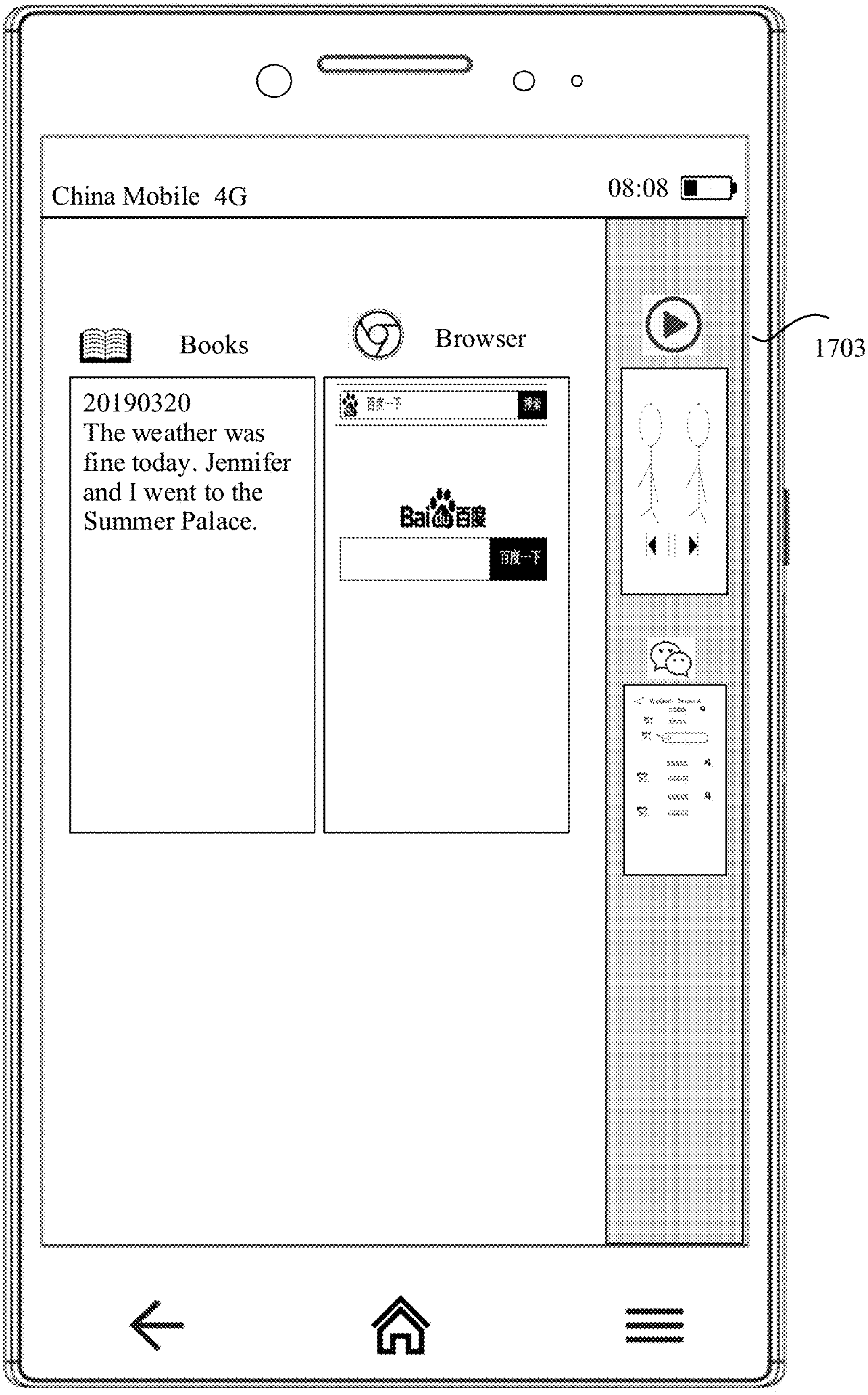
Figure 17I:
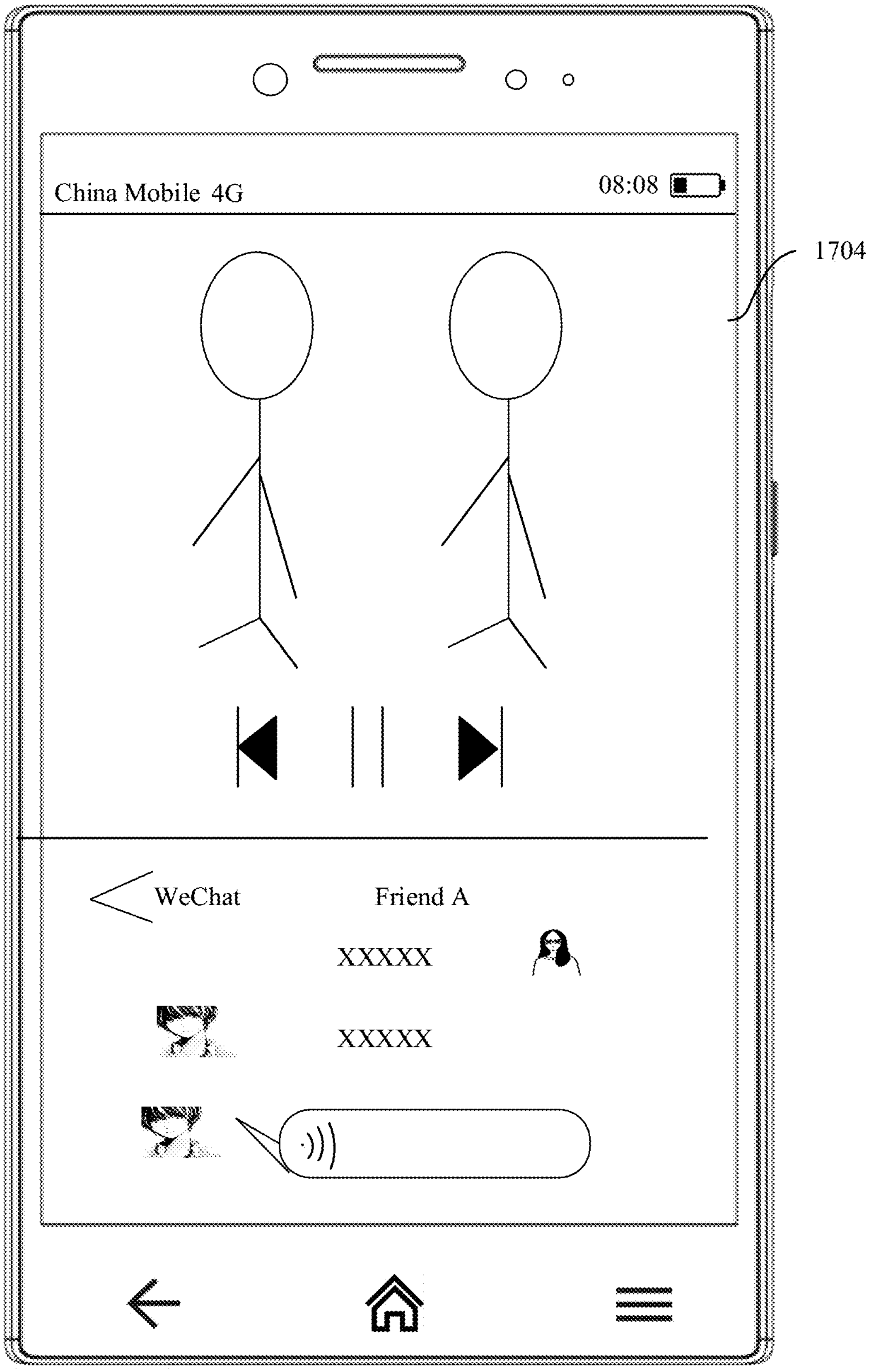
Figure 18A:
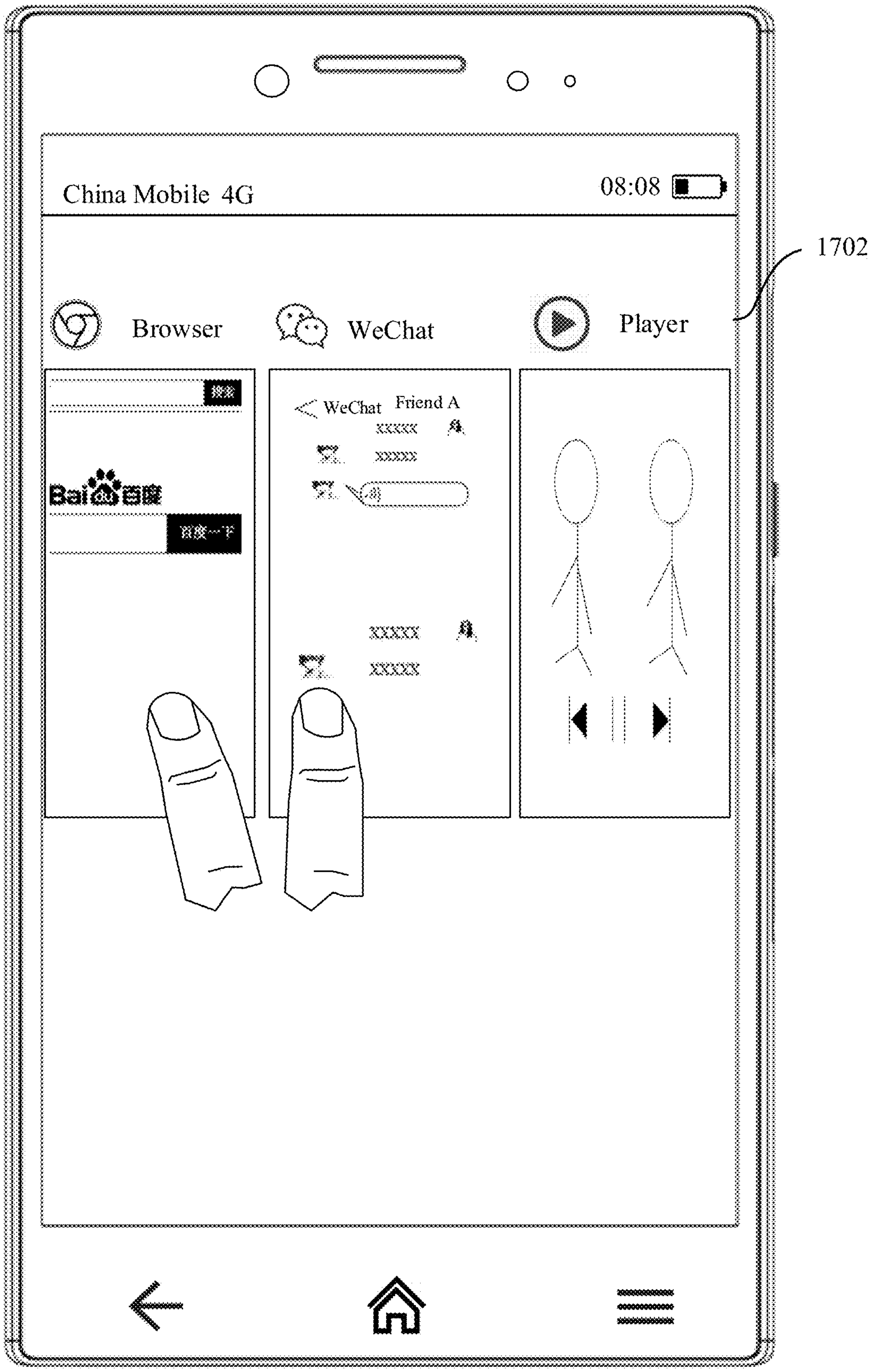
FIG. 18(*a*) to FIG. 18(*f*) are schematic diagrams of a scenario of another interface display method according to an embodiment of this application.
Figure 18B:
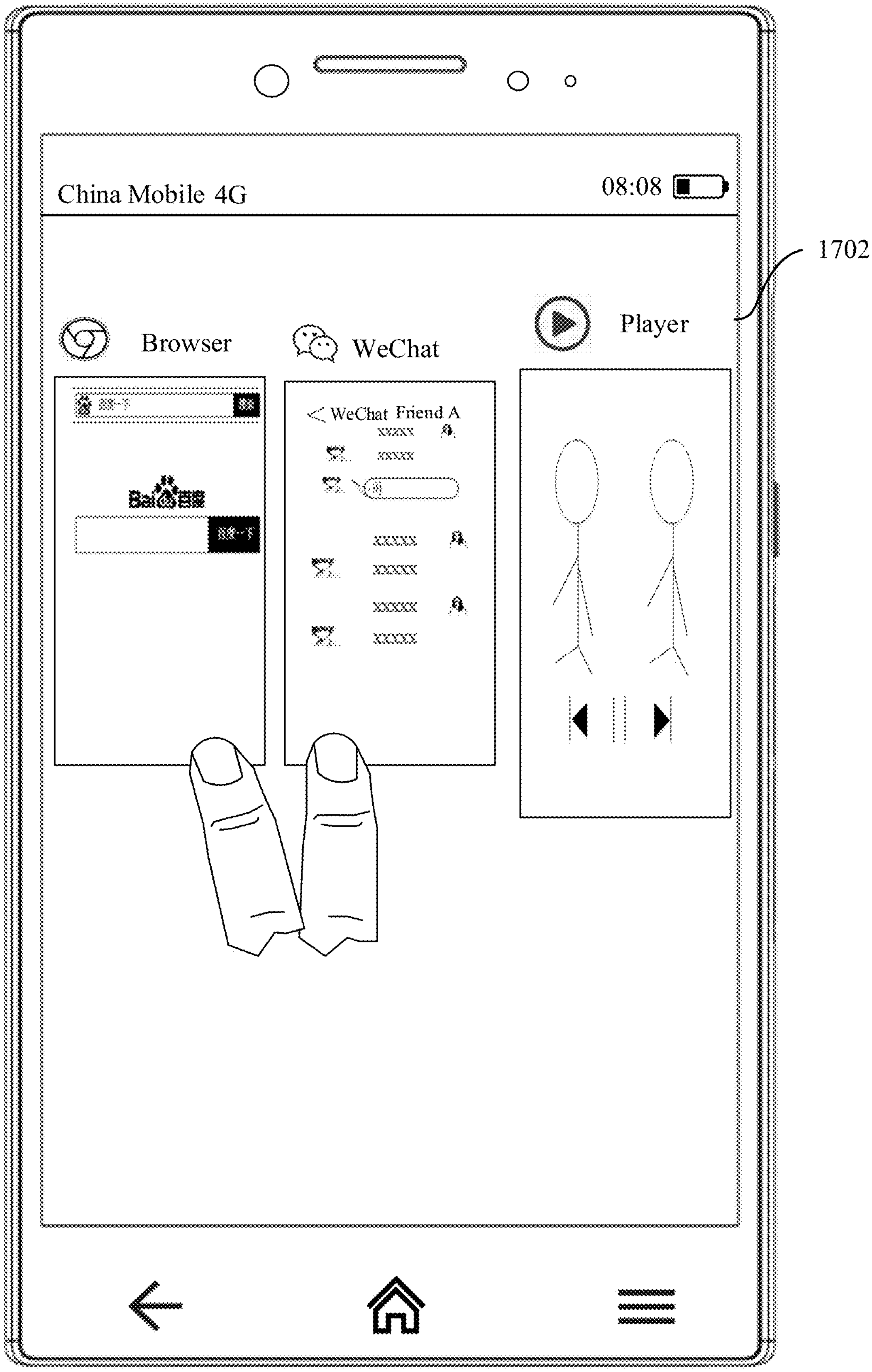
Figure 18C:
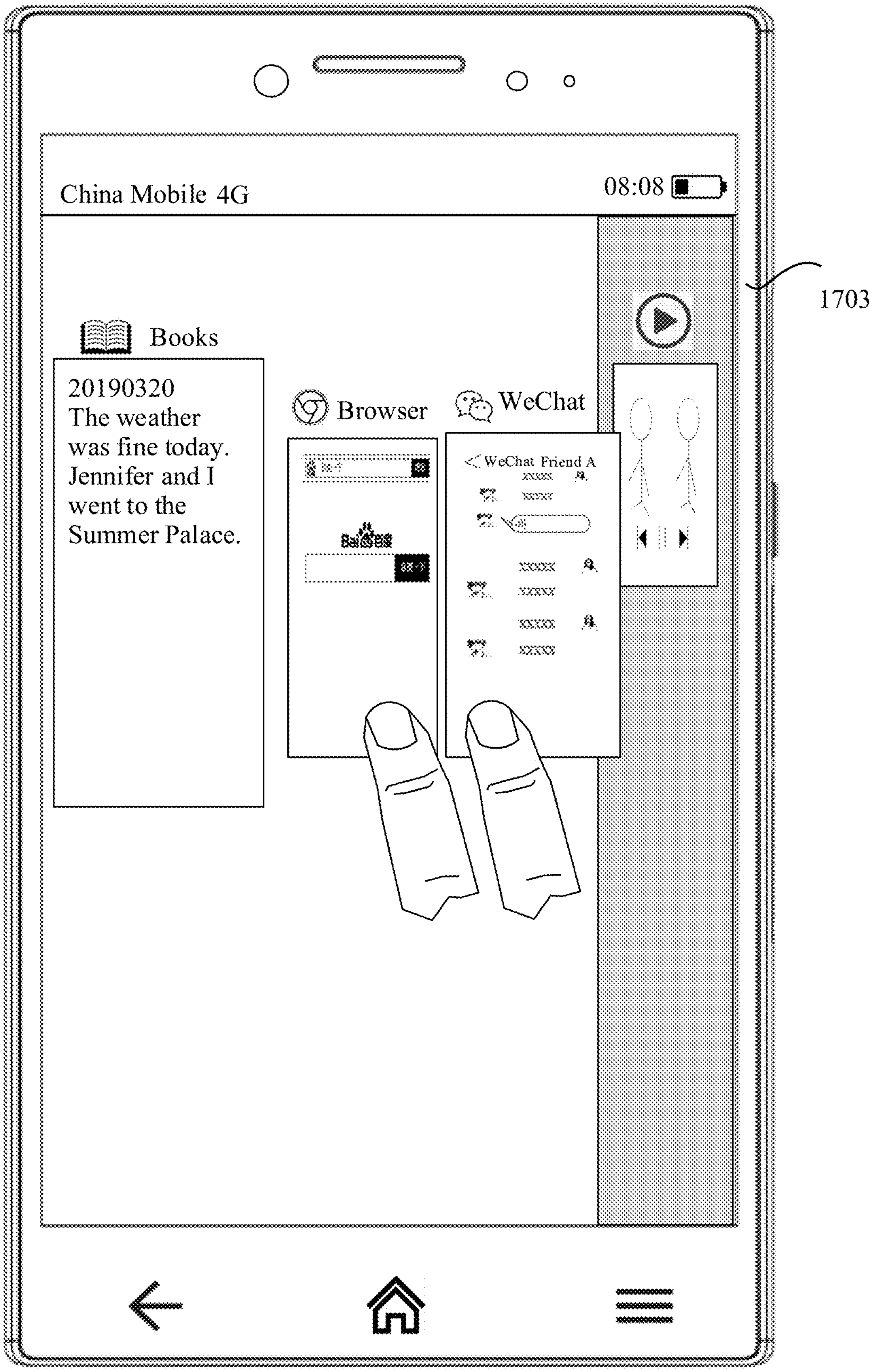
Figure 18D:
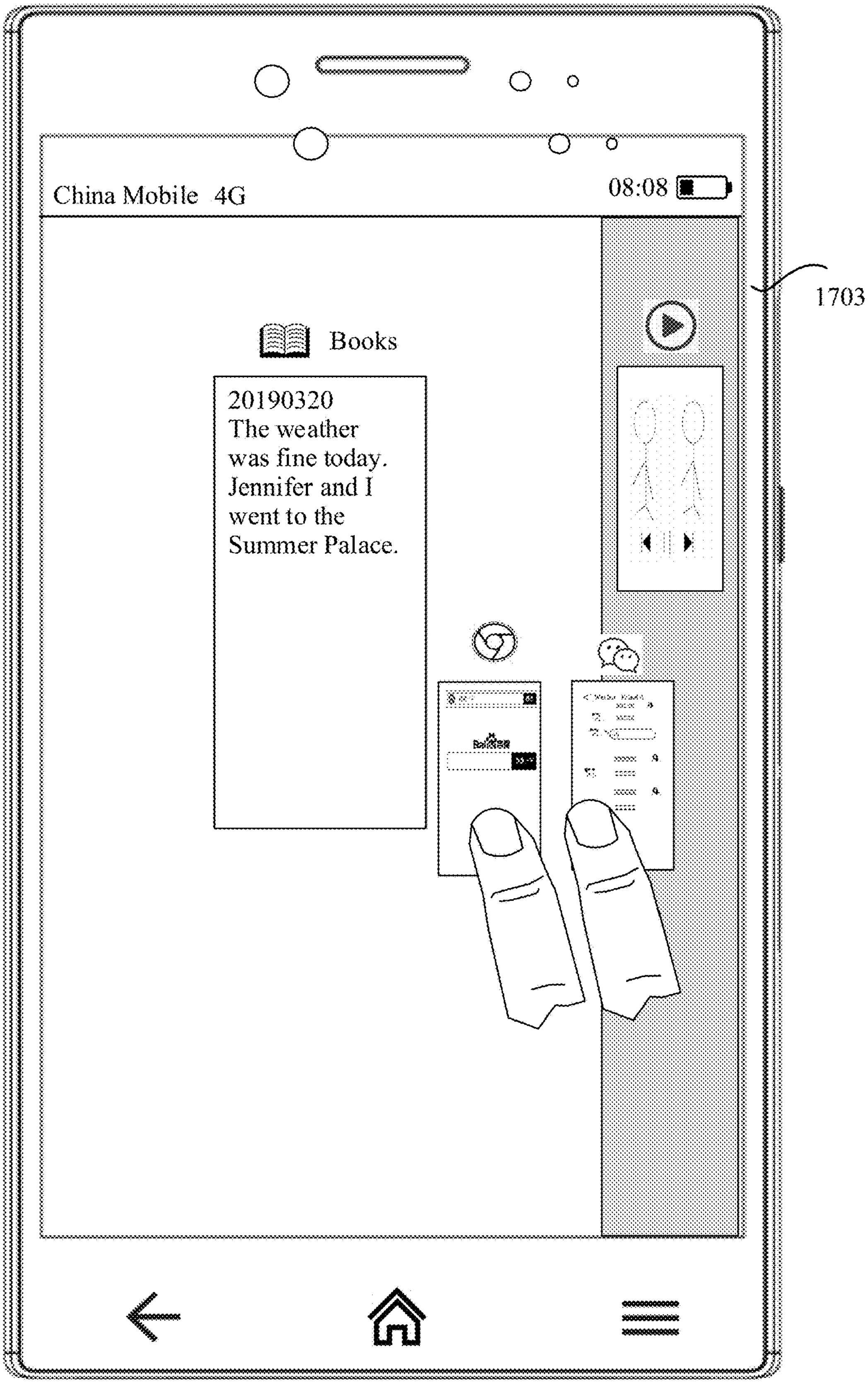
Figure 18E:
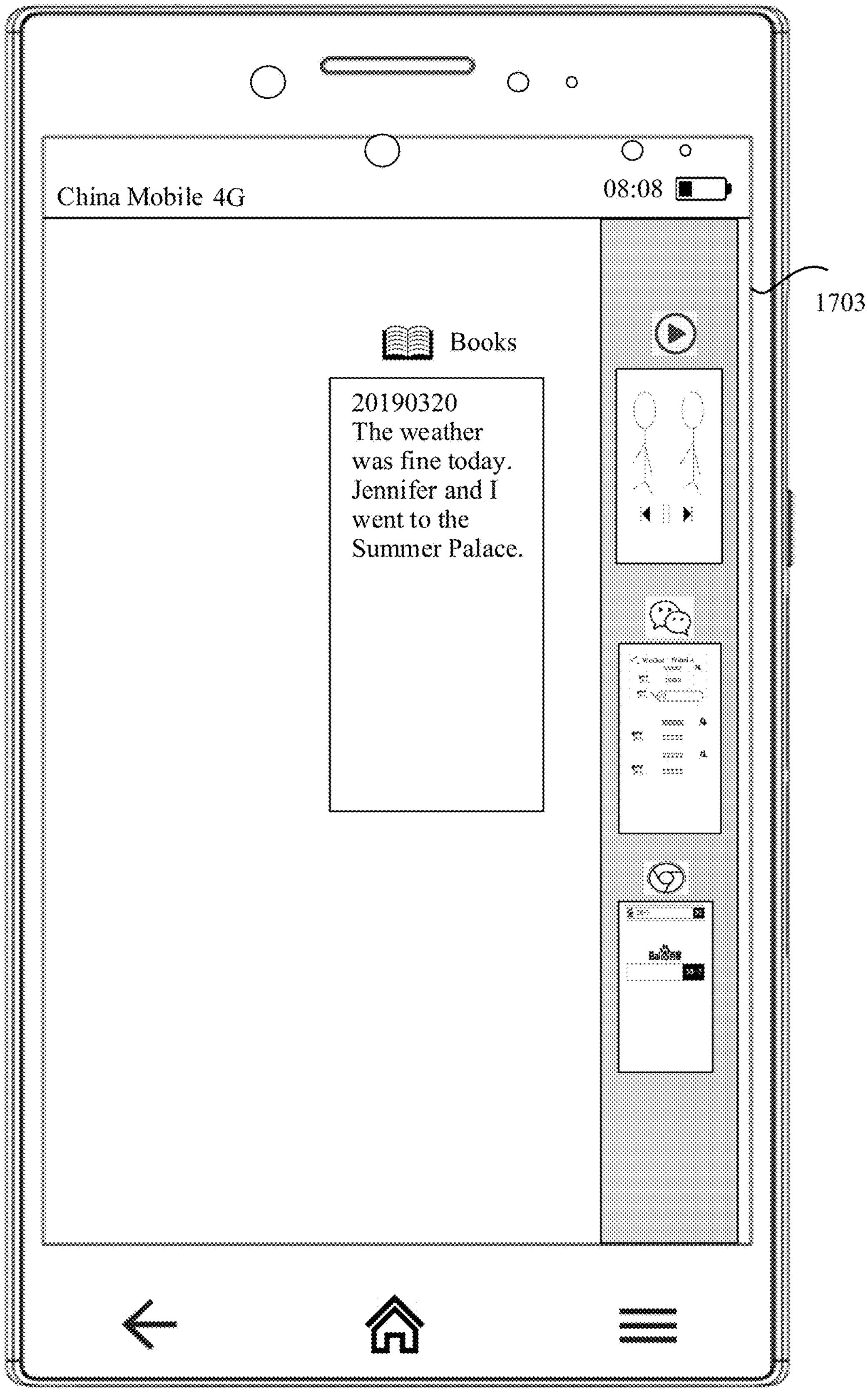
Figure 18F:
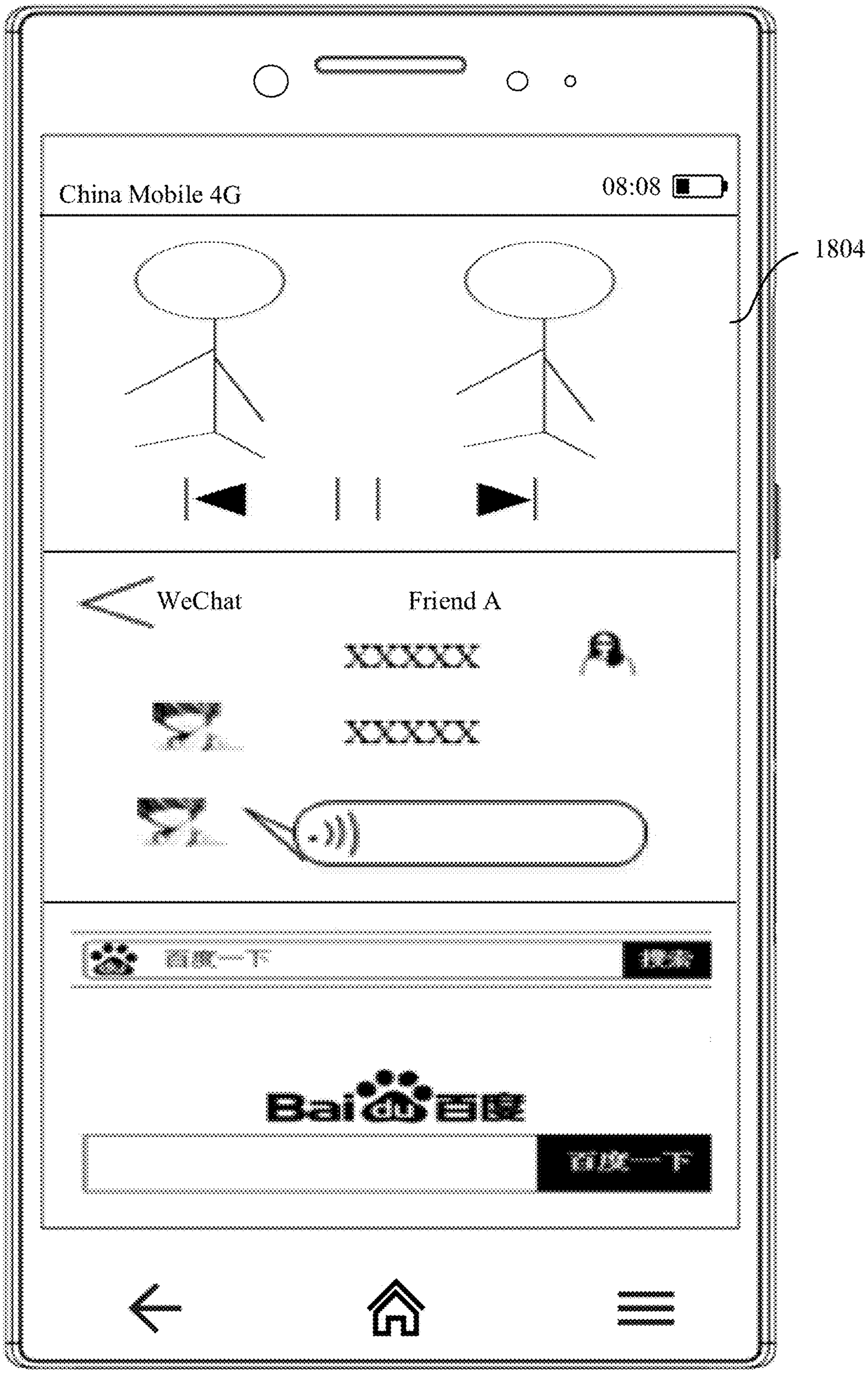
Figure 19A:
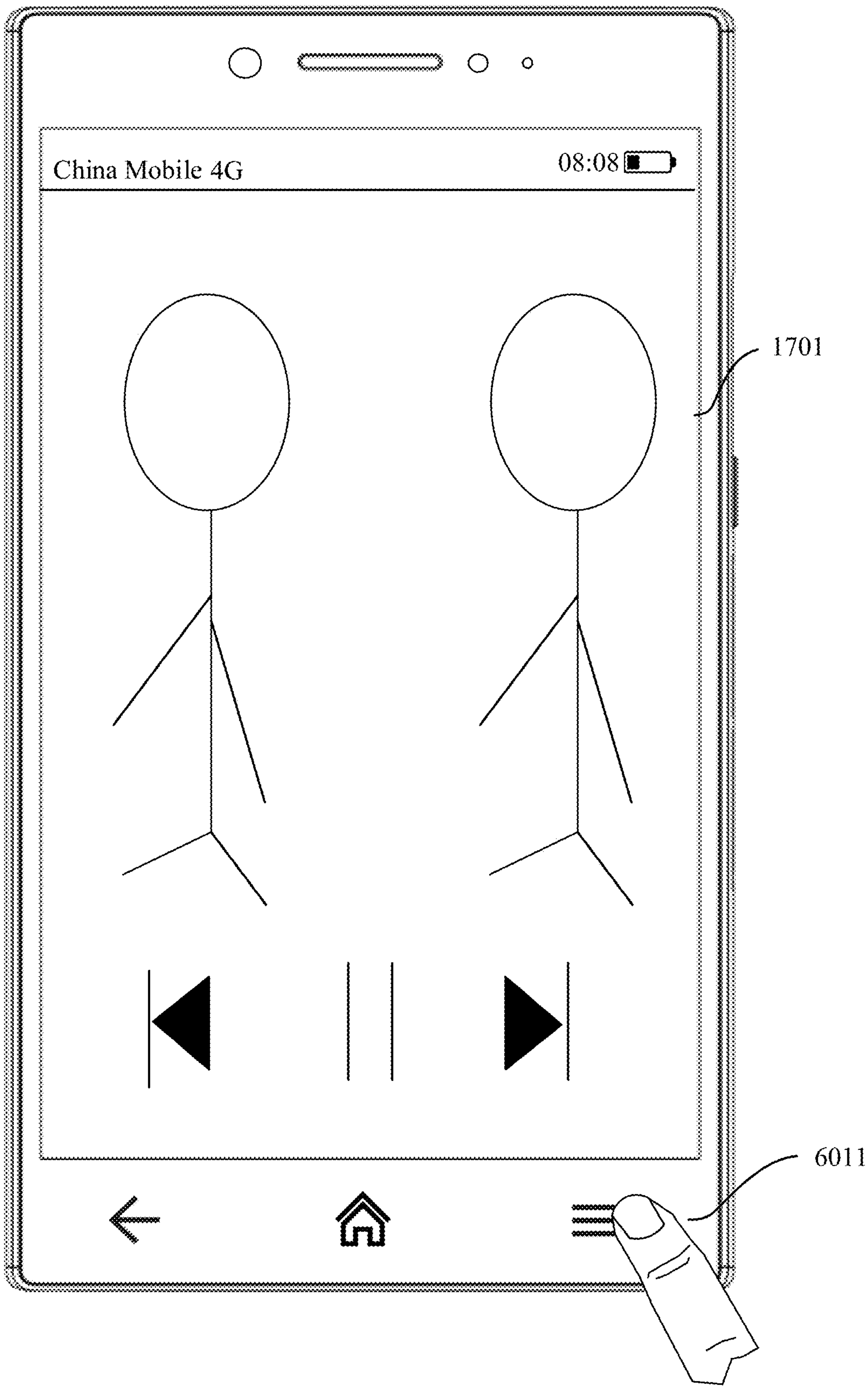
FIG. 19(*a*) to FIG. 19(*i*) are schematic diagrams of a scenario of another interface display method according to an embodiment of this application.
Figure 19B:
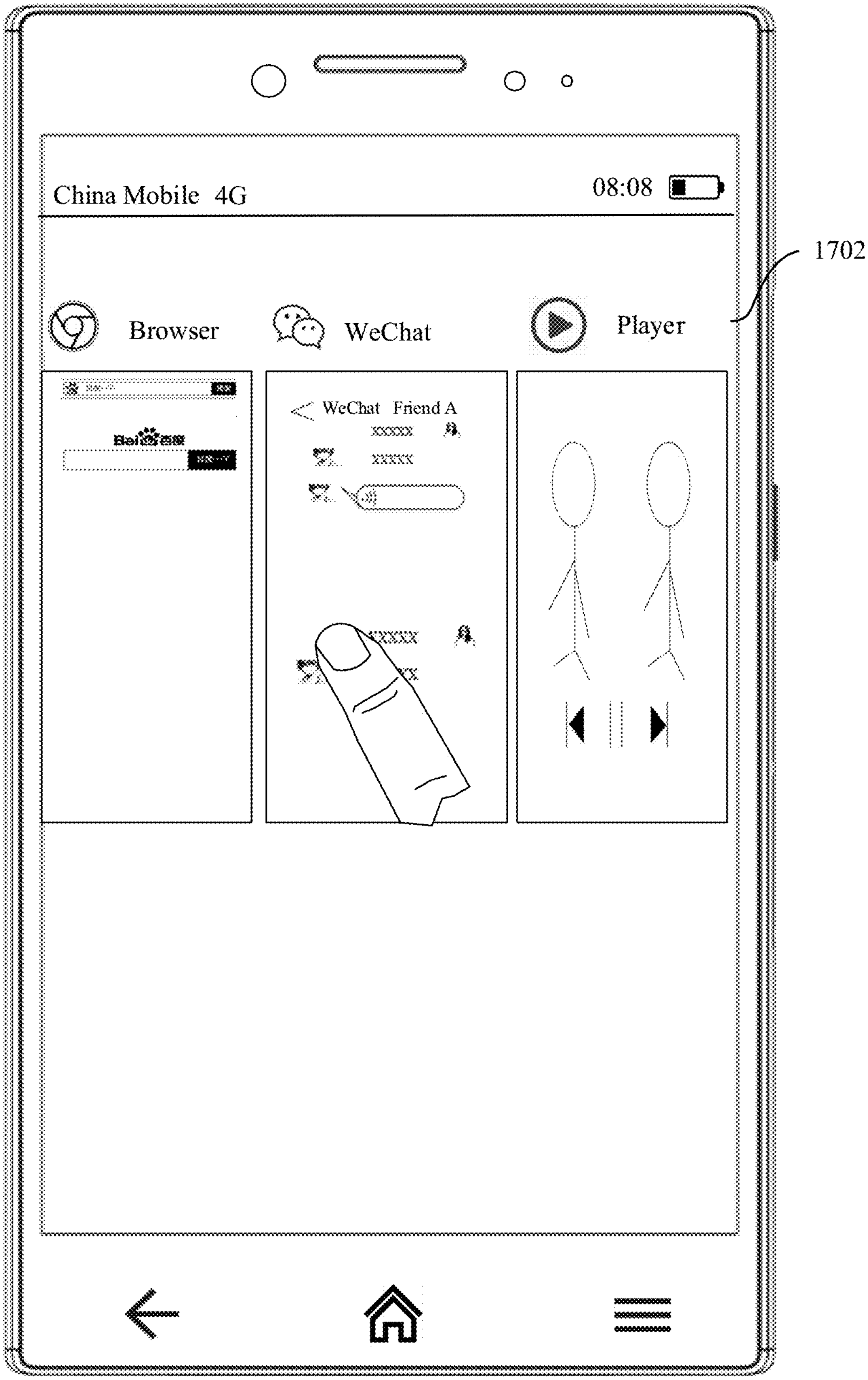
Figure 19C:
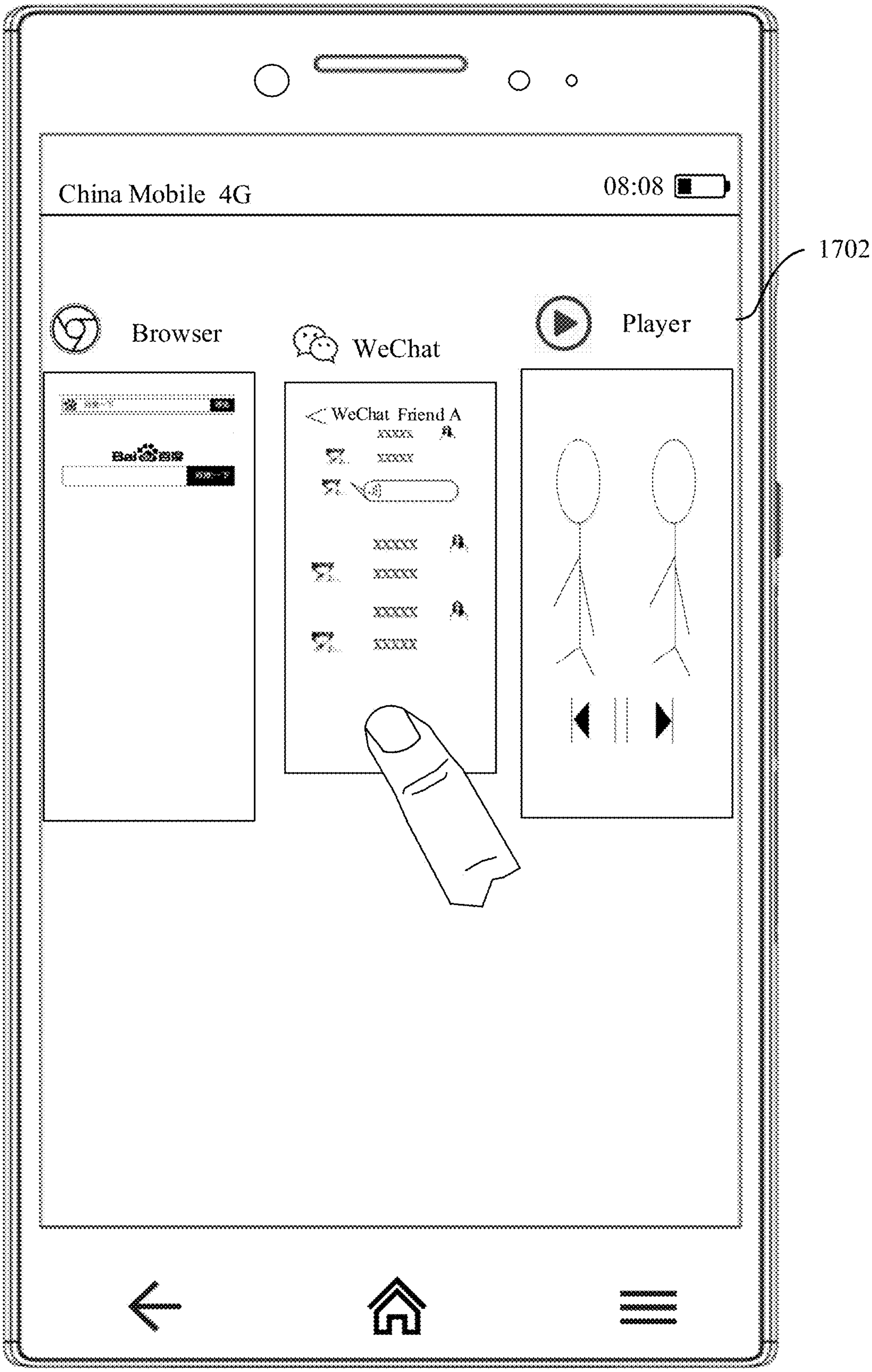
Figure 19D:
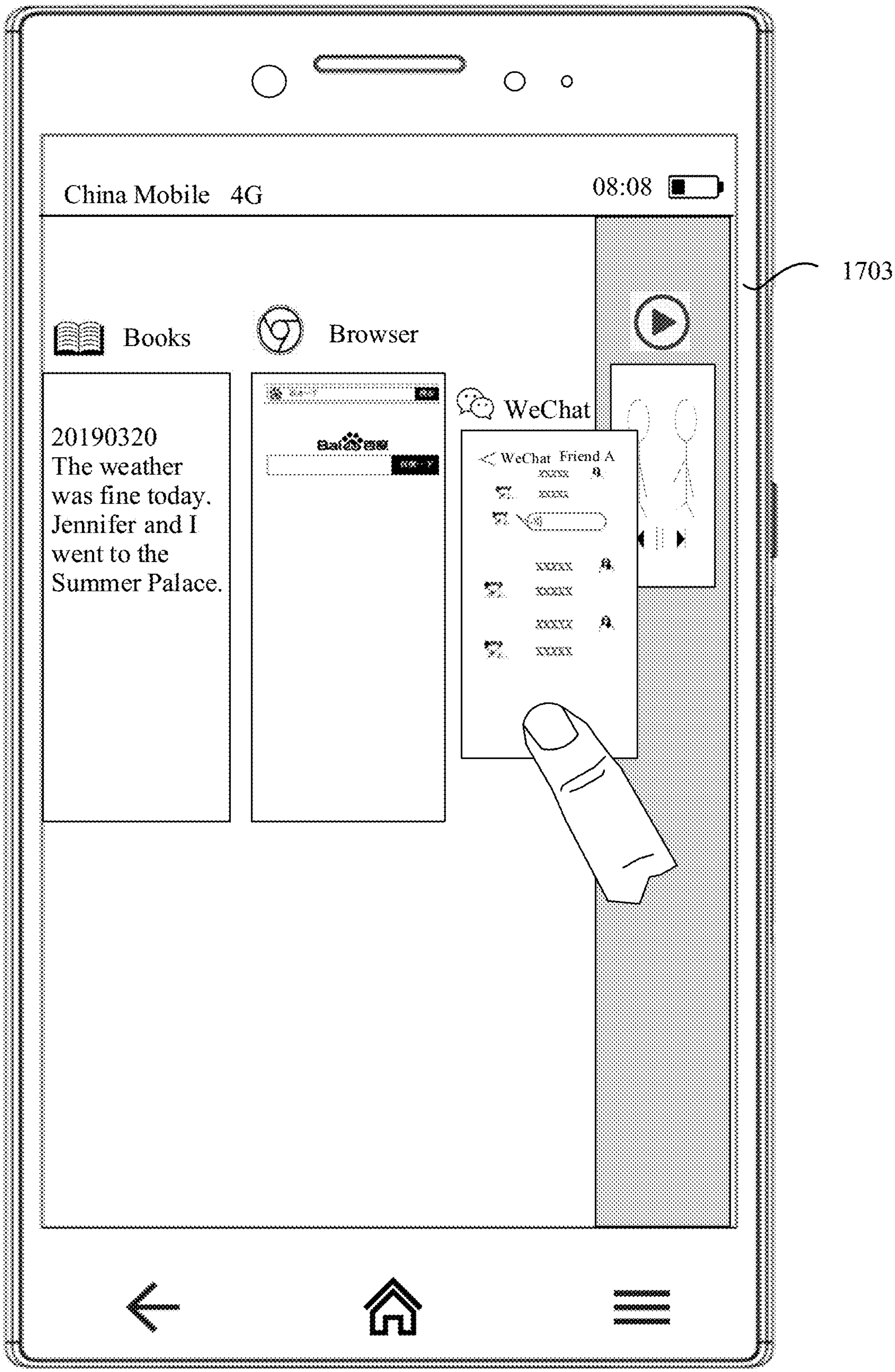
Figure 19E:
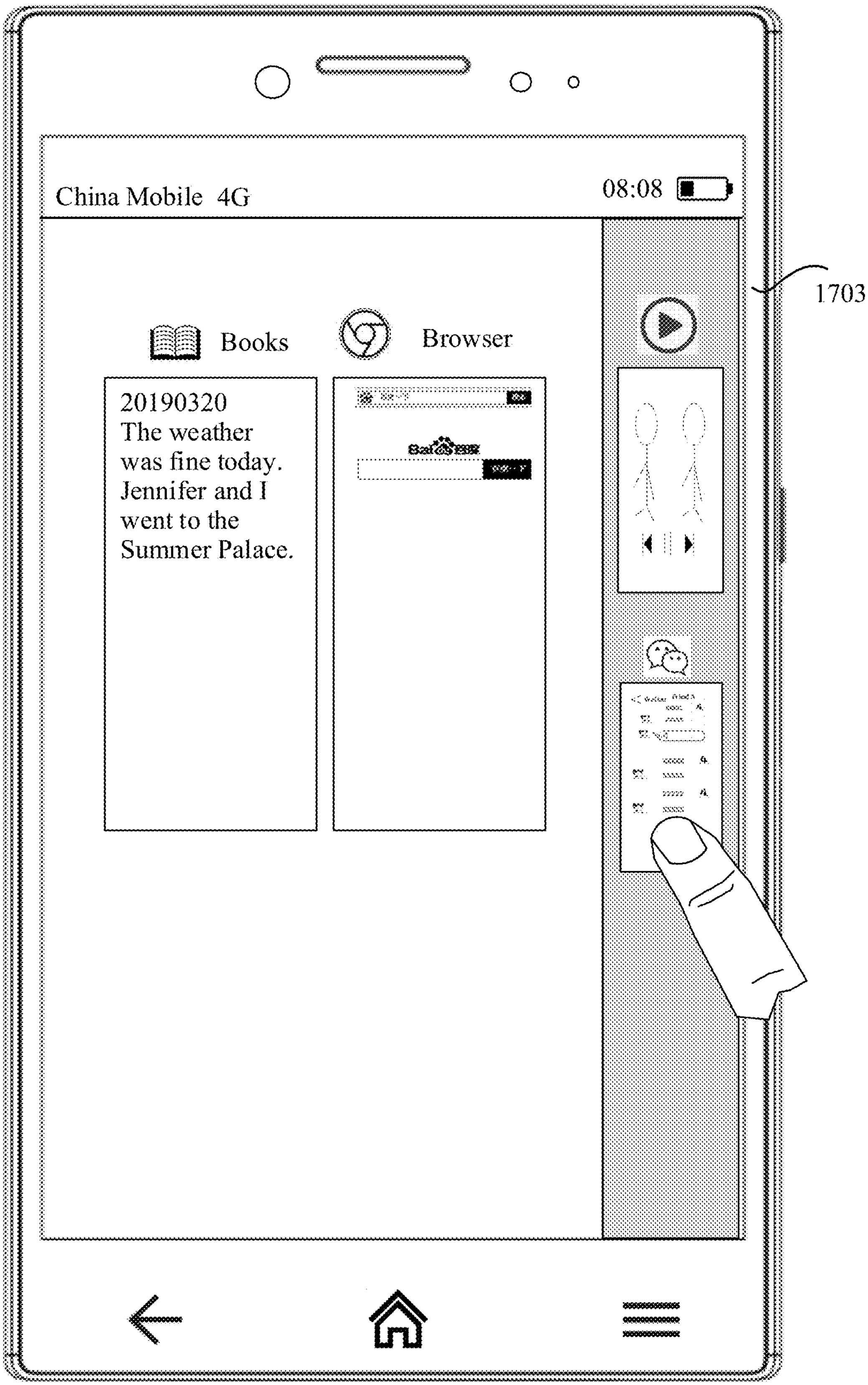
Figure 19F:
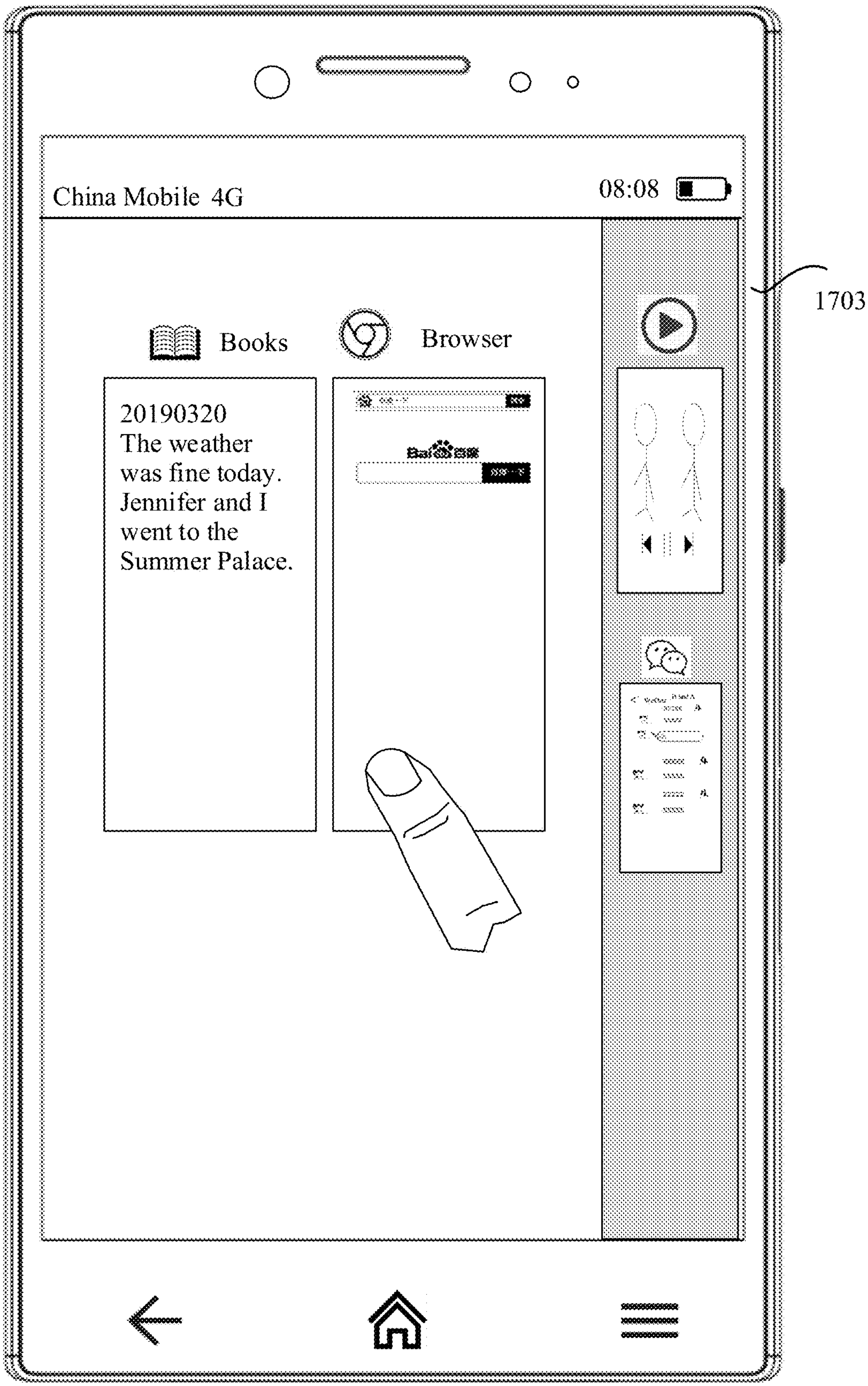
Figure 19G:
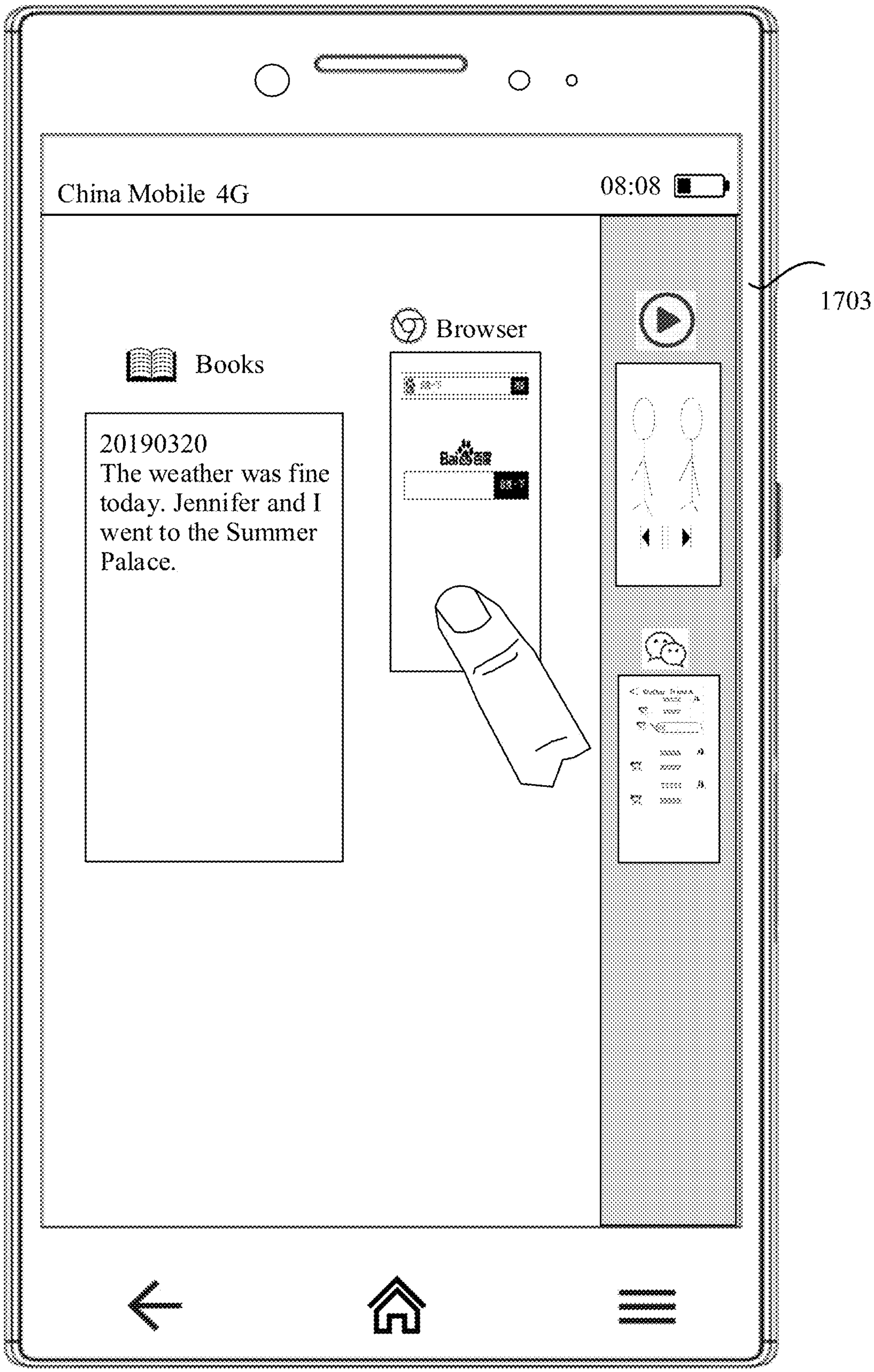
Figure 19H:
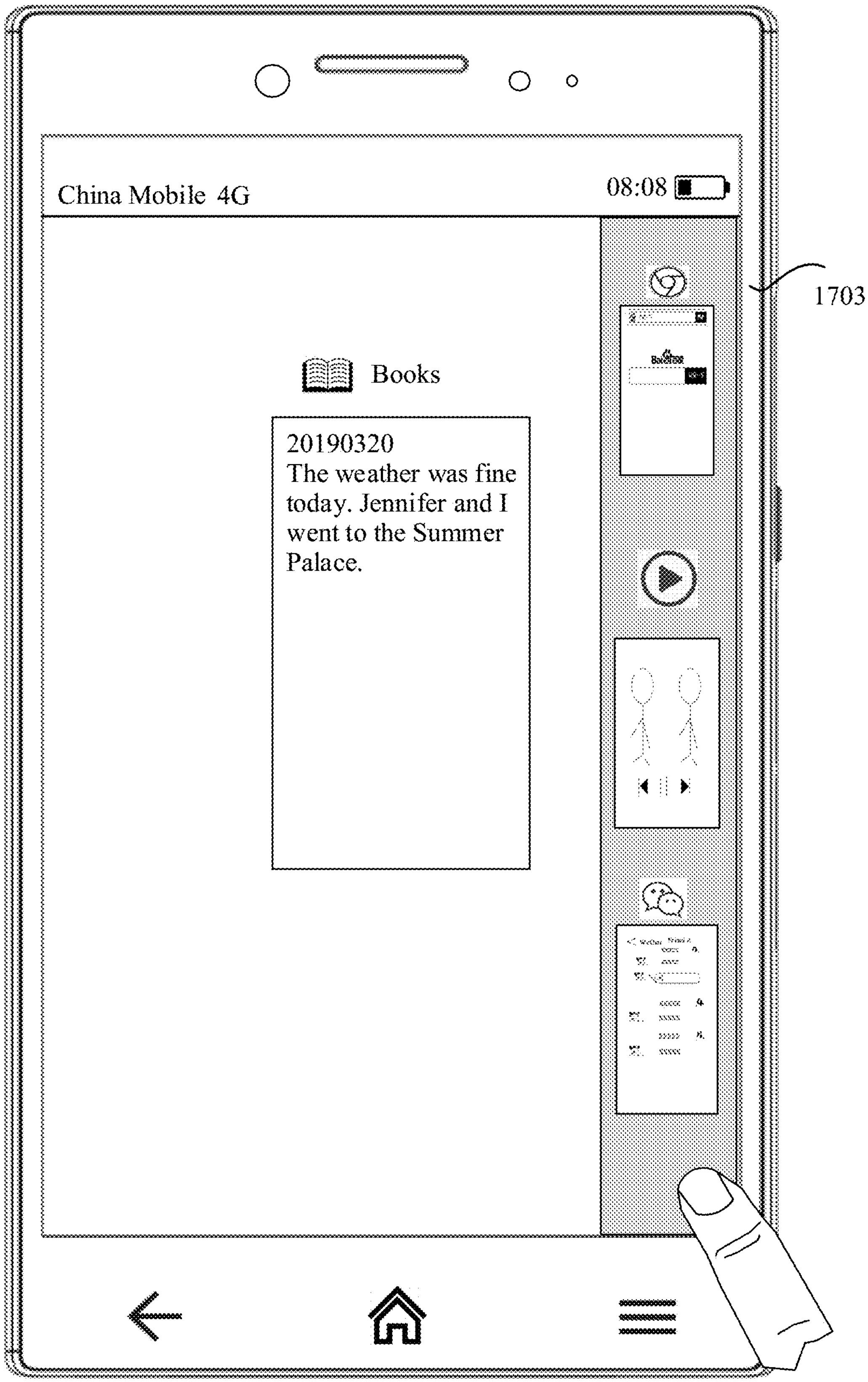
Figure 19I:
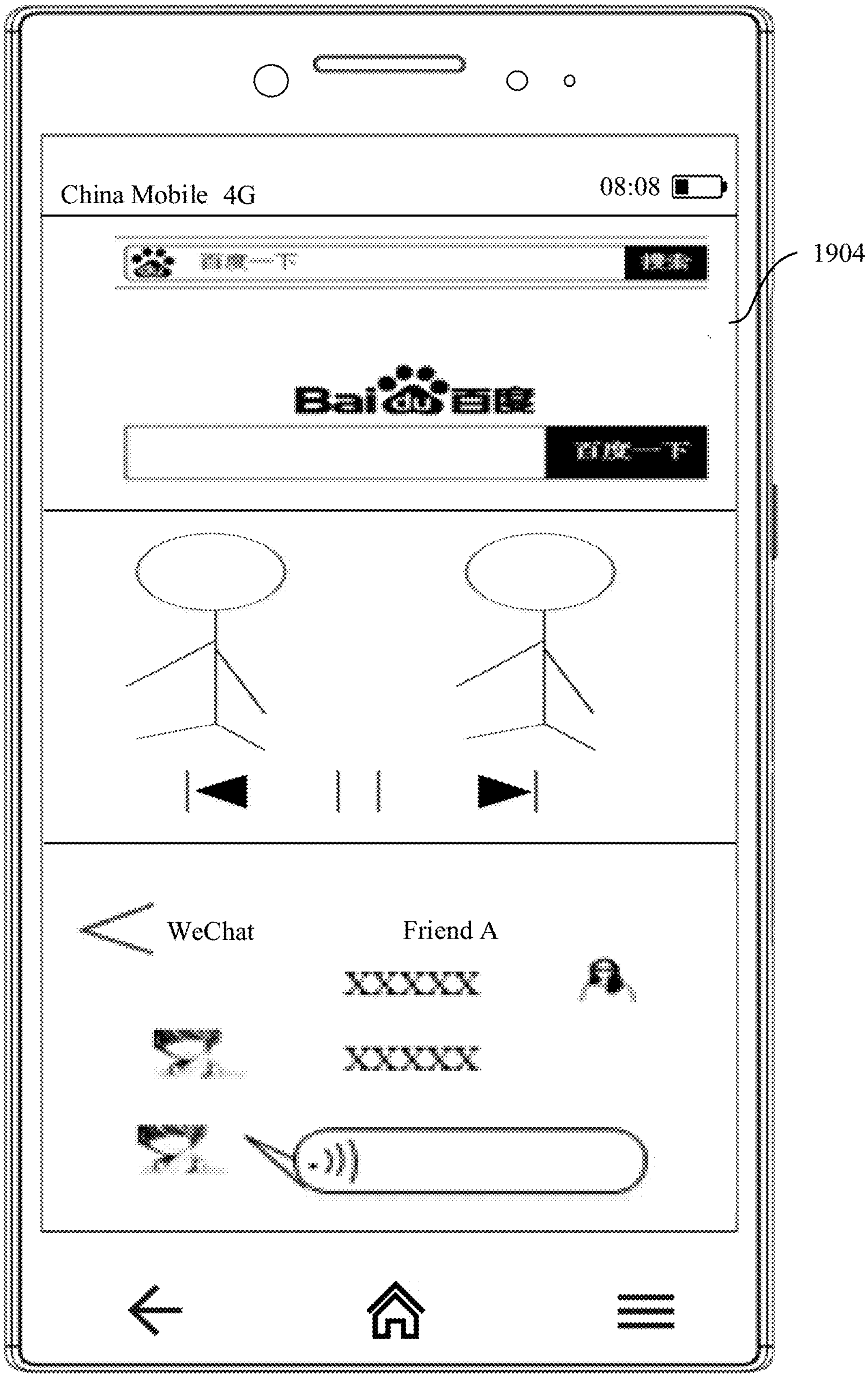
Figures 1, 20A:
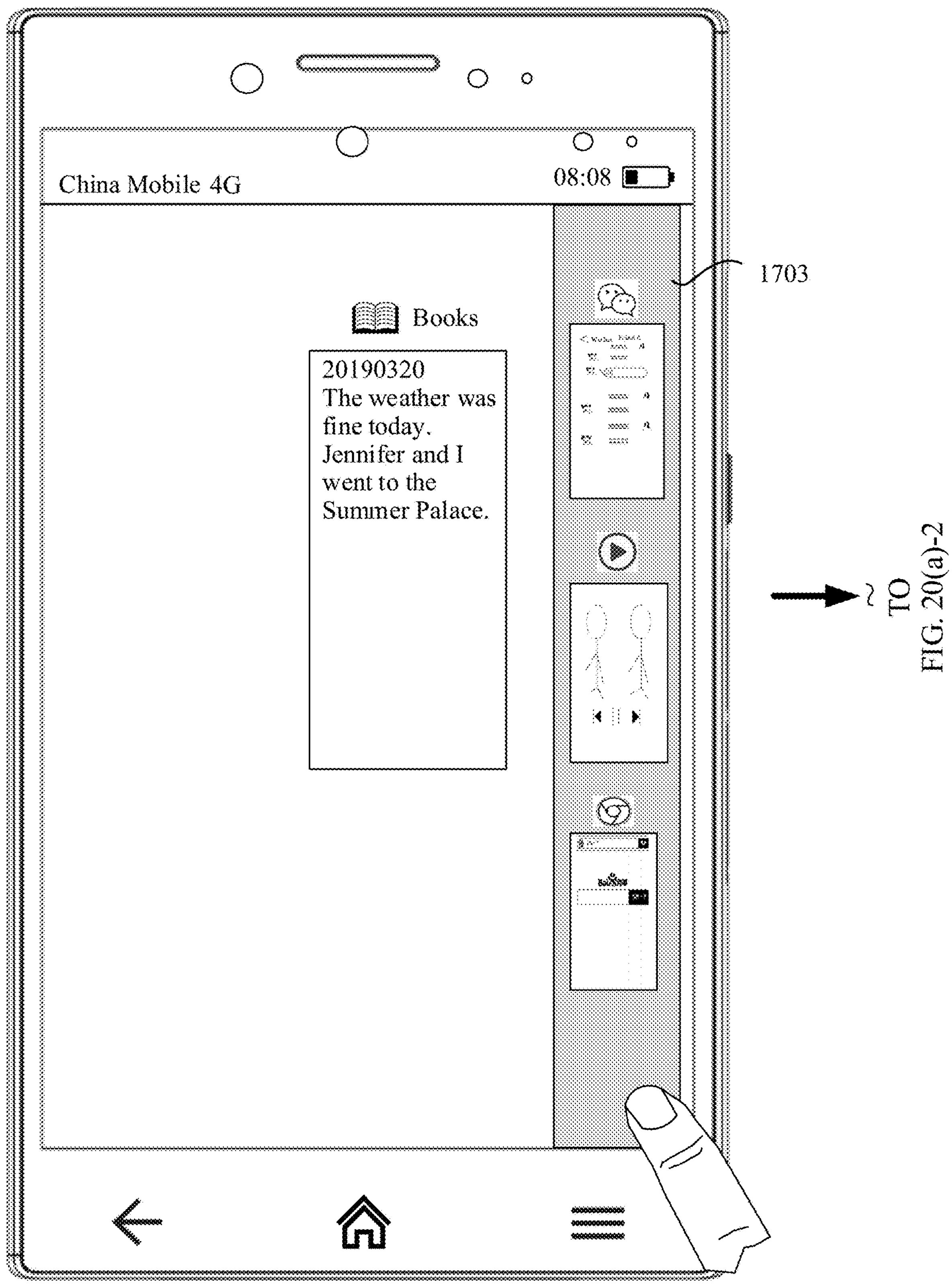
FIG. 20(*a*)-1 to FIG. 20(*d*)-2 are schematic diagrams of a scenario of another interface display method according to an embodiment of this application.
Figures 2, 20A:
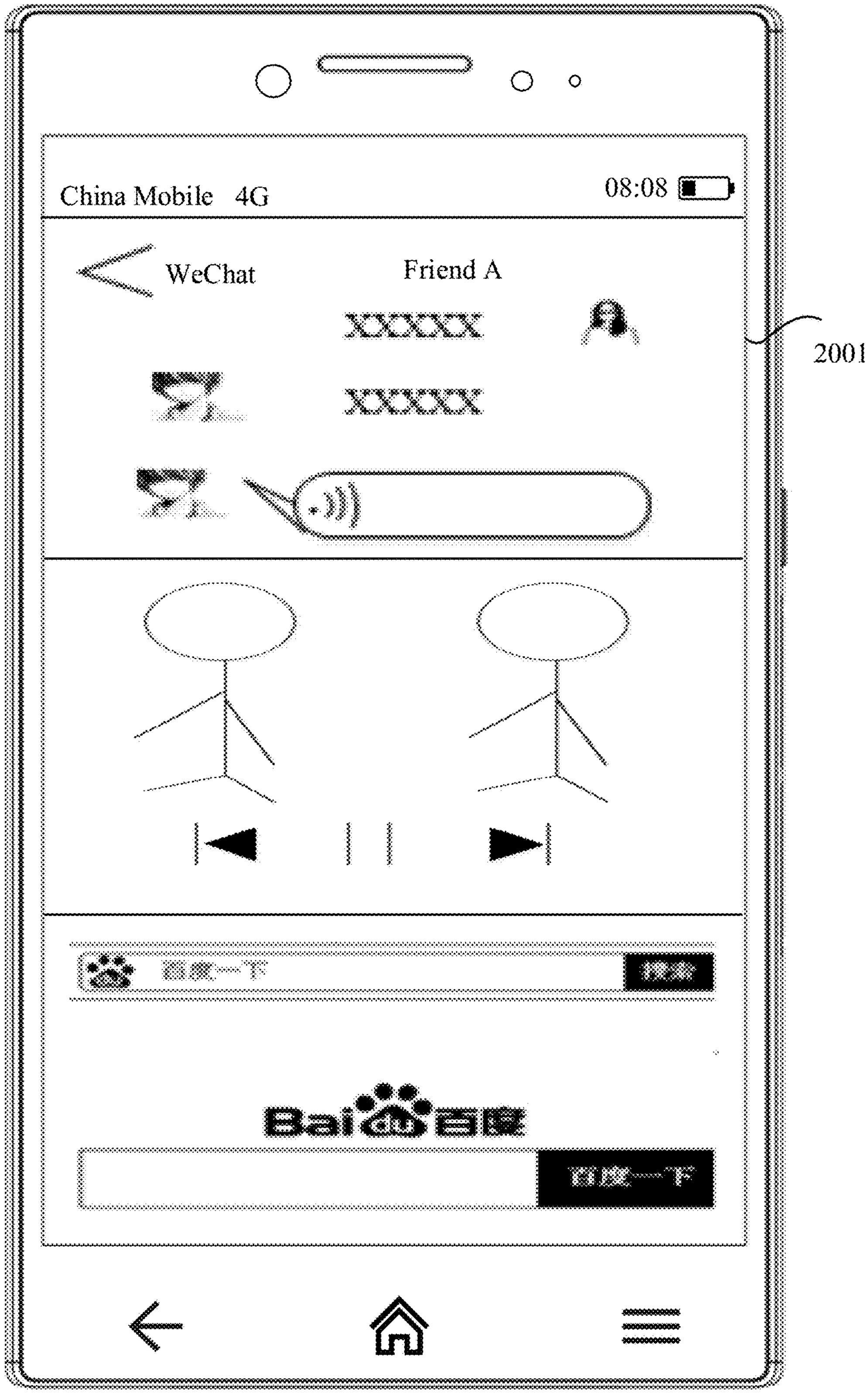
Figures 1, 20B:
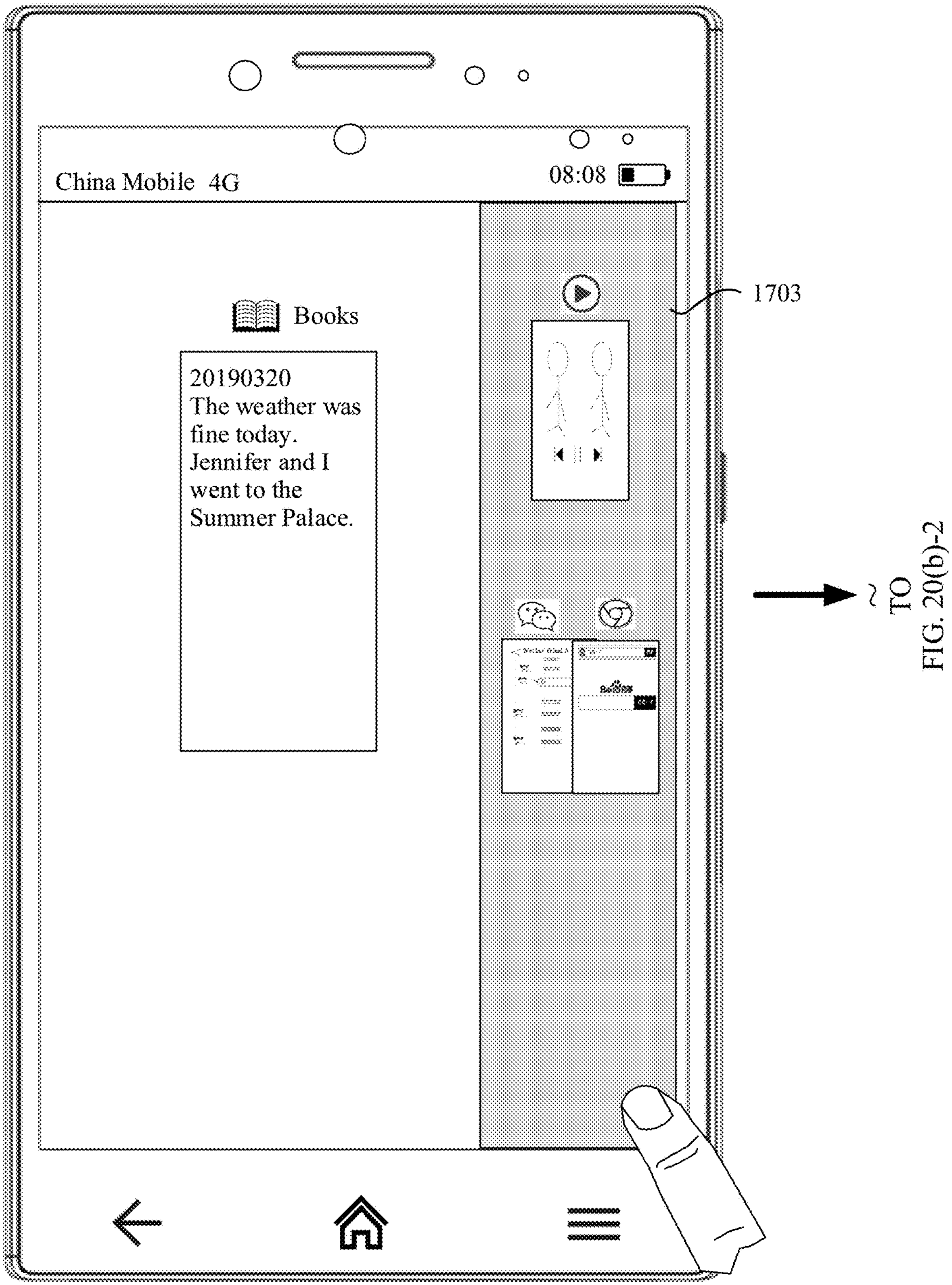
Figures 2, 20B:
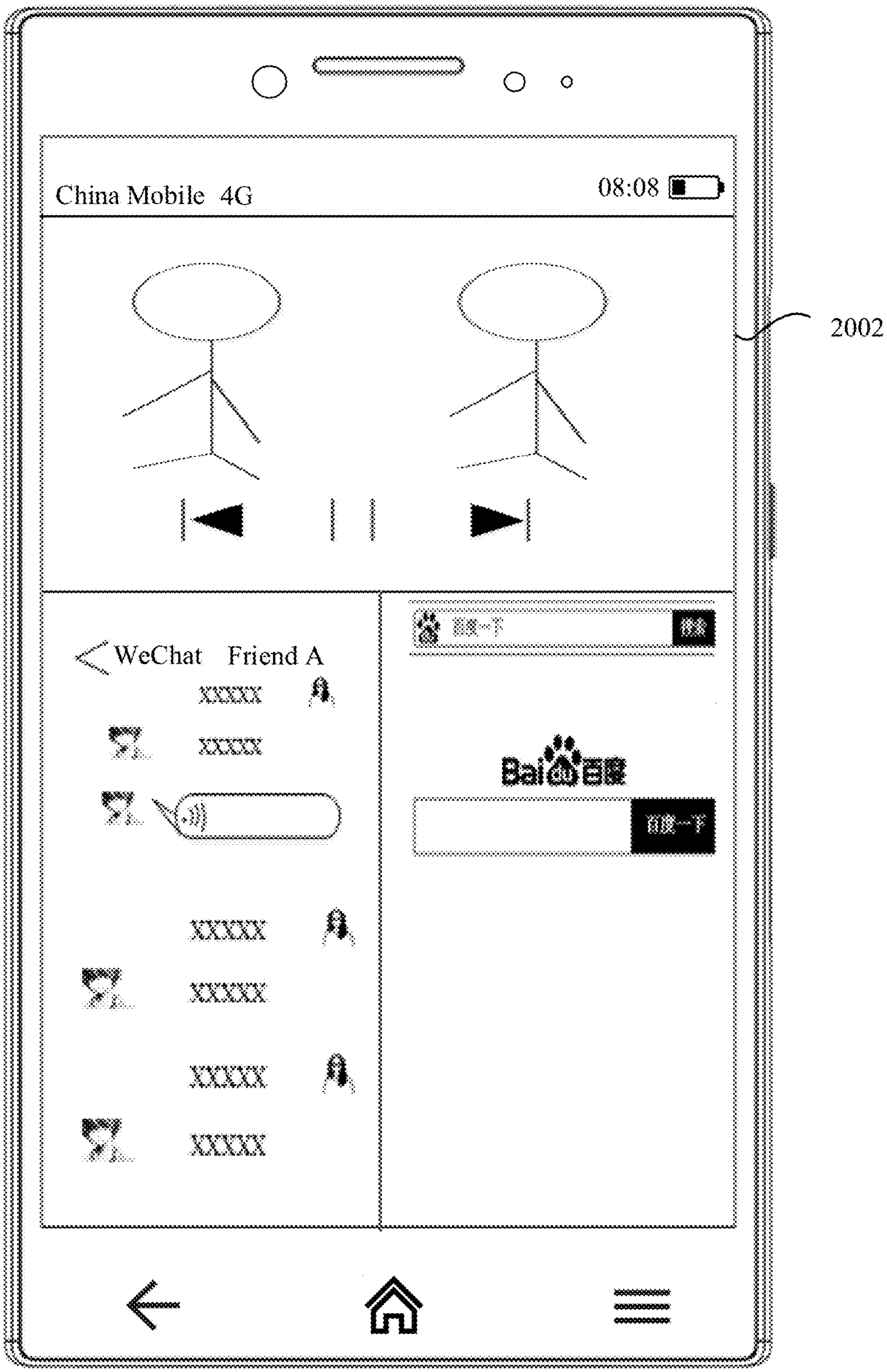
Figures 1, 20C:
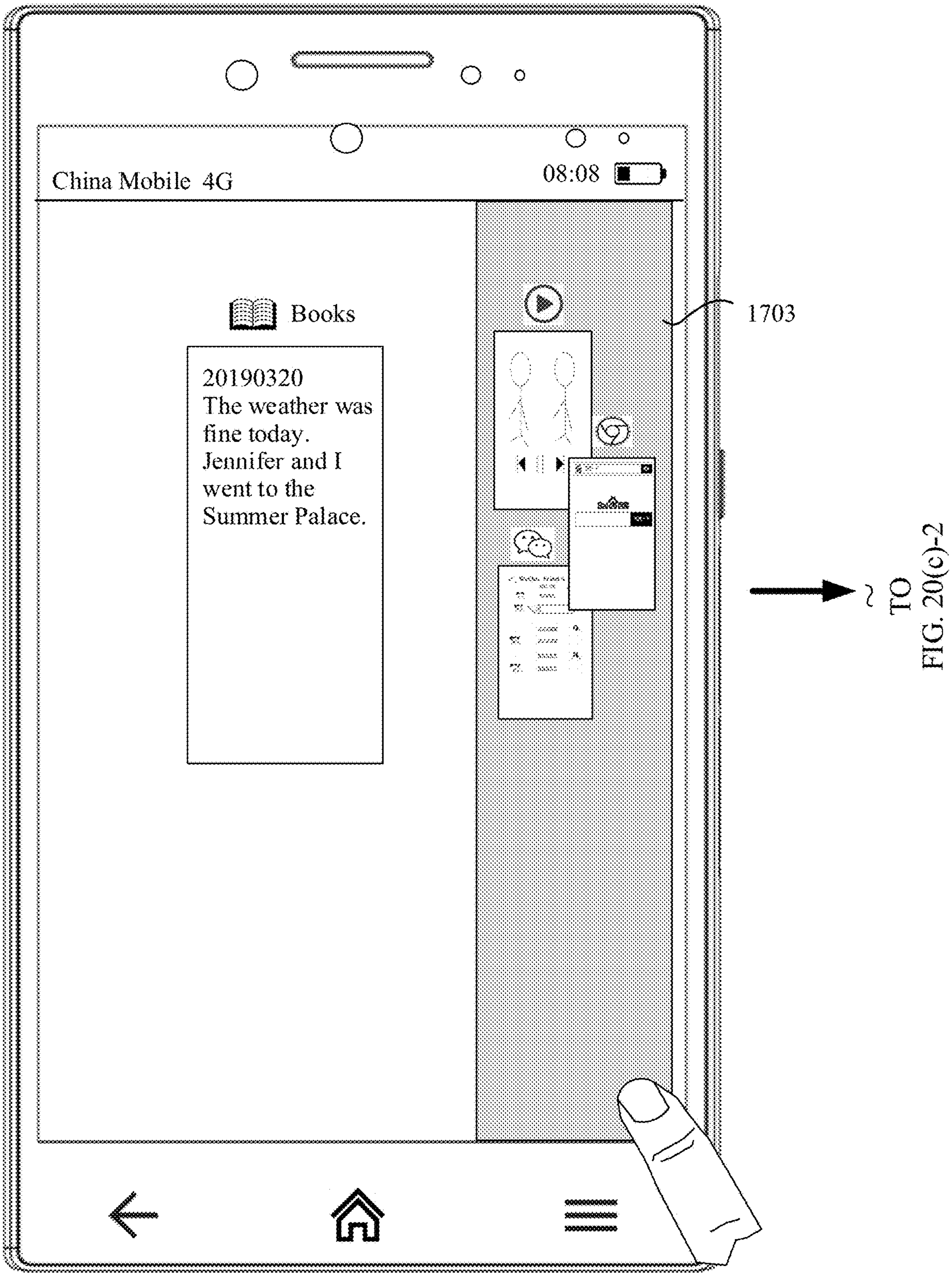
Figures 2, 20C:
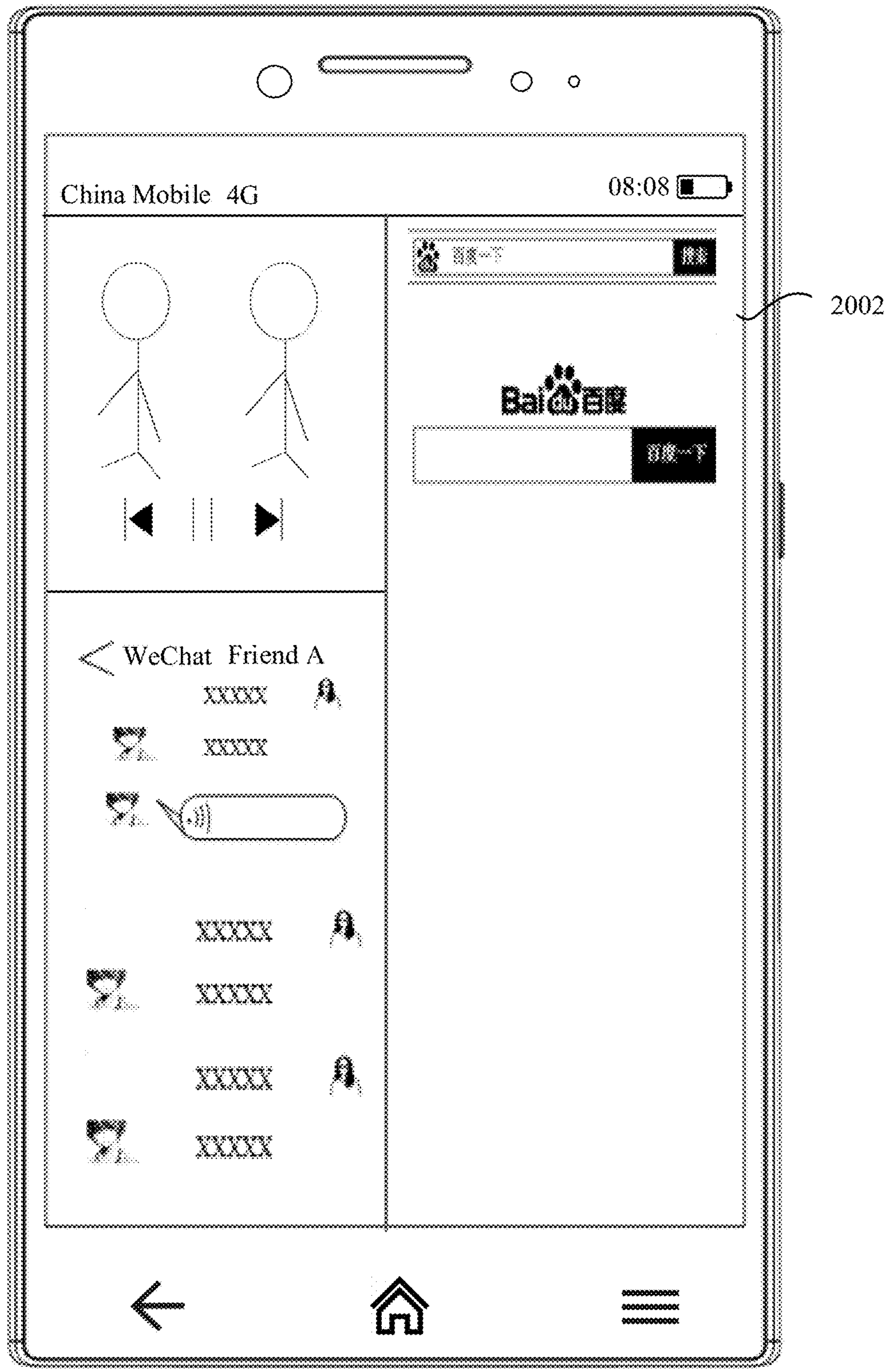
Figures 1, 20D:
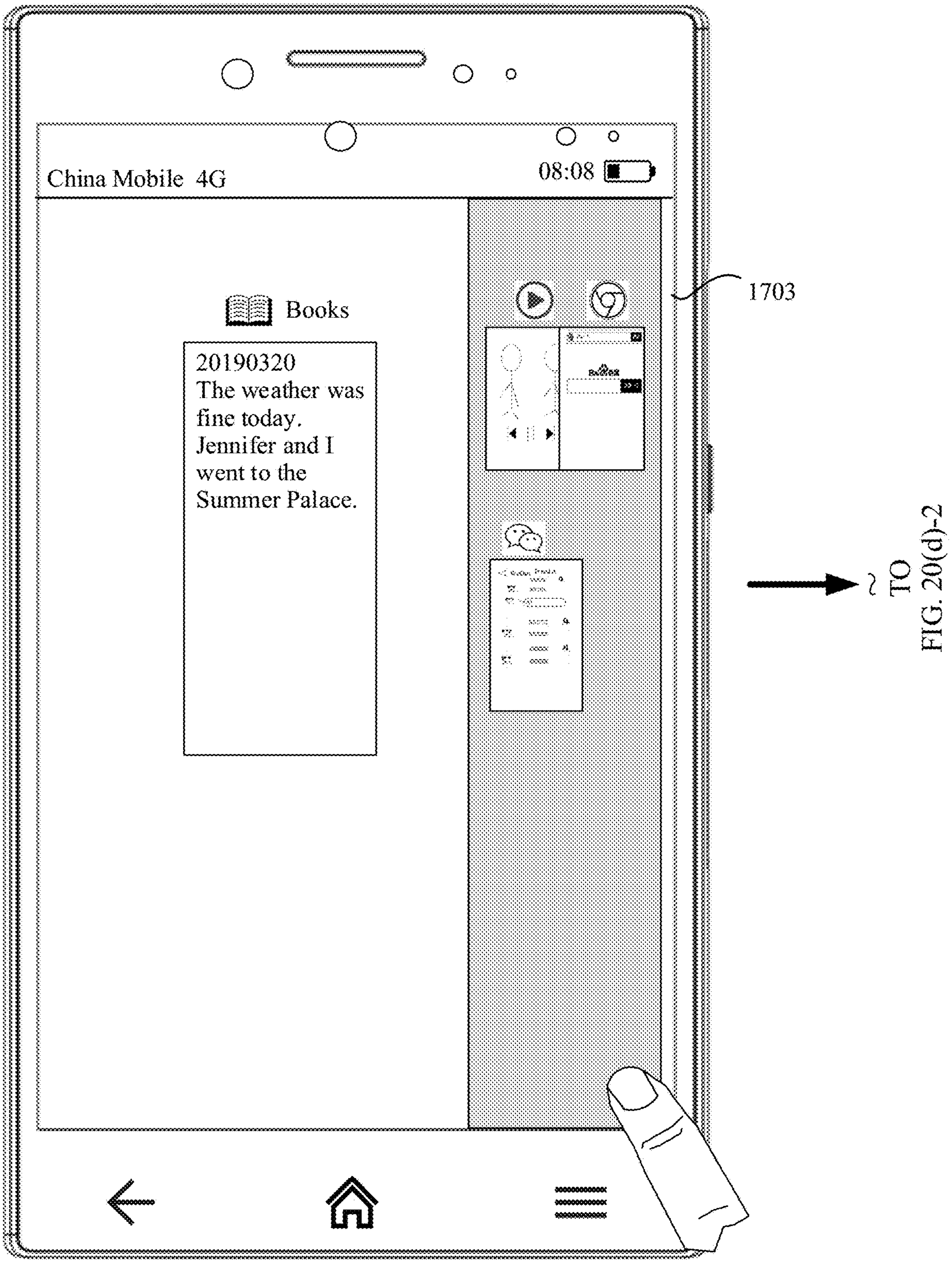
Figures 2, 20D:
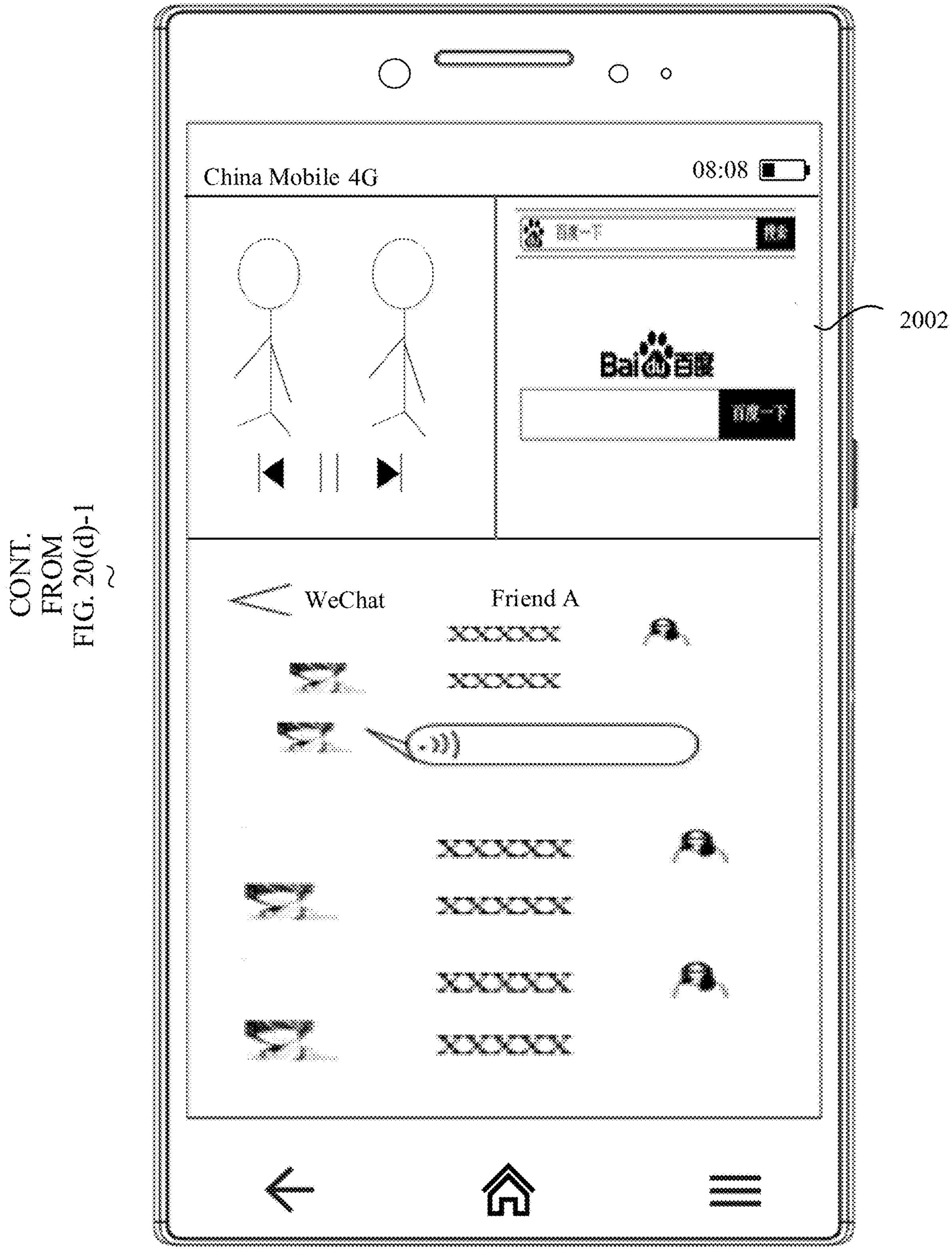
Figure 21A:
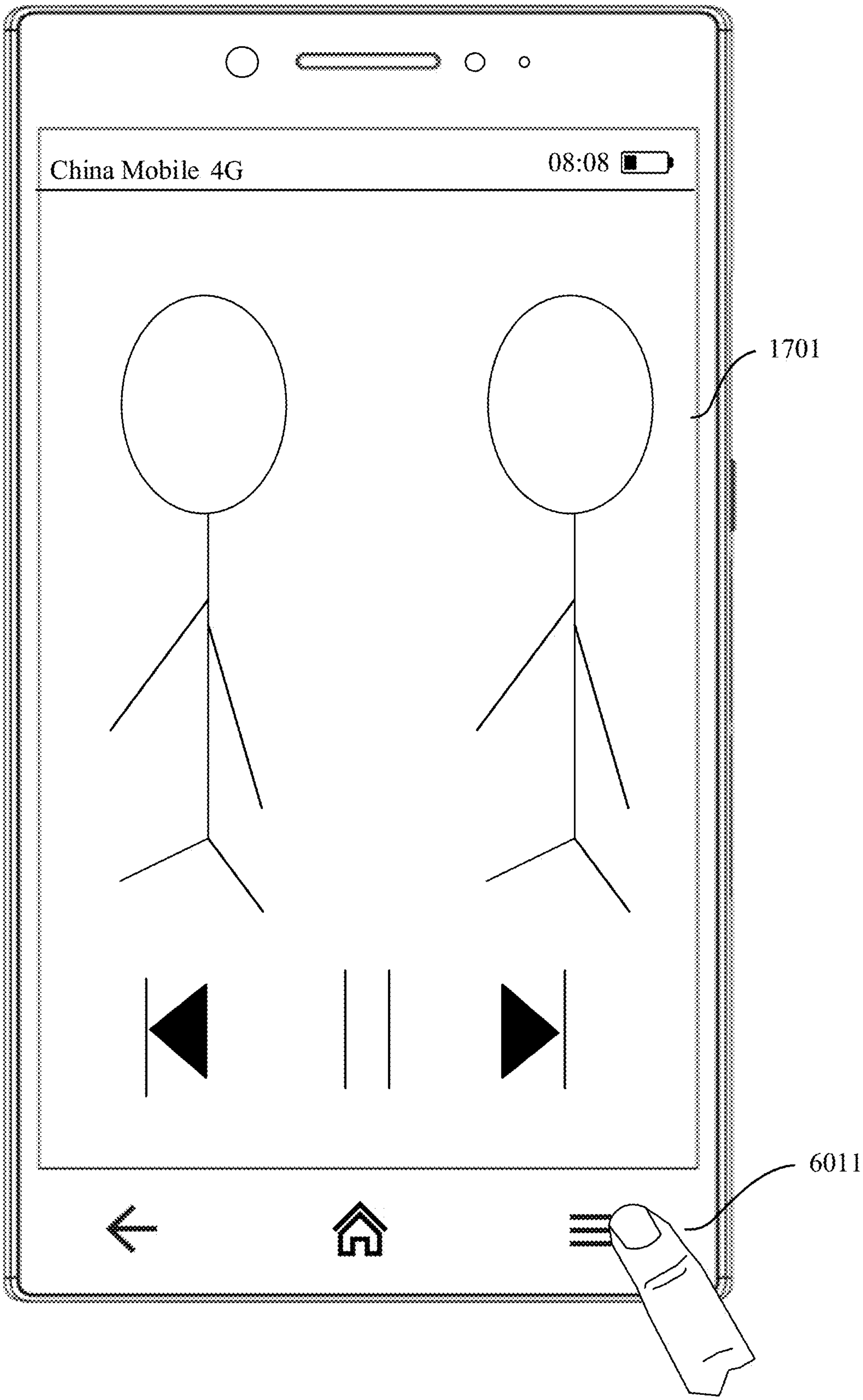
FIG. 21(*a*) to FIG. 21(*i*) are schematic diagrams of a scenario of another interface display method according to an embodiment of this application.
Figure 21B:
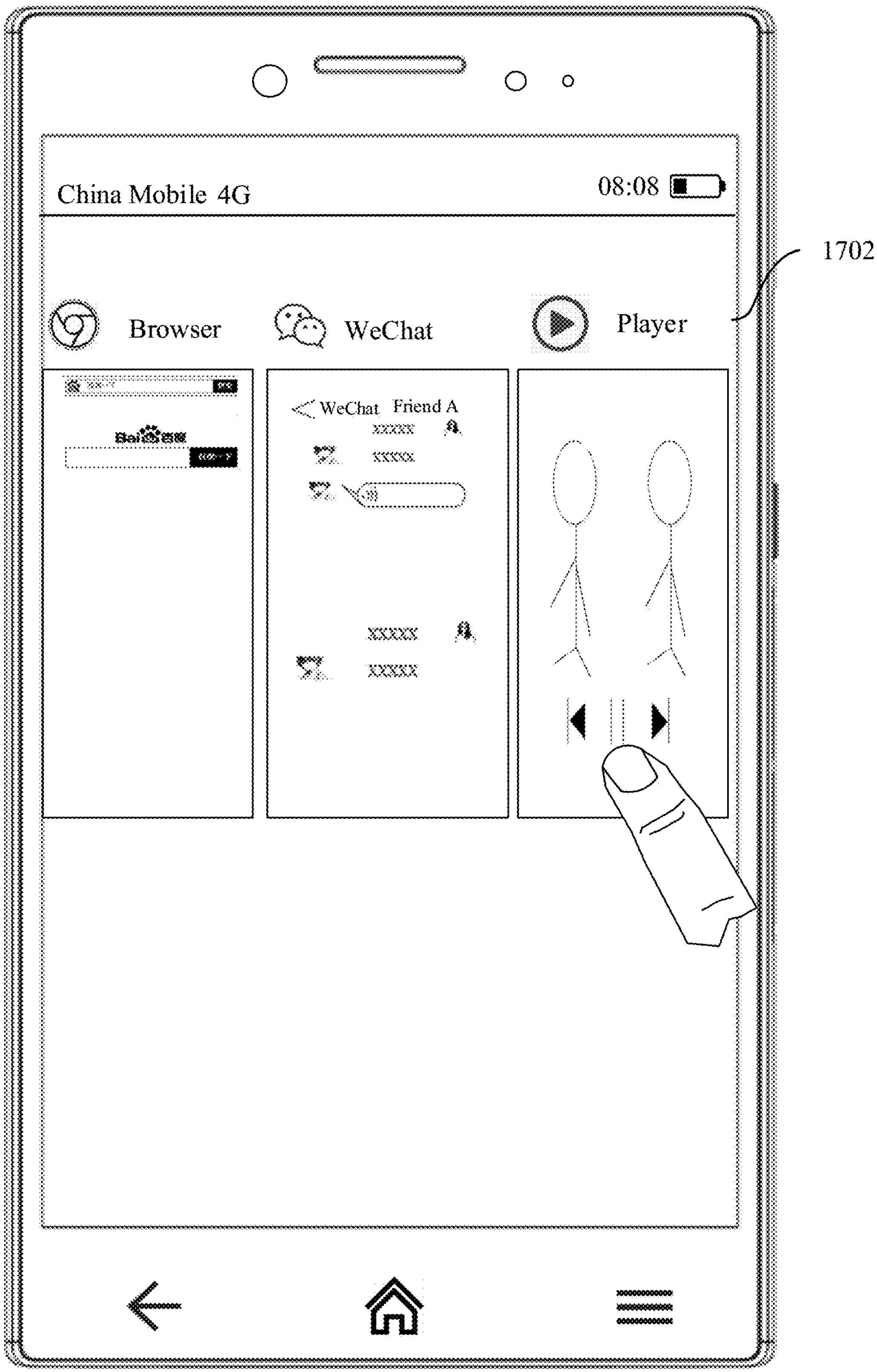
Figure 21C:
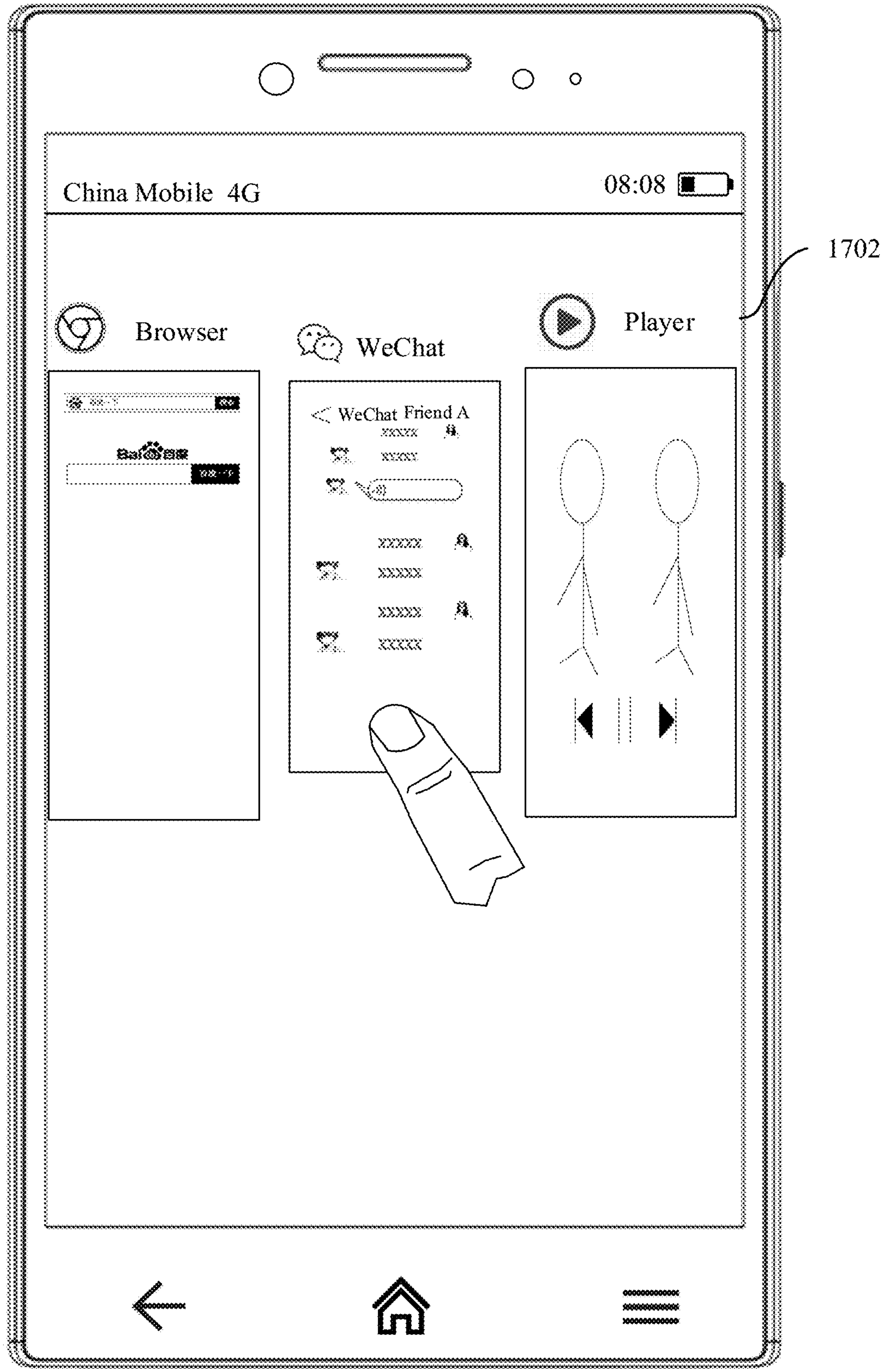
Figure 21D:
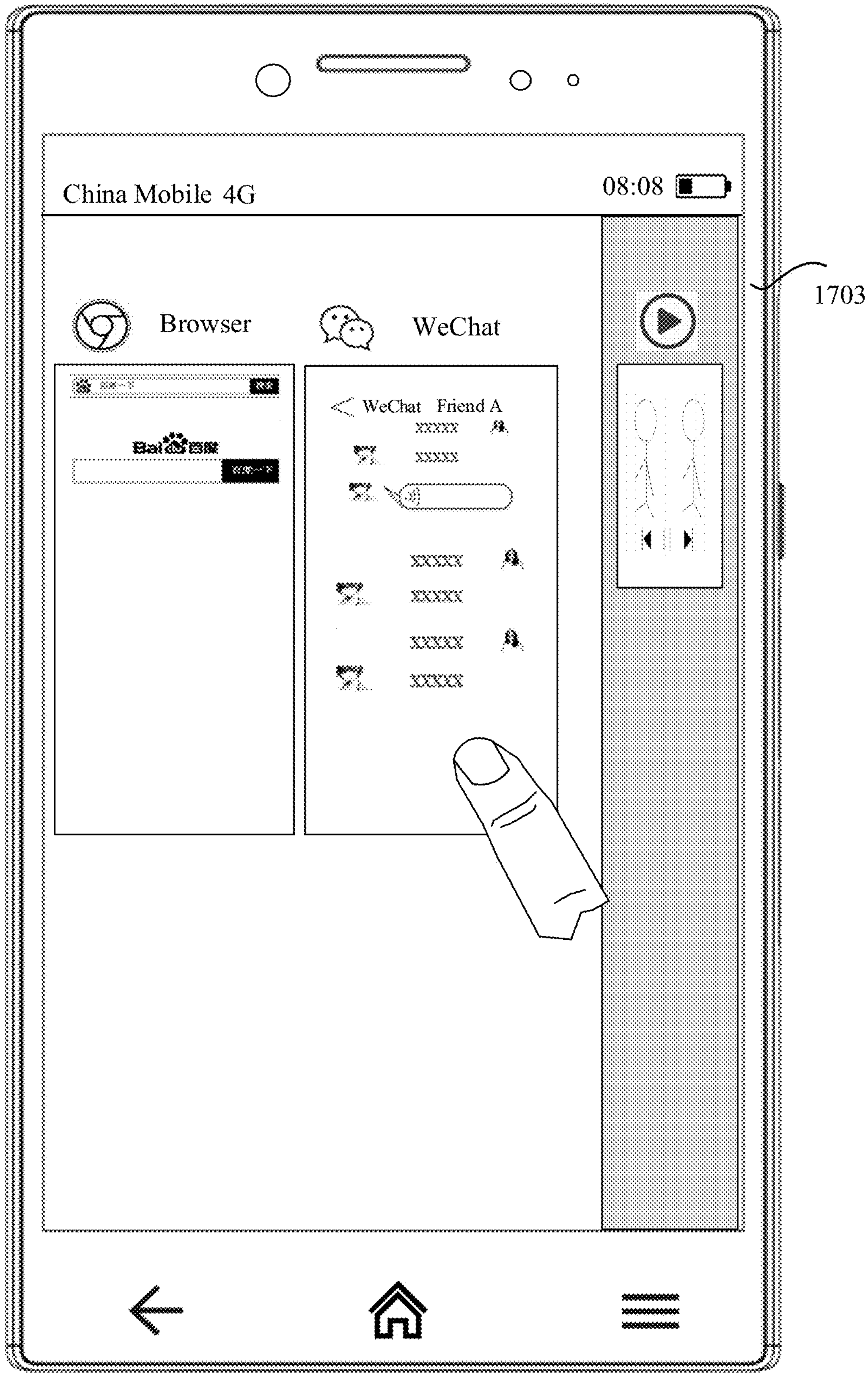
Figure 21E:
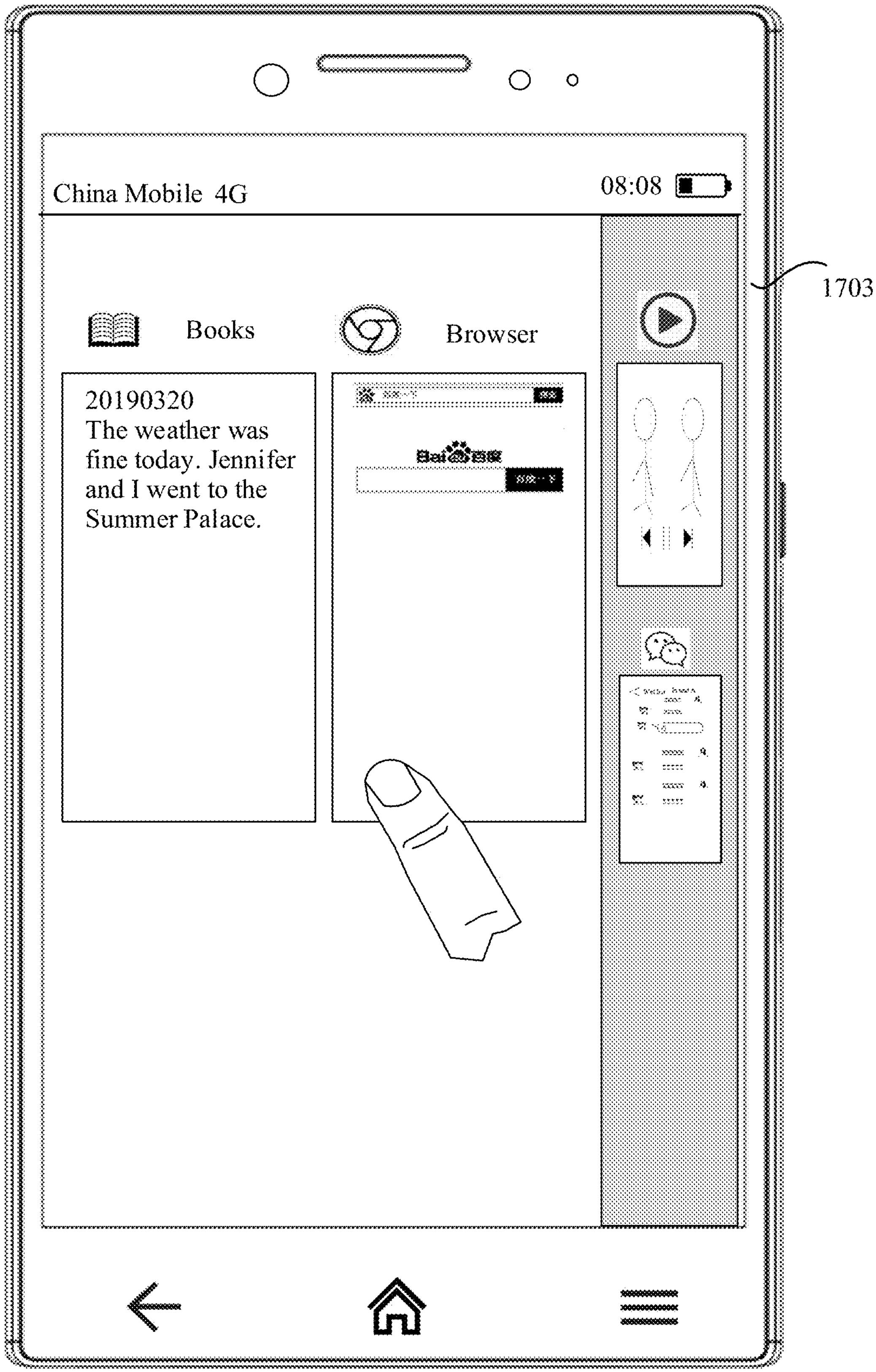
Figure 21F:
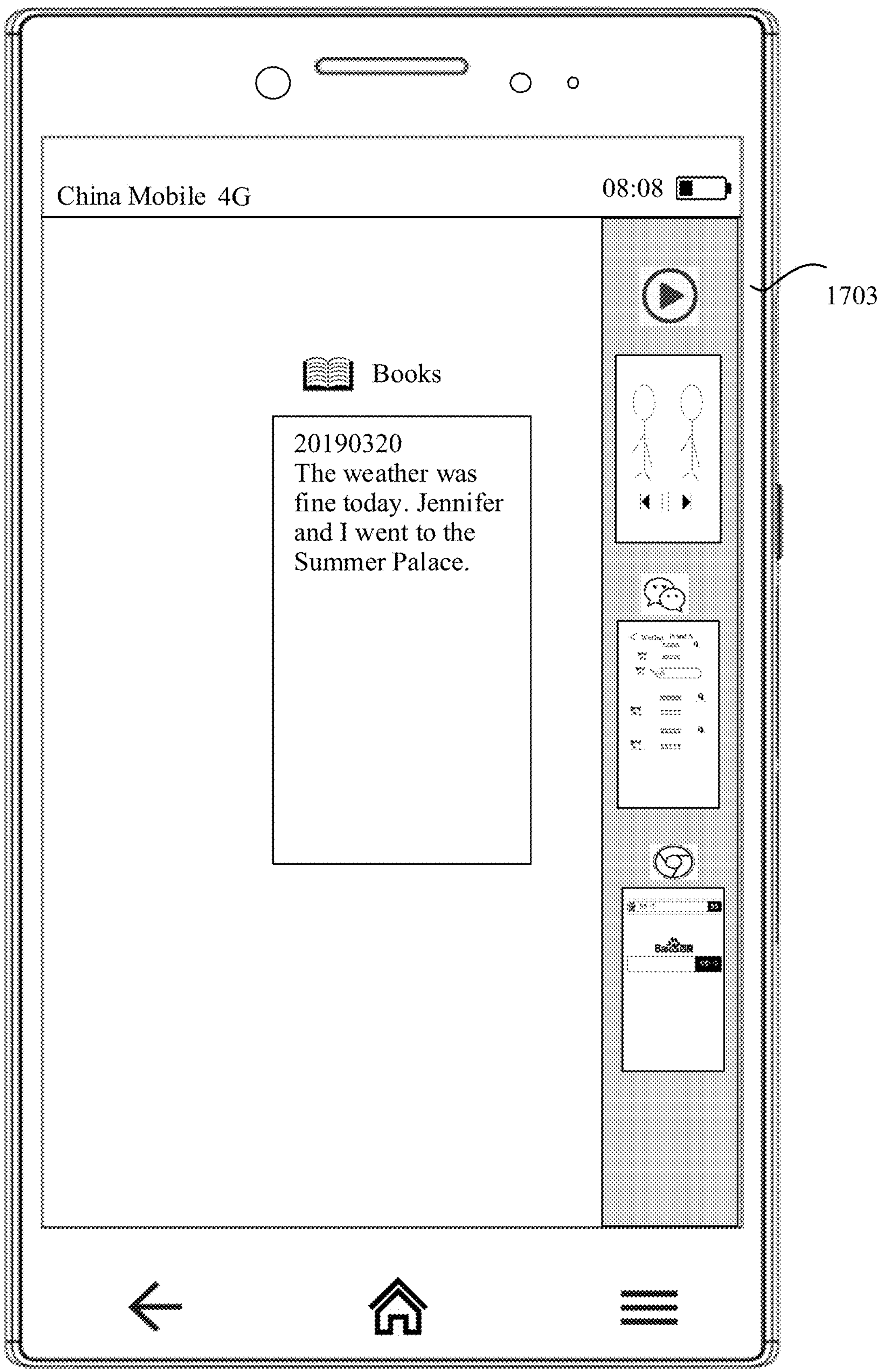
Figure 21G:
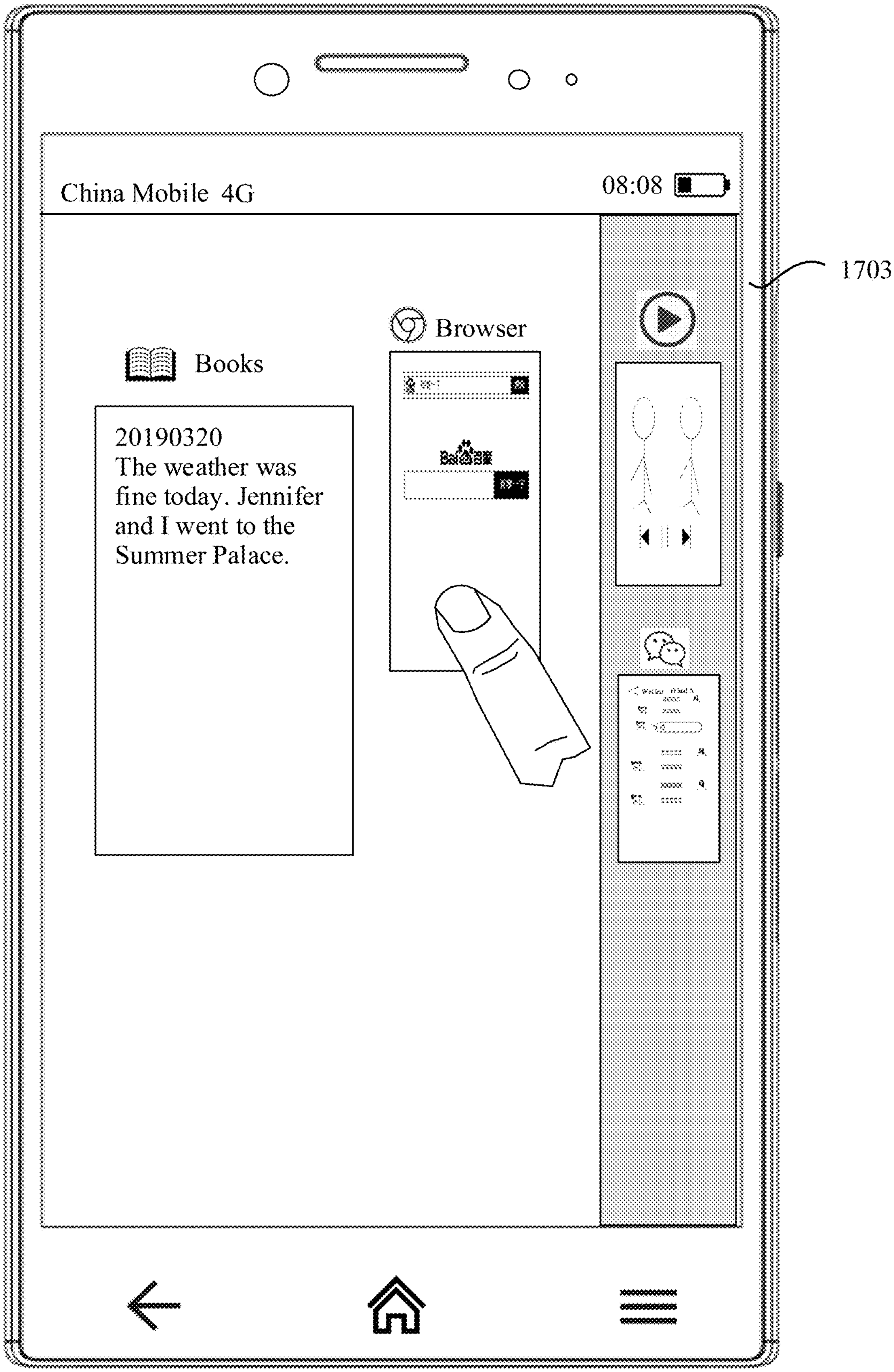
Figure 21H:
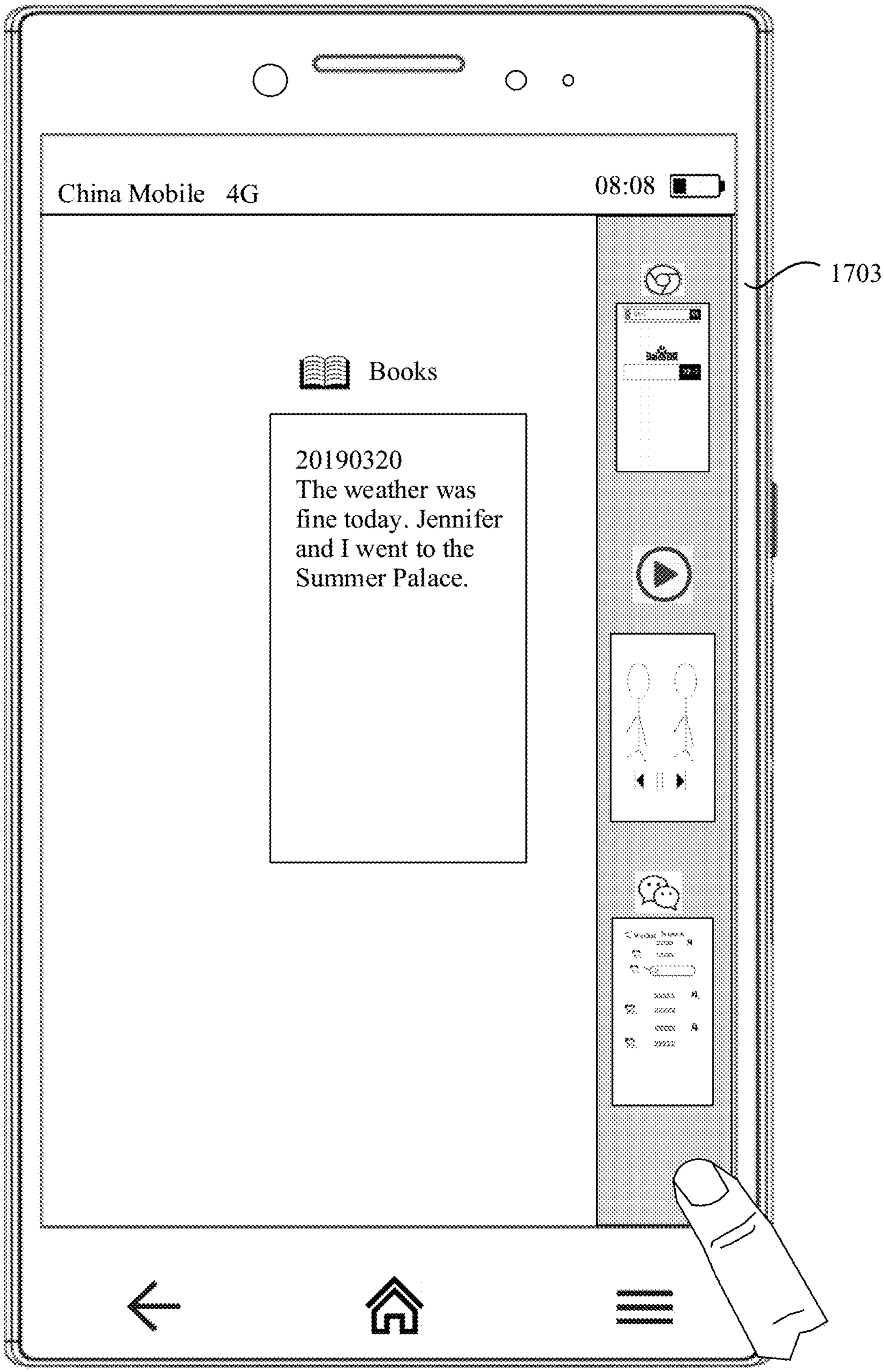
Figure 21I:
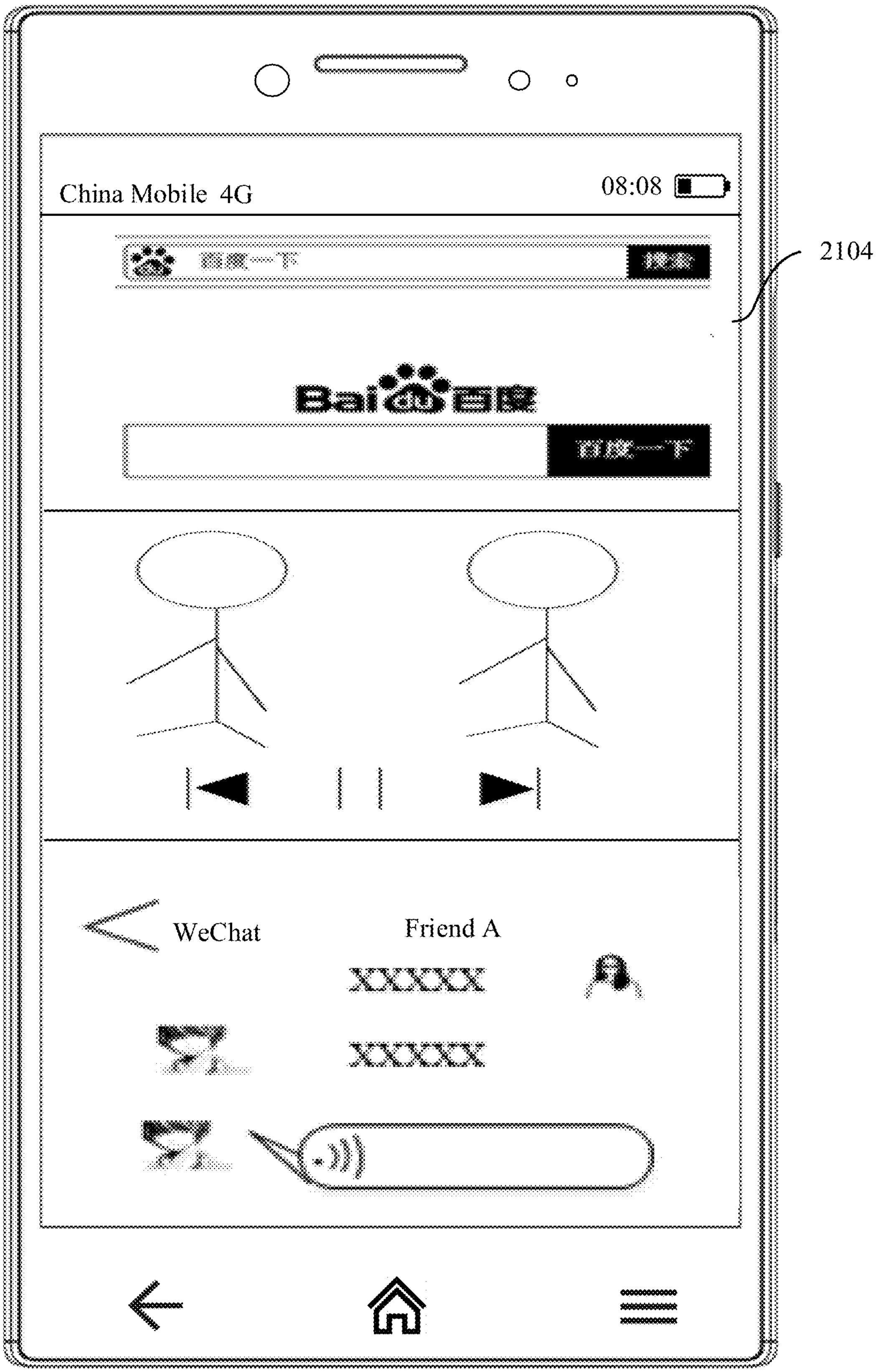

It may be understood that when a function of the electronic device is not well known to the user, the user may not know how to use the function. To better guide the user to use the interface display methods in the foregoing embodiments, an embodiment of this application provides another interface display method. As shown in FIG. 16, the method includes the following steps.

Step 1601: An electronic device displays an interface A in a display area A.

The interface A includes an application interface of a first application.

Step 1602: The electronic device receives an operation D performed by the user on the display area A.

The operation D may be used to indicate the electronic device to display application windows of one or more running applications. For example, the operation D may be sliding inward from a point on a lower edge of the display area. Alternatively, the operation A may be tapping, touching and holding, or double-tapping a multi-task button in the display area. For the operation D, refer to the description of the operation A.

Step 1603: The electronic device displays a multi-task interface Ain the display area A in response to the operation D of the user.

The multi-task interface A is a multi-task interface. The multi-task interface includes application windows of one or more running applications. For a description of the multi-task interface, refer to the interfaces 602, 802, 1101, and 1202. Details are not described herein again.

Step 1604: The electronic device receives an operation E of the user.

The operation E may be touching and holding or moving the application windows of the one or more applications. The operation D and the operation E may be one consecutive operation, or may be two operations at an interval. The operation E is used to indicate the electronic device to display another multi-task interface.

Step 1605: The electronic device displays a multi-task interface B in response to the operation E.

The multi-task interface B is the another multi-task interface. Different from the multi-task interface A, the multi-task interface B includes a first area and a second area different from the first area. An application window of the first application is displayed in the first area, and an application window of another application other than the first application is displayed in the second area. For a description of a second multi-task interface, refer to the interface 1402. Details are not described herein again.

Optionally, in response to the operation E, the electronic device may display an animation in which the application window of the first application is moved to the first area and/or an animation in which the application window of the another application other than the first application is moved to the second area. In other words, the electronic device may display a process in which the multi-task interface A changes to the multi-task interface B.

Step 1606: The electronic device receives an operation F.

For the operation F, refer to the operation C. Details are not described herein again. It should be noted that the operation F and the operation E may be one consecutive operation, or may be two operations at an interval.

Step 1607: In response to the operation F, the electronic device displays application interfaces of applications in different areas based on application windows, of the applications, that are included in the first area.

For a description of step 1607, refer to step 1305. Details are not described herein again.

For ease of understanding, the following specifically describes the method shown in FIG. 16 with reference to application scenarios. FIG. 17(*a*) to FIG. 17(*i*) are schematic diagrams of a scenario of the another interface display method according to an embodiment of this application.

As shown in FIG. 17(*a*), the electronic device displays an interface 1701 in a display area 600. The interface 1701 is an interface of "Player". The electronic device runs one or more applications in a background. For example, "WeChat", "Browser", and "Books" run in the background. The user taps a button 6011. As shown in FIG. 17(*b*), in response to that the user taps the button 6011, the electronic device displays a multi-task interface (for example, an interface 1702). The interface 1702 includes application windows of "Player", "WeChat", "Browser", and "Books". The electronic device arranges the application windows based on running time of the applications. From right to left, the application windows are the application window of "Player", the application window of "WeChat", the application window of "Browser", and the application window of "Books". As shown in FIG. 17(*c*), the user moves application windows of the one or more applications. For example, the user moves the application window of "WeChat". As shown in FIG. 17(*d*) to FIG. 17(*f*), in response to that the user moves the application windows of the one or more applications, the electronic device displays a multi-task interface (for example, an interface 1703). The interface 1703 includes a first area and a second area. In this case, the application window of "Player" is displayed in the first area, and application windows of other applications are displayed in the second area. For descriptions of the first area and the second area, refer to the foregoing embodiments. Details are not described herein again. As shown in FIG. 17(*g*) to FIG. 17(*h*), the user moves the application window of "WeChat" to the first area. Optionally, the application window of "WeChat" may gradually become smaller until a width of the application window is less than a width of the first area and the application window is placed in the first area. As shown in FIG. 17(*i*), in response to that the application window of "WeChat" is moved to the first area, the electronic device displays an interface 1704. The interface 1704 includes an interface of "Player" and an interface of "WeChat". The electronic device displays the interface of "Player" and the interface of "WeChat" in different areas.

Optionally, as shown in FIG. 17(*d*) and FIG. 17(*e*), after the user moves the application window of "WeChat" and before the electronic device displays the interface, the electronic device may display an animation in which the application window of the first application (for example, the application window of "Player") is moved to the first area. Optionally, the application window of "Player" may gradually become smaller until a width of the application window is less than or equal to the width of the first area. In other words, the electronic device may display a process in which the interface 1702 changes to the interface 1703.

It should be noted that, as shown in FIG. 18(*a*) to FIG. 18(*f*), the user may move application windows of a plurality of applications by using a multi-point operation. The electronic device displays the interface 1701 in the display area 600. The user taps the button 6011. As shown in FIG. 18(*a*), in response to that the user taps the button 6011, the electronic device displays the interface 1702. Still as shown in FIG. 18(*a*), the user moves the application windows of "WeChat" and "Browser". As shown in FIG. 18(*c*), in response to that the user moves the application windows of "WeChat" and "Browser", the electronic device displays the interface 1703. As shown in FIG. 18(*d*) and FIG. 18(*e*), then, the user moves the application windows of "WeChat" and "Browser" to the first area. As shown in FIG. 18(*f*), in response to that the application windows of "WeChat" and "Browser" are moved to the first area, the electronic device displays an interface 1804. The interface 1804 includes the interface of "Player", the interface of "WeChat", and the interface of "Browser". The electronic device displays the interface of "Player", the interface of "WeChat", and the interface of "Browser" in different areas.

It may be understood that once an application window is moved to the first area, the electronic device displays the interface 1804. This is inconvenient for the user to separately adjust positions of application windows of a plurality of second applications in the first area. Therefore, optionally, the electronic device may display the interfaces of the applications in different areas after receiving the operation F. In other words, the electronic device does not perform area-based display until the electronic device receives the operation F of the user (for example, the operation of tapping the first area by the user). Therefore, before the electronic device receives the operation F, the user may adjust positions of the application windows of the one or more applications in the first area, move the application windows of the one or more applications out of the first area, or move in application windows of one or more applications to the first area.

FIG. 19(*a*) to FIG. 19(*i*) are schematic diagrams of a scenario of another interface display method.

As shown in FIG. 19(*a*), the electronic device displays an interface 1701. The user taps a multi-task button 6011. As shown in FIG. 19(*b*), in response to that the user taps the multi-task button 6011, the electronic device displays an interface 1702. Then, as shown in FIG. 19(*b*) and FIG. 19(*c*), the user touches and holds an application window of "WeChat". As shown in FIG. 19(*d*), in response to that the user touches and holds the application window of "WeChat", the electronic device displays an interface 1703. As shown in FIG. 19(*d*) to FIG. 19(*g*), after moving the application window of "WeChat" to a first area, the user moves an application window of "Browser" to the first area. As shown in FIG. 19(*h*), the user taps the first area. In this case, the first area includes application windows of three applications. From top to bottom, the application windows are the application window of "Browser", an application window of "Player", and the application window of "WeChat". As shown in FIG. 19(*i*), in response to the operation of tapping the first area by the user, the electronic device displays an interface 1904. The interface 1904 includes an interface of "WeChat", an interface of "Player", and an interface of "Browser". An upper third of the interface is the interface of "Browser", a middle third of the interface is the interface of "Player", and a lower third of the interface is the interface of "WeChat". The electronic device displays the interface of "WeChat", the interface of "Player", and the interface of "Browser" in different areas.

In conclusion, the user may sequentially operate one or more application windows to move the application windows to the first area. In addition, different from the interface display method in FIG. 18(*a*) to FIG. 18(*f*), the interface display method in FIG. 19(*a*) to FIG. 19(*i*) facilitates the user to move the application window of "WeChat" and the application window of "Browser" to different positions in the first area.

It should be noted that, before the user taps the first area, the user may move application windows of any one or more applications out of the first area. The any one or more applications may include the first application. For example, after moving an application window of "Books" to the first area, the user moves the application window of "Books" out of the first area, and then taps the first area. In this case, the electronic device does not display an application interface of "Books" in an area-based manner.

It should be noted that, before the user taps the first area, the user may adjust positions of the application windows of the any one or more applications in the first area. FIG. 20(*a*)-1 to FIG. 20(*d*)-2 are schematic diagrams of a scenario of another interface display method. FIG. 20(*a*)-1 to FIG. 20(*d*)-2 separately show different interfaces (for example, an interface 2001, an interface 2002, an interface 2003, and an interface 2004) displayed by the electronic device based on different positions of the application windows in the first area.

It may be understood that an operation of moving an application window to the first area is complex. Therefore, to simplify an operation of moving the second application to the first area, alternatively, the user may tap, double-tap, or touch and hold the application window to move the application window to the first area. FIG. 21(*a*) to FIG. 21(*i*) are schematic diagrams of a scenario of the another interface display method according to an embodiment of this application.

As shown in FIG. 21(*a*), the electronic device displays an interface 1701. The user taps a multi-task button 6011. As shown in FIG. 21(*b*), in response to that the user taps the multi-task button 6011, the electronic device displays an interface 1702. Then, as shown in FIG. 21(*b*) and FIG. 21(*c*), the user touches and holds an application window of an application (for example, "Player"). As shown in FIG. 21(*d*), in response to that the user touches and holds the application window of the application, the electronic device displays an interface 1703. As shown in FIG. 21(*d*), the user taps an application window of "WeChat". As shown in FIG. 21(*e*), in response to that the user taps the application window of "WeChat", the electronic device moves the application window of "WeChat" to a first area. In this case, the application window of "WeChat" is located below the application window of "Player". Still as shown in FIG. 21(*e*), the electronic device taps an application window of "Browser". As shown in FIG. 21(*f*), in response to that the user taps the application window of "Browser", the electronic device moves the application window of "Browser" to the first area. In this case, the application window of "Browser" is located below the application window of "WeChat". As shown in FIG. 21(*g*) to FIG. 21(*h*), the user moves the application window of "Browser" above the application window of "Player".

Then, still as shown in FIG. 21(*h*), the user taps the first area. In this case, the first area includes application windows of three applications. From top to bottom, the application windows are the application window of "Browser", the application window of "Player", and the application window of "WeChat". As shown in FIG. 21(*i*), in response to that the user taps the first area, the electronic device displays an interface 2104. The interface 2104 includes an interface of "WeChat", an interface of "Player", and an interface of "Browser". An upper third of the interface is the interface of "Browser", a middle third of the interface is the interface of "Player", and a lower third of the interface is the interface of "WeChat". In other words, the electronic device displays the interface of "WeChat", the interface of "Player", and the interface of "Browser" in different areas.

In other words, the user may first tap or double-tap or touch and hold an application window of an application to move the application window of the application to the first area, and then adjust a position of the application window of the application by moving the application window of the application. Finally, the user taps the first area. In response to that the user taps the first area, the electronic device displays an application interface of the application in an area-based manner.

It should be noted that, in the foregoing embodiment, tapping the first area is used as an example for description. It may be understood that the tapping the first area may be replaced with another operation, for example, double-tapping a second area.

It should be noted that, in FIG. 19(*a*) to FIG. 21(*i*), a method in which a multi-task interface is first displayed and then another multi-task interface is displayed is used as an example for description. It may be understood that the embodiments in FIG. 19(*a*) to FIG. 21(*i*) are applicable to the method described in FIG. 13 to FIG. 14(*i*).

Figure 22A:
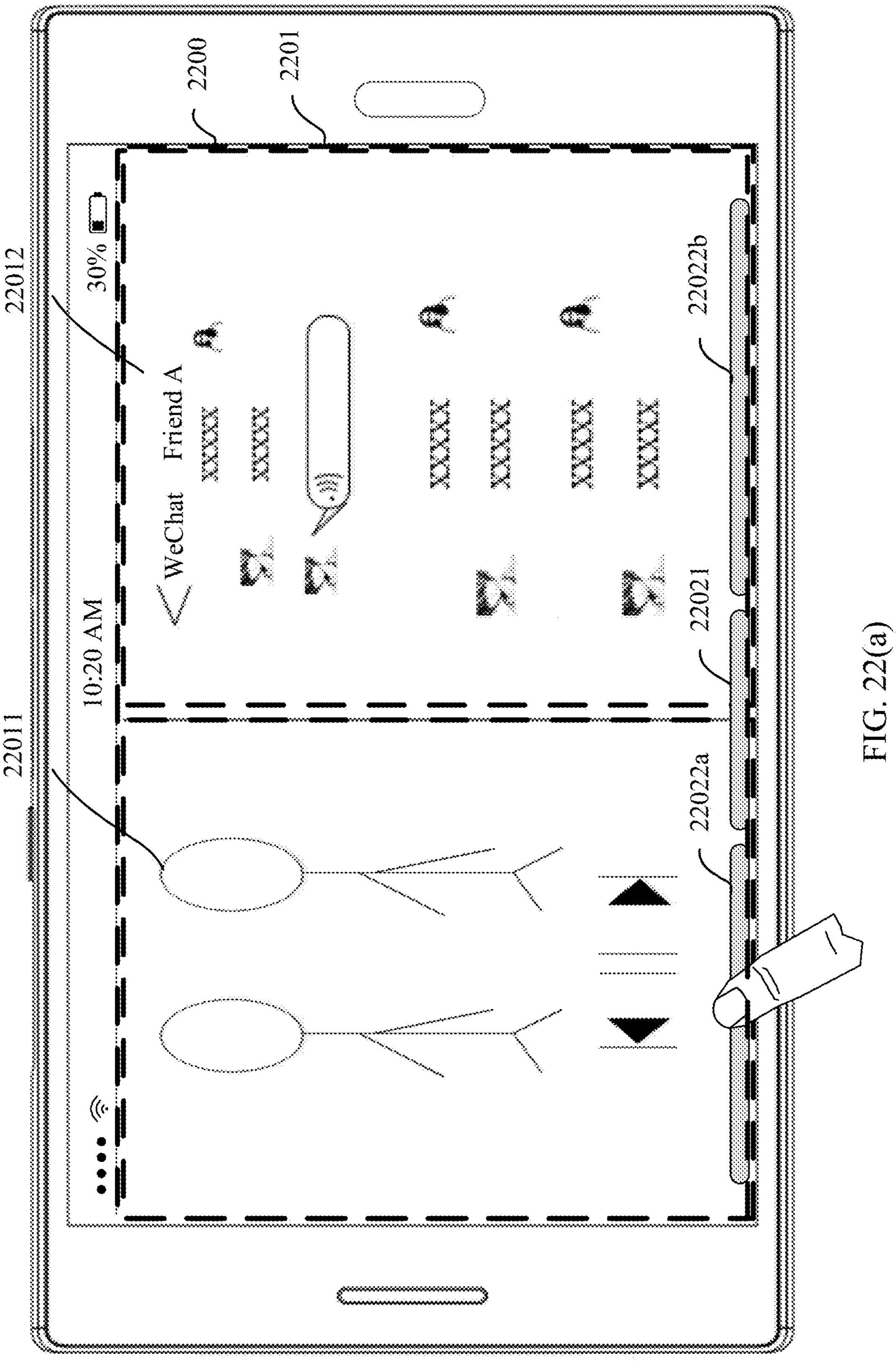
FIG. 22(*a*) to FIG. 22(*c*) are schematic diagrams of a scenario of another interface display method according to an embodiment of this application.
Figure 22B:
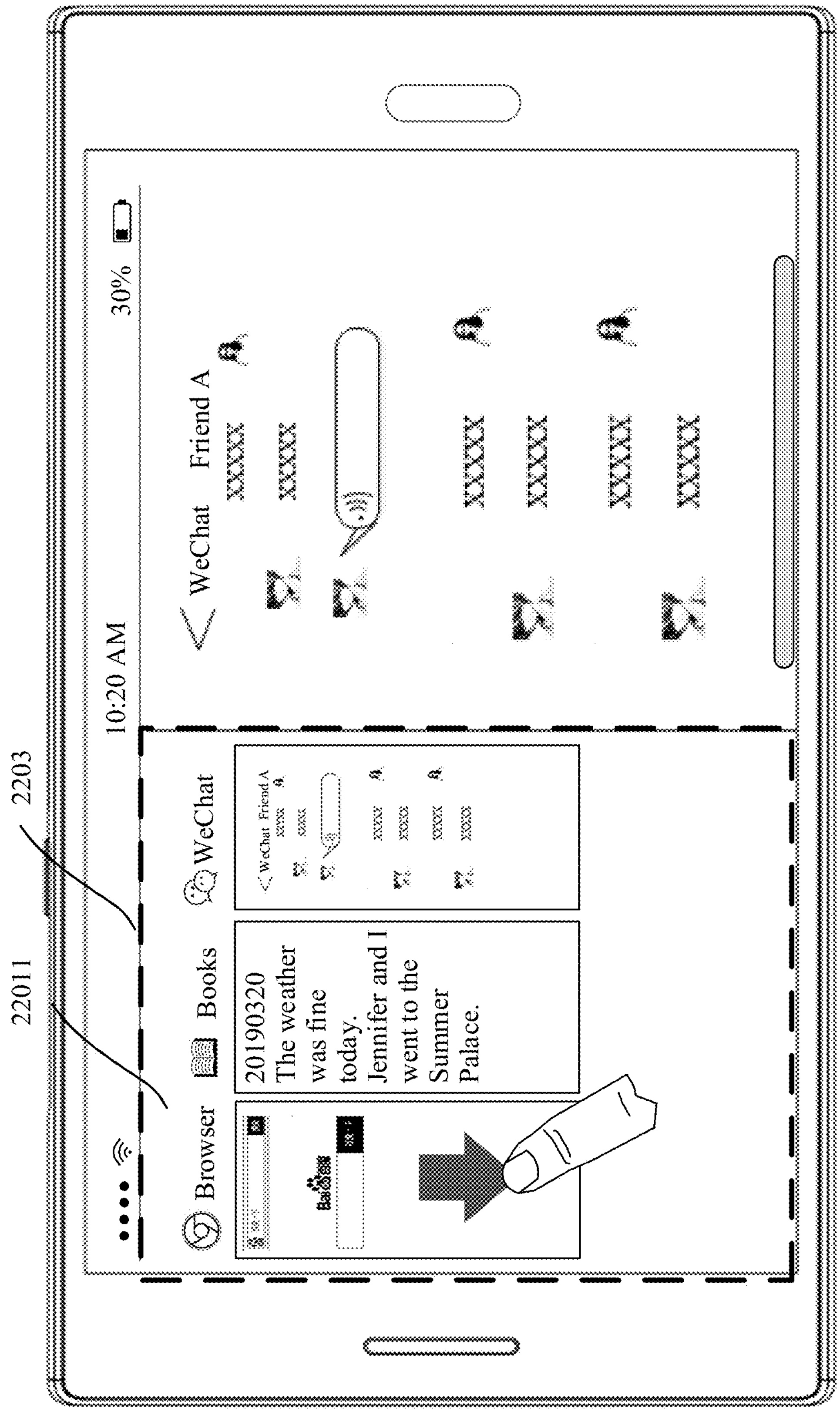
Figure 22C:
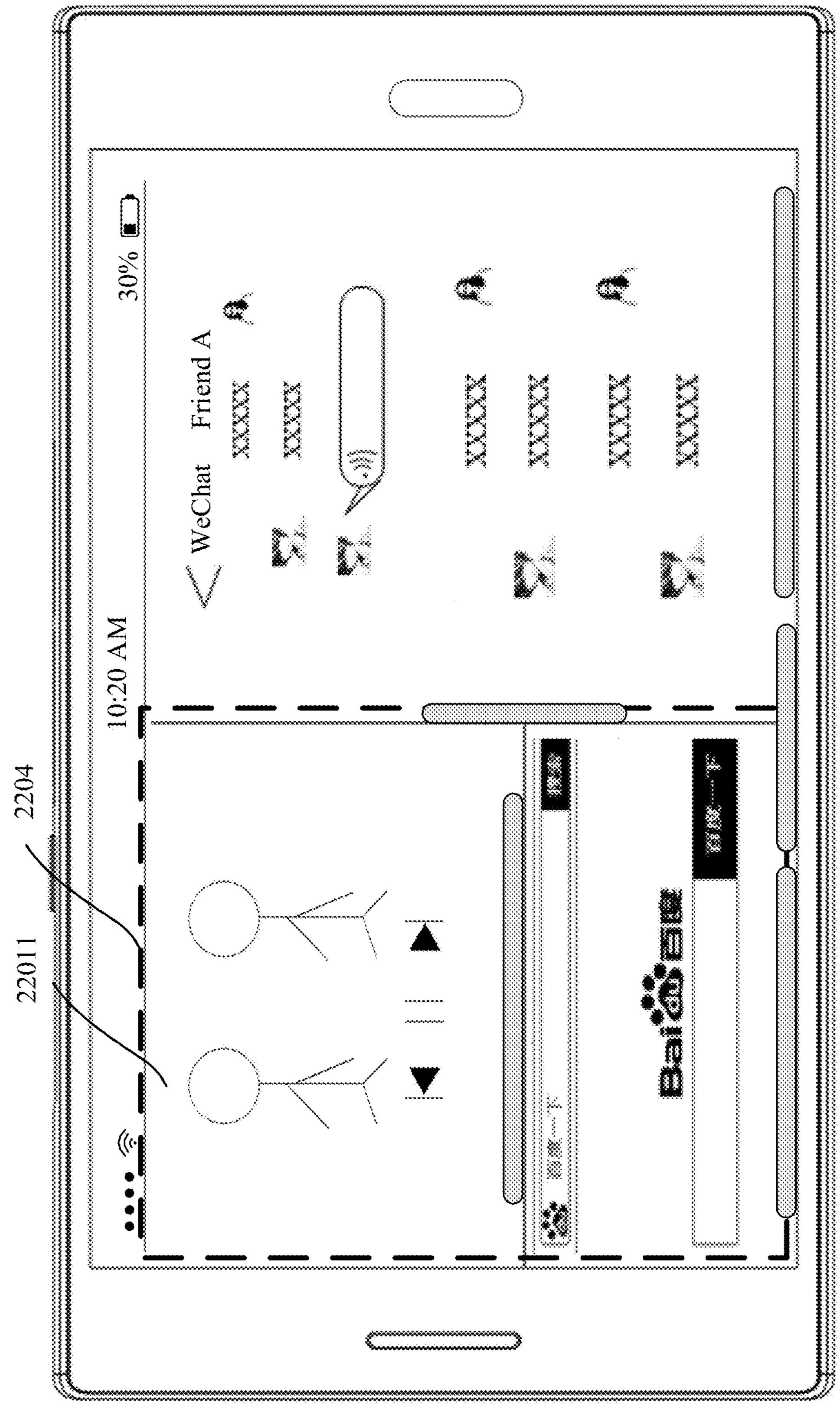

It should be noted that the interface display methods described in FIG. 5 to FIG. 21(*i*) are described by using an example in which the display area A is the display area 600. It may be understood that the display area includes but is not limited thereto. The display area A may be any area on the display 194. For example, in an interface display method shown in FIG. 22(*a*) to FIG. 22(*c*), the display area may be a partial display area of the display 194. In this case, the electronic device may change display of one or more display areas without changing display of another display area. FIG. 22(*a*) to FIG. 22(*c*) are schematic diagrams of a scenario of another interface display method according to an embodiment of this application.

Figure 32A:
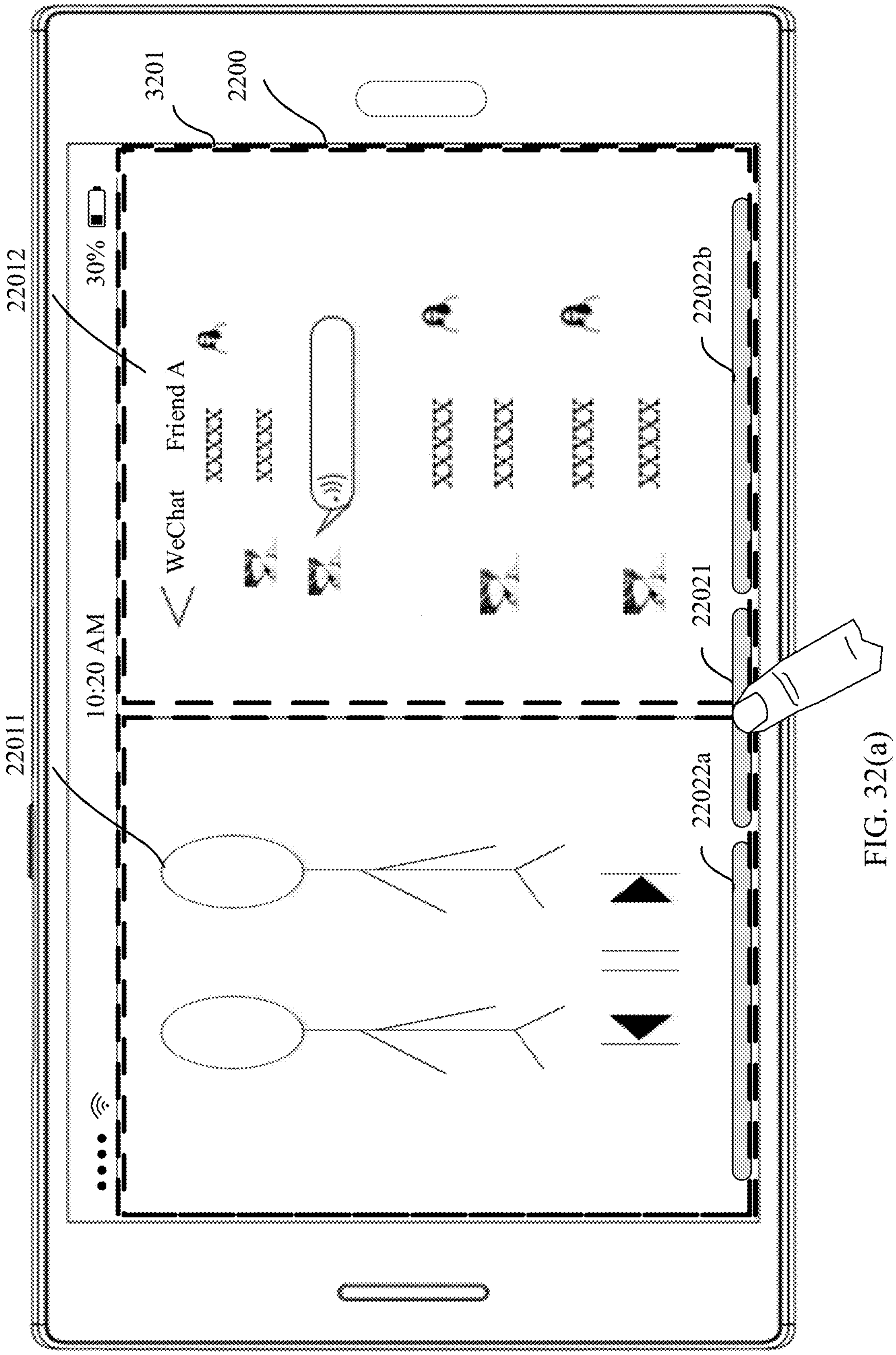
FIG. 32(*a*) to FIG. 32(*c*) are schematic diagrams of a scenario of another interface display method according to an embodiment of this application.
Figure 32B:
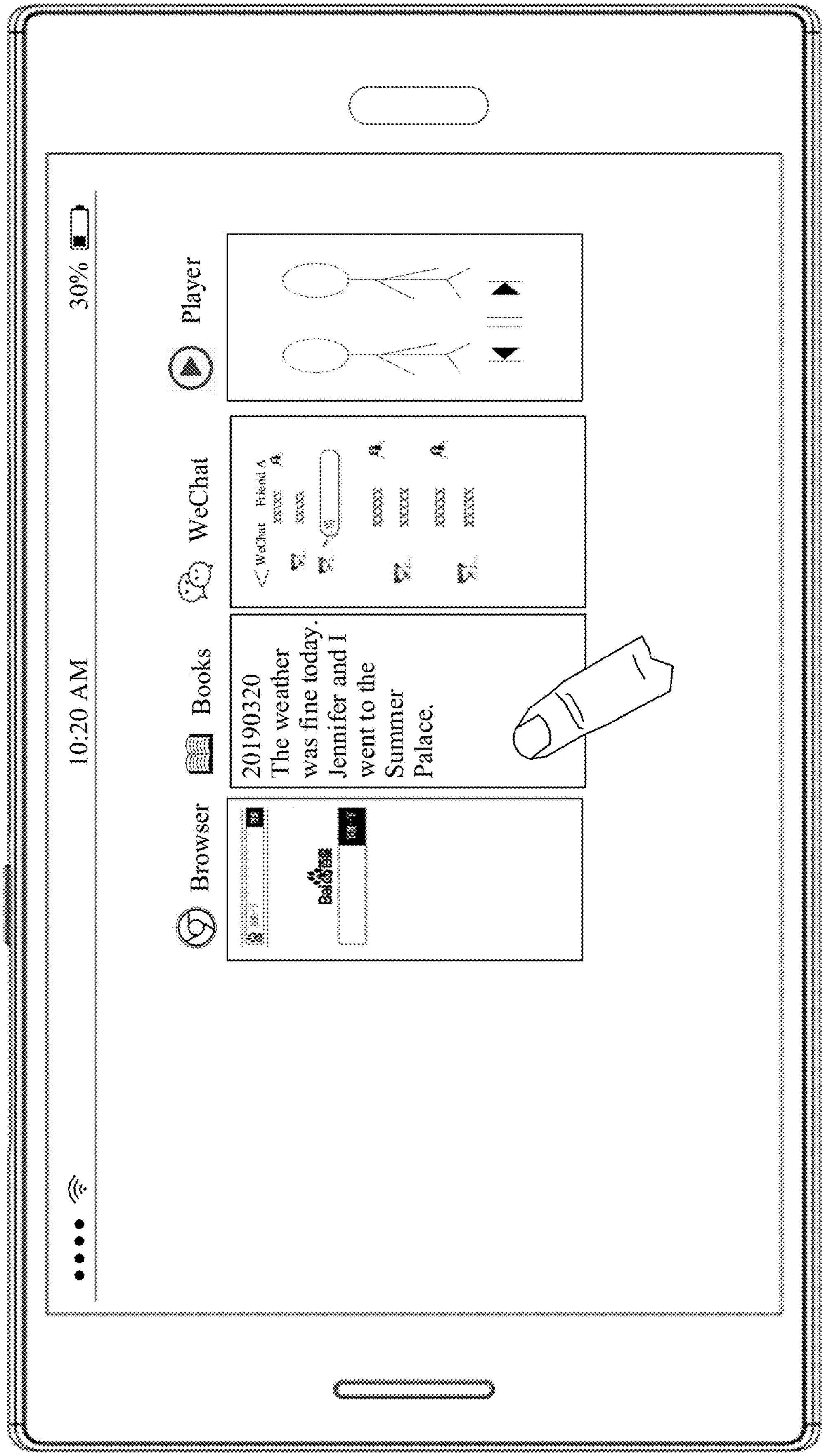
Figure 32C:
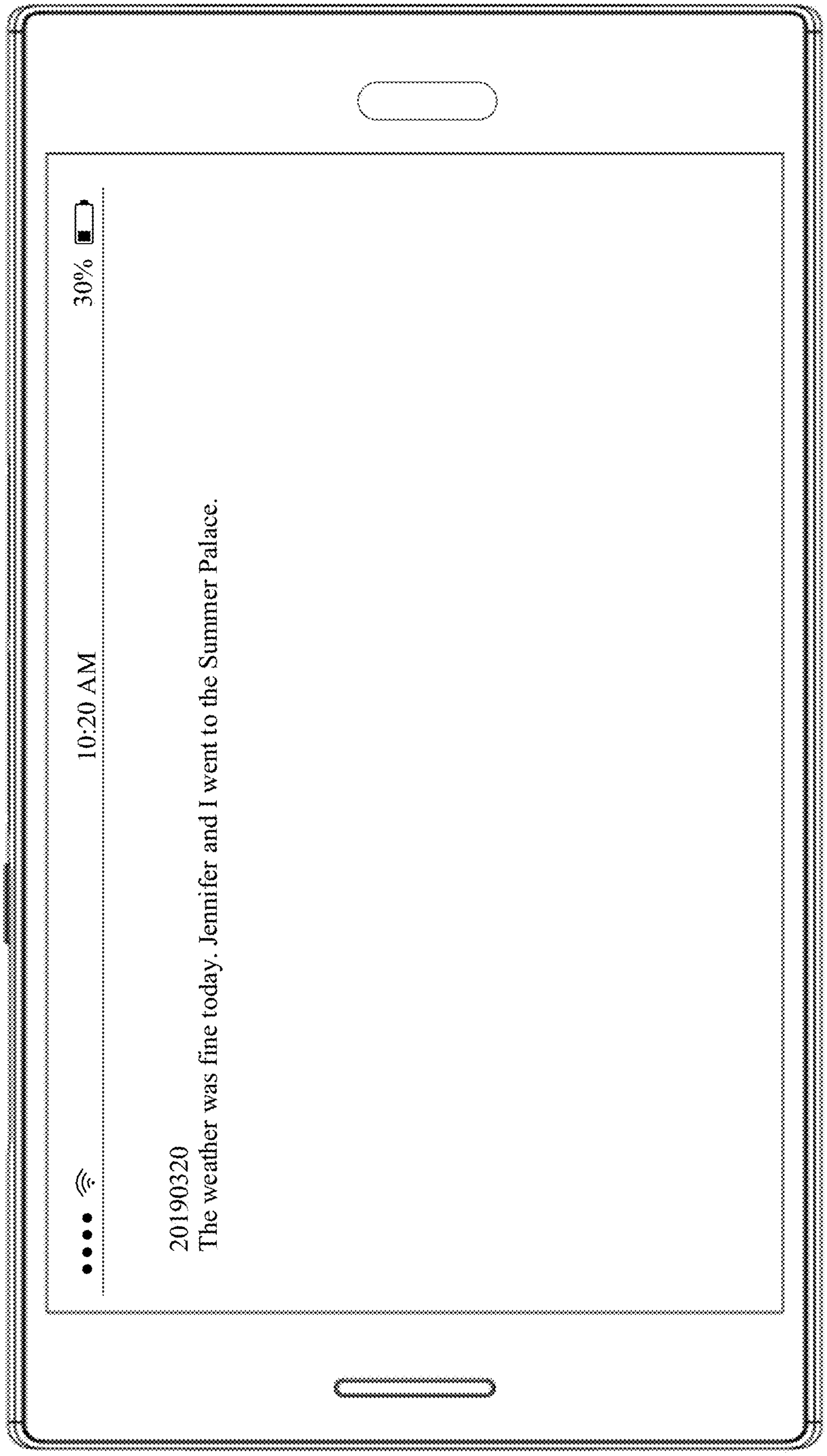
Figure 33A:
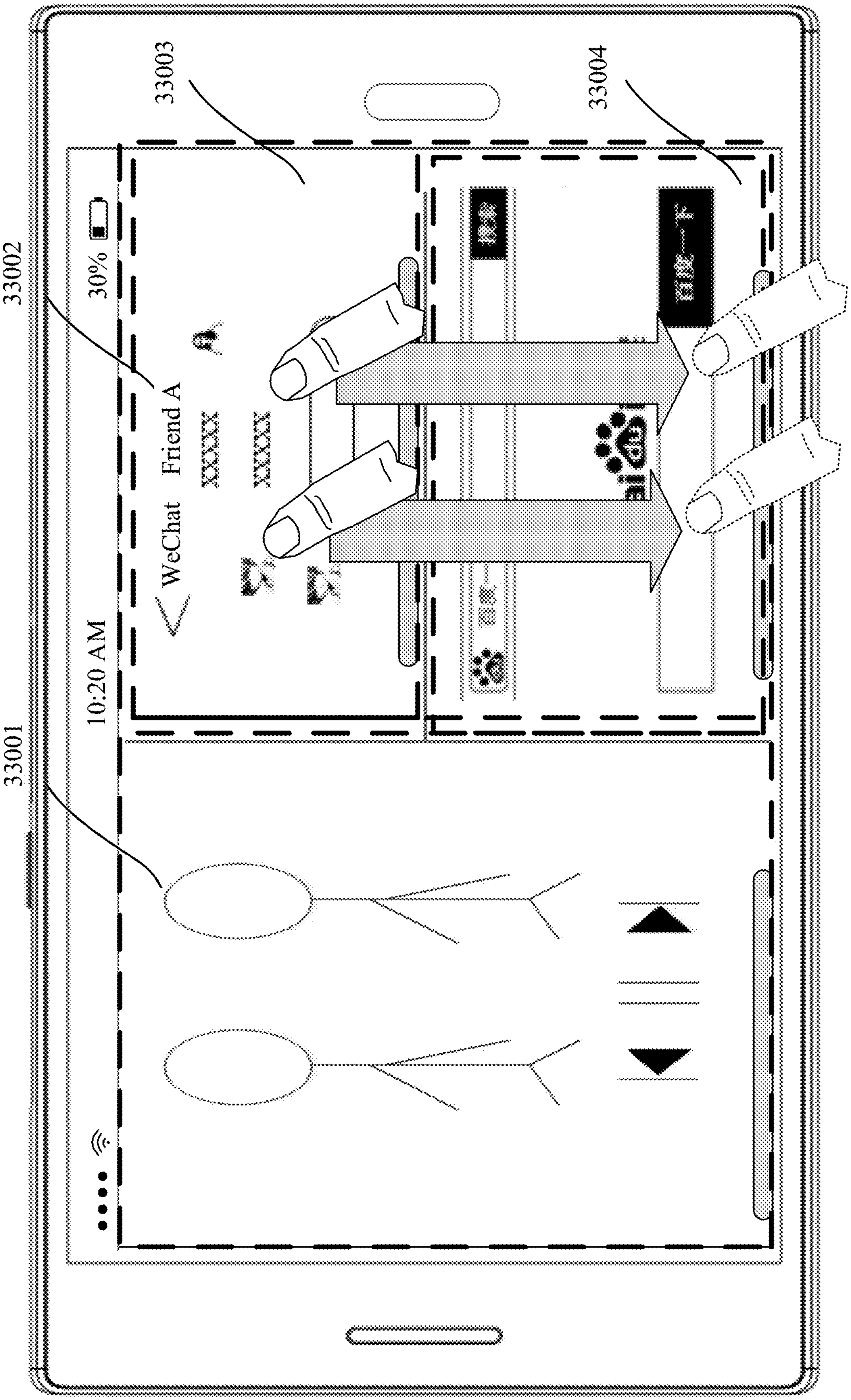
FIG. 33(*a*) to FIG. 33(*f*) are schematic diagrams of a scenario of another interface display method according to an embodiment of this application.
Figure 33B:
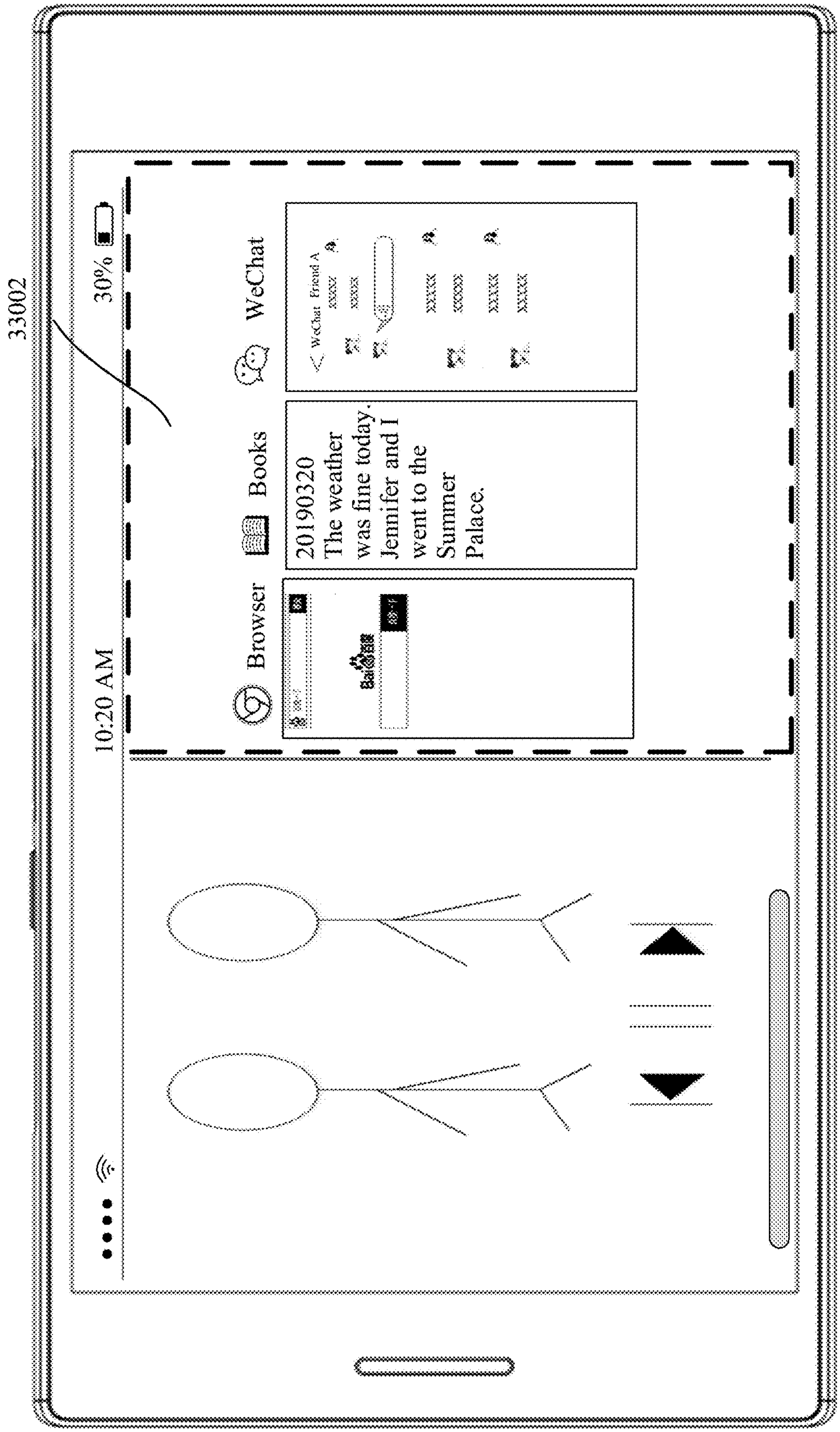
Figure 33C:
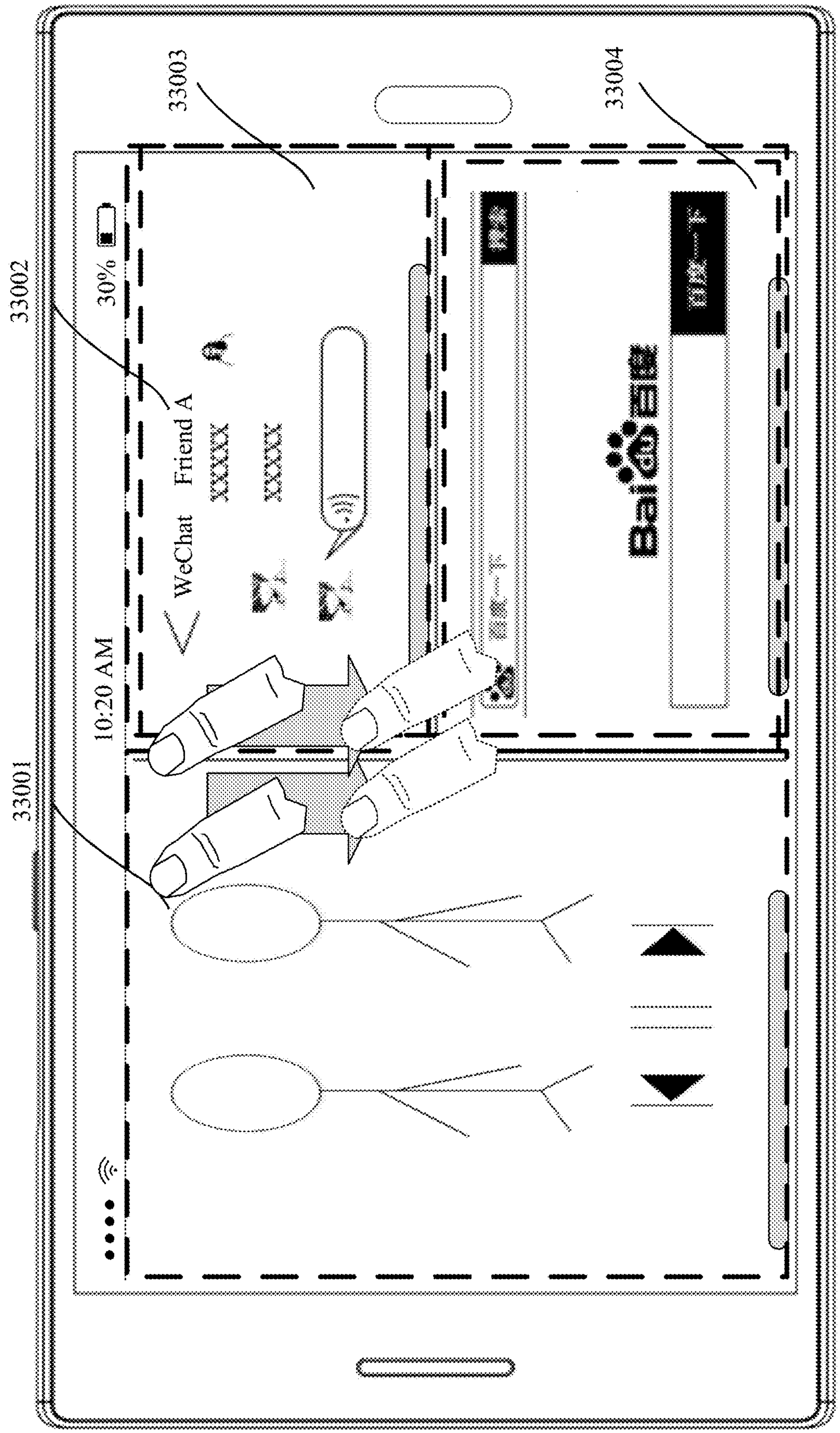
Figure 33D:
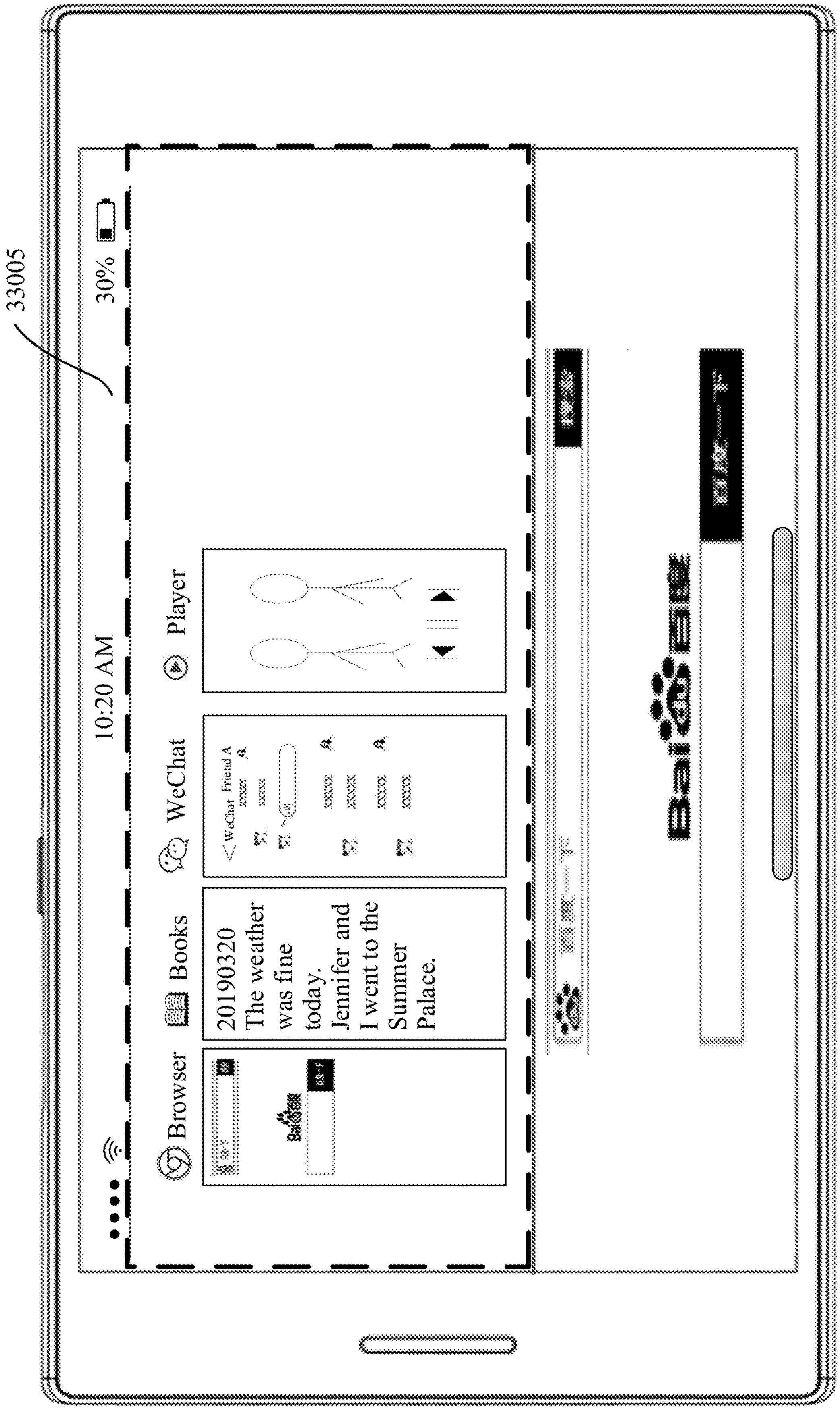
Figure 33E:
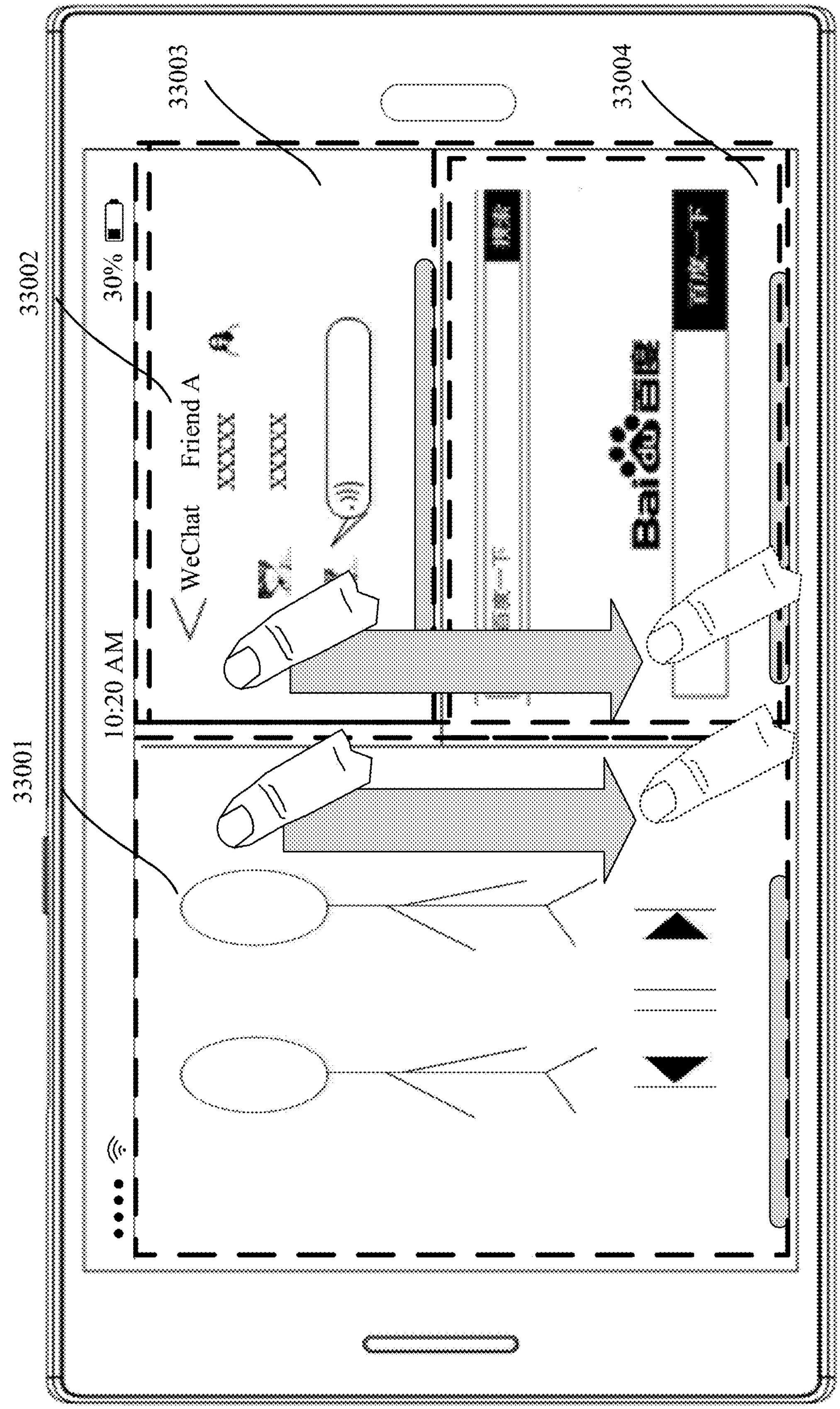
Figure 33F:
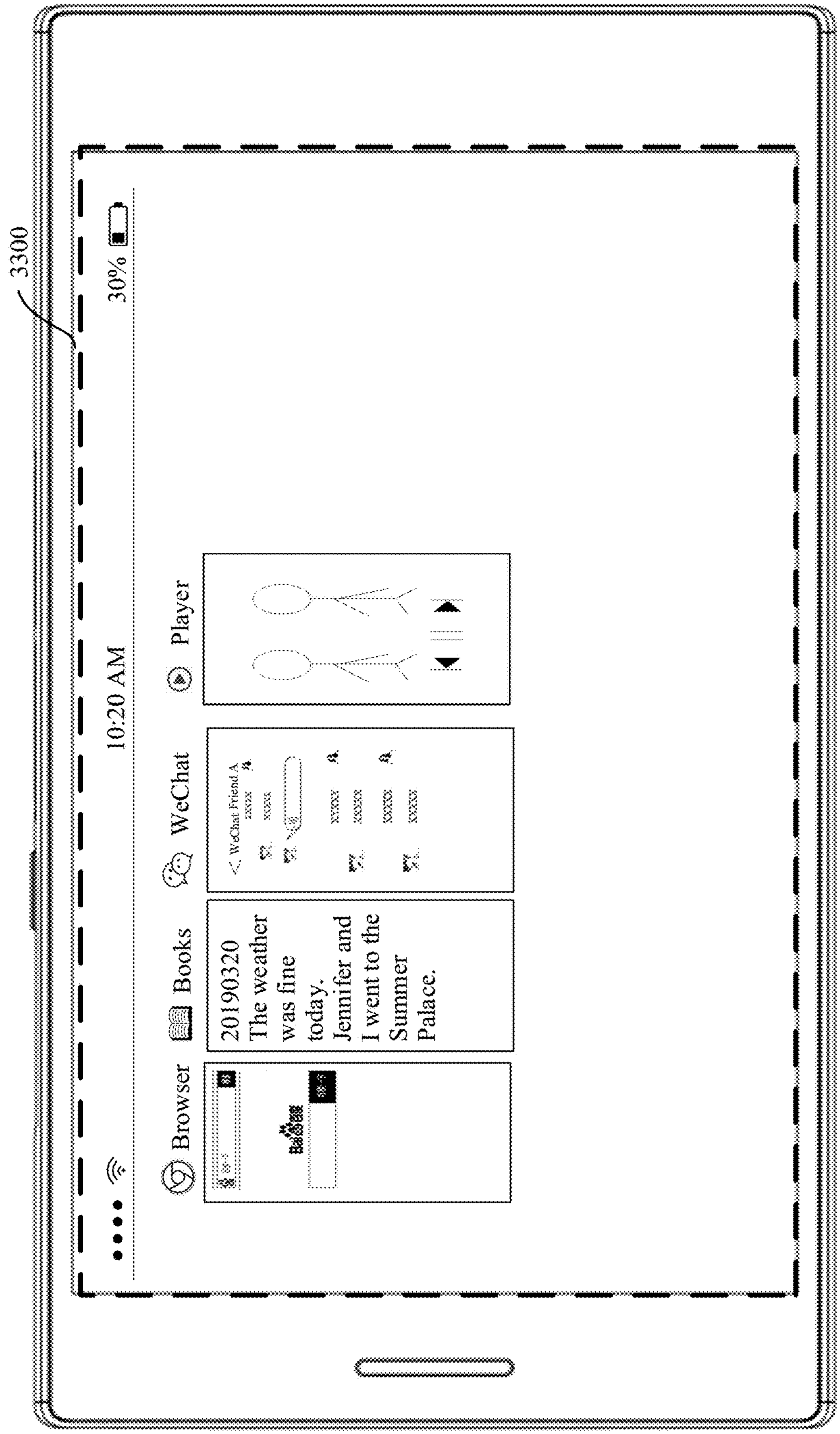
Figures 1, 34A:
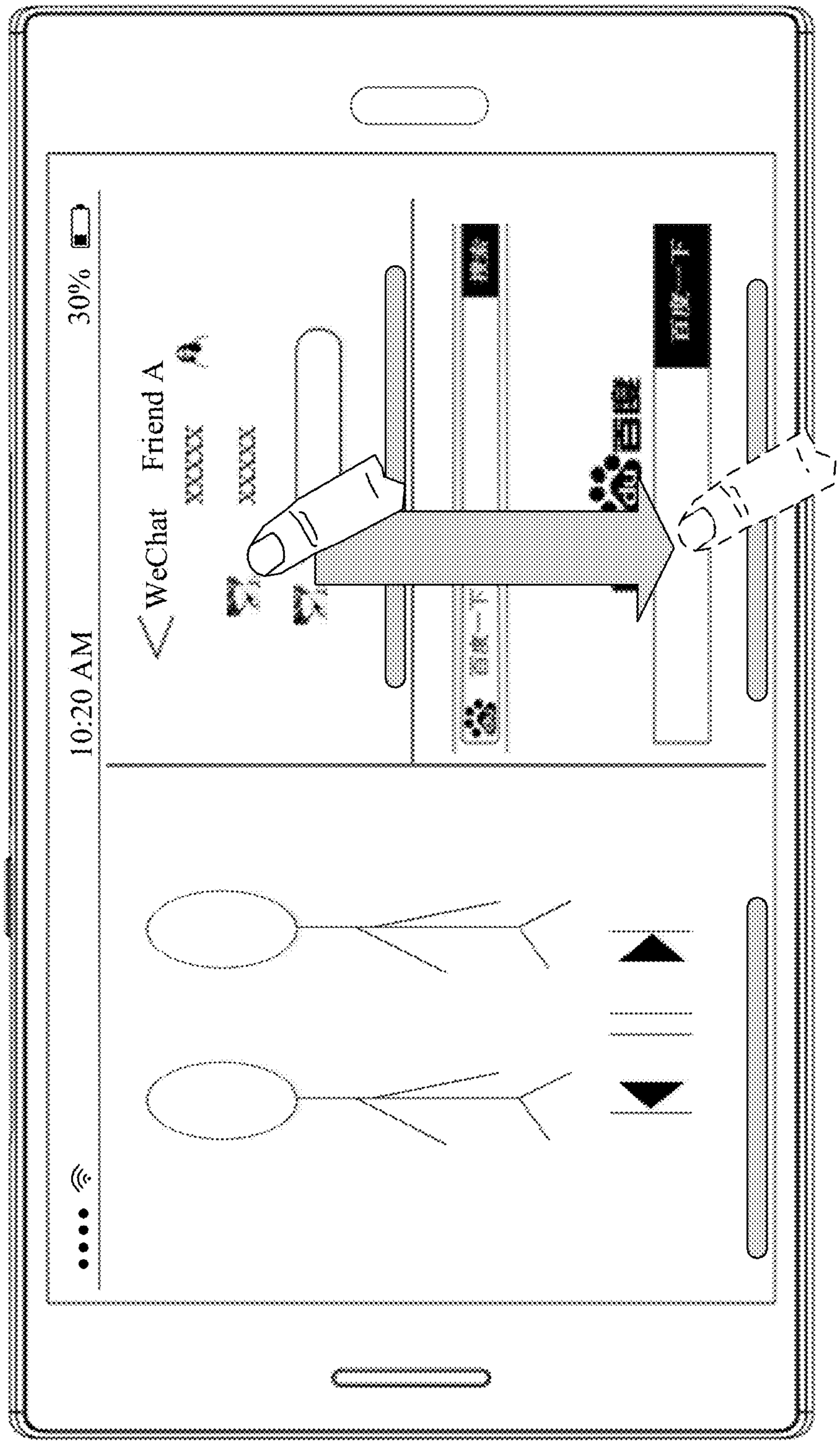
FIG. 34(*a*)-1 to FIG. 34(*c*)-2 are schematic diagrams of a scenario of another interface display method according to an embodiment of this application.
Figures 2, 34A:
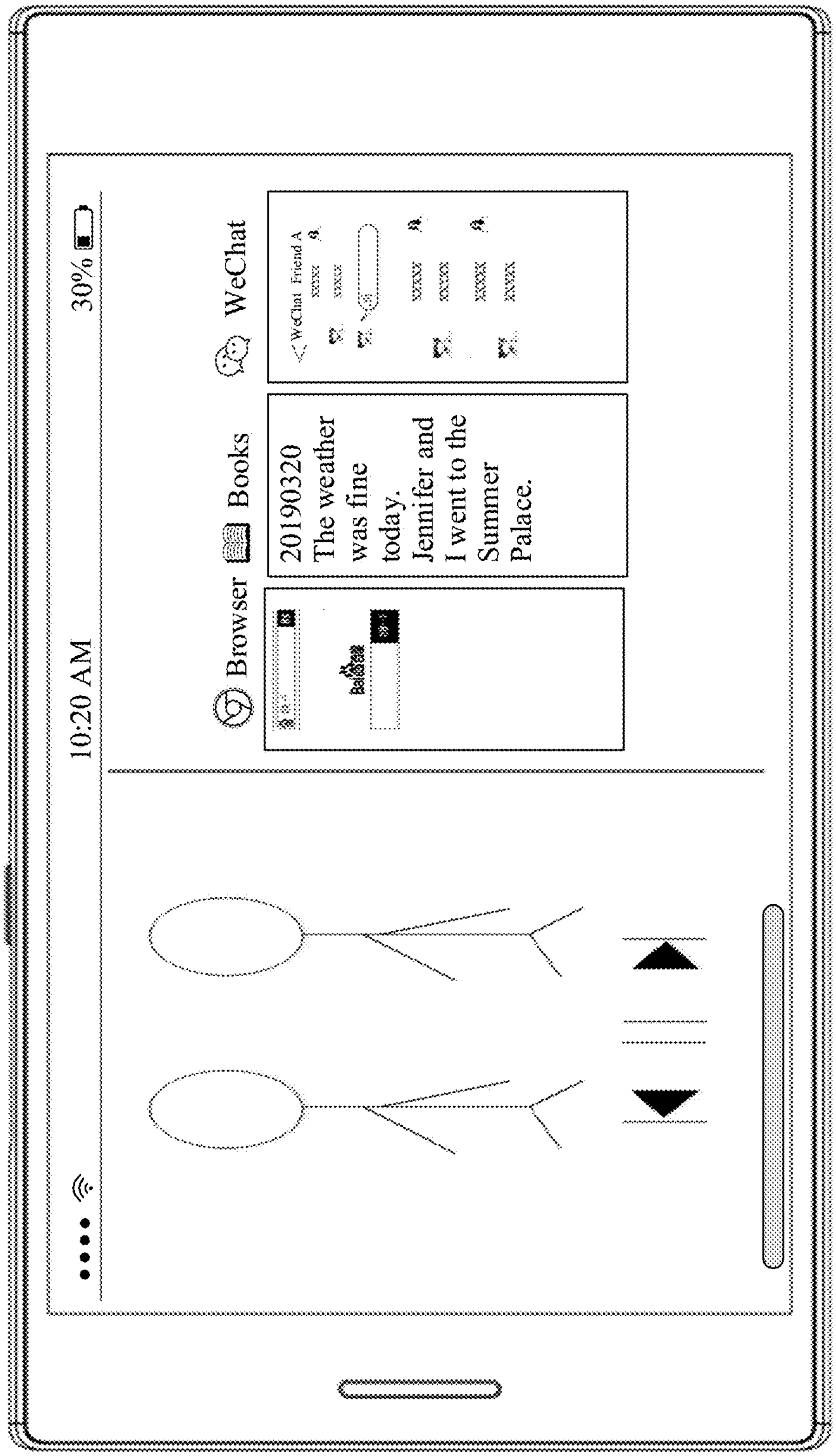
Figures 1, 34B:
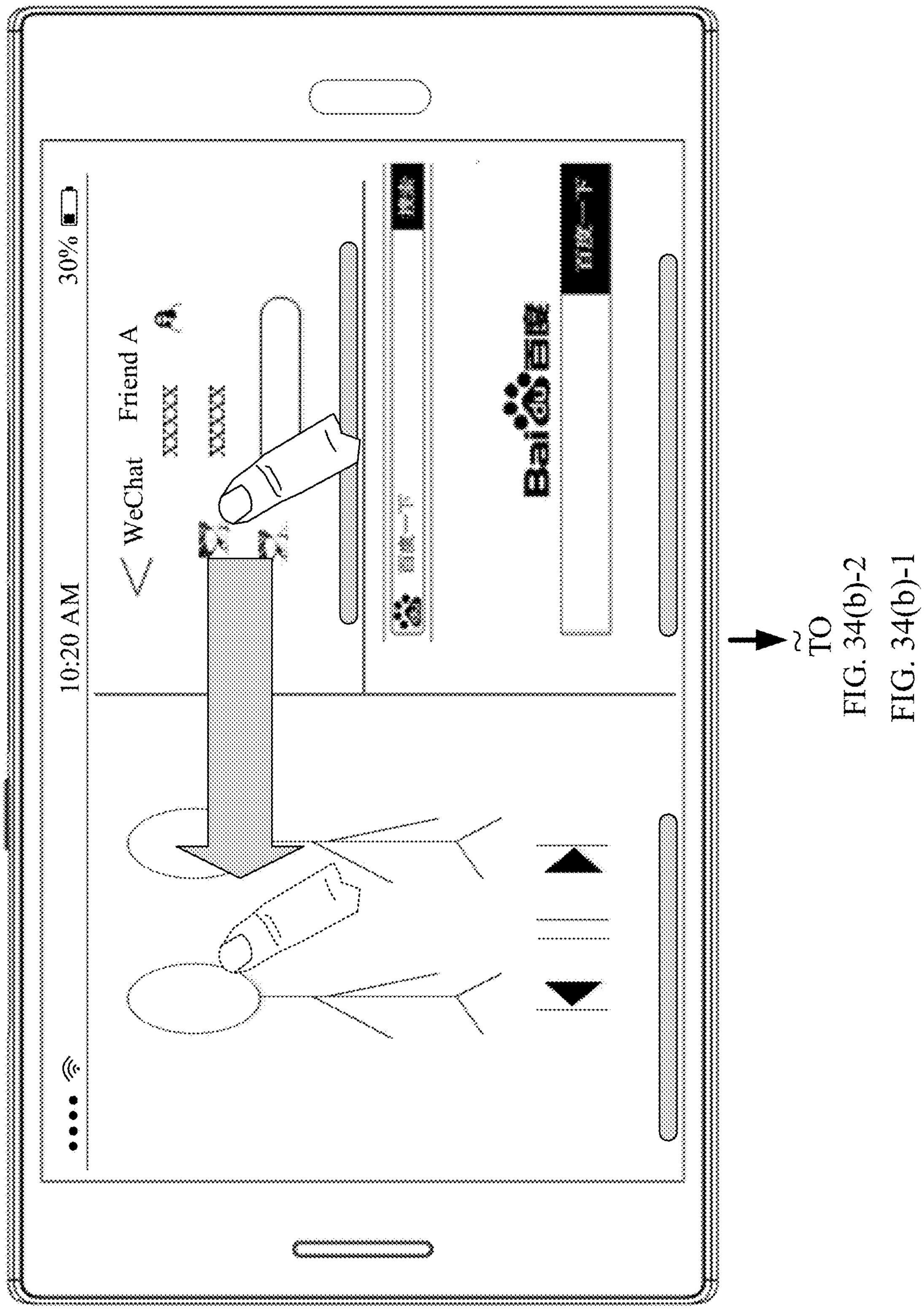
Figures 2, 34B:
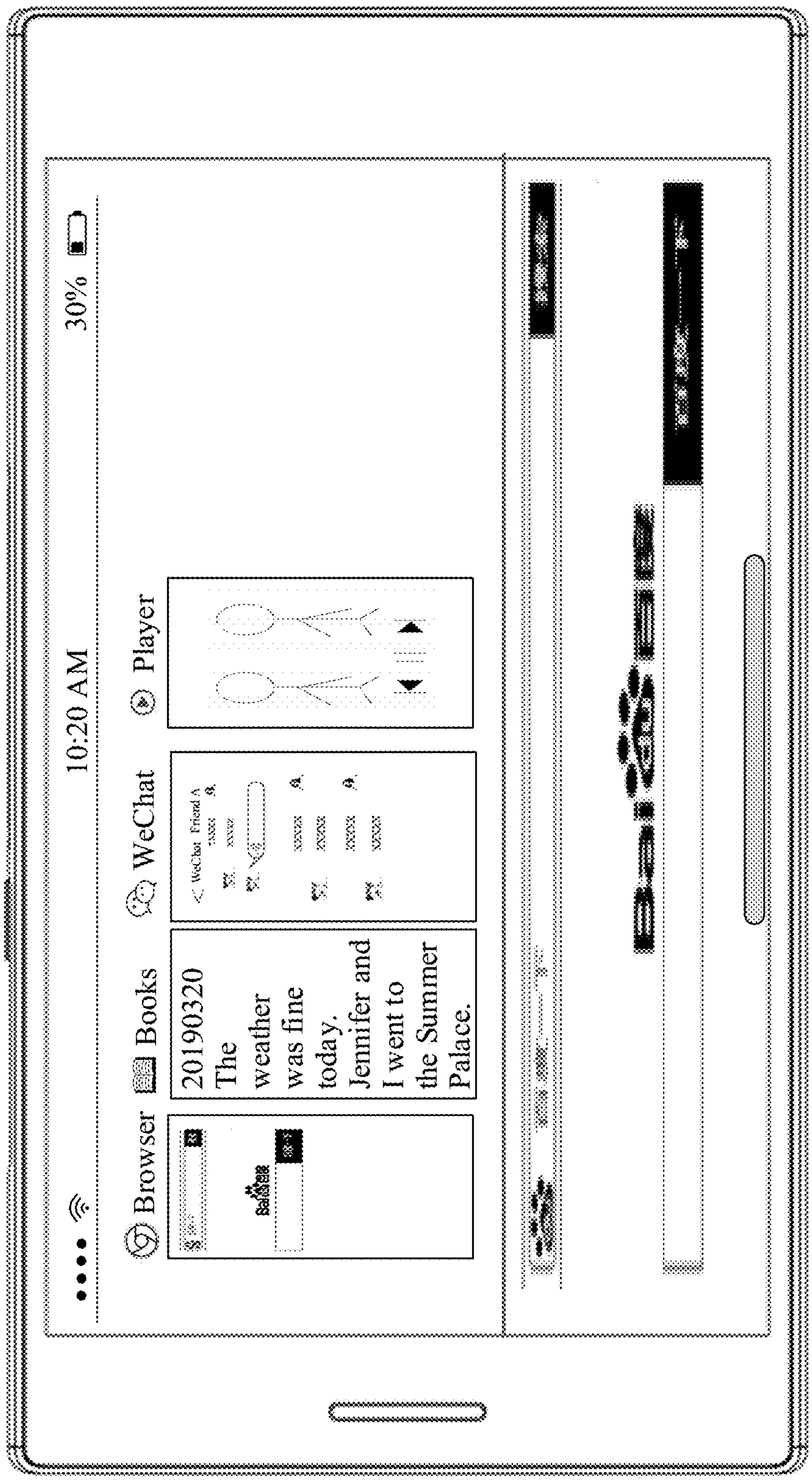
Figures 2, 34C:
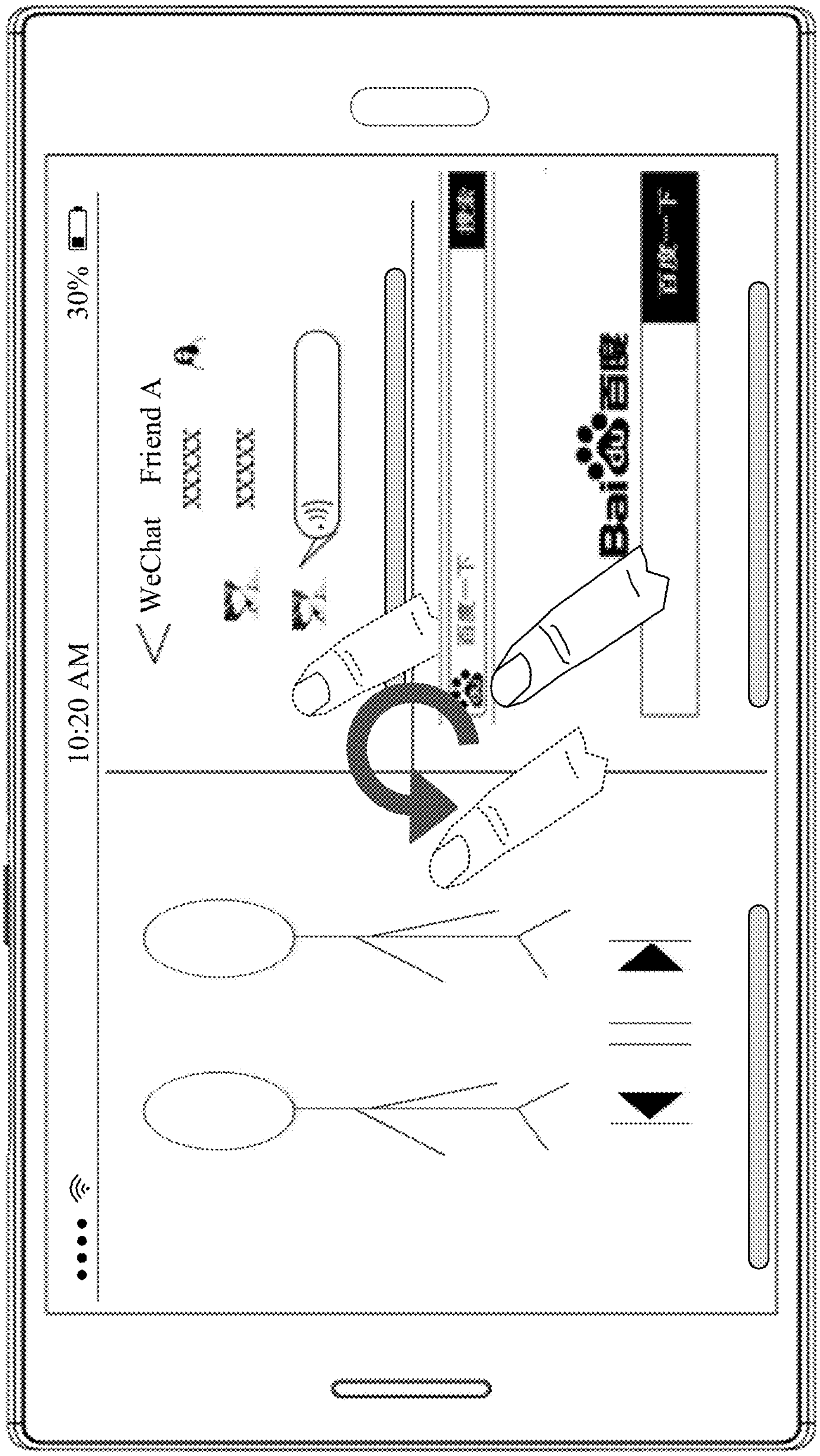
Figures 2, 34C:
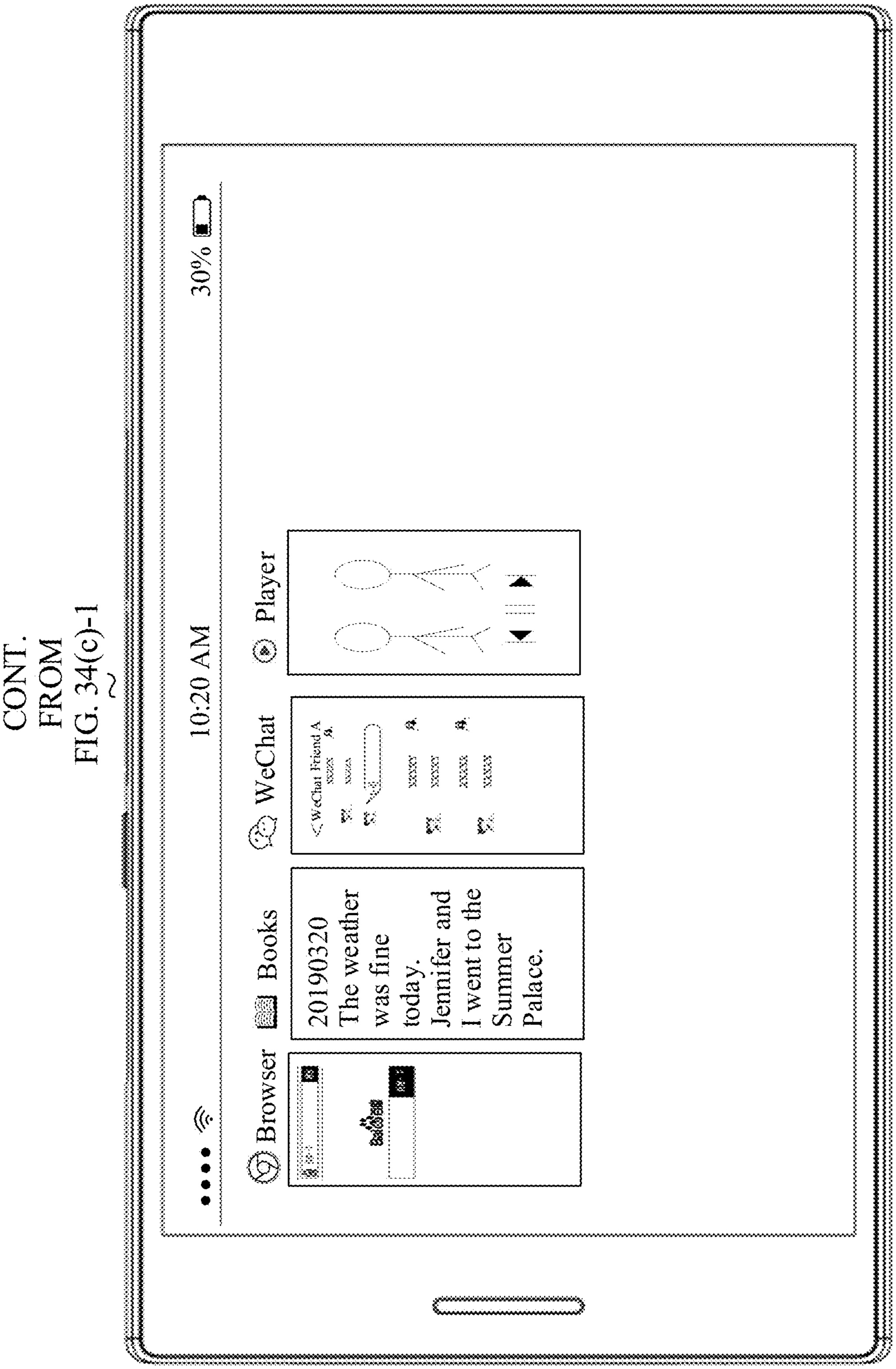

As shown in FIG. 22(*a*), the electronic device displays an interface 2201 in a display area 2200. The interface 2201 includes an interface of "Player" and an interface of "WeChat". The electronic device displays the interface of "Player" in a display area 22011, and displays the interface of "WeChat" in a display area 22012. The display area 2200 includes the display area 22011 and the display area 22012. The interface 2201 may include multi-task buttons 22022*a*, 22022*b*, and 22021. The multi-task button 22022*a* is used to indicate the electronic device to display a multi-task interface in the display area 22011. The multi-task button 22022*b* is used to indicate the electronic device to display a multi-task interface in the display area 22012. To be specific, for example, a multi-task button (for example, the multi-task button 22022*a* or the multi-task button 22022*b*) used to indicate the electronic device to display a multi-task interface in a display area may be located at an edge, for example, a lower edge, of the display area. The multi-task button 22021 is used to indicate the electronic device to display a multi-task interface in the display area 2200 (which includes the display areas 22011 and 22012). To be specific, for example, a multi-task button (for example, the multi-task button 22021) used to indicate the electronic device to display one multi-task interface in a plurality of display areas may be located at one end (as shown in FIG. 32(*a*) and FIG. 32(*b*)) of a division line of the plurality of display areas. As shown in FIG. 22(*a*), the user taps the multi-task button 22022*a*. In this case, as shown in FIG. 22(*b*), in response to tapping the multi-task button 22022*a*, the electronic device displays a multi-task interface (for example, an interface 2203) in the display area 22011. The interface 2203 includes an application window of "WeChat", an application window of "Books", an application window of "Browser", and an application window of "Player". In this case, the application window of "WeChat", the application window of "Books", and the application window of "Browser" are displayed in the display area 22011. The user slides down the application window of "Browser". As shown in FIG. 22(*c*), in response to that the user slides down the application window of "Browser", the electronic device displays an interface 2204 in the display area 22011. The interface 2204 includes an interface of "Player" and an interface of "Browser". The electronic device displays the interface of "Player" and the interface of "Browser" in different areas in the display area 22011. In this case, display content in the display area 22012 is still an interface of "WeChat".

In this way, the electronic device may display interfaces of one or more applications in different areas in a single display area or a display area including a plurality of display areas, without changing display of another display area.

Optionally, when an interface of an application, selected by the user, that is to be displayed in an area-based manner, is displayed in another display area, the electronic device may display a home screen, to avoid repeatedly displaying same content in different display areas.

Figure 23A:
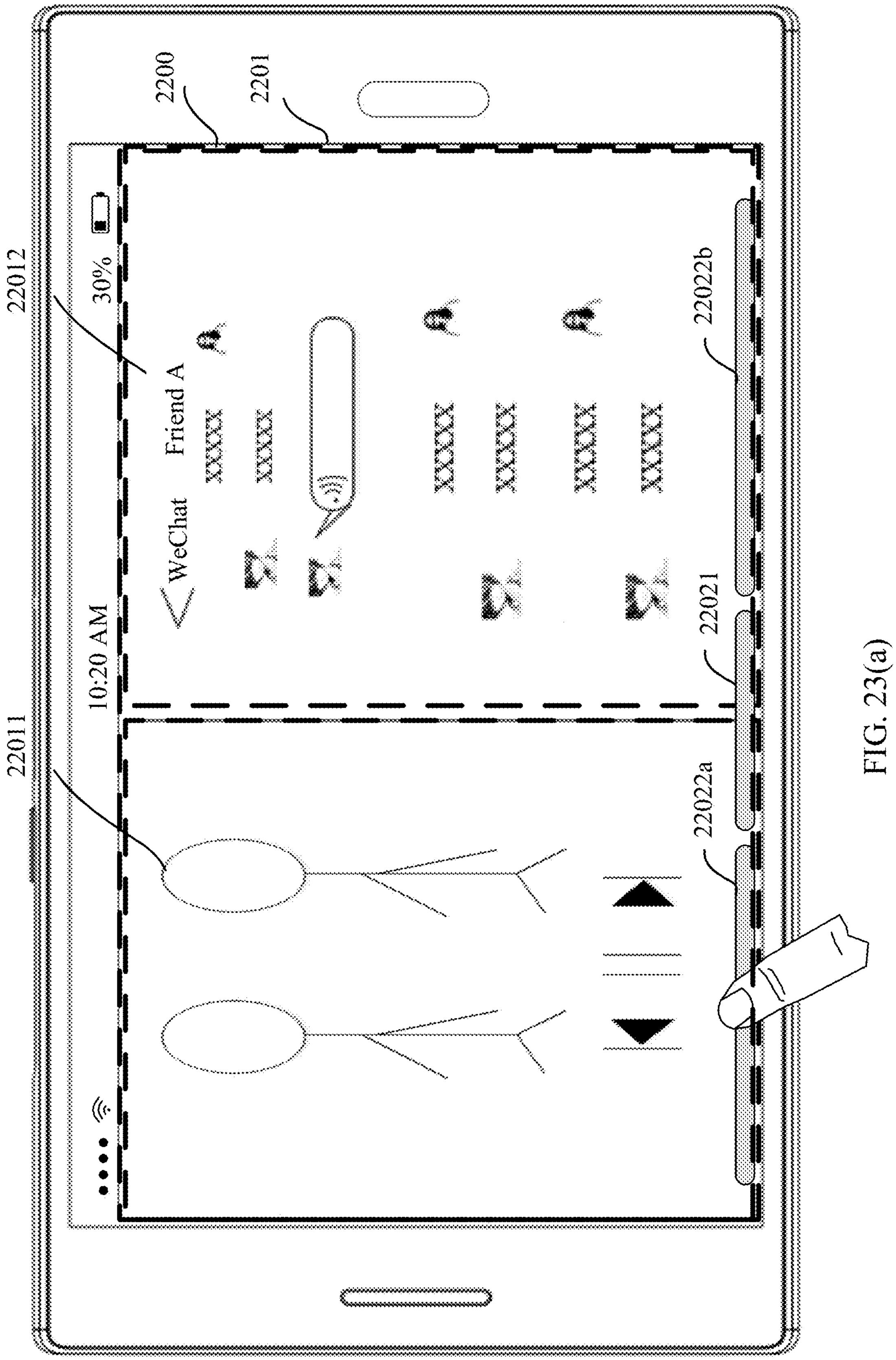
FIG. 23(*a*) to FIG. 23(*c*) are schematic diagrams of a scenario of another interface display method according to an embodiment of this application.
Figure 23B:
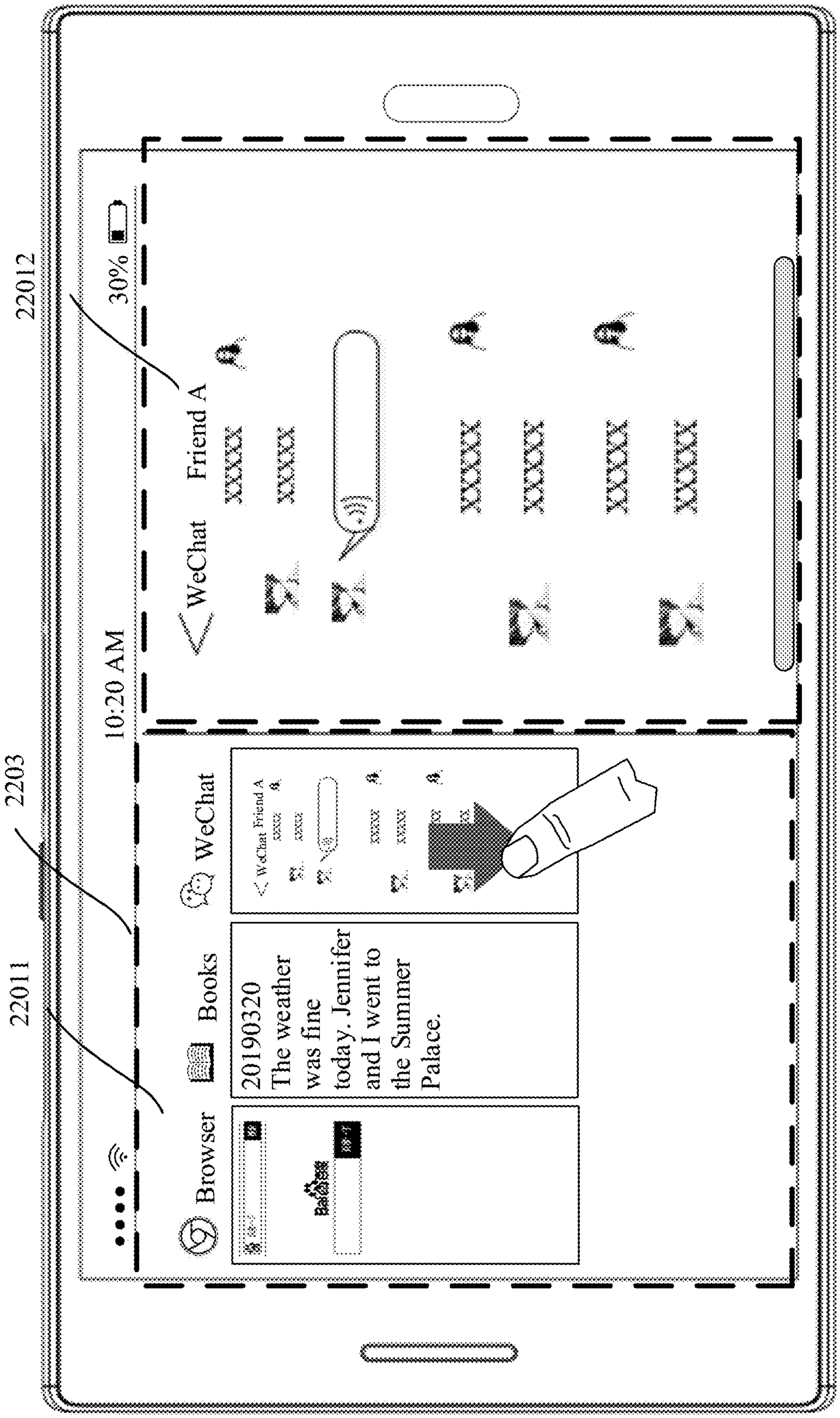
Figure 23C:
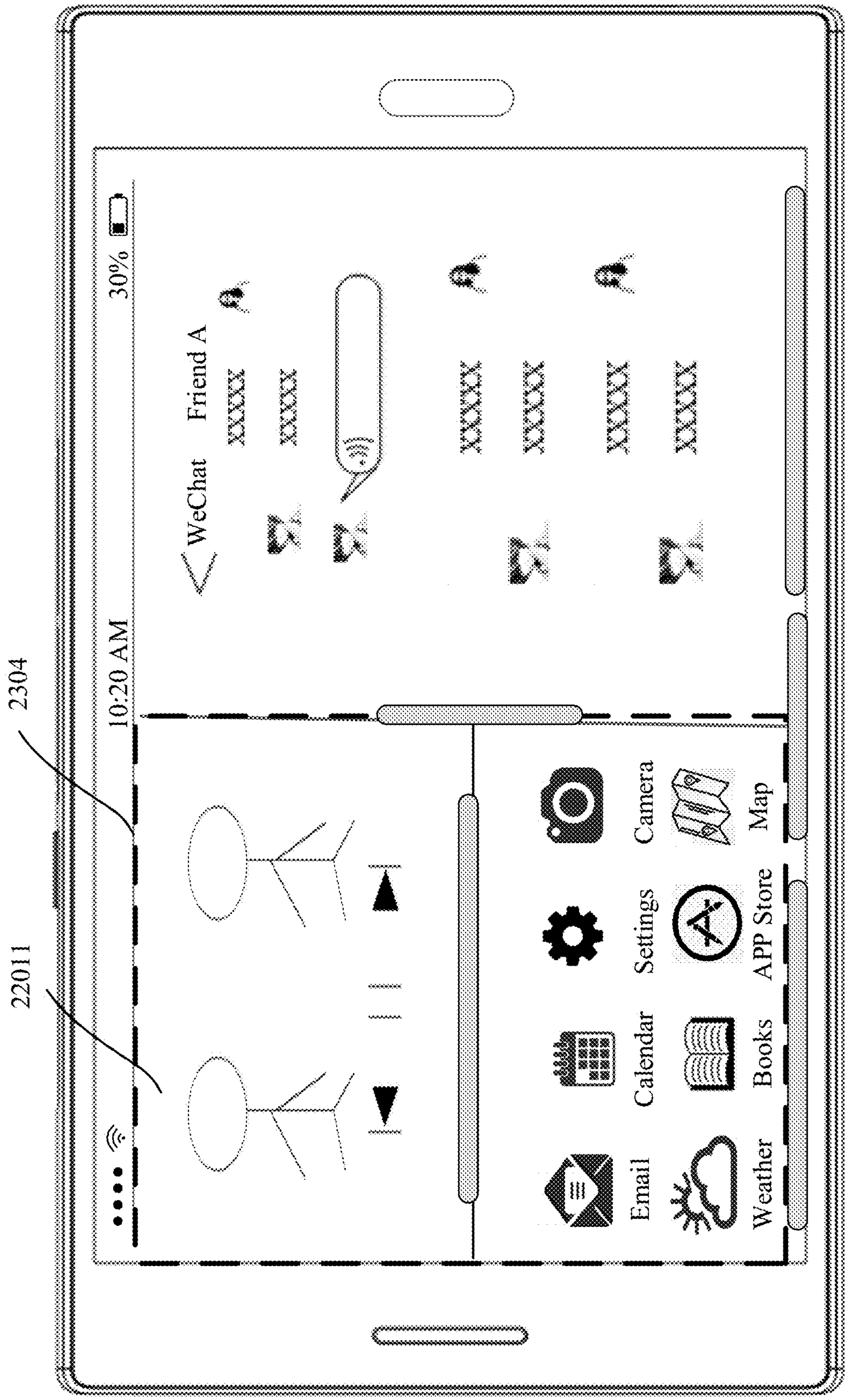

FIG. 23(*a*) to FIG. 23(*c*) are schematic diagrams of a scenario of another interface display method according to an embodiment of this application. For example, as shown in FIG. 23(*a*), the electronic device displays an interface 2201 in a display area 2200. The user taps a multi-task button 22022*a*. As shown in FIG. 23(*b*), in response to that the user taps the multi-task button 22022*a*, the electronic device displays an interface 2203 in a display area 22011. The user slides down an application window of "WeChat". In this case, the application window of "WeChat" is displayed in a display area 22012. Therefore, as shown in FIG. 23(*c*), in response to that the user slides down the application window of "WeChat", the electronic device displays an interface 2304 in the display area 22011. The interface 2304 includes an interface of "Player" and the home screen. The electronic device displays the interface of "Player" and the home screen in different areas in the display area 22011.

Optionally, when an application, selected by the user, that is to be displayed in an area-based manner includes a plurality of interfaces, the electronic device may display an interface that is not displayed in another display area.

Figure 24A:
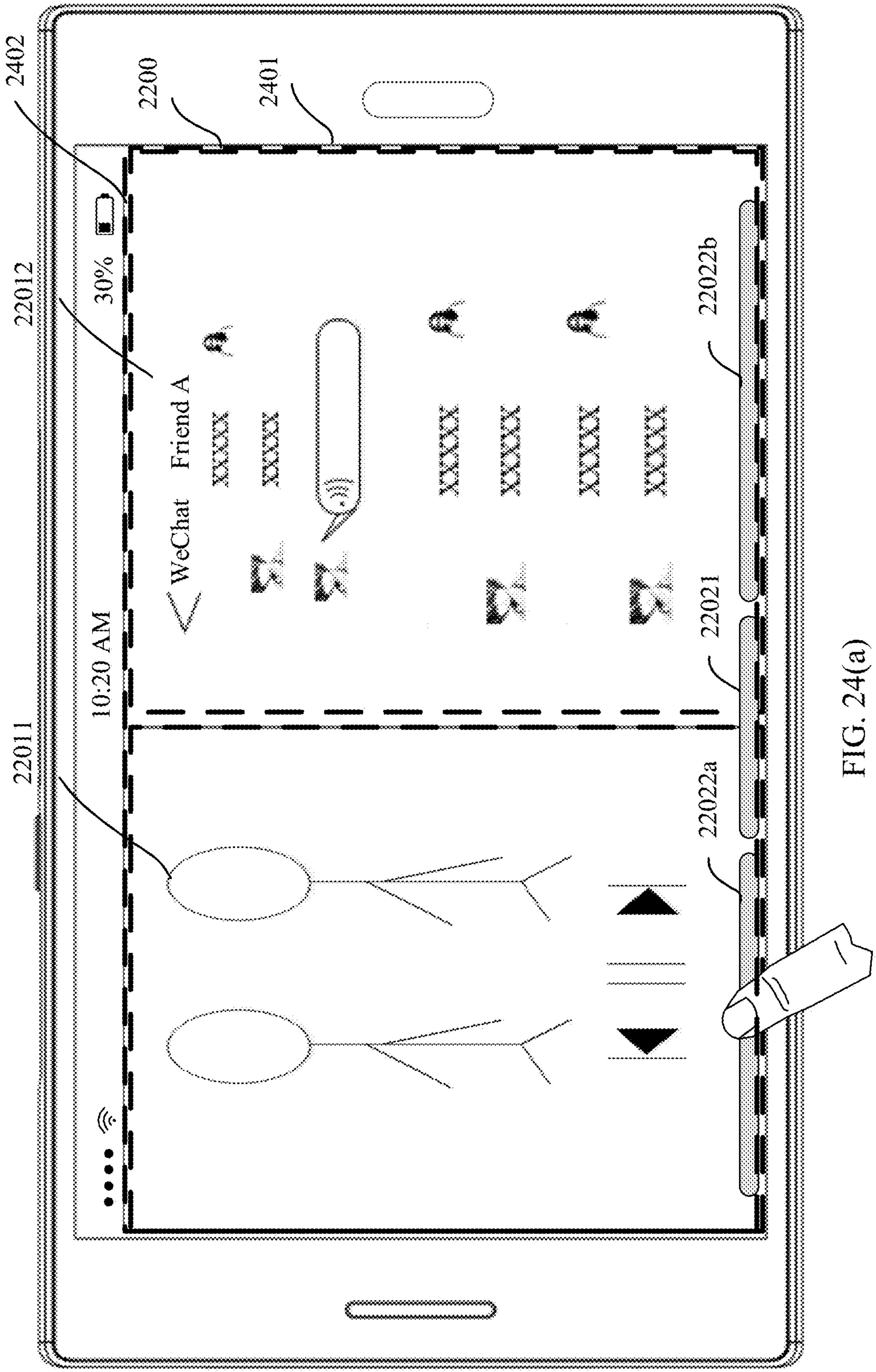
FIG. 24(*a*) to FIG. 24(*c*) are schematic diagrams of a scenario of another interface display method according to an embodiment of this application.
Figure 24B:
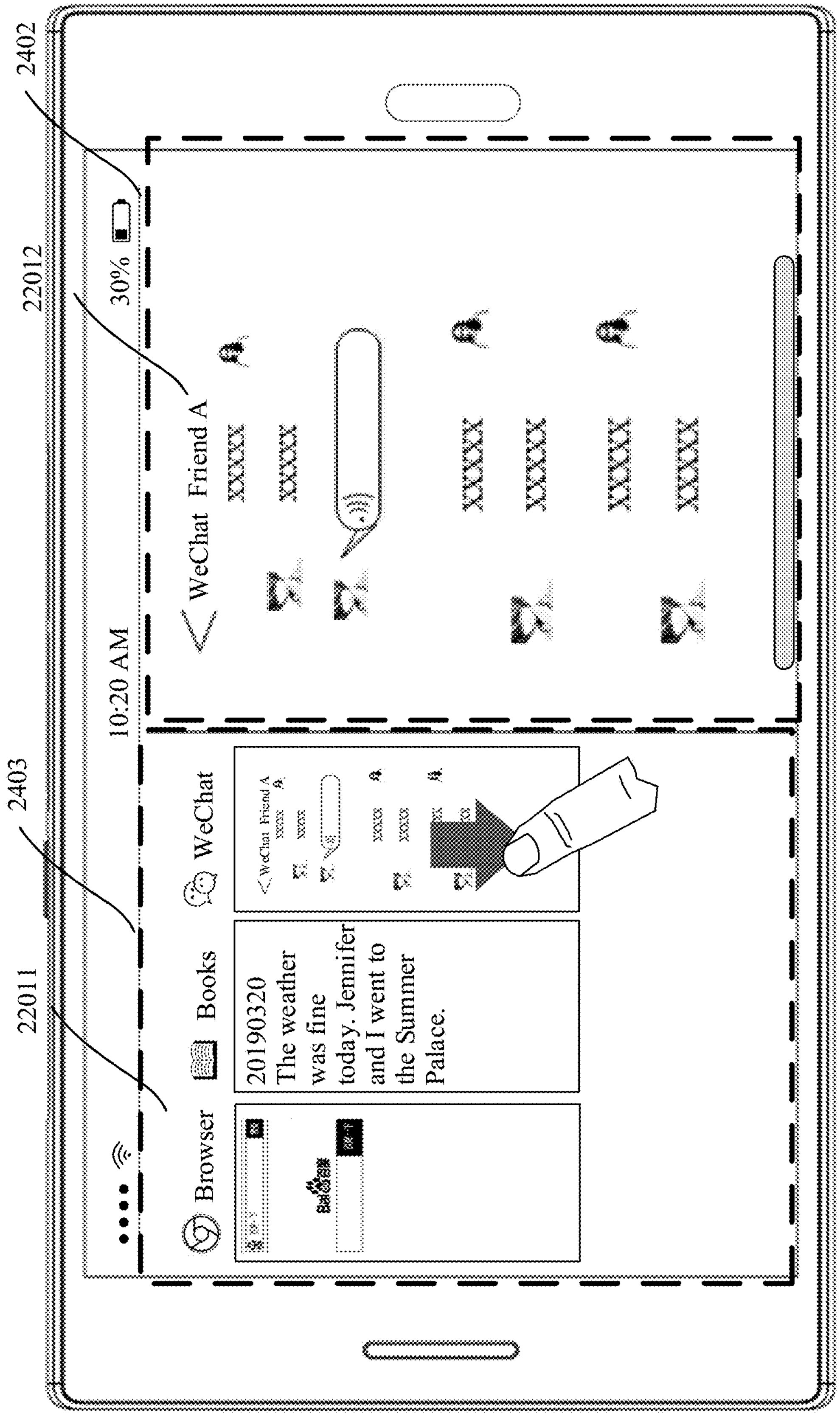
Figure 24C:
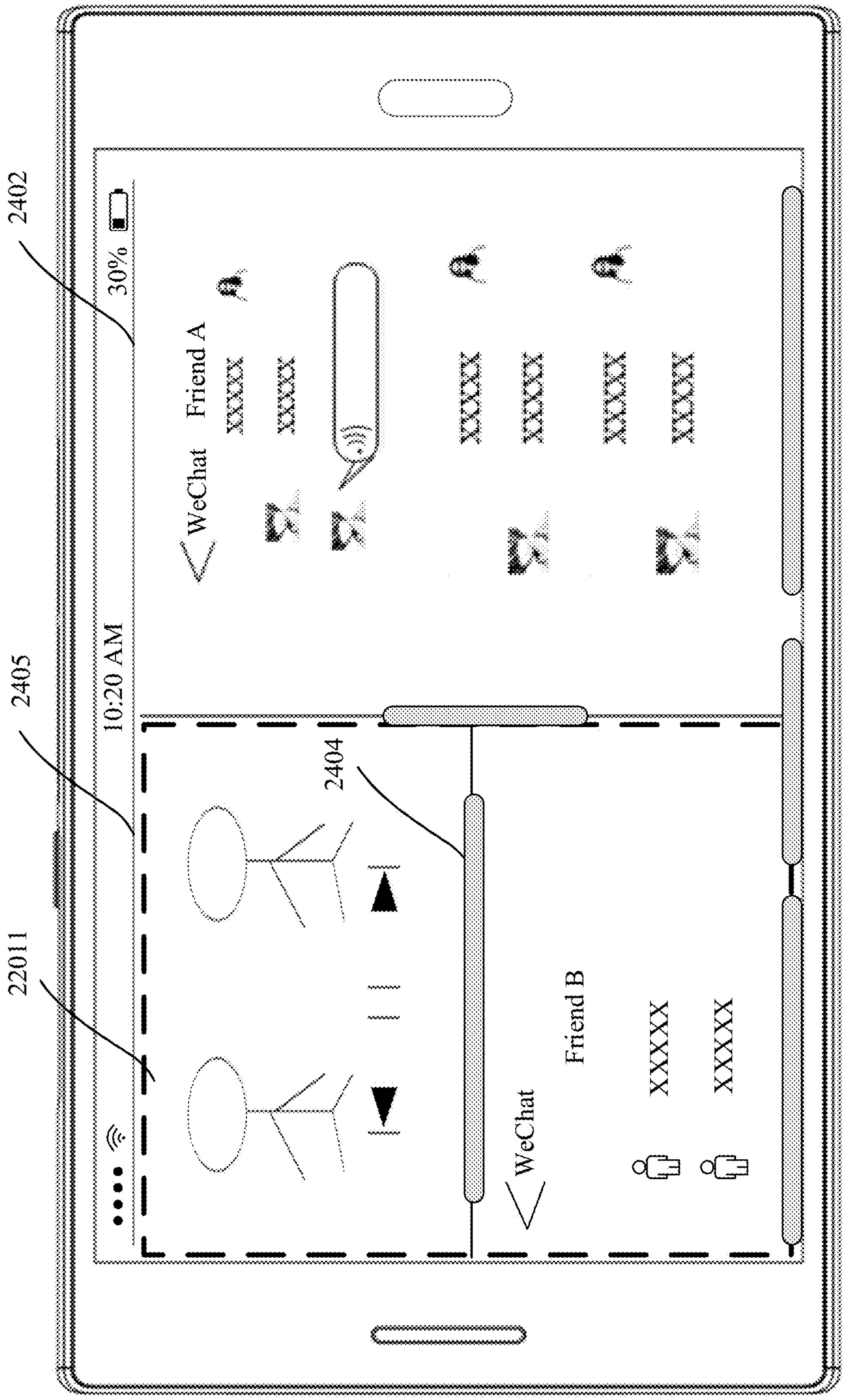

FIG. 24(*a*) to FIG. 24(*c*) are schematic diagrams of a scenario of another interface display method according to an embodiment of this application. The application scenario shown in FIG. 24(*a*) to FIG. 24(*c*) is that the user watches a video when chatting with a friend A. In this case, the user receives a new message from a friend B. "WeChat" includes a dialog interface 2402 with the friend A and a dialog interface 2404 with the friend B.

For example, as shown in FIG. 24(*a*), the electronic device displays an interface 2401 in a display area 2200. The interface 2401 includes an interface of "Player" and an interface (for example, the interface 2402) of "WeChat". The display area 2200 includes a display area 22011 and a display area 22012. The electronic device displays the interface of "Player" in the display area 22011, and displays the interface (for example, the interface 2402) of "WeChat" in the display area 22012. The interface 2204 may include multi-task buttons 22022*a*, 22022*b*, and 22021. The user taps the multi-task button 22022*a*. As shown in FIG. 22(*b*), in response to that the user taps the multi-task button 22022*a*, the electronic device displays a multi-task interface (for example, an interface 2403) in the display area 22011. The interface 2403 includes an application window of "WeChat", an application window of "Books", an application window of "Browser", and an application window of "Player". In this case, the application window of "WeChat", the application window of "Books", and the application window of "Browser" are displayed in the display area 22011. The user slides down the application window of "WeChat". In this case, one interface (for example, the interface 2402) of "WeChat" is displayed in the display area 21012, and another interface (for example, the interface 2404) of "WeChat" is not displayed. The new message received by the user is related to the interface 2404. As shown in FIG. 22(*c*), in response to that the user slides down the application window of "WeChat", the electronic device displays an interface 2405 in the display area 22011. The interface 2405 includes the interface 2404 and the interface of "Player". In other words, the electronic device displays the interface of "Player" and the interface of "WeChat" in different areas in the display area 22011. The interfaces of "WeChat" that are displayed in the display area 22011 and the display area 21012 are different.

It may be understood that, in the method shown in FIG. 24(*a*) to FIG. 24(*c*), the user needs to first display the multi-task interface, and then select the application window of "WeChat" to display the dialog interface with the friend B. This interrupts the user from watching the video. To further simplify interface display for the user, as shown in FIG. 25(*a*) to FIG. 25(*c*), this application provides another interface display method.

Figure 25A:
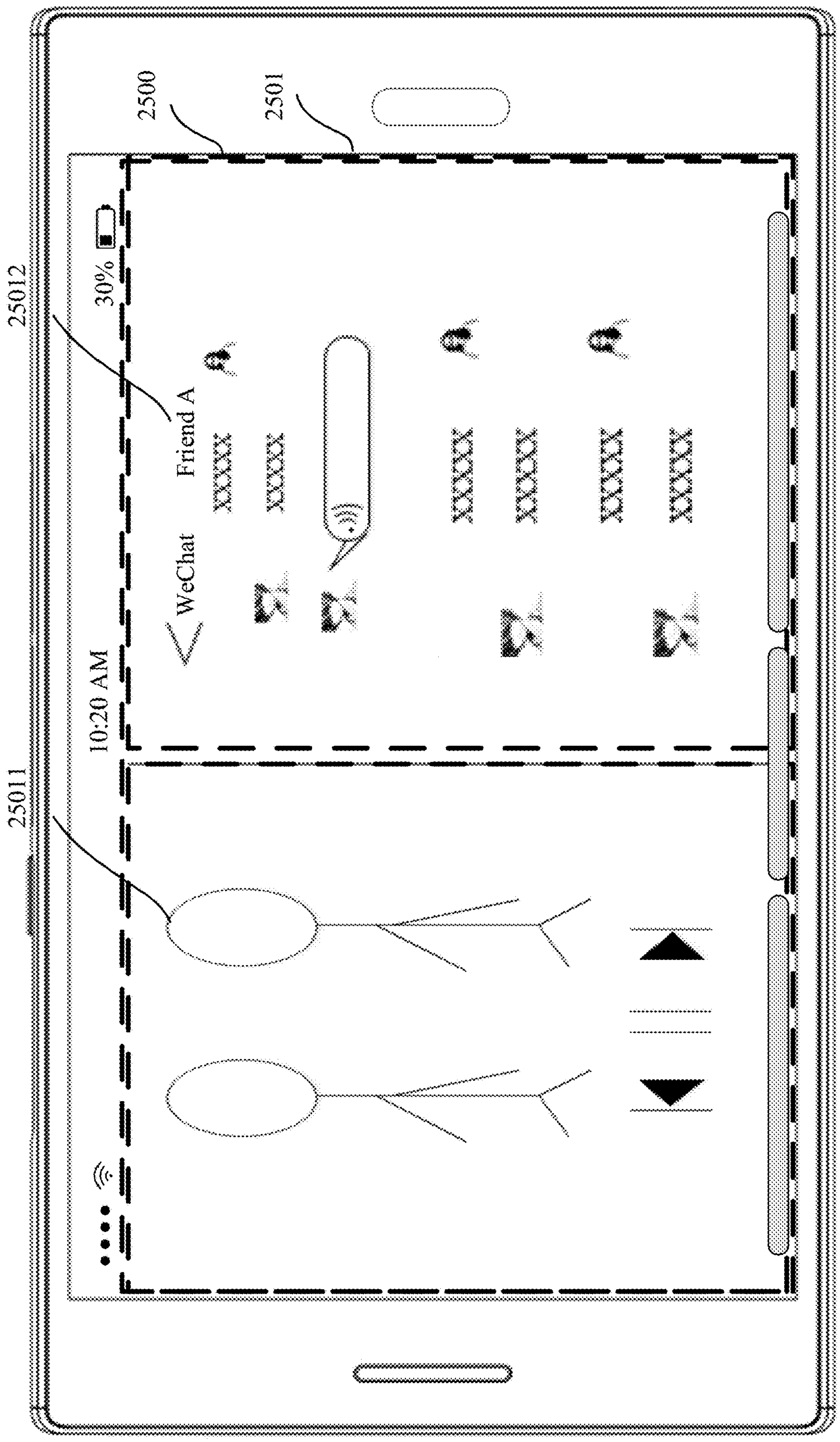
FIG. 25(*a*) to FIG. 25(*c*) are schematic diagrams of a scenario of another interface display method according to an embodiment of this application.
Figure 25B:
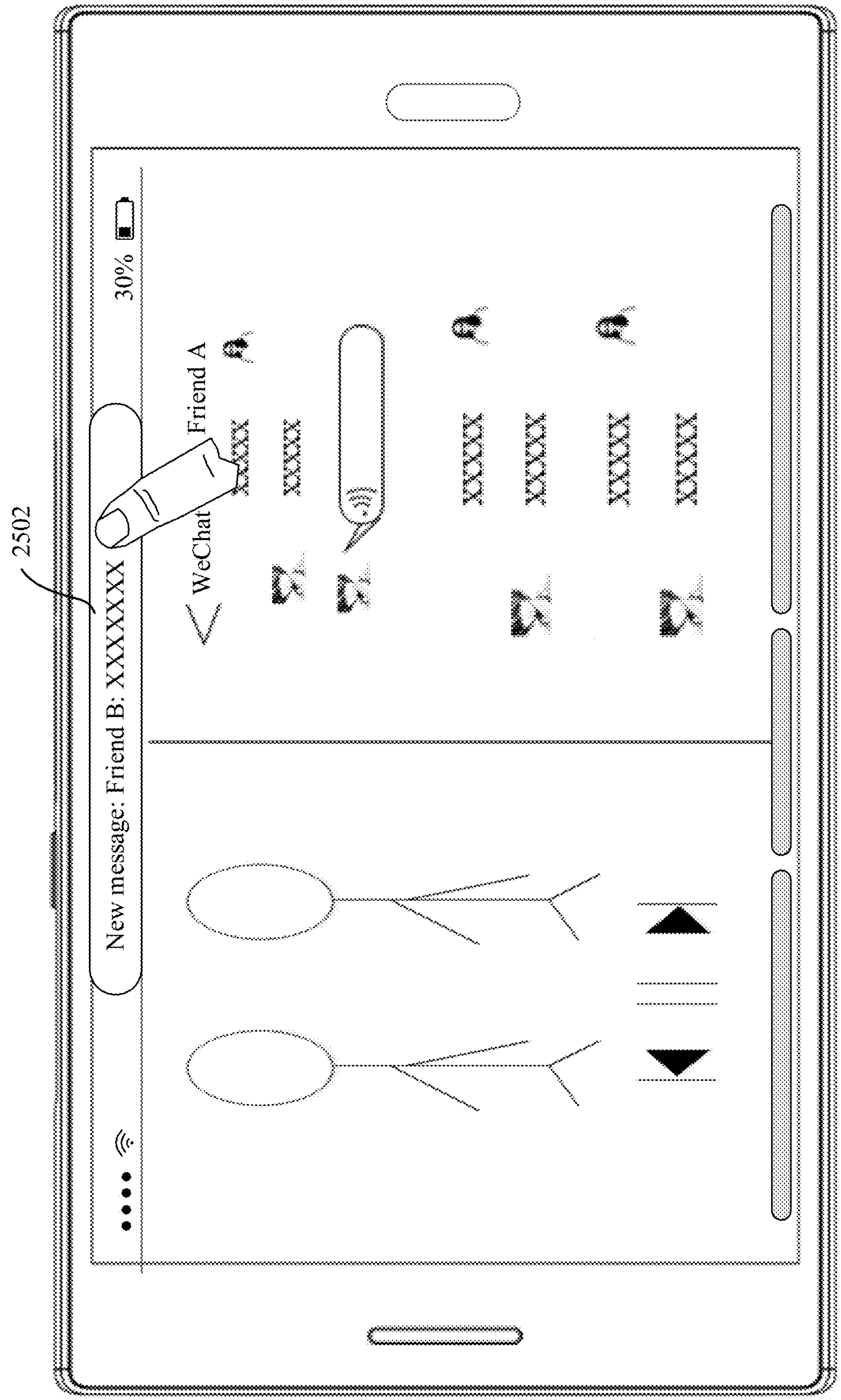
Figure 25C:
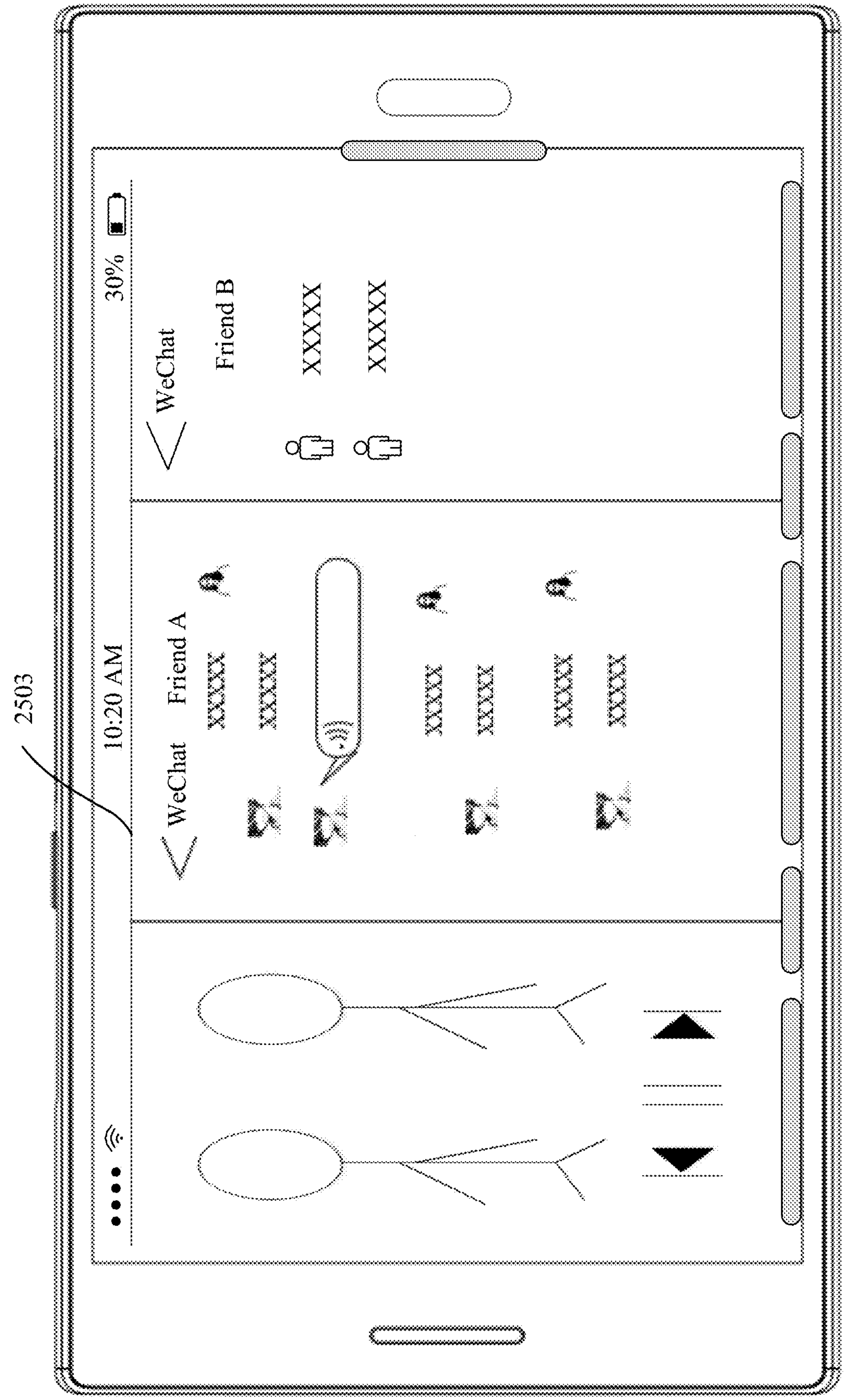

For example, as shown in FIG. 25(*a*), the electronic device displays an interface 2501 in a display area 2500. The interface 2501 includes an interface of "Player" and an interface of "WeChat" (for example, a dialog interface with a friend A). The display area 2500 includes a display area 25011 and a display area 25012. The interface of "Player" is displayed in the display area 25011, and the interface of "WeChat" is displayed in the display area 25012. As shown in FIG. 25(*b*), when the electronic device receives a new message from a friend B, the electronic device displays a new message notification 2502. It may be understood that the new message notification 2502 corresponds to an interface of "WeChat" (for example, a dialog interface with the friend B). The user moves, double-taps, or touches and holds the new message notification 2502. As shown in FIG. 25(*c*), in response to the operation performed by the user on the new message notification, the electronic device displays an interface 2503 in the display area 2500. The interface 2503 includes one interface of "WeChat" (for example, the dialog interface with the friend A), another interface of "WeChat" (for example, the dialog interface with the friend B), and the interface of "Player".

Optionally, the new message notification 2502 may alternatively be moved to a display area (for example, the display area 25012). In this case, in response to the operation performed on the new message notification, the electronic device displays, in an area-based manner, the interface corresponding to the new message notification in the display area.

Figure 26A:
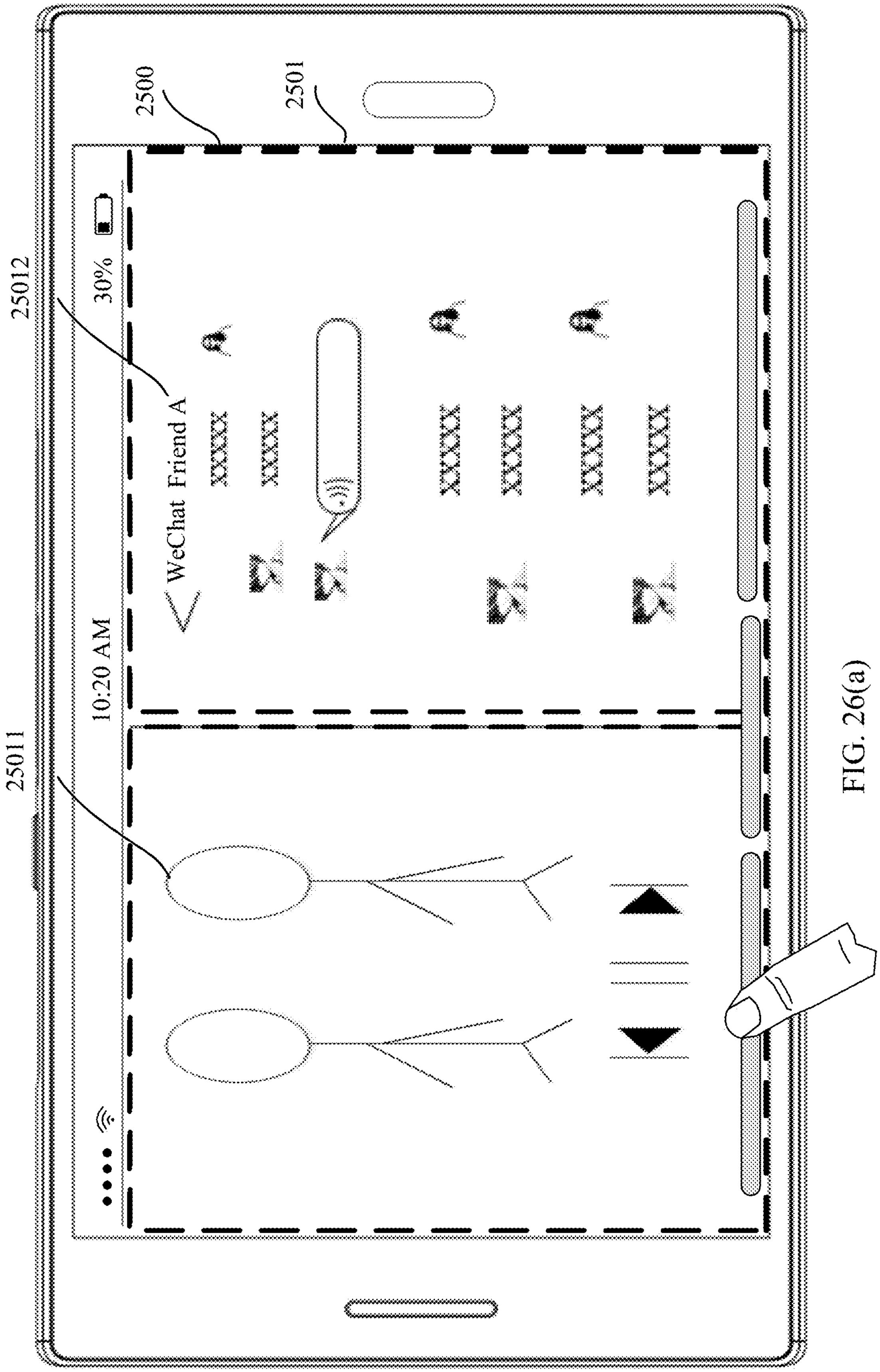
FIG. 26(*a*) to FIG. 26(*c*) are schematic diagrams of a scenario of another interface display method according to an embodiment of this application.
Figure 26B:
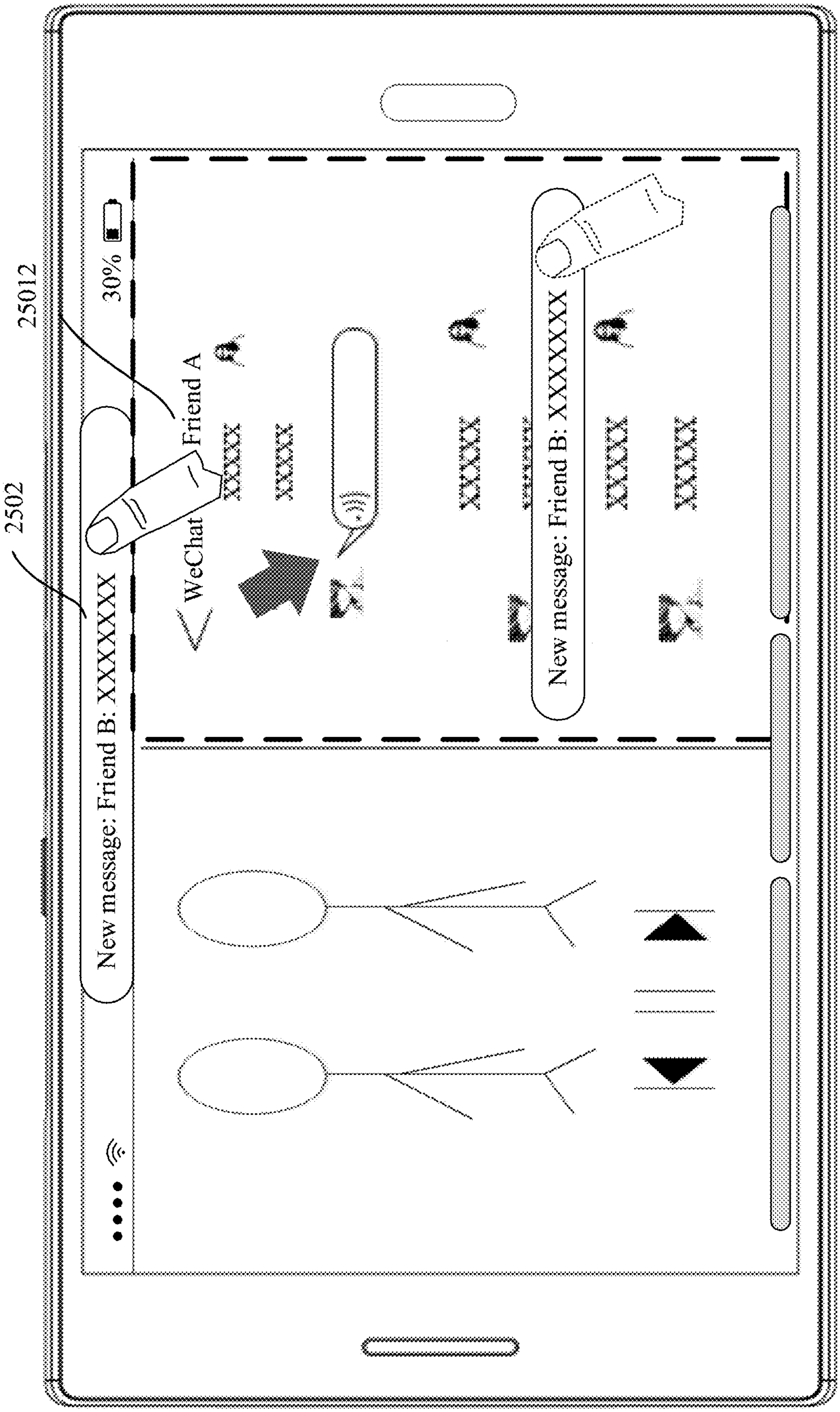
Figure 26C:
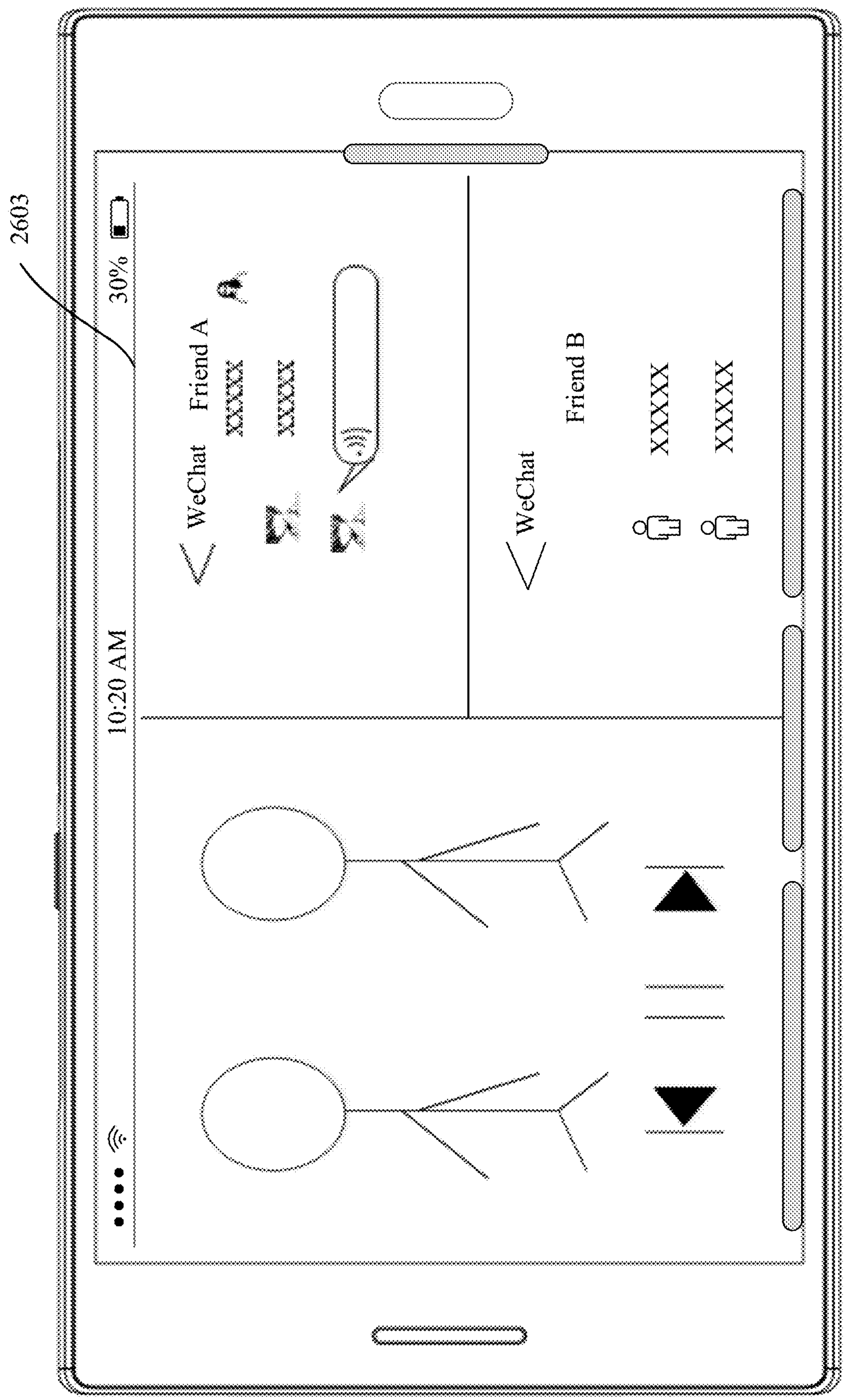
Figure 27A:
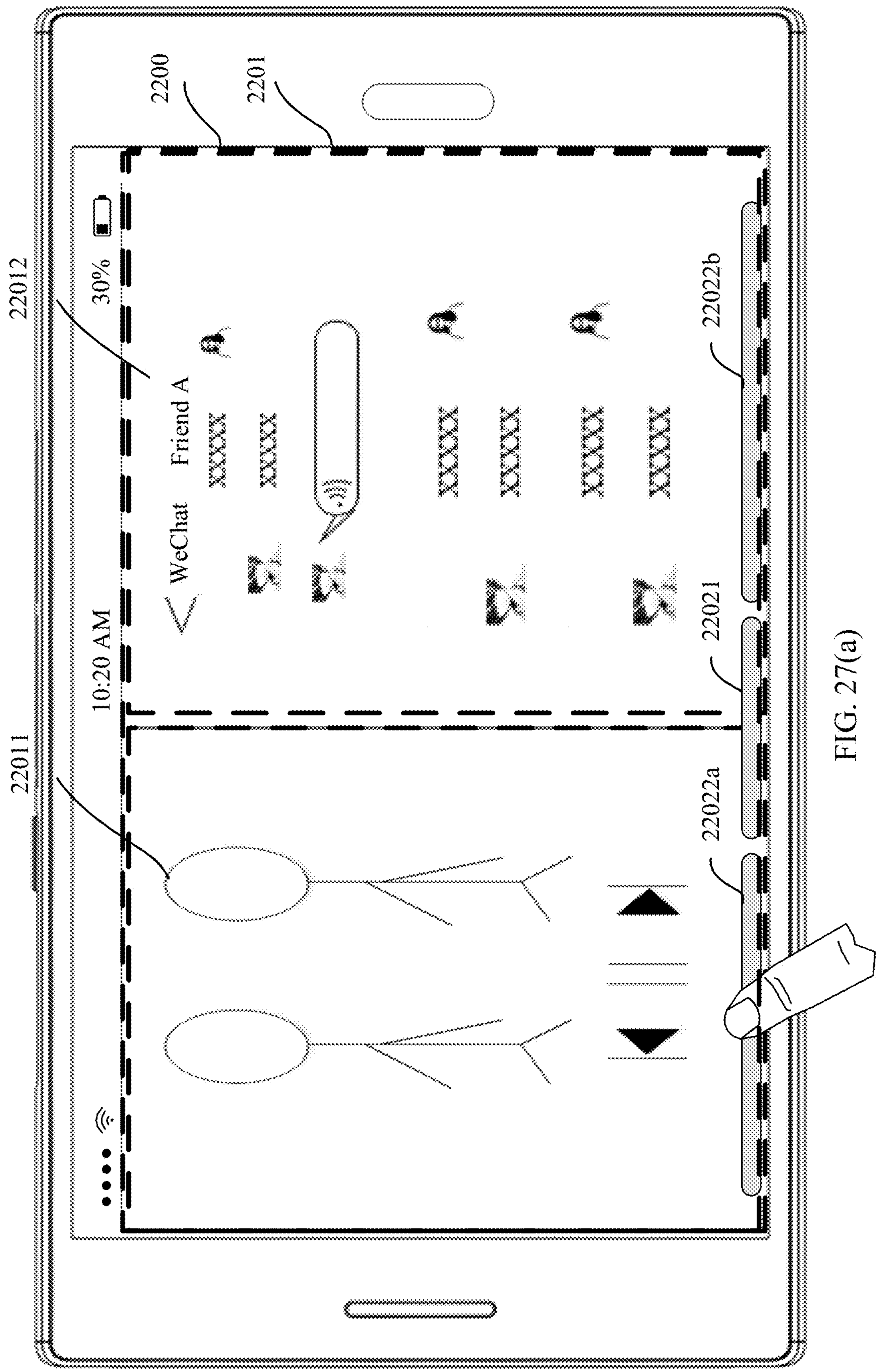
FIG. 27(*a*) to FIG. 27(*f*) are schematic diagrams of a scenario of another interface display method according to an embodiment of this application.
Figure 27B:
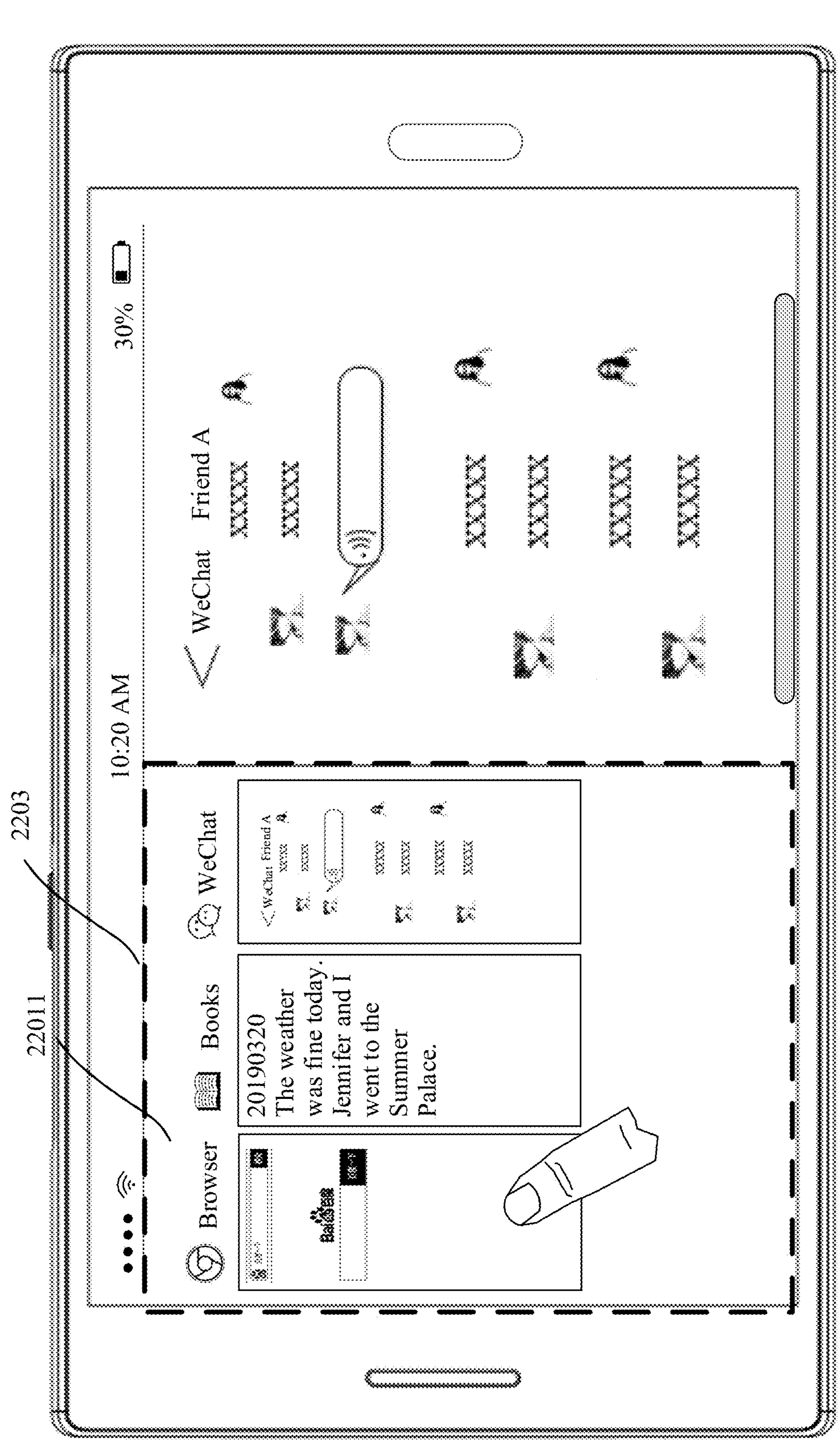
Figure 27C:
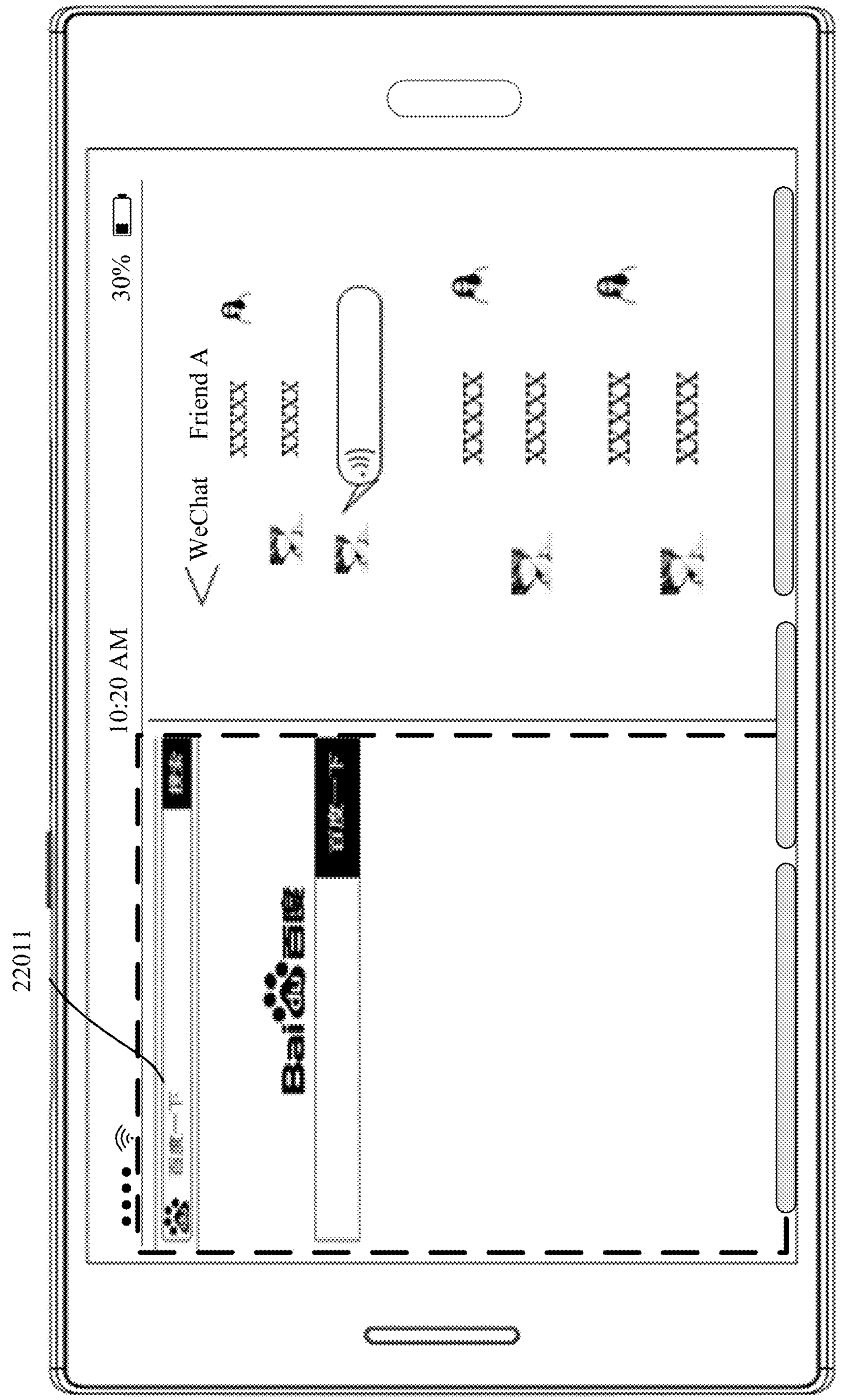
Figure 27D:
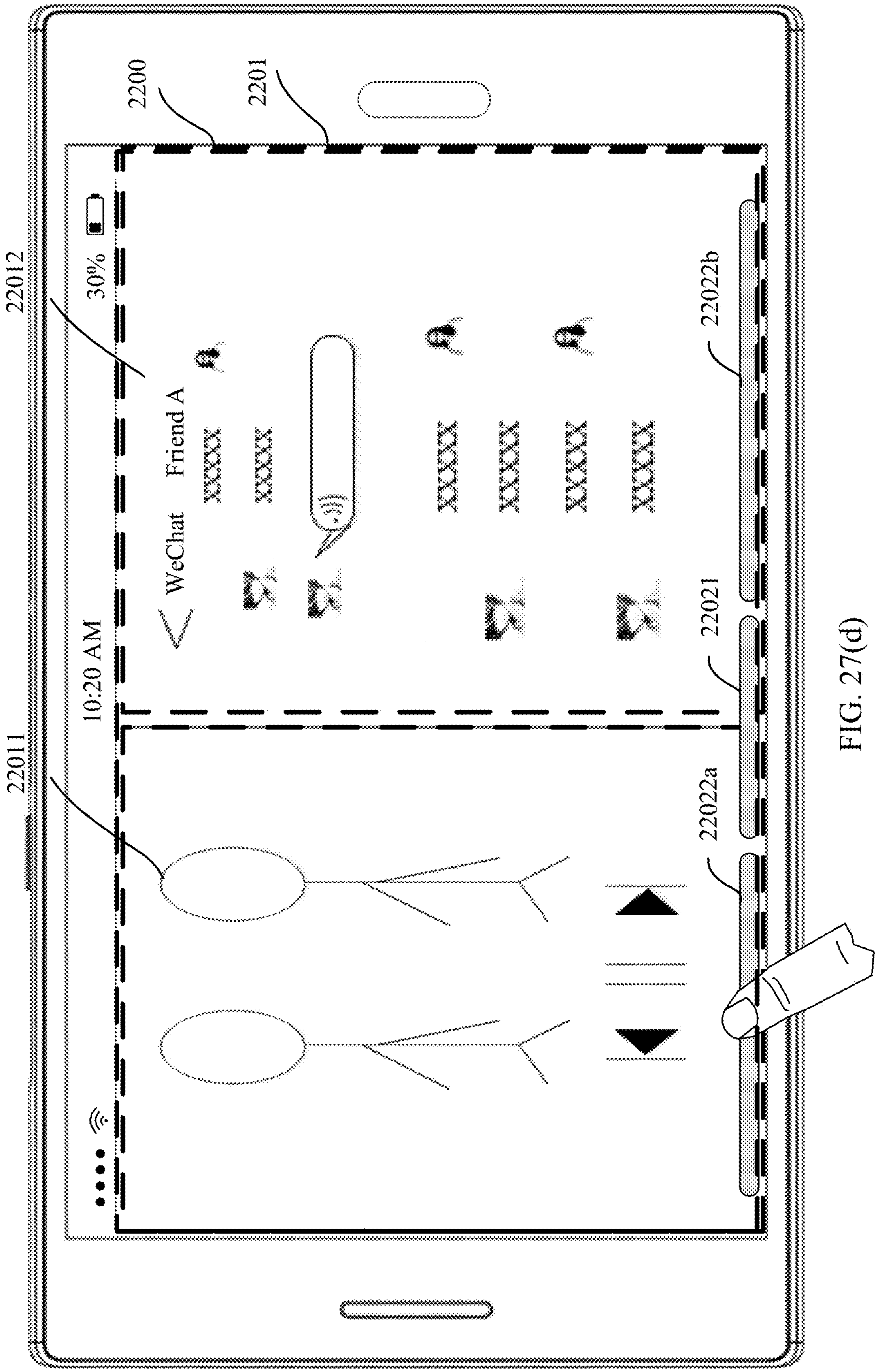
Figure 27E:
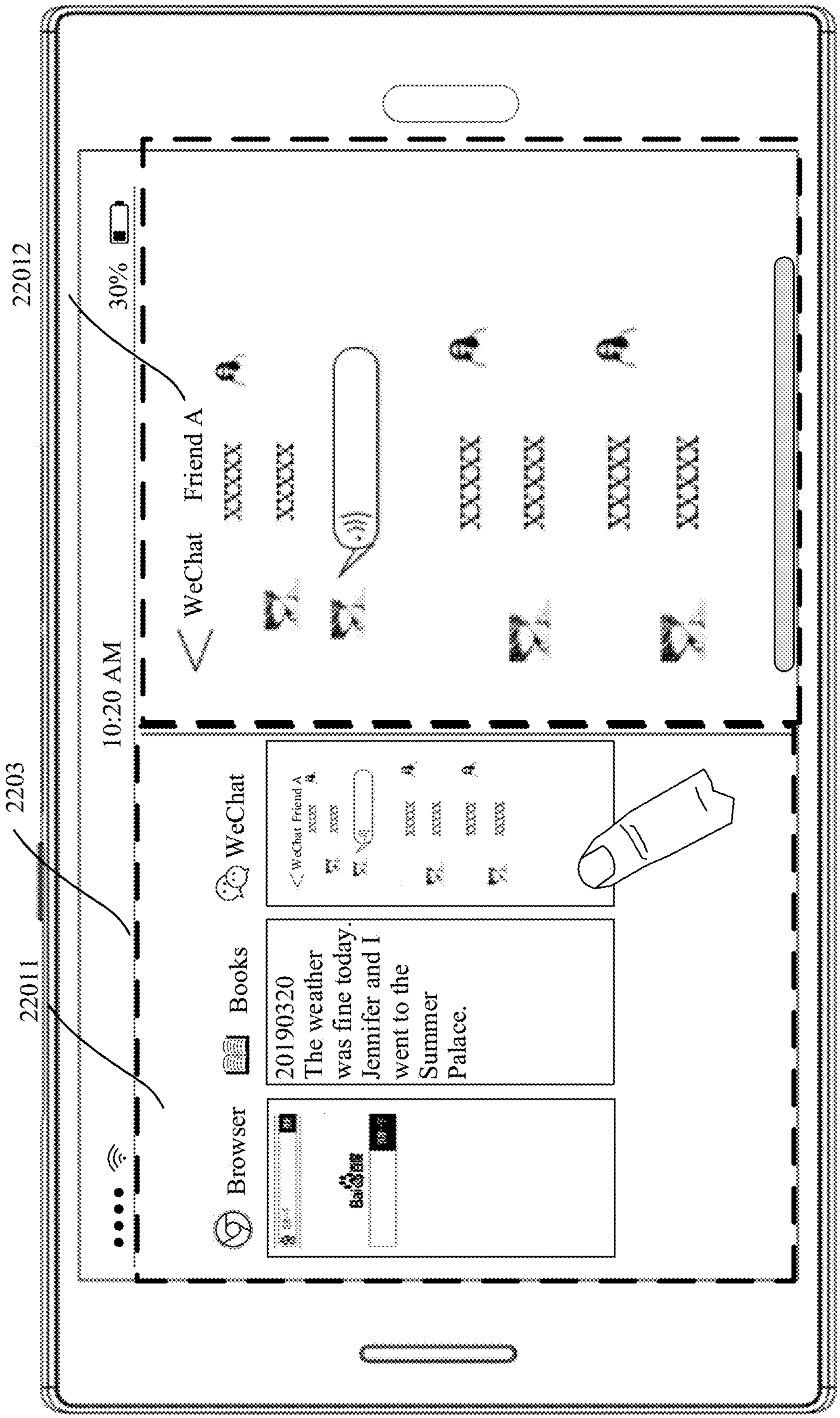
Figure 27F:
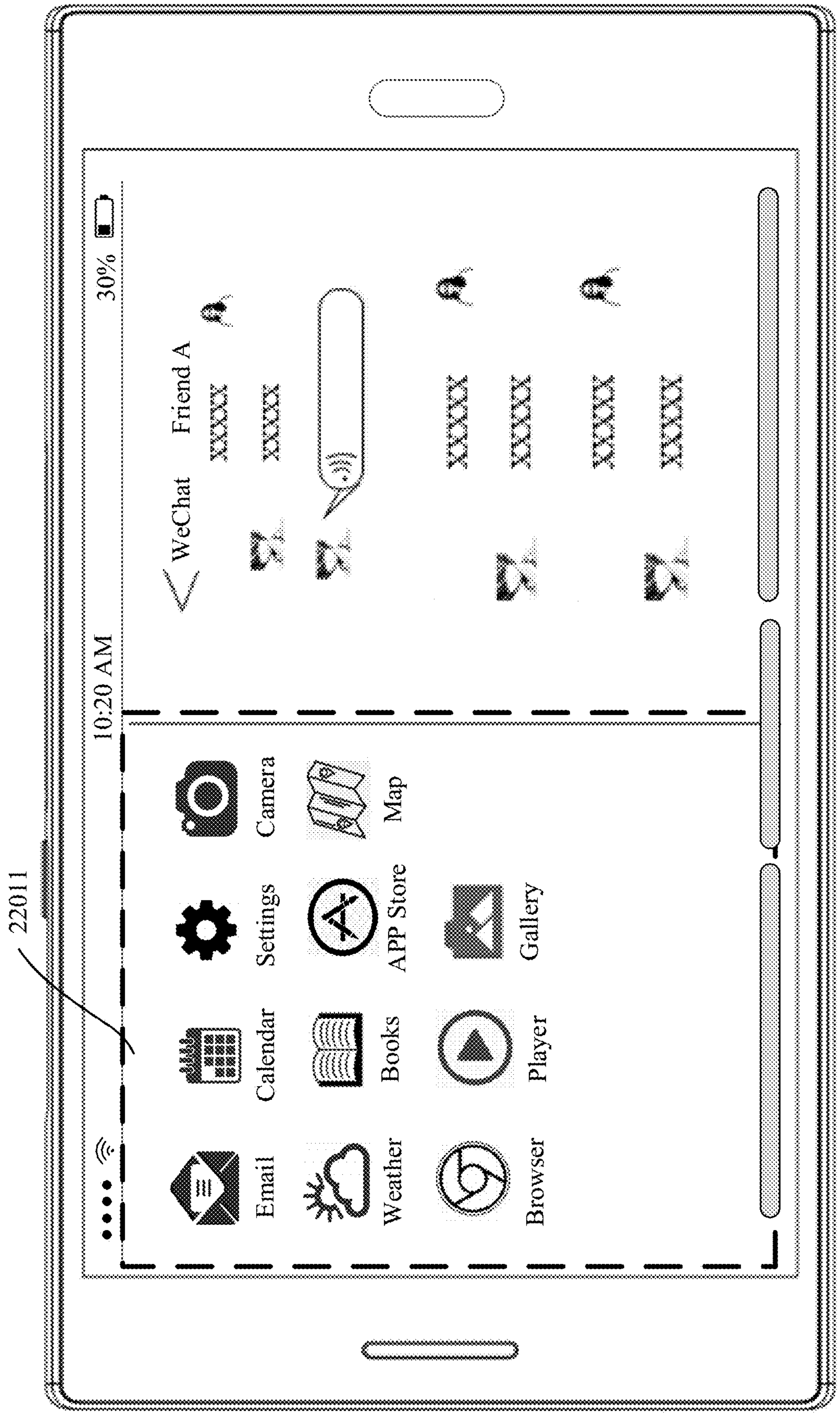

For example, for a description of FIG. 26(*a*), refer to the description of FIG. 25(*a*). Details are not described herein again. As shown in FIG. 26(*b*), when the electronic device receives the new message from the friend B, the electronic device displays the new message notification 2502. The user moves the new message notification 2502 to the display area 25012. As shown in FIG. 26(*c*), in response to that the user moves the new message notification 2502 to the display area 25012, the electronic device displays an interface 2603 in the display area 25012. The interface 2603 includes one interface of "WeChat" (for example, the dialog interface with the friend A) and another interface of "WeChat" (for example, the dialog interface with the friend B).

Optionally, the electronic device may determine, based on a position in the display area and to which the new message notification 2502 is moved, a position of the interface that corresponds to the new message notification and that is displayed in the area-based manner. For example, as shown in FIG. 26(*b*), when the new message notification 2502 is moved to a lower half of the display area 25012, as shown in FIG. 26(*c*), a lower half of the interface 2603 is the interface corresponding to the new message notification (for example, a second window interface of "WeChat").

In conclusion, according to the interface display method described in FIG. 25(*a*) to FIG. 26(*c*), the user may quickly display, in the area-based manner, the interface corresponding to the new message notification.

It may be understood that the user may tap an application window of an application to display an interface of the application. For example, as shown in FIG. 27(*a*), the electronic device displays an interface 2201 in a display area 2200. The user taps a multi-task button 22022*a*. As shown in FIG. 27(*b*), in response to the operation (namely, tapping the multi-task button 22022*a*), the electronic device displays an interface 2203 in a display area 22011. The user taps an application window of "Browser" to display an interface of the application. As shown in FIG. 27(*c*), in response to the operation (namely, tapping the application window of "Browser"), the electronic device displays the interface of "Browser" in the display area 22011.

Optionally, when an interface of an application selected by the user through tapping is displayed in another display area, the electronic device may display a home screen in the display area. For example, in FIG. 27(*d*), the electronic device displays the interface 2201 in the display area 2200. The user taps the multi-task button 22022*a*. As shown in FIG. 27(*e*), in response to the operation (namely, tapping the multi-task button 22022*a*), the electronic device displays the interface 2203 in the display area 22011. The user taps an application window of "WeChat" to display an interface of the application. However, the application window of "WeChat" is displayed in a display area 2102. Therefore, as shown in FIG. 27(*f*), the electronic device displays the home screen in the display area 22011.

Optionally, when an application, selected by the user through tapping, that is to be displayed in an area-based manner includes a plurality of interfaces, the electronic device may display, in the display area, an interface that is of the application and that is not displayed in another display area. For ease of understanding, the following provides description with reference to an application scenario shown in FIG. 28(*a*) to FIG. 28(*c*).

Figure 28A:
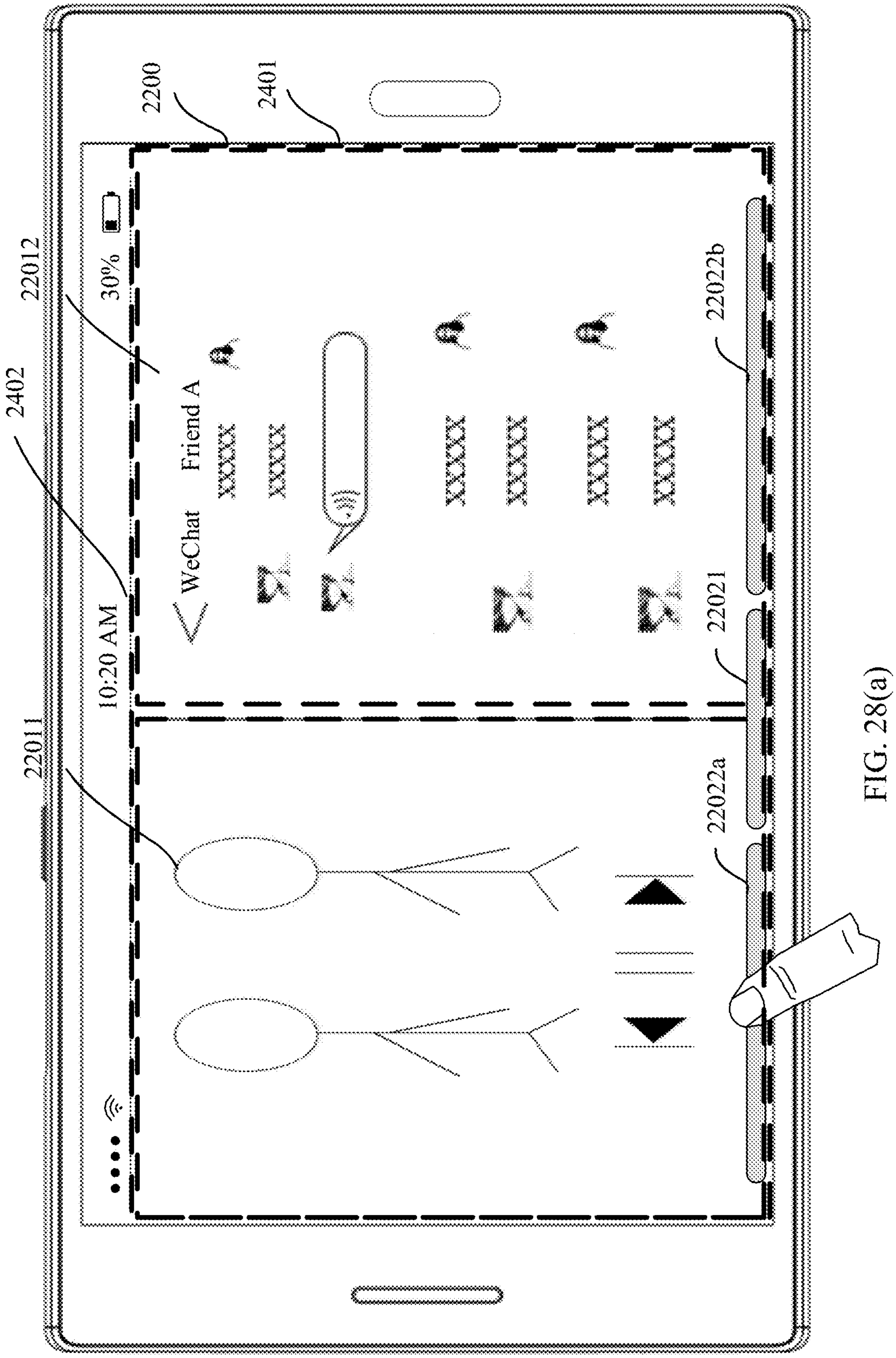
FIG. 28(*a*) to FIG. 28(*c*) are schematic diagrams of a scenario of another interface display method according to an embodiment of this application.
Figure 28B:
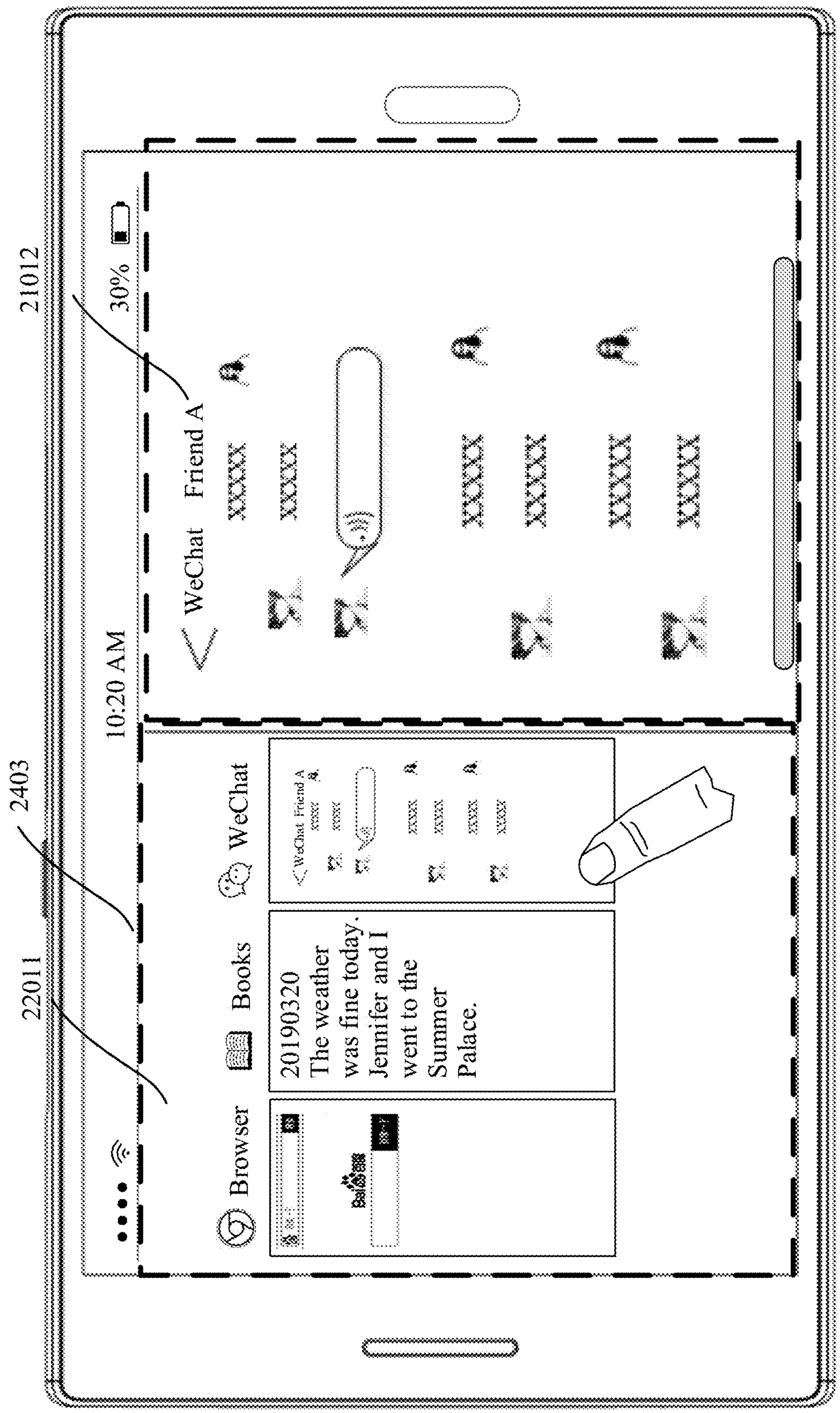
Figure 28C:
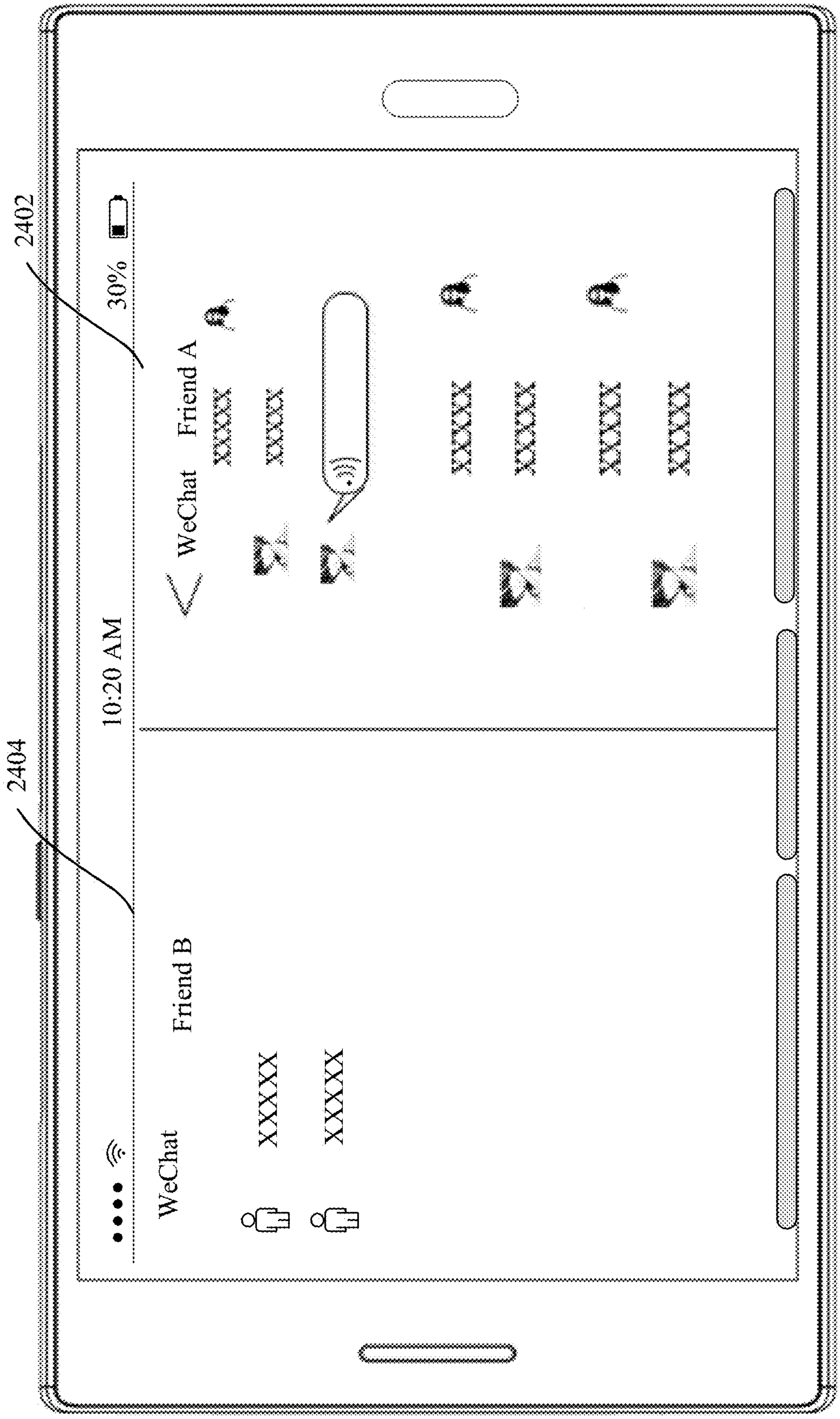
Figure 29A:
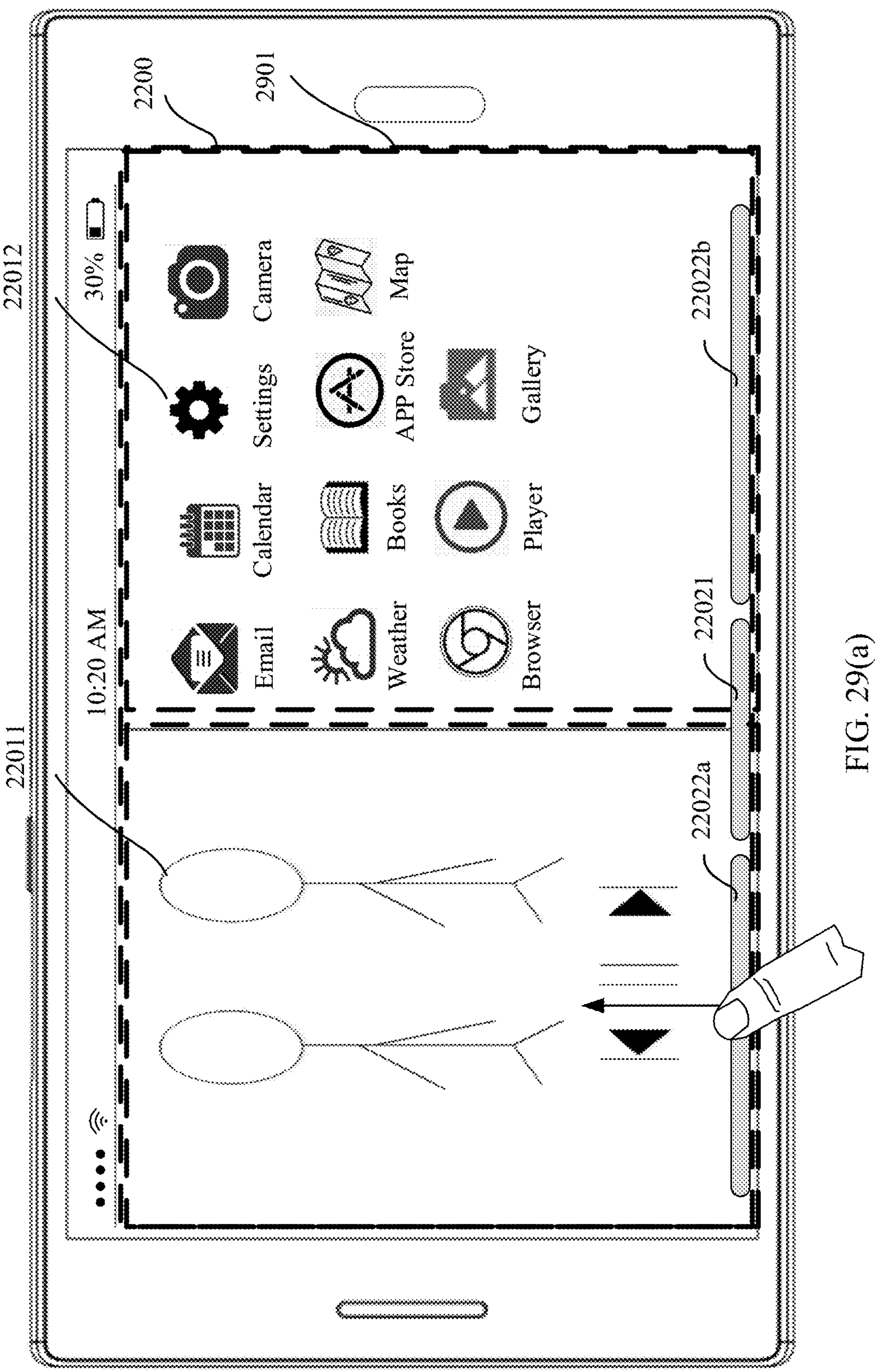
FIG. 29(*a*) to FIG. 29(*d*) are schematic diagrams of a scenario of another interface display method according to an embodiment of this application.
Figure 29B:
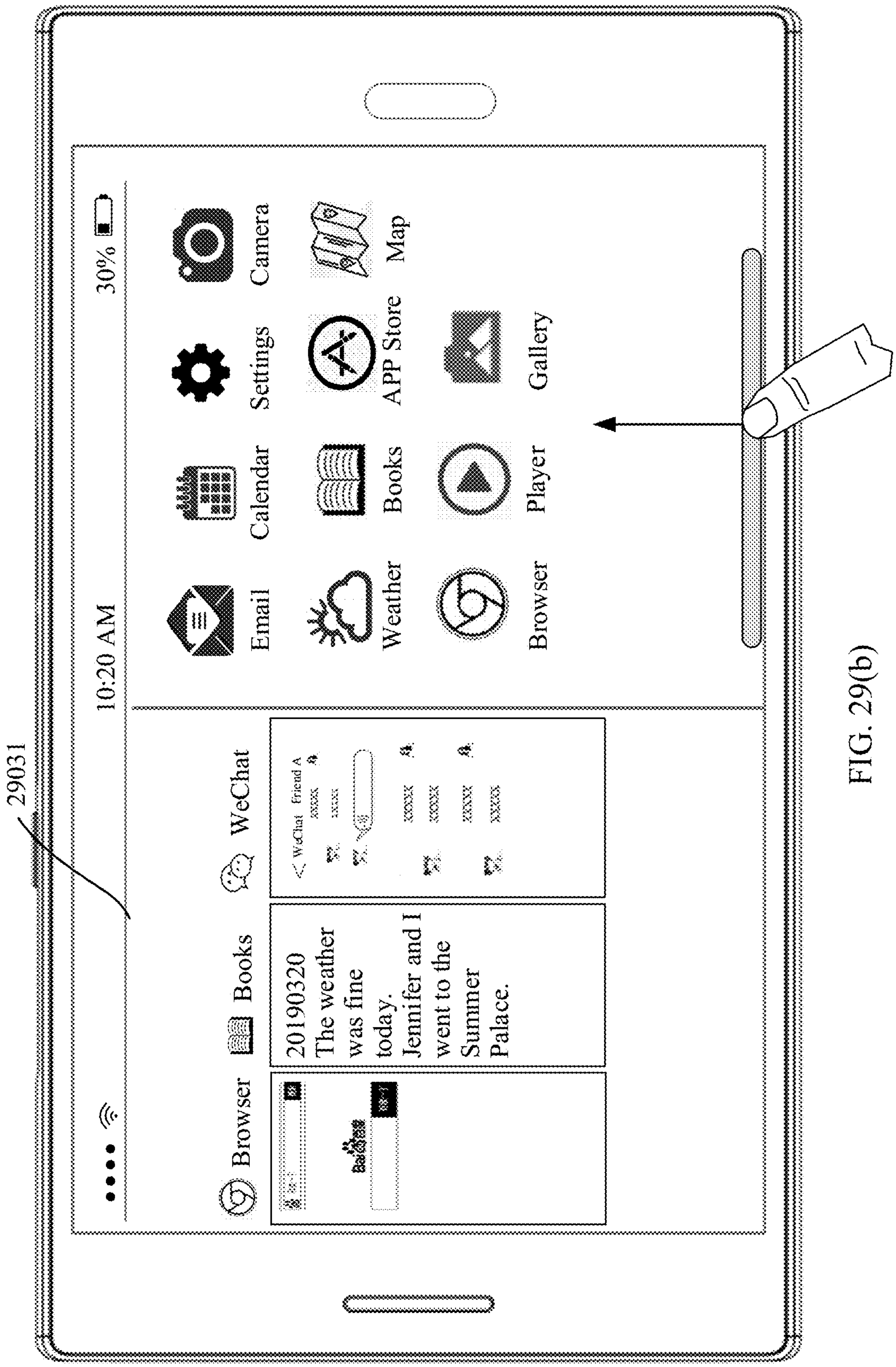
Figure 29C:
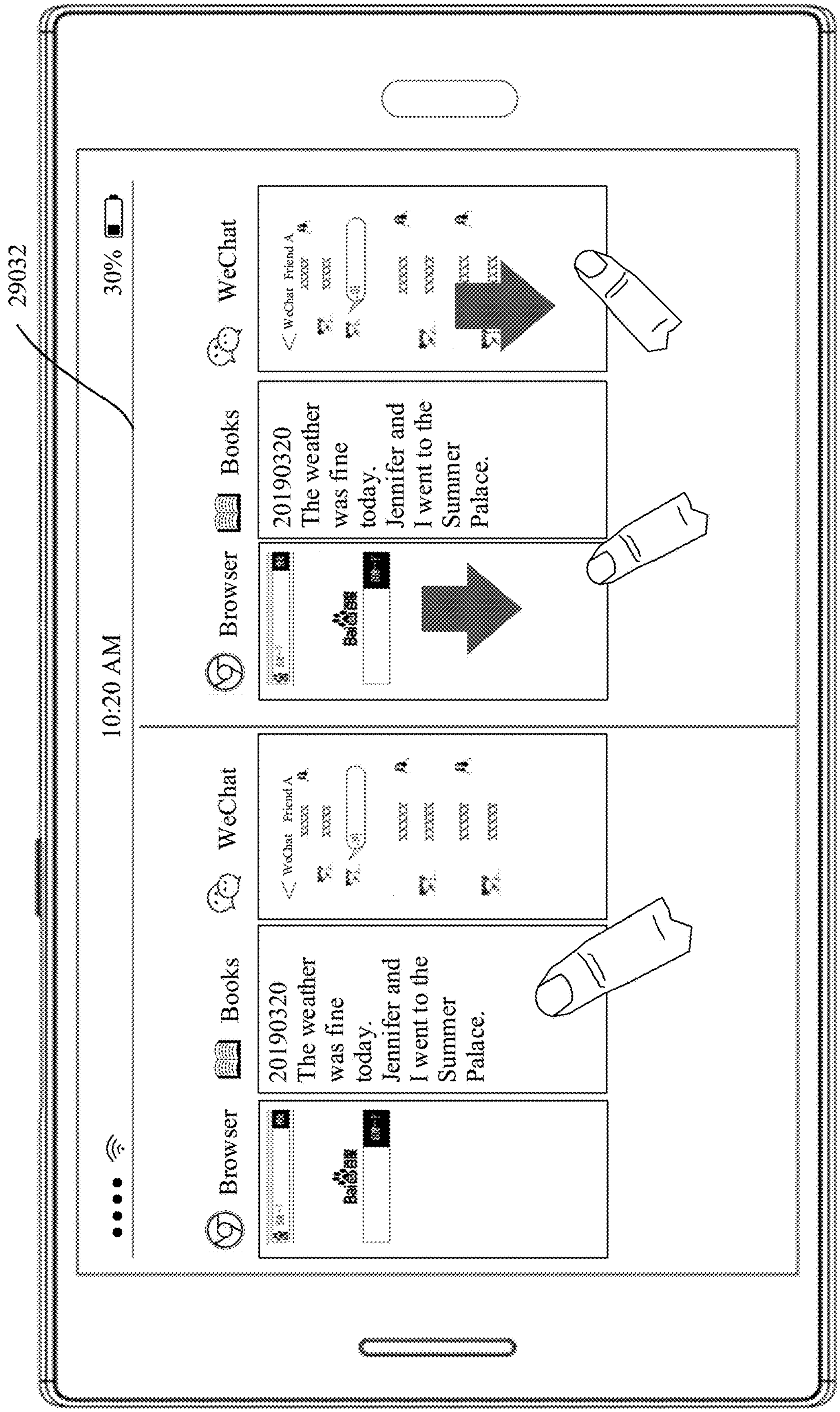
Figure 29D:
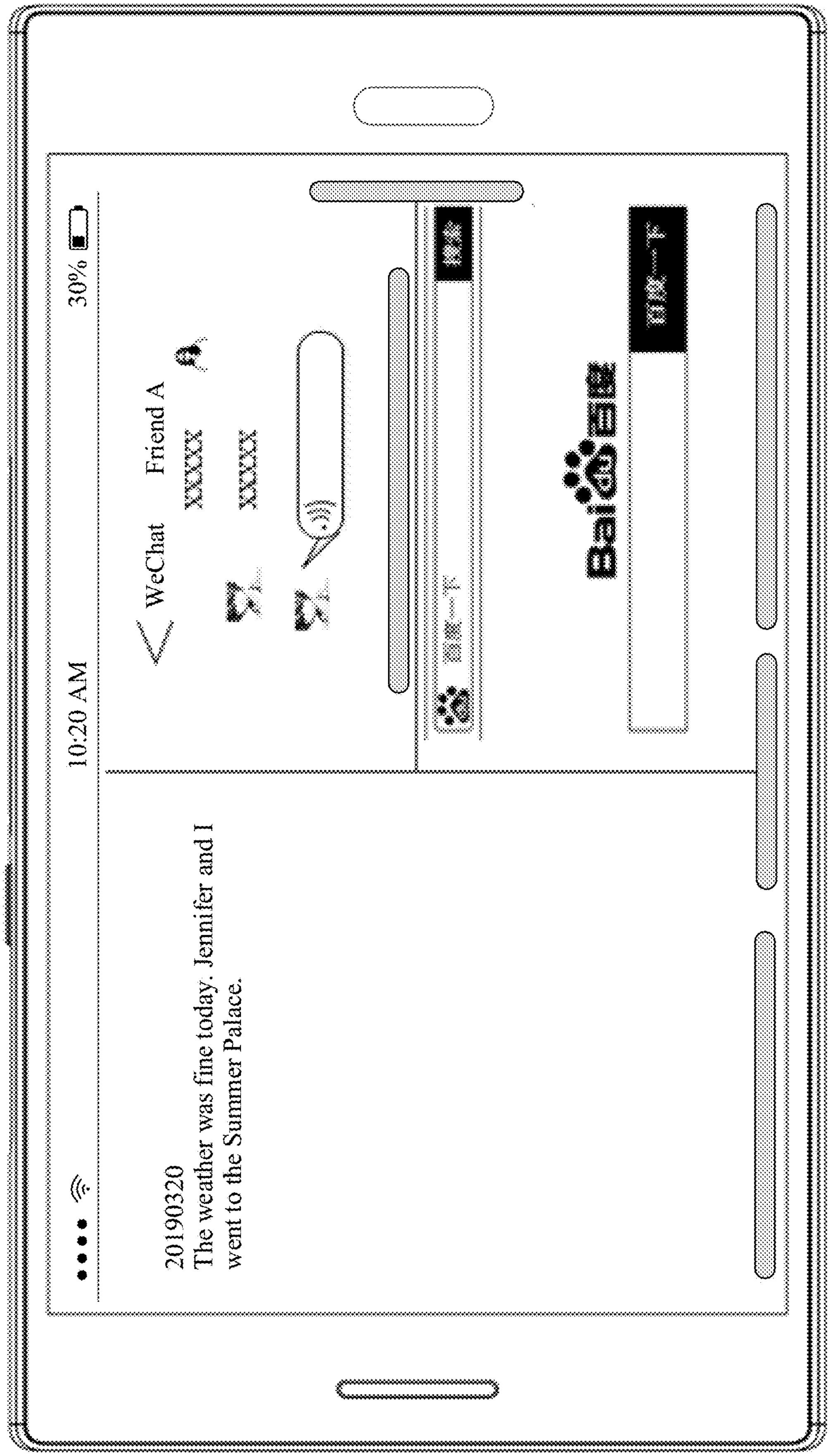
Figure 30A:
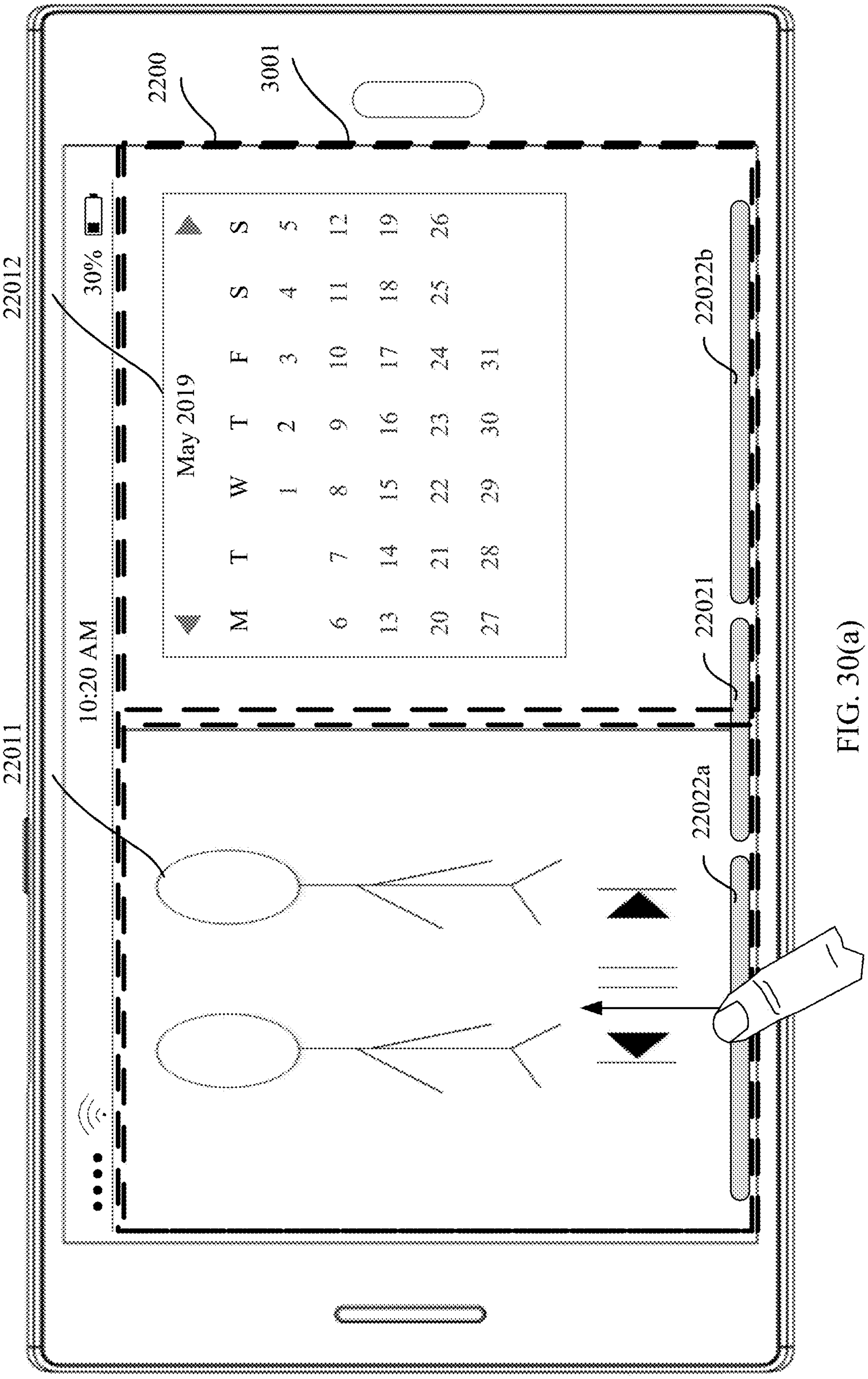
FIG. 30(*a*) to FIG. 30(*f*) are schematic diagrams of a scenario of another interface display method according to an embodiment of this application.
Figure 30B:
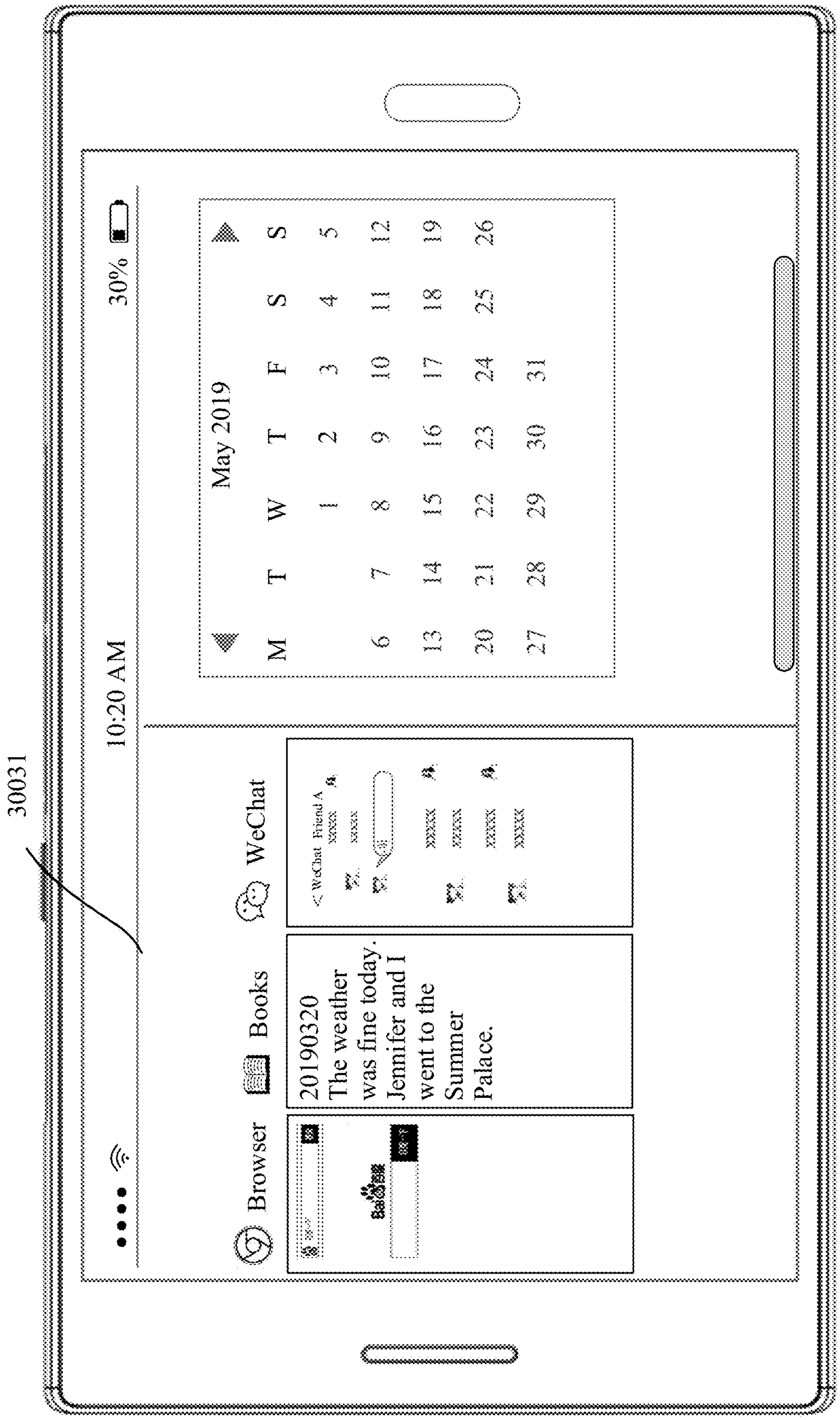
Figure 30C:
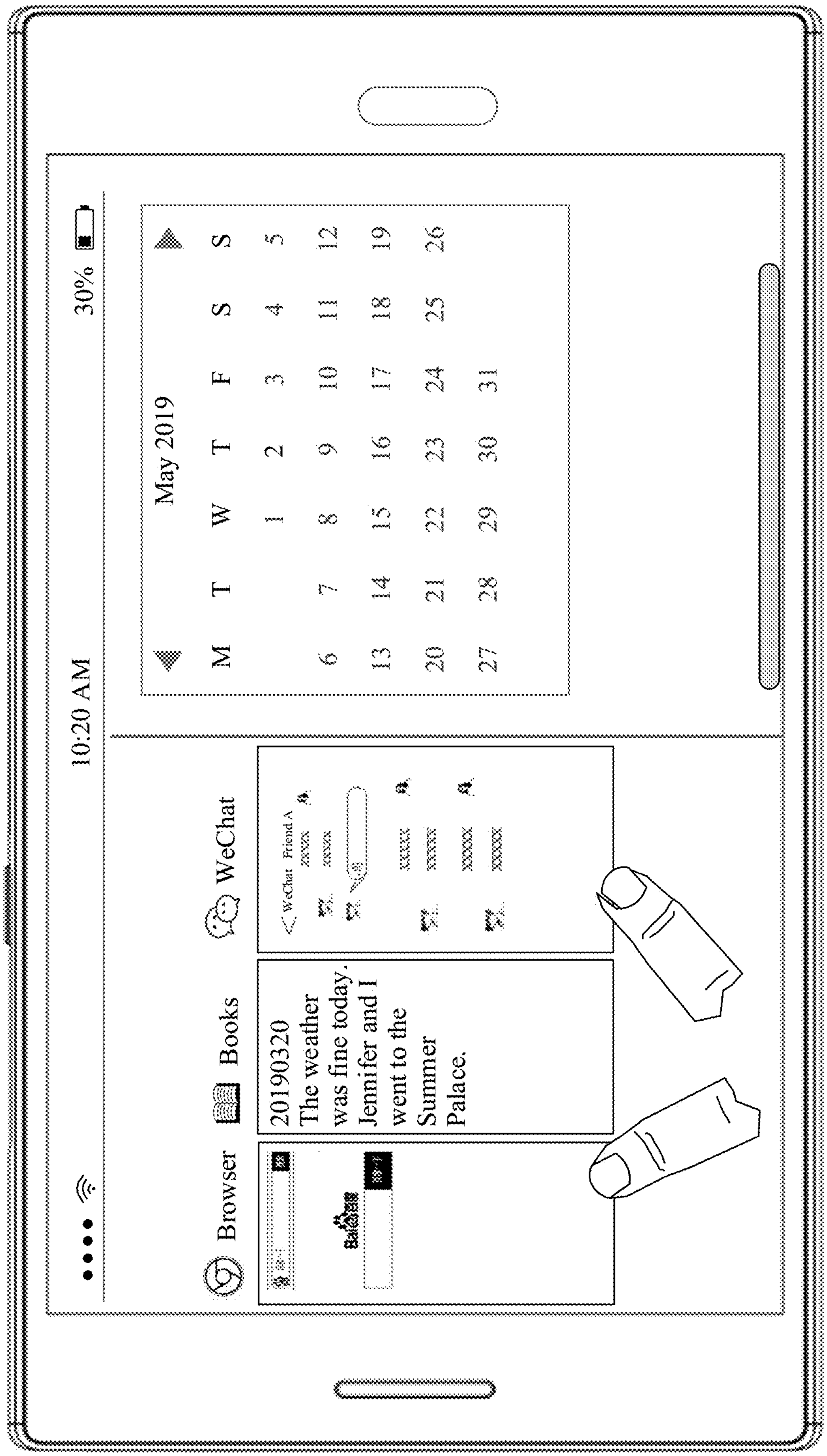
Figure 30D:
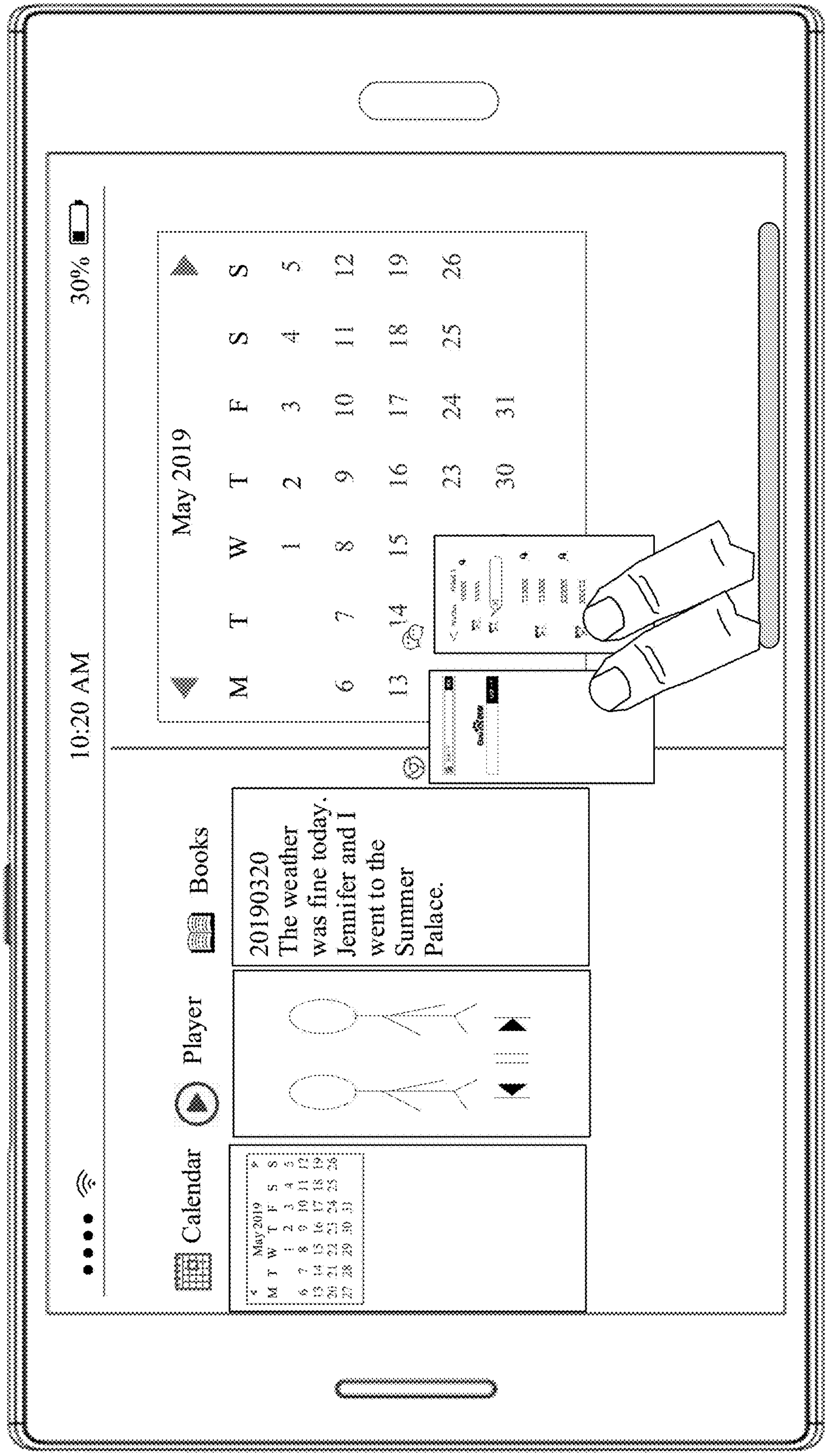
Figure 30E:
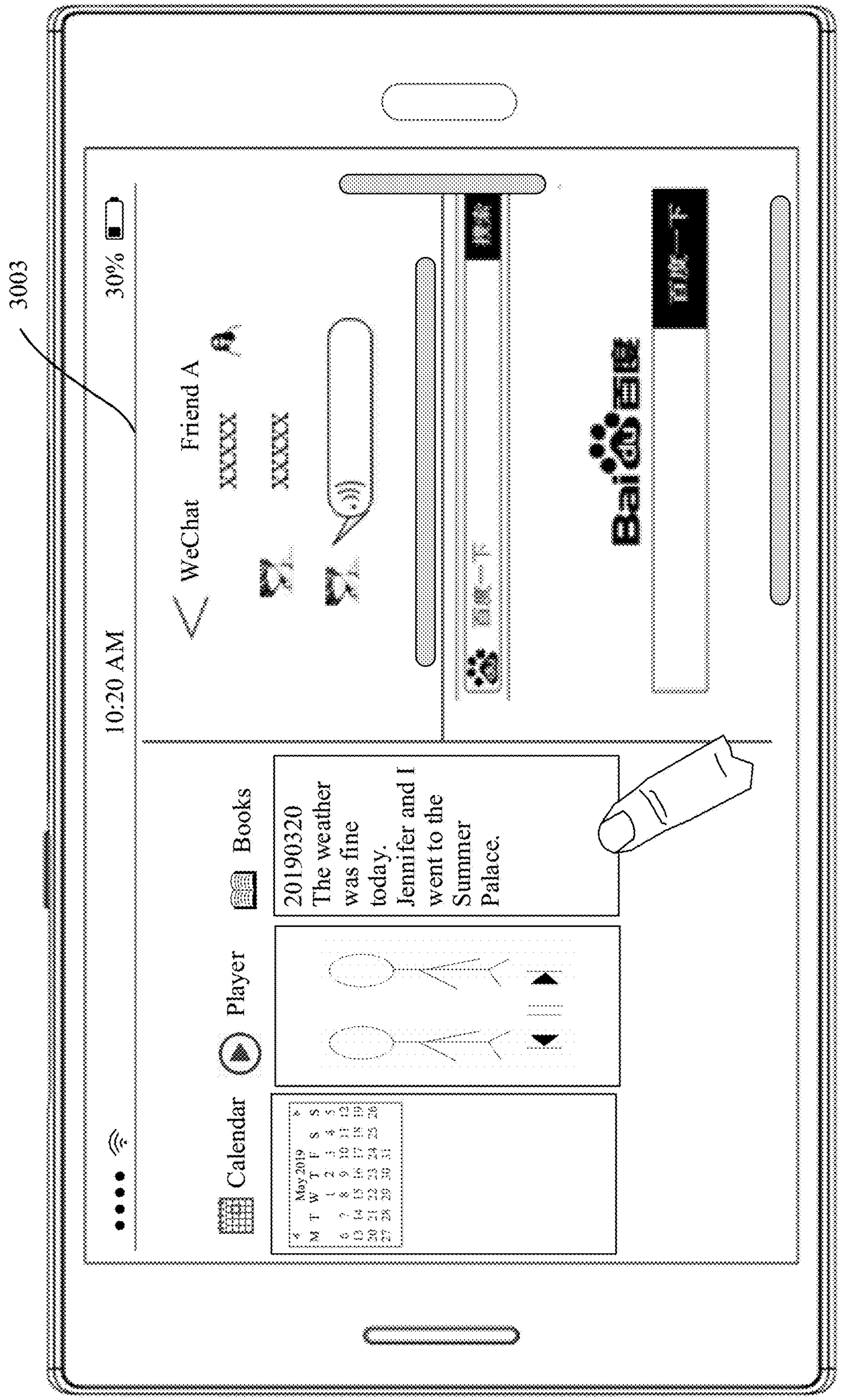
Figure 30F:
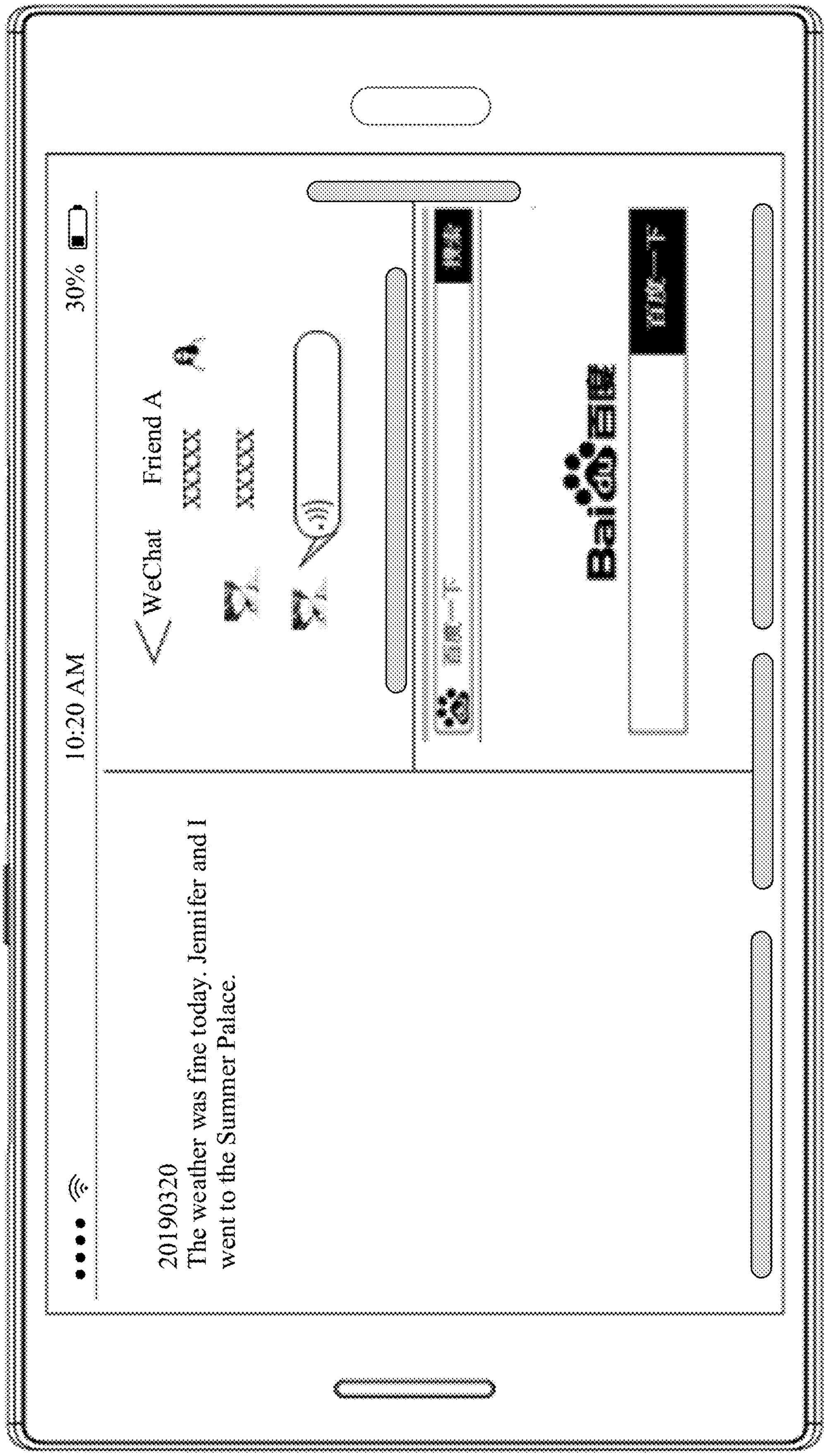
Figure 31A:
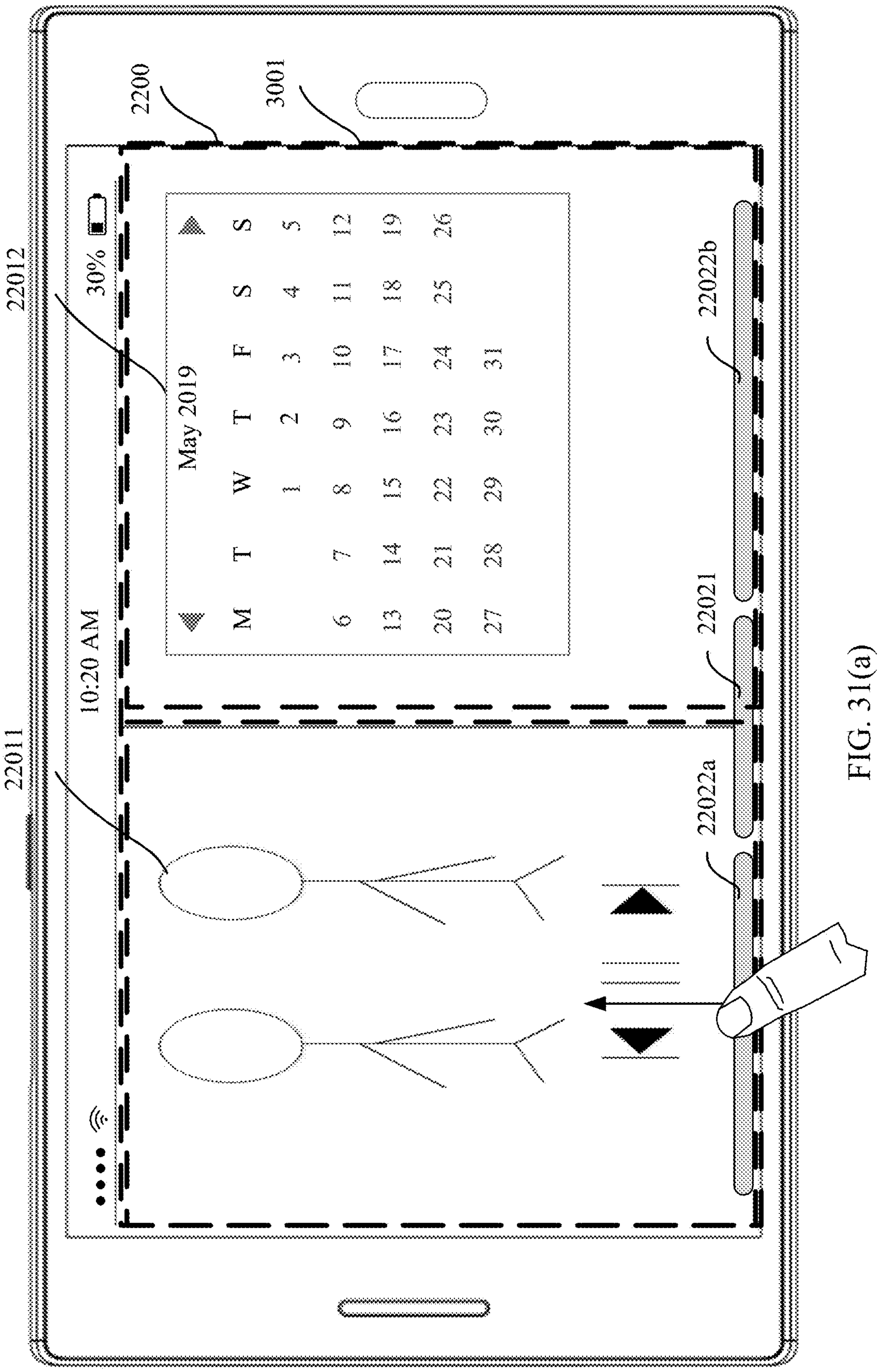
FIG. 31(*a*) to FIG. 31(*f*) are schematic diagrams of a scenario of another interface display method according to an embodiment of this application.
Figure 31B:
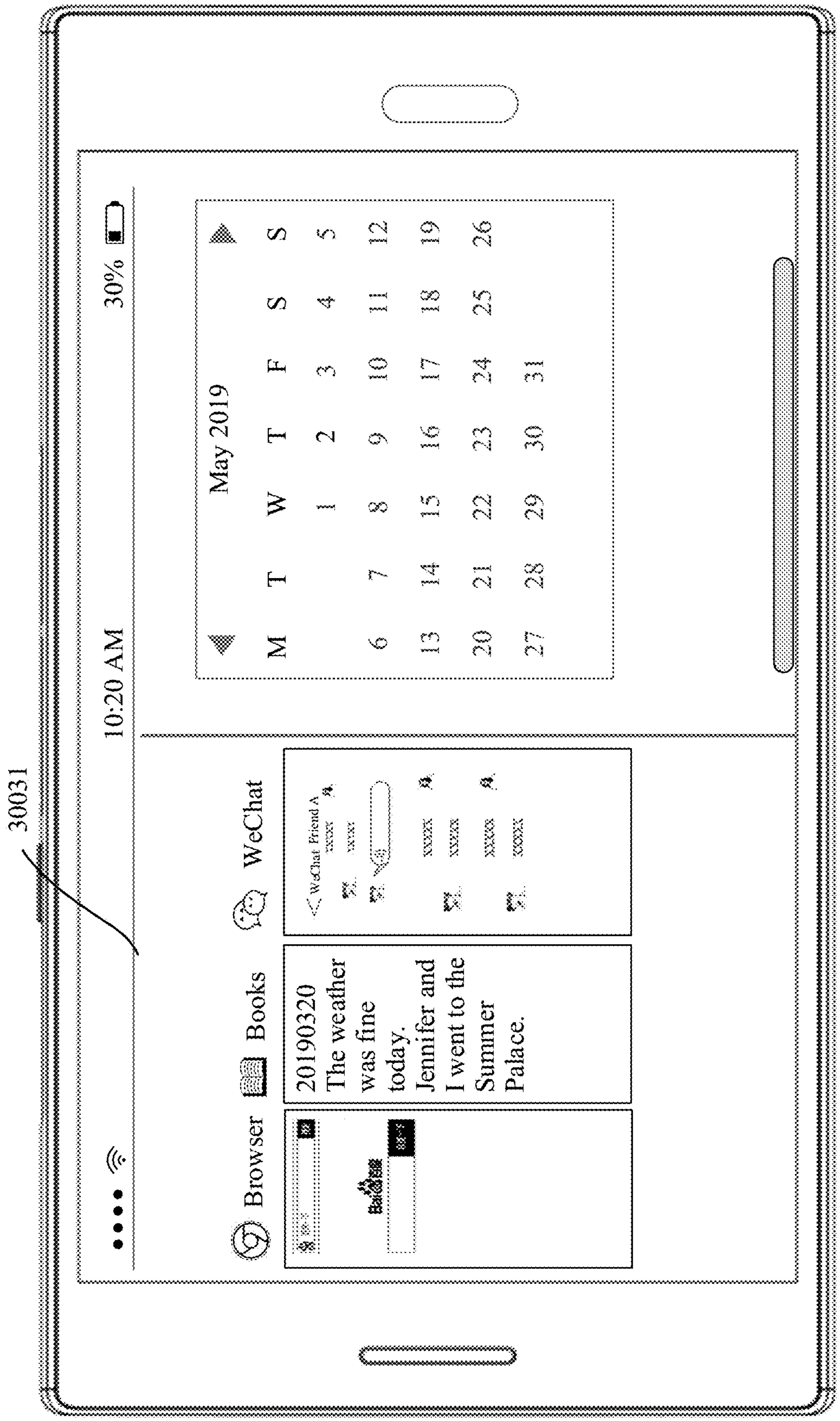
Figure 31C:
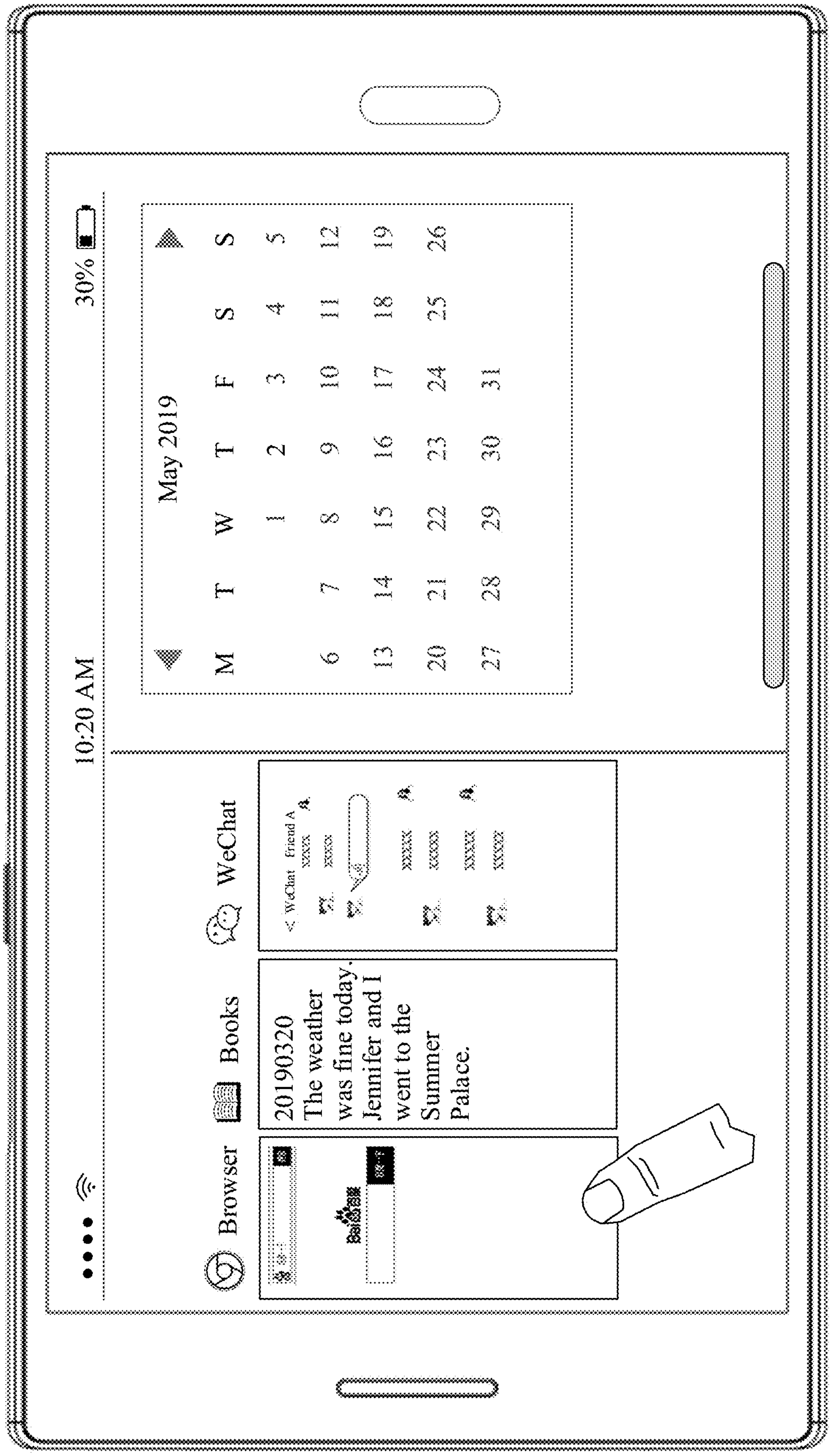
Figure 31D:
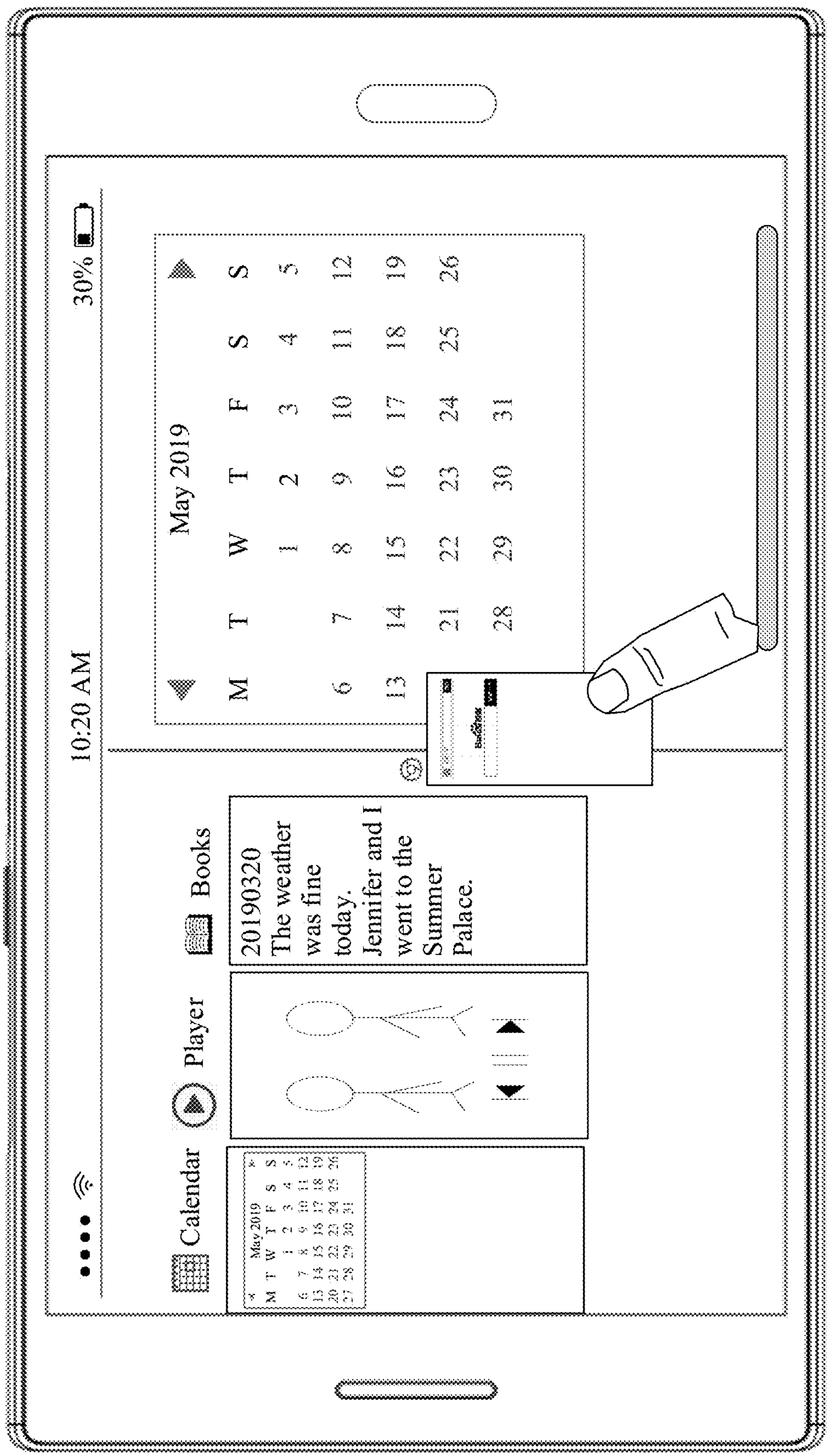
Figure 31E:
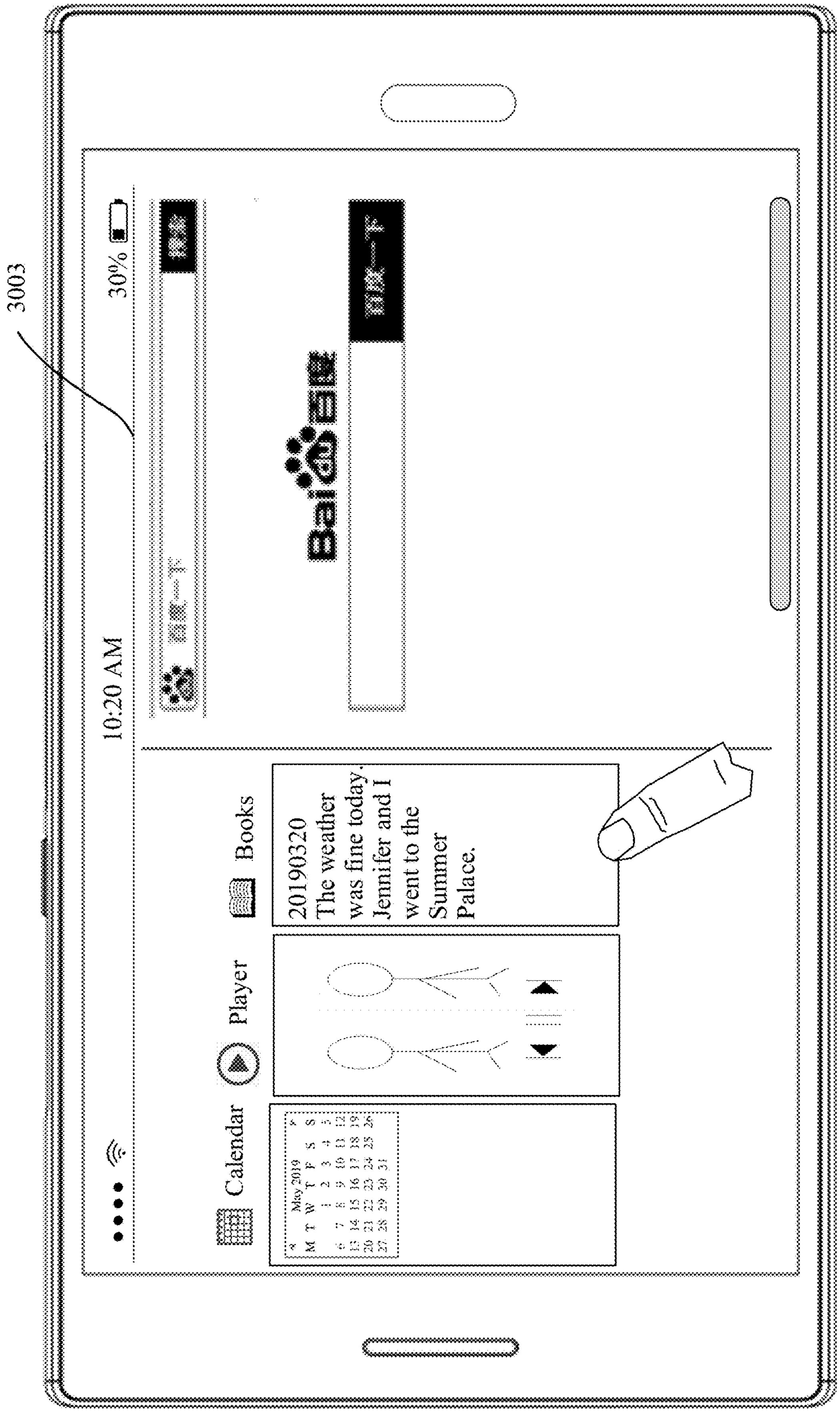
Figure 31F:
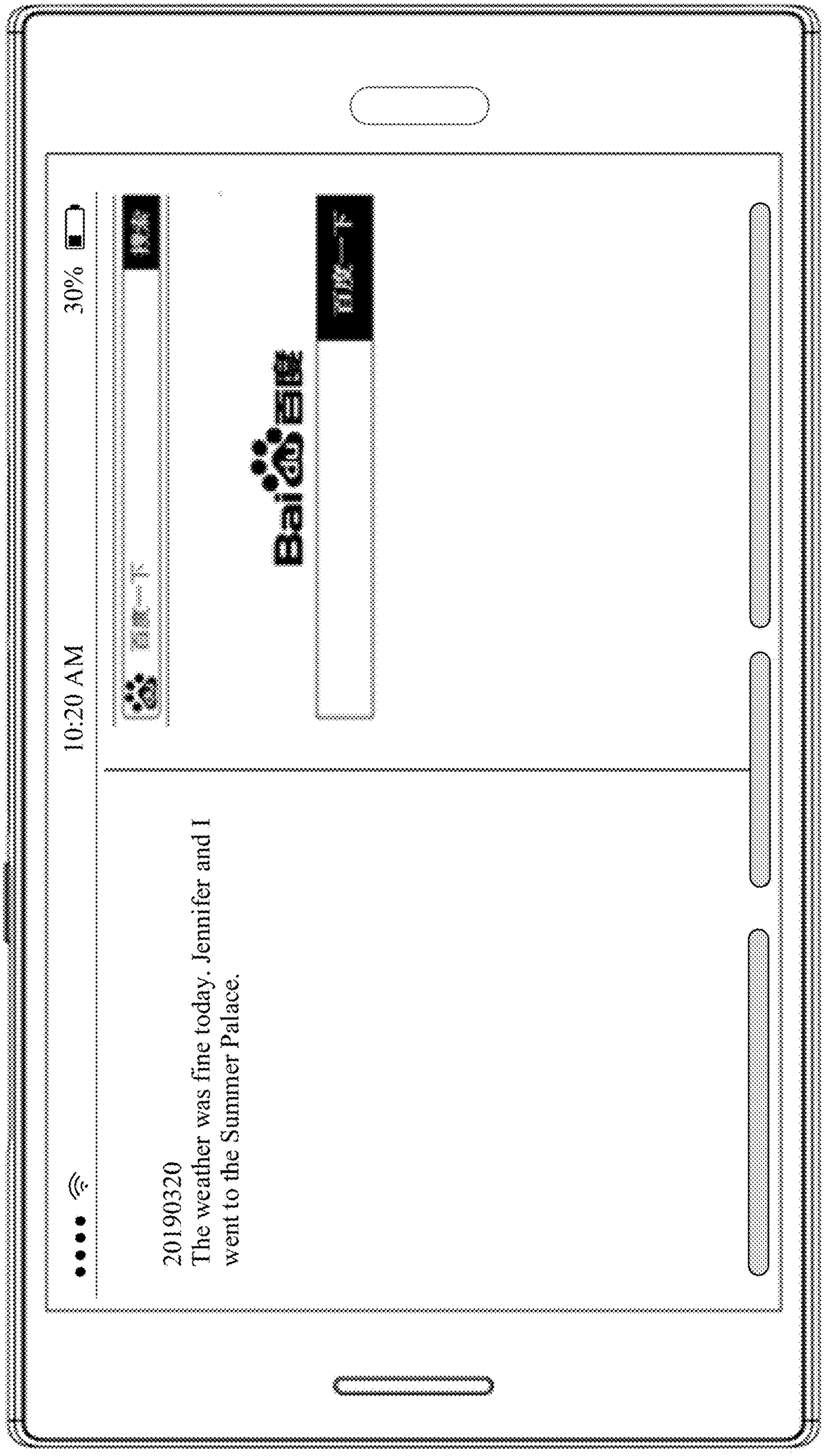

For example, as shown in FIG. 28(*a*) to FIG. 28(*c*), it is assumed that "WeChat" includes a dialog interface 2402 with a friend A and a dialog interface 2404 with a friend B.

As shown in FIG. 28(*a*), the electronic device displays an interface 2401 in a display area 2200. The interface 2401 includes an interface of "Player" and the interface 2402 (namely, an interface of "WeChat"). The display area 2200 includes a display area 22011 and a display area 22012. The electronic device displays the interface of "Player" in the display area 22011, and displays the interface 2402 in the display area 22012. The interface 2204 may include multi-task buttons 22022*a*, 22022*b*, and 22021. The user taps the multi-task button 22022*a*. As shown in FIG. 28(*b*), in response to that the user taps the multi-task button 22022*a*, the electronic device displays an interface 2403 in the display area 22011. The interface 2403 includes an application window of "WeChat", an application window of "Books", an application window of "Browser", and an application window of "Player". In this case, the application window of "WeChat", the application window of "Books", and the application window of "Browser" are displayed in the display area 22011. The user taps the application window of "WeChat". In this case, "WeChat" includes a plurality of interfaces. The interface 2402 is displayed in the display area 21012, and the interface 2404 is not displayed. As shown in FIG. 28(*c*), in response to tapping the application window of "WeChat", the electronic device displays the interface 2404 in the display area 22011. In this case, display content in the display area 22012 is still the interface 2402.

It may be understood that, as shown in FIG. 29(*a*) to FIG. 29(*d*), when the user wants to change content displayed in a plurality of display areas, the user may perform an operation on the plurality of display areas to change the content displayed in the plurality of display areas. FIG. 29(*a*) to FIG. 29(*d*) are schematic diagrams of a scenario of another interface display method according to an embodiment of this application. As shown in FIG. 29(*a*), the electronic device displays an interface 2901 in a display area 2200. The interface 2901 includes an interface of "Player" and a home screen. The display area 2200 includes a display area 22011 and a display area 22012. The electronic device displays the interface of "Player" in the display area 22011, and displays the home screen in the display area 22012. The interface 2901 may include multi-task buttons 22022*a*, 22022*b*, and 22021. The user taps the multi-task button 22022*a*. As shown in FIG. 28(*b*), in response to that the user taps the multi-task button 22022*a*, the electronic device displays a multi-task interface (for example, an interface 29031) in the display area 22011. The interface 29031 includes an application window of "WeChat", an application window of "Books", an application window of "Browser", and an application window of "Player". Still as shown in FIG. 28(*b*), the user taps the multi-task button 22022*b*. As shown in FIG. 28(*c*), in response to that the user taps the multi-task button 22022*b*, the electronic device displays a multi-task interface (for example, an interface 29032) in the display area 22012. The interface 29032 includes the application window of "WeChat", the application window of "Books", the application window of "Browser", and the application window of "Player". The user slides down the application window of "Browser" and the application window of "WeChat" on the interface 29032. The user taps the application window of "Books" on the interface 29031. As shown in FIG. 28(*d*), in response to sliding down the application window of "Browser" and the application window of "WeChat" on the interface 29032, the electronic device displays an interface of "WeChat" and an interface of "Browser" in the display area 22012. In response to that the user taps the application window of "Books" on the interface 29031, the electronic device displays an interface of "Books" in the display area 22021.

It may be understood that the user may alternatively slide down the application window of "Browser" and the application window of "WeChat" on the interface 29032, and slide down the application window of "Books" on the interface 29031. In this case, in response to sliding down the application window of "Browser" and the application window of "WeChat" on the interface 29032, the electronic device displays the interface of "WeChat" and the interface of "Browser" in the display area 22012. In response to that the user slides down the application window of "Books" on the interface 29031, the electronic device displays the interface of "Books" and the interface of "Player" in the display area 22021.

It may be understood that, in the interface display method shown in FIG. 29(*a*) to FIG. 29(*d*), when the user wants to change content displayed in the display area 22011 and the display area 22012, the user needs to separately operate the display area 22011 and the display area 22012, to display one multi-task interface in the display area 22011 and display another multi-task interface in the display area 22012. An operation process is relatively complex. To further simplify a user operation, as shown in FIG. 30(*a*) to FIG. 31(*f*), an embodiment of this application provides another interface display method.

FIG. 30(*a*) to FIG. 30(*f*) are schematic diagrams of a scenario of the another interface display method according to an embodiment of this application.

In FIG. 30(*a*), the electronic device displays an interface 3001 in a display area 2200. The interface 3001 includes an interface of "Player" and an interface of "Calendar". The display area 2200 includes a display area 22011 and a display area 22012. The electronic device displays the interface of "Player" in the display area 22011, and displays the interface of "Calendar" in the display area 22012. The interface 3001 may include multi-task buttons 22022*a*, 22022*b*, and 22021. The user taps the multi-task button 22022*a*. As shown in FIG. 30(*b*), in response to that the user taps the multi-task button 22022*a*, the electronic device displays a multi-task interface (for example, an interface 30031) in the display area 22011. The interface 30031 includes an application window of "WeChat", an application window of "Books", an application window of "Browser", an application window of "Calendar", and an application window of "Player". As shown in FIG. 30(*c*) and FIG. 30(*d*), the user moves the application window of "WeChat" and the application window of "Browser" on the interface 29031 to the display area 22012. In other words, application windows of a plurality of applications displayed in a display area (for example, the display area 22011) are moved to another display area (for example, the display area 22012). As shown in FIG. 30(*e*), in response to an operation G of the user, the electronic device displays an interface 3003 in the display area 22012. The interface 3003 includes an interface of "WeChat" and an interface of "Browser". In other words, the electronic device displays the interface of "WeChat" and the interface of "Browser" in different areas in the display area 22012. Then, still as shown in FIG. 30(*e*), the user taps the application window of "Books" on the interface 29031. As shown in FIG. 30(*f*), in response to that the user taps the application window of "Books" on the interface 29021, the electronic device displays an interface of "Books" in the display area 22021.

FIG. 31(*a*) to FIG. 31(*f*) are schematic diagrams of a scenario of another interface display method according to an embodiment of this application.

FIG. 31(*a*) is the same as FIG. 30(*a*), and FIG. 31(*b*) is the same as FIG. 30(*b*). Details are not described herein again. As shown in FIG. 31(*c*) and FIG. 31(*d*), the electronic device receives an operation G of the user. The operation G is moving an application window of "Browser" on an interface 29031 to a display area 22012. In other words, an application window of an application displayed in a display area (for example, a display area 22011) is moved to another display area (for example, the display area 22012). As shown in FIG. 30(*e*), in response to the operation G of the user, the electronic device displays an interface 3103 in the display area 22012. The interface 3103 is an interface of "Browser". Then, still as shown in FIG. 30(*e*), the user taps an application window of "Books" on the interface 29031. As shown in FIG. 30(*f*), in response to that the user taps the application window of "Books" on the interface 29021, the electronic device displays an interface of "Books" in the display area 22021.

It can be learned that, different from the method shown FIG. 29(*a*) to FIG. 29(*d*) in which the user needs to perform two operations to separately display the multi-task interface in the display area 22011 and the display area 22012, the method shown in FIG. 30(*a*) to FIG. 30(*f*) allows the user to perform only one operation to display the multi-task interface in a display area, so as to change content displayed in two display areas.

It should be noted that an operation used to display a multi-task interface in a display area includes but is not limited to the manner described in the foregoing embodiment.

FIG. 32(*a*) to FIG. 32(*c*) are schematic diagrams of a scenario of another interface display method according to an embodiment of this application. The application scenario shown in FIG. 31(*a*) to FIG. 31(*f*) is that the user simultaneously watches a video and replies to a WeChat message of a friend A by using the electronic device. An application window of "Player" is displayed in a display area 22011. An application window of "WeChat" is displayed in a display area 22012. In this case, the user wants to read a book. The user wants to combine the display area 22011 and the display area 22012, and display an interface of "Books" in a combined display area.

As shown in FIG. 32(*a*), the electronic device displays an interface 3201 in a display area 2200. The interface 3201 includes an interface of "Player" and an interface of "WeChat". The electronic device displays the interface of "Player" in the display area 22011, and displays the interface of "WeChat" in the display area 22012. The display area 2200 includes the display area 22011 and the display area 22021. A multi-task button 22021 is used to indicate the electronic device to display a multi-task interface in the display area 2200. The user taps the multi-task button 22021. As shown in FIG. 32(*b*), in response to that the user taps the multi-task button 22021, the electronic device displays a multi-task interface (for example, an interface 2203) in the display area 2200. The interface 2203 includes the application window of "WeChat", an application window of "Books", an application window of "Browser", and the application window of "Player". The user taps the application window of "Books". As shown in FIG. 32(*c*), in response to that the user taps the application window of "Books", the electronic device displays the interface of "Books" in the display area 2200.

FIG. 33(*a*) to FIG. 33(*f*) are schematic diagrams of a scenario of another interface display method according to an embodiment of this application.

For example, as shown in FIG. 33(*a*), FIG. 33(*c*), or FIG. 33(*e*), the electronic device displays an interface 3301 in a display area 3300. The interface 3301 includes an interface of "Player", an interface of "WeChat", and an interface of "Browser". The electronic device displays the interface of "Player" in a display area 33001, displays the interface of "WeChat" in a display area 33003, and displays the interface of "Browser" in a display area 33004. The display area 33003 includes the display area 33001 and a display area 33002. A display area 33006 includes the display area 33001 and the display area 33002. The user may slide a plurality of display areas through multi-point sliding to display a multi-task interface in the plurality of display areas.

As shown in FIG. 33(*a*), when the user slides the display area 33003 and the display area 33004 through multi-point sliding, as shown in FIG. 33(*b*), in response to the operation, the electronic device combines the display area 33003 and the display area 33004, and displays the multi-task interface in the combined display area 33002. As shown in FIG. 33(*c*), when the user slides the display area 33001 and the display area 33003 through multi-point sliding, as shown in FIG. 33(*d*), in response to the operation A, the electronic device combines the display area 33001 and the display area 33003, and displays the multi-task interface in the combined display area 33005. It should be noted that a combined display area may be different from superimposition of display areas that are combined. As shown in FIG. 33(*e*), when the user slides the display area 33001, the display area 33003, and the display area 33004 through multi-point sliding, as shown in FIG. 33(*d*), in response to the operation, the electronic device combines the display area 33001, the display area 33003, and the display area 33004, and displays the multi-task interface in a combined display area 3300.

It should be noted that the multi-point sliding is used as an example for description in FIG. 33(*a*) to FIG. 33(*f*). It may be understood that, as shown in FIG. 34(*a*)-1 to FIG. 34(*c*)-2, the multi-point sliding operation may alternatively be replaced with another operation, for example, a single-point sliding operation. A sliding track may be a straight line or a curve.

Optionally, to help the user adjust a size of each display area, the multi-task button may further be used to adjust the size of each display area. The user may slide the multi-task button in a direction perpendicular to a division line to adjust the size of each display area divided by the division line. Optionally, a length of the multi-task button may vary with a size of the display area.

Figure 35A:
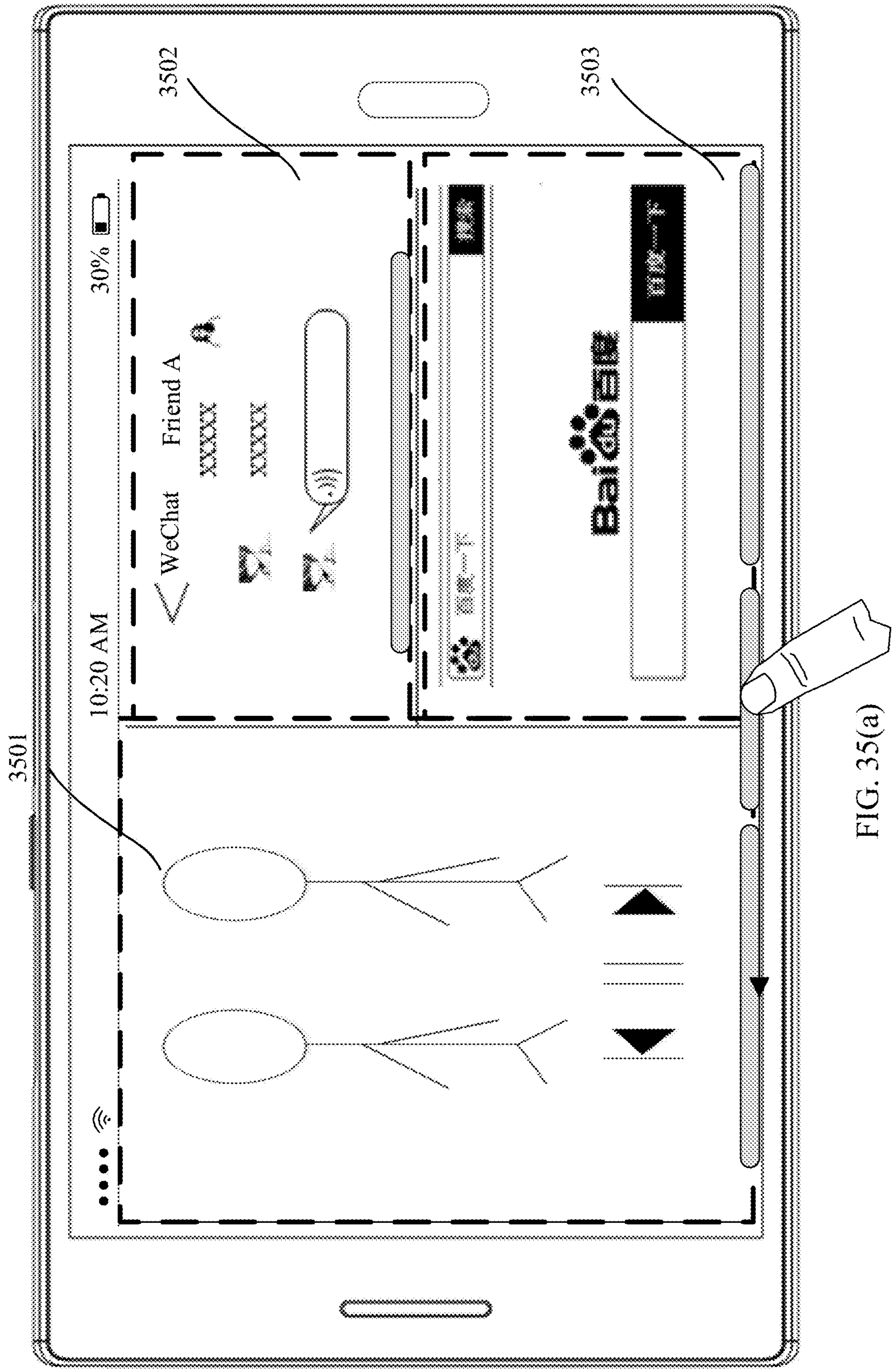
FIG. 35(*a*) and FIG. 35(*b*) are schematic diagrams of a scenario of another interface display method according to an embodiment of this application.
Figure 35B:
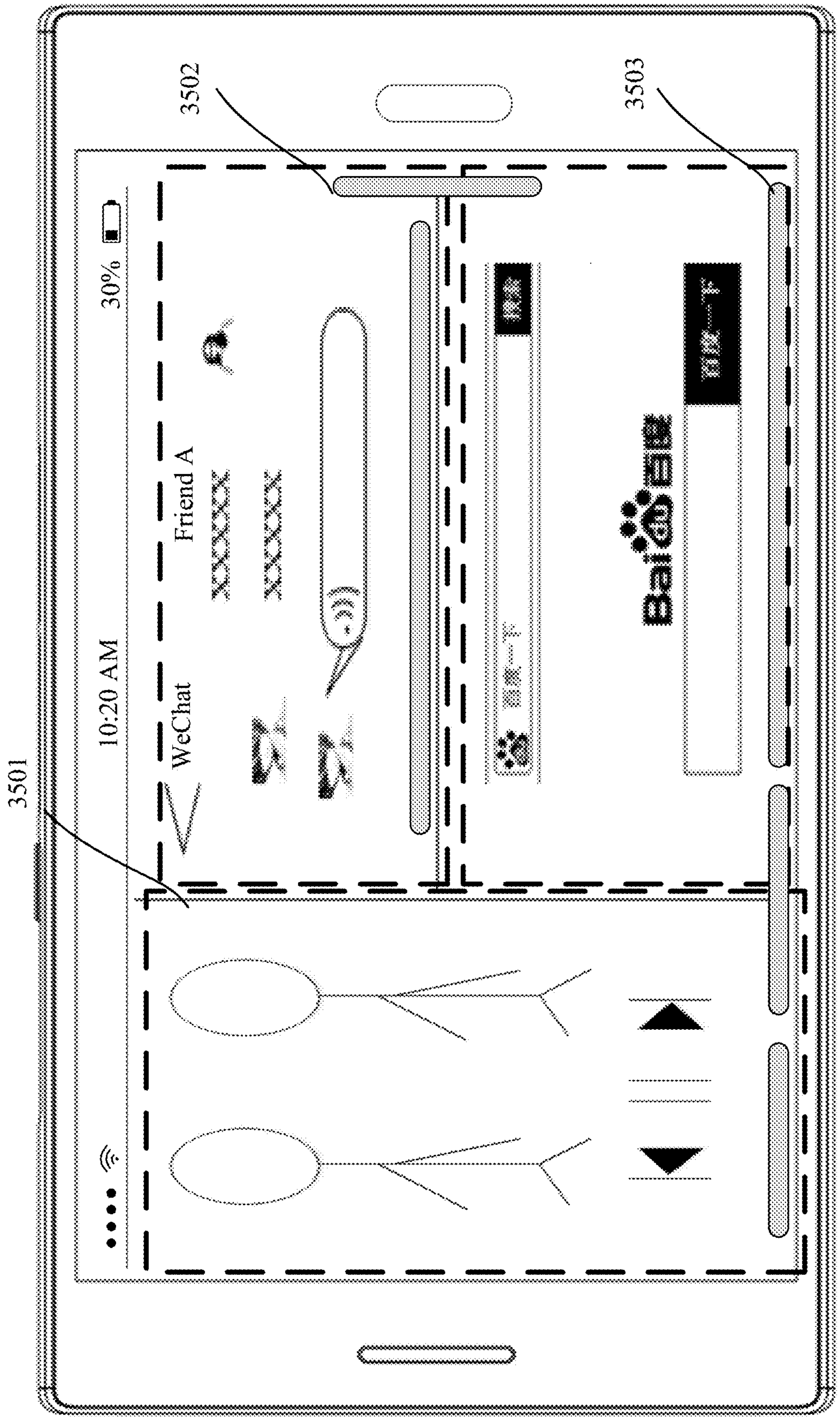

For example, as shown in FIG. 35(*a*) and FIG. 35(*b*), the user may slide a multi-task button 3504 left, to reduce a width of a display area 3501 and increase widths of a display area 3502 and a display area 3503. It may be understood that a reduced width of the display area 3501 is the same as an increased width of the display area 3502 or the display area 3503.

Optionally, the operation G may be sliding from a display area to another display area. In response to the operation G of the user, the electronic device combines display areas on which the sliding operation is performed, and displays the multi-task interface in the combined display area.

An embodiment of this application discloses an electronic device, including a display, a processor, a memory, one or more sensors, an application, and a computer program. The foregoing components may be connected through one or more communications buses. The one or more computer programs are stored in the memory and are configured to be executed by the one or more processors. The one or more computer programs include instructions, and the instructions may be used to enable the electronic device to perform the steps in the foregoing embodiments. The one or more sensors may include a touch sensor.

For example, the processor may be specifically the processor 110 shown in FIG. 3, the memory may be specifically the internal memory 121 and/or the external memory shown in FIG. 3, the display may be specifically the display 194 shown in FIG. 3, the sensor may be specifically one or more sensors in the sensor module 180 shown in FIG. 3, and the touch sensor may be the touch sensor 180K shown in FIG. 3. This is not limited in this embodiment of this application.

In addition, an embodiment of this application further provides a graphical user interface (GUI) on an electronic device. The graphical user interface specifically includes a graphical user interface displayed when the electronic device performs the foregoing method embodiments.

All or some of the foregoing embodiments may be implemented by using software, hardware, firmware, or any combination thereof. When a software program is used to implement the embodiments, all or some of the embodiments may be implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (Solid State Disk, SSD)), or the like.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. An interface display method, performed by an electronic device, wherein the electronic device comprises a display, and the method comprises:

displaying an interface of a first application in a first display area of the display, the first application is currently running;

when the electronic device displays the interface of the first application, receiving, by the electronic device, a first user operation;

displaying, by the electronic device, a first area and a second area of a multi-task interface in the first display area in response to the first user operation, the first area comprises an application window of the first application, and the second area comprises an application window of a second application and an application window of a third application, the second application and the third application are currently running, the application window of first application comprises a thumbnail image of the interface of the first application, the application window of second application includes thumbnail image of the interface of the second application, the application window of third application includes thumbnail image of the interface of the third application;

while displaying the multi-task interface, receiving a second user operation performed on the application window of the third application;

moving the application window of the third application to the first area in response to the second user operation;

while displaying the multi-task interface, receiving a third user operation performed on the application window of the third application;

moving the application window of the third application to the second area in response to the third user operation;

while displaying the multi-task interface, receiving a fourth user operation performed on the application window of the second application;

moving the application window of the second application to the first area in response to the fourth user operation;

while displaying the multi-task interface receiving a fifth user operation;

adjusting a location of the application window of the first application or the application window of the second application in the first area in response to the fifth user operation and displaying the interface of the first application and an interface of the second application in different areas in the first display area based on the arrangement of the application windows of the first and second application in the first area after the electronic device moves the application window of the second application to the first area, wherein during the preceding steps the first area is smaller than the second area.

2. The method according to claim 1, wherein the displaying, by the electronic device, the interface of the first application and the interface of the second application in different areas in the first display area based on the arrangement of the application windows of the first and second application in the first area after the electronic device moves the application window of the second application to the first area comprises:

after the electronic device moves the application window of the second application to the first area, receiving a sixth user operation; and displaying the interface of the first application and the interface of the second application in different areas in the first display area based on the arrangement of the application windows of the first and second application in the first area in response to the sixth user operation.

3. The method according to claim 2, wherein the displaying the interface of the first application and an interface of the second application in different areas in the first display area based on the arrangement of the application windows of the first and second application in the first area is done such that a relative location between the interface of the first application and the interface of the second application in the first area is the same as a relative location between the application window of the first application in the first area and the application window of the second application in the second area.

4. The method according to claim 2, wherein the displaying the interface of the first application and an interface of the second application in different areas in the first display area based on the arrangement of the application windows of the first and second application in the first area in response to the sixth user operation comprises:

if the application window of the first application is located on the left side of the application window of the second application, displaying the interface of the first application on the left side of the first display area and displaying the interface of the second application on the right side of the first display area, if the application window of the first application is located on the right side of the application window of the second application, displaying the interface of the second application on the left side of the first display area and displaying the interface of the first application on the right side of the first display area.

5. The method according to claim 2, wherein the application window of the first application is not displayed in the second area.

6. The method according to claim 2, further comprises:

receiving a seventh user operation on the multi-task interface; and;

in response to the seventh user operation, scrolling the displayed application window of the currently running application comprised in the second area.

7. The method according to claim 2, further comprises:

when displaying the multi-task interface in the first display area, the interface of the first application is not displayed;

when displaying the interface of the first application and the interface of the second application, the multi-task interface is not displayed.

8. The method according to claim 2, wherein the first application is a video application, and the second application is an instant messaging application.

9. An electronic device, comprising:

a display;

a processor; and a memory, configured to store a computer program, wherein the computer program comprises instructions, and when the instructions are executed by the electronic device they cause the electronic device to perform:

displaying an interface of a first application in a first display area of the display, while the first application is currently running;

when the electronic device displays the interface of the first application, receiving, by the electronic device, a first user operation;

displaying, by the electronic device, a first area and a second area of a multi-task interface in the first display area in response to the first user operation, the first area comprises an application window of the first application, and the second area comprises an application window of a second application and an application window of a third application, the second application and the third application are currently running, the application window of first application comprises a thumbnail image of the interface of the first application, the application window of second application includes a thumbnail image of the interface of the second application, the application window of third application includes a thumbnail image of the interface of the third application;

while displaying the multi-task interface, receiving a second user operation performed on the application window of the second application;

moving the application window of the third application to the first area in response to the second user operation;

while displaying the multi-task interface, receiving a third user operation performed on the application window of the third application;

moving the application window of the third application to the second area in response to the third user operation;

while displaying the multi-task interface, receiving a fourth user operation performed on the application window of the second application;

moving the application window of the second application to the first area in response to the fourth user operation;

while displaying the multi-task interface receiving a fifth user operation; and;

adjusting a location of the application window of the first application or the application window of the second application in the first area in response to the fifth user operation and displaying the interface of the first application and an interface of the second application in different areas in the first display area based on the arrangement of the application windows of the first and second application in the first area after the electronic device moves the application window of the second application to the first area, wherein during the preceding steps the first area is smaller than the second area.

10. The device according to claim 9, wherein the displaying, by the electronic device, the interface of the first application and the interface of the second application in different areas in the first display area based on the arrangement of the application windows of the first and second application in the first area after the electronic device moves the application window of the second application to the first area comprises:

after the electronic device moves the application window of the second application to the first area, receiving a sixth user operation; and displaying the interface of the first application and the interface of the second application in different areas in the first display area based on the arrangement of the application windows of the first and second application in the first area in response to the sixth user operation.

11. The device according to claim 10, wherein the displaying the interface of the first application and an interface of the second application in different areas in the first display area based on application windows in the first area comprising:

a location relationship between the interface of the first application and the interface of the second application is same with a location relationship between the application windows of the first application in the first area and the application windows of the second application in the second area.

12. The device according to claim 10, wherein the displaying the interface of the first application and an interface of the second application in different areas in the first display area based on the arrangement of the application windows of the first and second application in the first area comprises:

if the application window of the first application is located on the left side of the application window of the second application, displaying the interface of the first application on the left side of the first display area and displaying the interface of the second application on the right side of the first display area, if the application window of the first application is located on the right side of the application window of the second application, displaying the interface of the second application on the left side of the first display area and displaying the interface of the first application on the right side of the first display area.

13. The device according to claim 10, wherein when the instructions are executed by the electronic device the instructions cause the electronic device to further not display the application window of the first application in the second area.

14. The device according to claim 10, wherein when the instructions are executed by the electronic device they cause the electronic device to further perform:

receiving a seventh user operation on the multitask interface; and;

in response to the seventh user operation, scrolling the displayed application window of the currently running application comprised in the second area.

15. The device according to claim 10, wherein when the instructions are executed by the electronic device they cause the electronic device to further perform:

when displaying the multi-task interface in the first display area, the interface of the first application is not displayed;

when displaying the interface of the first application and the interface of the second application, the multi-task interface is not displayed.

16. The device according to claim 10, wherein the first application is a video application, and the second application is an instant messaging application.

17. A computer-readable storage medium, wherein the computer-readable storage medium stores instructions, and when the instructions are run on an electronic device, they cause the electronic device to perform:

displaying an interface of a first application in a first display area of the display, while the first application is currently running;

when the electronic device displays the interface of the first application, receiving, by the electronic device, a first user operation;

displaying, by the electronic device, a first area and a second area of a multi-task interface in the first display area in response to the first user operation, the first area comprises an application window of the first application, and the second area comprises an application window of a second application and an application window of a third application, the second application and the third application are currently running, the application window of first application comprises a thumbnail image of the interface of the first application, the application window of second application includes a thumbnail image of the interface of the second application, the application window of third application includes a thumbnail image of the interface of the third application;

while displaying the multi-task interface, receiving a second user operation performed on the application window of the second application;

moving the application window of the third application to the first area in response to the second user operation;

while displaying the multi-task interface, receiving a third user operation performed on the application window of the third application;

moving the application window of the third application to the second area in response to the third user operation;

while displaying the multi-task interface, receiving a fourth user operation performed on the application window of the second application;

moving the application window of the second application to the first area in response to the fourth user operation;

while displaying the multi-task interface, receiving a fifth user operation;

adjusting a location of the application window of the first application or the application window of the second application in the first area in response to the fifth user operation; and displaying the interface of the first application and an interface of the second application in different areas in the first display area based on the arrangement of the application windows of the first and second application in the first area after the electronic device moves the application window of the second application to the first area, wherein during the preceding steps the first area is smaller than the second area.

18. The method according to claim 1, wherein a width of the first area is less than a width of the second area.

19. The method according to claim 1, wherein the application window of the third application in the first area is smaller than the application window of the third application in the second area.

20. The method according to claim 1, wherein the first application is switched to the background in response to the first user operation.

* * * * *